(12) United States Patent
Scheper et al.

(10) Patent No.: US 10,225,707 B1
(45) Date of Patent: Mar. 5, 2019

(54) SPACE GUIDANCE AND MANAGEMENT SYSTEM AND METHOD

(71) Applicant: Steelcase Inc., Grand Rapids, MI (US)

(72) Inventors: Robert Scheper, Grand Rapids, MI (US); Darrin Sculley, Byron Center, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 15/935,319

(22) Filed: Mar. 26, 2018

Related U.S. Application Data

(63) Continuation of application No. 15/170,550, filed on Jun. 1, 2016, now Pat. No. 9,955,318, which is a
(Continued)

(51) Int. Cl.
*H04W 4/30* (2018.01)
*G06Q 10/06* (2012.01)
*G06Q 30/02* (2012.01)

(52) U.S. Cl.
CPC ...... *H04W 4/30* (2018.02); *G06Q 10/063114* (2013.01); *G06Q 30/0281* (2013.01)

(58) Field of Classification Search
CPC ............ H04W 4/30; G06Q 10/063114; G06Q 30/0281
(Continued)

(56) References Cited

U.S. PATENT DOCUMENTS

| 4,751,399 A | 6/1988 | Koehring |
|---|---|---|
| 5,050,077 A | 9/1991 | Vincent |

(Continued)

FOREIGN PATENT DOCUMENTS

| AU | 2011203137 A1 | 7/2011 |
|---|---|---|
| AU | 2013203919 A1 | 5/2013 |

(Continued)

OTHER PUBLICATIONS

Citrix, GoToMeeting User Guide, Copyright 2015 Citrix Systems.
(Continued)

*Primary Examiner* — Yazan A Soofi
(74) *Attorney, Agent, or Firm* — Quarles & Brady LLP

(57) ABSTRACT

A guidance system for helping users locate specific affordance configurations for use within an enterprise space, the system comprising a stationary display field located within the enterprise space, the display field controlled to present guidance information to a system user, a database storing affordance configuration schedules and user schedules, a processor programmed to automatically perform the steps of obtaining location information for a set of users within the enterprise space, for at least a first user proximate the display field, examining the first user's schedule information to identify locations of activities scheduled for the first user within a threshold period of time, identifying at least one affordance configuration within the enterprise space that is proximate the locations of the activities scheduled for the first user within the threshold period of time and automatically presenting the identified at least one affordance configuration via the display field as a suggestion to the first user while the first user is proximate the display field.

20 Claims, 125 Drawing Sheets

Related U.S. Application Data continuation-in-part of application No. 14/871,097, filed on Sep. 30, 2015, now Pat. No. 9,766,079, said application No. 15/170,550 is a continuation-in-part of application No. 14/730,996, filed on Jun. 4, 2015, now Pat. No. 9,380,682.

(60) Provisional application No. 62/328,339, filed on Apr. 27, 2016, provisional application No. 62/171,401, filed on Jun. 5, 2015, provisional application No. 62/059,602, filed on Oct. 3, 2014, provisional application No. 62/008,283, filed on Jun. 5, 2014.

(58) Field of Classification Search
USPC ........................................................ 701/454
See application file for complete search history.

(56) References Cited

U.S. PATENT DOCUMENTS

| | | |
|---|---|---|
| 5,086,385 A | 2/1992 | Launey |
| 5,097,672 A | 3/1992 | Takenaka |
| 5,293,097 A | 3/1994 | Elwell |
| 5,406,176 A | 4/1995 | Sugden |
| 5,455,487 A | 10/1995 | Mix |
| 5,476,221 A | 12/1995 | Seymour |
| 5,489,827 A | 2/1996 | Xia |
| 5,898,579 A | 4/1999 | Boys |
| 5,915,091 A | 6/1999 | Ludwig |
| 6,038,542 A | 3/2000 | Ruckdashel |
| 6,100,663 A | 8/2000 | Boys |
| 6,140,921 A | 10/2000 | Baron |
| 6,144,942 A | 11/2000 | Ruckdashel |
| 6,177,905 B1 | 1/2001 | Welch |
| 6,266,612 B1 | 7/2001 | Dussell |
| 6,266,691 B1 | 7/2001 | Watanabe |
| 6,288,716 B1 | 9/2001 | Humpleman |
| 6,297,621 B1 | 10/2001 | Hui |
| 6,304,068 B1 | 10/2001 | Hui |
| 6,342,906 B1 | 1/2002 | Kumar |
| 6,360,101 B1 | 3/2002 | Irvin |
| 6,361,173 B1 | 3/2002 | Vlahos |
| 6,424,623 B1 | 7/2002 | Borgstahl |
| 6,434,158 B1 | 8/2002 | Harris |
| 6,434,159 B1 | 8/2002 | Woodward |
| 6,466,234 B1 | 10/2002 | Pyle |
| 6,487,180 B1 | 11/2002 | Borgstahl |
| 6,501,364 B1 | 12/2002 | Hui |
| 6,532,218 B1 | 3/2003 | Shaffer |
| 6,546,419 B1 | 4/2003 | Humpleman |
| 6,548,967 B1 | 4/2003 | Dowling |
| 6,587,782 B1 | 7/2003 | Nocek |
| 6,691,029 B2 | 2/2004 | Hughes |
| 6,724,159 B2 | 4/2004 | Gutta |
| 6,760,412 B1 | 7/2004 | Loucks |
| 6,760,749 B1 | 7/2004 | Dunlap |
| 6,803,744 B1 | 10/2004 | Sabo |
| 6,839,417 B2 | 1/2005 | Weisman |
| 6,850,837 B2 | 2/2005 | Paulauskas |
| 6,888,438 B2 | 5/2005 | Hui |
| 6,906,495 B2 | 6/2005 | Cheng |
| 7,000,660 B2 | 2/2006 | Chen |
| 7,003,728 B2 | 2/2006 | Berque |
| 7,027,995 B2 | 4/2006 | Kaufman |
| 7,042,196 B2 | 5/2006 | Ka-Lai |
| 7,043,532 B1 | 5/2006 | Humpleman |
| 7,084,758 B1 | 8/2006 | Cole |
| 7,124,164 B1 | 10/2006 | Chemtob |
| 7,139,976 B2 | 11/2006 | Kausik |
| 7,149,776 B1 | 12/2006 | Roy |
| 7,163,263 B1 | 1/2007 | Kurrasch |
| 7,180,503 B2 | 2/2007 | Burr |
| 7,212,414 B2 | 5/2007 | Baarman |
| 7,221,937 B2 | 5/2007 | Lau |
| 7,239,110 B2 | 7/2007 | Cheng |
| 7,248,017 B2 | 7/2007 | Cheng |
| 7,266,383 B2 | 9/2007 | Anderson |
| 7,268,682 B2 | 9/2007 | Bialecki, Jr. |
| 7,340,769 B2 | 3/2008 | Baugher |
| 7,370,269 B1 | 5/2008 | Prabhu |
| 7,393,053 B2 | 7/2008 | Kurrasch |
| 7,394,405 B2 | 7/2008 | Godden |
| 7,421,069 B2 | 9/2008 | Vernon |
| 7,474,058 B2 | 1/2009 | Baarman |
| 7,475,078 B2 | 1/2009 | Kiilerich |
| 7,495,414 B2 | 2/2009 | Hui |
| 7,499,462 B2 | 3/2009 | MacMullan |
| 7,518,267 B2 | 4/2009 | Baarman |
| 7,519,664 B2 | 4/2009 | Karaki |
| 7,522,878 B2 | 4/2009 | Baarman |
| 7,525,283 B2 | 4/2009 | Cheng |
| 7,526,525 B2 | 4/2009 | Hagale |
| 7,554,316 B2 | 6/2009 | Stevens |
| 7,554,437 B2 | 6/2009 | Axelsen |
| 7,576,514 B2 | 8/2009 | Hui |
| 7,577,522 B2 | 8/2009 | Rosenberg |
| 7,590,941 B2 | 9/2009 | Wee |
| 7,605,496 B2 | 10/2009 | Stevens |
| 7,612,528 B2 | 11/2009 | Baarman |
| 7,615,936 B2 | 11/2009 | Baarman |
| 7,619,366 B2 | 11/2009 | Diederiks |
| 7,622,891 B2 | 11/2009 | Cheng |
| 7,634,533 B2 | 12/2009 | Rudolph |
| 7,639,110 B2 | 12/2009 | Baarman |
| 7,639,514 B2 | 12/2009 | Baarman |
| 7,639,994 B2 | 12/2009 | Greene |
| 7,643,312 B2 | 1/2010 | Vanderelli |
| 7,649,454 B2 | 1/2010 | Singh |
| 7,664,870 B2 | 2/2010 | Baek |
| 7,689,655 B2 | 3/2010 | Hewitt |
| 7,693,935 B2 | 4/2010 | Weber |
| 7,707,249 B2 | 4/2010 | Spataro |
| 7,714,537 B2 | 5/2010 | Cheng |
| 7,715,831 B2 | 5/2010 | Wakefield |
| 7,734,690 B2 | 6/2010 | Moromisato |
| 7,735,918 B2 | 6/2010 | Beck |
| 7,741,734 B2 | 6/2010 | Joannopoulos |
| 7,810,025 B2 | 10/2010 | Blair |
| 7,825,543 B2 | 11/2010 | Karalis |
| 7,844,306 B2 | 11/2010 | Shearer |
| 7,847,675 B1 | 12/2010 | Thyen |
| 7,849,135 B2 | 12/2010 | Agrawal |
| 7,863,861 B2 | 1/2011 | Cheng |
| 7,868,482 B2 | 1/2011 | Greene |
| 7,868,587 B2 | 1/2011 | Stevens |
| 7,869,941 B2 | 1/2011 | Coughlin |
| 7,881,233 B2 | 2/2011 | Bieselin |
| 7,885,925 B1 | 2/2011 | Strong |
| 7,893,953 B2 | 2/2011 | Krestakos |
| 7,896,436 B2 | 3/2011 | Kurrasch |
| 7,898,105 B2 | 3/2011 | Greene |
| 7,904,209 B2 | 3/2011 | Podgorny |
| 7,915,858 B2 | 3/2011 | Liu |
| D636,333 S | 4/2011 | Kulikowski |
| 7,925,308 B2 | 4/2011 | Greene |
| 7,925,525 B2 | 4/2011 | Chin |
| 7,932,618 B2 | 4/2011 | Baarman |
| 7,941,133 B2 | 5/2011 | Aaron |
| 7,941,753 B2 | 5/2011 | Meisels |
| 7,952,324 B2 | 5/2011 | Cheng |
| 7,953,369 B2 | 5/2011 | Baarman |
| 7,965,859 B2 | 6/2011 | Marks |
| 7,973,635 B2 | 7/2011 | Baarman |
| 7,973,657 B2 | 7/2011 | Ayed |
| 7,989,986 B2 | 8/2011 | Baarman |
| 7,999,669 B2 | 8/2011 | Singh |
| 8,004,235 B2 | 8/2011 | Baarman |
| 8,021,164 B2 | 9/2011 | Epstein |
| 8,022,576 B2 | 9/2011 | Joannopoulos |
| 8,024,661 B2 | 9/2011 | Bibliowicz |
| 8,026,908 B2 | 9/2011 | Ku |
| 8,028,020 B2 | 9/2011 | Huck |
| 8,032,705 B2 | 10/2011 | Klitsner |
| 8,035,255 B2 | 10/2011 | Kurs |

(56) References Cited

U.S. PATENT DOCUMENTS

| | | |
|---|---|---|
| 8,035,340 B2 | 10/2011 | Stevens |
| 8,039,995 B2 | 10/2011 | Stevens |
| 8,040,103 B2 | 10/2011 | Hui |
| 8,041,586 B2 | 10/2011 | Jethani |
| 8,049,301 B2 | 11/2011 | Hui |
| 8,054,854 B2 | 11/2011 | Poslinski |
| 8,055,310 B2 | 11/2011 | Beart |
| 8,055,644 B2 | 11/2011 | Crowley |
| 8,057,069 B2 | 11/2011 | Mangiardi |
| 8,061,864 B2 | 11/2011 | Metcalf |
| 8,069,100 B2 | 11/2011 | Taylor |
| 8,069,465 B1 | 11/2011 | Bartholomay |
| 8,073,614 B2 | 12/2011 | Coughlin |
| 8,076,800 B2 | 12/2011 | Joannopoulos |
| 8,076,801 B2 | 12/2011 | Karalis |
| 8,081,083 B2 | 12/2011 | Hinterlong |
| 8,084,889 B2 | 12/2011 | Joannopoulos |
| 8,091,029 B1 | 1/2012 | Gay |
| 8,093,758 B2 | 1/2012 | Hussmann |
| 8,097,983 B2 | 1/2012 | Karalis |
| 8,097,984 B2 | 1/2012 | Baarman |
| 8,102,235 B2 | 1/2012 | Hui |
| 8,106,539 B2 | 1/2012 | Schatz |
| 8,112,100 B2 | 2/2012 | Frank |
| 8,115,448 B2 | 2/2012 | John |
| 8,116,681 B2 | 2/2012 | Baarman |
| 8,116,683 B2 | 2/2012 | Baarman |
| 8,117,262 B2 | 2/2012 | Kumar |
| 8,120,311 B2 | 2/2012 | Baarman |
| 8,126,974 B2 | 2/2012 | Lyle |
| 8,127,155 B2 | 2/2012 | Baarman |
| 8,129,864 B2 | 3/2012 | Baarman |
| 8,138,875 B2 | 3/2012 | Baarman |
| 8,140,701 B2 | 3/2012 | Rajan |
| 8,141,143 B2 | 3/2012 | Lee |
| 8,149,104 B2 | 4/2012 | Crum |
| 8,150,449 B2 | 4/2012 | Onozawa |
| 8,159,090 B2 | 4/2012 | Greene |
| 8,164,222 B2 | 4/2012 | Baarman |
| 8,170,946 B2 | 5/2012 | Blair |
| 8,174,152 B2 | 5/2012 | Baumann |
| 8,180,663 B2 | 5/2012 | Tischhauser |
| 8,188,856 B2 | 5/2012 | Singh |
| 8,200,520 B2 | 6/2012 | Chen |
| 8,204,272 B2 | 6/2012 | Marks |
| 8,204,935 B2 | 6/2012 | Vernon |
| 8,209,618 B2 | 6/2012 | Garofalo |
| 8,214,061 B2 | 7/2012 | Westrick, Jr. |
| 8,219,115 B1 | 7/2012 | Nelissen |
| 8,222,827 B2 | 7/2012 | Kuennen |
| 8,223,508 B2 | 7/2012 | Baarman |
| 8,228,025 B2 | 7/2012 | Ho |
| 8,228,026 B2 | 7/2012 | Johnson |
| 8,234,189 B2 | 7/2012 | Taylor |
| 8,238,125 B2 | 8/2012 | Fells |
| 8,239,890 B2 | 8/2012 | Kooman |
| 8,259,428 B2 | 9/2012 | Mollema |
| 8,262,244 B2 | 9/2012 | Metcalf |
| 8,266,535 B2 | 9/2012 | Brown |
| 8,269,456 B2 | 9/2012 | Hui |
| 8,270,320 B2 | 9/2012 | Boyer |
| 8,280,453 B2 | 10/2012 | Beart |
| 8,280,948 B1 | 10/2012 | Chen |
| 8,290,479 B2 | 10/2012 | Aaron |
| 8,296,669 B2 | 10/2012 | Madonna |
| 8,299,753 B2 | 10/2012 | Hui |
| 8,300,784 B2 | 10/2012 | Choi |
| 8,301,077 B2 | 10/2012 | Xue |
| 8,301,079 B2 | 10/2012 | Baarman |
| 8,301,080 B2 | 10/2012 | Baarman |
| 8,304,935 B2 | 11/2012 | Karalis |
| 8,315,561 B2 | 11/2012 | Baarman |
| 8,315,621 B2 | 11/2012 | Lau |
| 8,315,650 B2 | 11/2012 | Lau |
| 8,324,759 B2 | 12/2012 | Karalis |
| 8,327,410 B2 | 12/2012 | Andersen |
| 8,338,990 B2 | 12/2012 | Baarman |
| 8,339,274 B2 | 12/2012 | Van De Sluis |
| 8,341,532 B2 | 12/2012 | Ryan |
| 8,346,166 B2 | 1/2013 | Baarman |
| 8,346,167 B2 | 1/2013 | Baarman |
| 8,350,971 B2 | 1/2013 | Malone |
| 8,351,856 B2 | 1/2013 | Baarman |
| 8,352,296 B2 | 1/2013 | Taneja |
| 8,354,821 B2 | 1/2013 | Cheng |
| 8,362,651 B2 | 1/2013 | Hamam |
| 8,364,400 B2 | 1/2013 | Coughlin |
| 8,370,516 B2 | 2/2013 | Salesky |
| 8,373,310 B2 | 2/2013 | Baarman |
| 8,373,386 B2 | 2/2013 | Baarman |
| 8,375,103 B2 | 2/2013 | Lin |
| 8,380,255 B2 | 2/2013 | Shearer |
| 8,380,786 B2 | 2/2013 | Hoffert |
| 8,385,894 B2 | 2/2013 | Takehara |
| 8,390,669 B2 | 3/2013 | Catchpole |
| 8,395,282 B2 | 3/2013 | Joannopoulos |
| 8,395,283 B2 | 3/2013 | Joannopoulos |
| 8,400,017 B2 | 3/2013 | Kurs |
| 8,400,018 B2 | 3/2013 | Joannopoulos |
| 8,400,019 B2 | 3/2013 | Joannopoulos |
| 8,400,020 B2 | 3/2013 | Joannopoulos |
| 8,400,021 B2 | 3/2013 | Joannopoulos |
| 8,400,022 B2 | 3/2013 | Joannopoulos |
| 8,400,023 B2 | 3/2013 | Joannopoulos |
| 8,400,024 B2 | 3/2013 | Joannopoulos |
| 8,407,289 B2 | 3/2013 | Chen |
| 8,410,636 B2 | 4/2013 | Kurs |
| 8,415,897 B2 | 4/2013 | Choong |
| 8,421,407 B2 | 4/2013 | Johnson |
| 8,423,288 B2 | 4/2013 | Stahl |
| 8,432,062 B2 | 4/2013 | Greene |
| 8,438,333 B2 | 5/2013 | Edwards, III |
| 8,441,154 B2 | 5/2013 | Karalis |
| 8,441,354 B2 | 5/2013 | Padmanabhan |
| 8,443,035 B2 | 5/2013 | Chen |
| 8,446,046 B2 | 5/2013 | Fells |
| 8,446,450 B2 | 5/2013 | Mauchly |
| 8,450,877 B2 | 5/2013 | Baarman |
| 8,456,509 B2 | 6/2013 | Khot |
| 8,457,888 B2 | 6/2013 | Ranford |
| 8,461,719 B2 | 6/2013 | Kesler |
| 8,461,720 B2 | 6/2013 | Kurs |
| 8,461,721 B2 | 6/2013 | Karalis |
| 8,461,722 B2 | 6/2013 | Kurs |
| 8,461,817 B2 | 6/2013 | Martin |
| 8,466,583 B2 | 6/2013 | Karalis |
| 8,471,410 B2 | 6/2013 | Karalis |
| 8,473,571 B2 | 6/2013 | Penner |
| 8,476,788 B2 | 7/2013 | Karalis |
| 8,482,158 B2 | 7/2013 | Kurs |
| 8,482,160 B2 | 7/2013 | Johnson |
| 8,484,494 B2 | 7/2013 | Siegel |
| 8,487,480 B1 | 7/2013 | Kesler |
| 8,489,329 B2 | 7/2013 | Coughlin |
| 8,494,143 B2 | 7/2013 | DeJana |
| 8,497,601 B2 | 7/2013 | Hall |
| 8,499,119 B2 | 7/2013 | Balraj |
| 8,504,663 B2 | 8/2013 | Lowery |
| 8,508,077 B2 | 8/2013 | Stevens |
| 8,510,255 B2 | 8/2013 | Fadell |
| 8,519,668 B2 | 8/2013 | Hui |
| 8,527,549 B2 | 9/2013 | Cidon |
| 8,527,610 B2 | 9/2013 | Koike |
| 8,528,014 B2 | 9/2013 | Reynolds |
| 8,531,153 B2 | 9/2013 | Baarman |
| 8,531,294 B2 | 9/2013 | Slavin |
| 8,533,268 B1 | 9/2013 | Vernon |
| 8,538,330 B2 | 9/2013 | Baarman |
| D692,010 S | 10/2013 | Verghese |
| 8,552,592 B2 | 10/2013 | Schatz |
| 8,554,476 B2 | 10/2013 | Coughlin |
| 8,554,477 B2 | 10/2013 | Coughlin |
| 8,558,411 B2 | 10/2013 | Baarman |
| 8,558,693 B2 | 10/2013 | Martin |

(56) References Cited

U.S. PATENT DOCUMENTS

| | | |
|---|---|---|
| 8,560,024 B2 | 10/2013 | Beart |
| 8,560,128 B2 | 10/2013 | Ruff |
| 8,560,232 B2 | 10/2013 | Coughlin |
| 8,567,048 B2 | 10/2013 | Singh |
| 8,569,914 B2 | 10/2013 | Karalis |
| 8,587,153 B2 | 11/2013 | Schatz |
| 8,587,154 B2 | 11/2013 | Fells |
| 8,587,155 B2 | 11/2013 | Giler |
| 8,593,105 B2 | 11/2013 | Baarman |
| 8,594,291 B2 | 11/2013 | Bieselin |
| 8,598,721 B2 | 12/2013 | Baarman |
| 8,598,743 B2 | 12/2013 | Hall |
| 8,600,670 B2 | 12/2013 | Kim |
| 8,604,714 B2 | 12/2013 | Mohan |
| 8,610,400 B2 | 12/2013 | Stevens |
| 8,610,530 B2 | 12/2013 | Singh |
| 8,618,696 B2 | 12/2013 | Kurs |
| 8,618,749 B2 | 12/2013 | Kuennen |
| 8,618,770 B2 | 12/2013 | Baarman |
| 8,620,484 B2 | 12/2013 | Baarman |
| 8,620,841 B1 | 12/2013 | Filson |
| 8,621,245 B2 | 12/2013 | Shearer |
| D697,477 S | 1/2014 | Jonas, III |
| 8,622,314 B2 | 1/2014 | Fisher |
| 8,629,578 B2 | 1/2014 | Kurs |
| 8,629,755 B2 | 1/2014 | Hashim-Waris |
| 8,630,741 B1 | 1/2014 | Matsuoka |
| 8,631,126 B2 | 1/2014 | Veiseh |
| 8,638,062 B2 | 1/2014 | Baarman |
| 8,643,326 B2 | 2/2014 | Campanella |
| 8,650,600 B2 | 2/2014 | Ogle |
| 8,653,927 B2 | 2/2014 | Singh |
| 8,659,417 B1 | 2/2014 | Trundle |
| 8,660,790 B2 | 2/2014 | Stahl |
| 8,665,310 B2 | 3/2014 | Verthein |
| 8,666,051 B2 | 3/2014 | Gilzean |
| 8,667,401 B1 | 3/2014 | Lozben |
| 8,667,452 B2 | 3/2014 | Verghese |
| 8,669,676 B2 | 3/2014 | Karalis |
| 8,669,844 B2 | 3/2014 | Walker |
| 8,680,960 B2 | 3/2014 | Singh |
| 8,683,345 B2 | 3/2014 | Lee |
| 8,686,598 B2 | 4/2014 | Schatz |
| 8,686,647 B2 | 4/2014 | Ono |
| 8,687,452 B2 | 4/2014 | Kishibe |
| 8,688,100 B2 | 4/2014 | Aaron |
| 8,690,362 B2 | 4/2014 | Wendt |
| 8,692,410 B2 | 4/2014 | Schatz |
| 8,692,412 B2 | 4/2014 | Fiorello |
| 8,692,639 B2 | 4/2014 | Baarman |
| 8,692,641 B2 | 4/2014 | Singh |
| 8,692,642 B2 | 4/2014 | Singh |
| 8,694,026 B2 | 4/2014 | Forstall |
| 8,694,165 B2 | 4/2014 | Smith |
| 8,694,597 B1 | 4/2014 | Raj |
| 8,698,590 B2 | 4/2014 | Singh |
| 8,698,591 B2 | 4/2014 | Singh |
| 8,700,060 B2 | 4/2014 | Huang |
| 8,707,546 B2 | 4/2014 | Singh |
| 8,710,948 B2 | 4/2014 | Singh |
| 8,712,858 B2 | 4/2014 | Blair |
| 8,713,112 B2 | 4/2014 | Hewitt |
| D705,745 S | 5/2014 | Kurs et al. |
| 8,716,903 B2 | 5/2014 | Kurs |
| 8,717,400 B2 | 5/2014 | Ranganath |
| 8,719,070 B2 | 5/2014 | Jabbour |
| 8,723,366 B2 | 5/2014 | Fiorello |
| 8,729,737 B2 | 5/2014 | Schatz |
| 8,731,116 B2 | 5/2014 | Norconk |
| 8,742,625 B2 | 6/2014 | Baarman |
| 8,743,171 B2 | 6/2014 | Hiller |
| 8,743,198 B2 | 6/2014 | Padmanabh |
| 8,756,348 B2 | 6/2014 | Beel |
| 8,760,007 B2 | 6/2014 | Joannopoulos |
| 8,760,008 B2 | 6/2014 | Joannopoulos |
| 8,760,265 B2 | 6/2014 | Krueger |
| 8,766,484 B2 | 7/2014 | Baarman |
| 8,766,485 B2 | 7/2014 | Joannopoulos |
| 8,766,487 B2 | 7/2014 | Dibben |
| 8,767,032 B2 | 7/2014 | Rodman |
| 8,768,309 B2 | 7/2014 | Robbins |
| 8,772,971 B2 | 7/2014 | Joannopoulos |
| 8,772,972 B2 | 7/2014 | Joannopoulos |
| 8,772,973 B2 | 7/2014 | Kurs |
| 8,782,527 B2 | 7/2014 | Karlson |
| 8,788,448 B2 | 7/2014 | Fadell |
| 8,797,159 B2 | 8/2014 | Kirkpatrick |
| 8,810,379 B2 | 8/2014 | Murphy |
| 8,812,028 B2 | 8/2014 | Yariv |
| 8,813,196 B2 | 8/2014 | Weller |
| 8,819,136 B1 | 8/2014 | Vernon |
| 8,819,138 B2 | 8/2014 | Houston |
| 8,825,597 B1 | 9/2014 | Houston |
| 8,838,681 B2 | 9/2014 | Motes |
| 8,842,153 B2 | 9/2014 | Ranganath |
| 8,843,816 B2 | 9/2014 | Stull |
| 8,849,914 B2 | 9/2014 | Bove |
| 8,856,256 B1 | 10/2014 | Srinivasan |
| 8,866,619 B2 | 10/2014 | Knibbe |
| 8,872,432 B2 | 10/2014 | Kercso |
| 8,875,195 B2 | 10/2014 | Ogle |
| 8,878,439 B2 | 11/2014 | Noguchi |
| 8,887,069 B2 | 11/2014 | Tipirneni |
| 8,896,656 B2 | 11/2014 | Epstein |
| 8,898,231 B2 | 11/2014 | Crawford |
| 8,904,293 B2 | 12/2014 | Bastide |
| 8,909,702 B2 | 12/2014 | Golovchinsky |
| 9,380,682 B2 | 6/2016 | Mead |
| 9,642,219 B2 | 5/2017 | Mead |
| 9,716,861 B1 | 7/2017 | Poel |
| 9,766,079 B1 | 9/2017 | Poel |
| 9,852,388 B1 | 12/2017 | Swieter |
| 9,921,726 B1 | 3/2018 | Sculley |
| 9,955,318 B1 | 4/2018 | Scheper |
| 2001/0051885 A1 | 12/2001 | Nardulli |
| 2002/0015097 A1 | 2/2002 | Martens |
| 2002/0130834 A1 | 9/2002 | Madarasz |
| 2003/0097284 A1 | 5/2003 | Shinozaki |
| 2003/0103075 A1 | 6/2003 | Rosselot |
| 2003/0218537 A1 | 11/2003 | Hoch |
| 2004/0001095 A1 | 1/2004 | Marques |
| 2004/0051813 A1 | 3/2004 | Marmaropoulos |
| 2004/0141605 A1 | 7/2004 | Chen |
| 2004/0153504 A1 | 8/2004 | Hutchinson |
| 2004/0210933 A1 | 10/2004 | Dresti |
| 2004/0215694 A1 | 10/2004 | Podolsky |
| 2005/0018826 A1 | 1/2005 | Benco |
| 2005/0027581 A1 | 2/2005 | Kjesbu |
| 2005/0071213 A1 | 3/2005 | Kumhyr |
| 2005/0218739 A1 | 10/2005 | Maddin |
| 2005/0235329 A1 | 10/2005 | Karaoguz |
| 2005/0273372 A1 | 12/2005 | Bowne |
| 2005/0273493 A1 | 12/2005 | Buford |
| 2006/0009215 A1 | 1/2006 | Bogod |
| 2006/0015376 A1 | 1/2006 | Sattler |
| 2006/0026502 A1 | 2/2006 | Dutta |
| 2006/0045107 A1 | 3/2006 | Kucenas |
| 2006/0080432 A1 | 4/2006 | Spataro |
| 2006/0168618 A1 | 7/2006 | Choi |
| 2006/0218027 A1 | 9/2006 | Carrion |
| 2007/0094065 A1 | 4/2007 | Wu |
| 2007/0118415 A1 | 5/2007 | Chen |
| 2007/0136095 A1 | 6/2007 | Weinstein |
| 2007/0162315 A1 | 7/2007 | Hodges |
| 2007/0197239 A1 | 8/2007 | Sane |
| 2007/0198744 A1 | 8/2007 | Wensley |
| 2007/0226034 A1 | 9/2007 | Khan |
| 2007/0282661 A1 | 12/2007 | Franco |
| 2007/0288291 A1 | 12/2007 | Earle |
| 2008/0028323 A1 | 1/2008 | Rosen |
| 2008/0091503 A1 | 4/2008 | Schirmer |
| 2008/0122635 A1 | 5/2008 | Fujikawa |
| 2008/0162198 A1 | 7/2008 | Jabbour |
| 2008/0184115 A1 | 7/2008 | Back |

(56) References Cited

U.S. PATENT DOCUMENTS

| | | |
|---|---|---|
| 2008/0239994 A1 | 10/2008 | Xiong |
| 2008/0244417 A1 | 10/2008 | Simpson |
| 2008/0288355 A1 | 11/2008 | Rosen |
| 2008/0291021 A1 | 11/2008 | Bhogal |
| 2008/0300660 A1 | 12/2008 | John |
| 2009/0019367 A1 | 1/2009 | Cavagnari |
| 2009/0055234 A1 | 2/2009 | Li |
| 2009/0066486 A1 | 3/2009 | Kiekbusch |
| 2009/0094533 A1 | 4/2009 | Bozionek |
| 2009/0106567 A1 | 4/2009 | Baarman |
| 2009/0146982 A1 | 6/2009 | Thielman |
| 2009/0164581 A1 | 6/2009 | Bove |
| 2009/0210822 A1 | 8/2009 | Schindler |
| 2009/0212637 A1 | 8/2009 | Baarman |
| 2009/0271713 A1 | 10/2009 | Stull |
| 2009/0327227 A1 | 12/2009 | Chakra |
| 2010/0017245 A1 | 1/2010 | Kristiansen |
| 2010/0037151 A1 | 2/2010 | Ackerman |
| 2010/0070334 A1 | 3/2010 | Monteverde |
| 2010/0088239 A1 | 4/2010 | Blair |
| 2010/0102640 A1 | 4/2010 | Joannopoulos |
| 2010/0127575 A1 | 5/2010 | Joannopoulos |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0153160 A1 | 6/2010 | Bezemer |
| 2010/0153983 A1 | 6/2010 | Philmon |
| 2010/0179854 A1 | 7/2010 | Shafer |
| 2010/0187911 A1 | 7/2010 | Joannopoulos |
| 2010/0207458 A1 | 8/2010 | Joannopoulos |
| 2010/0219694 A1 | 9/2010 | Kurs |
| 2010/0219791 A1 | 9/2010 | Cheng |
| 2010/0231340 A1 | 9/2010 | Fiorello |
| 2010/0235216 A1 | 9/2010 | Hehmeyer |
| 2010/0256823 A1 | 10/2010 | Cherukuri |
| 2010/0259110 A1 | 10/2010 | Kurs |
| 2010/0274855 A1 | 10/2010 | Wassingbo |
| 2010/0277121 A1 | 11/2010 | Hall |
| 2010/0283600 A1 | 11/2010 | Herbert |
| 2010/0308939 A1 | 12/2010 | Kurs |
| 2010/0315483 A1 | 12/2010 | King |
| 2010/0319066 A1 | 12/2010 | Berry |
| 2011/0043049 A1 | 2/2011 | Karalis |
| 2011/0072482 A1 | 3/2011 | Lau |
| 2011/0074346 A1 | 3/2011 | Hall |
| 2011/0084804 A1 | 4/2011 | Khorashadi |
| 2011/0088056 A1 | 4/2011 | Ansari |
| 2011/0095618 A1 | 4/2011 | Schatz |
| 2011/0121920 A1 | 5/2011 | Kurs |
| 2011/0126127 A1 | 5/2011 | Mariotti |
| 2011/0149809 A1 | 6/2011 | Narayanaswamy |
| 2011/0153738 A1 | 6/2011 | Bedingfield |
| 2011/0223899 A1 | 9/2011 | Hiraide |
| 2011/0225563 A1 | 9/2011 | Kim |
| 2011/0231216 A1 | 9/2011 | Fyke |
| 2011/0244798 A1 | 10/2011 | Daigle |
| 2011/0270952 A1 | 11/2011 | Ray |
| 2011/0295392 A1 | 12/2011 | Cunnington |
| 2011/0296465 A1 | 12/2011 | Krishnan |
| 2012/0007441 A1 | 1/2012 | John |
| 2012/0016678 A1 | 1/2012 | Gruber |
| 2012/0022909 A1 | 1/2012 | Ayatollahi |
| 2012/0032522 A1 | 2/2012 | Schatz |
| 2012/0062345 A1 | 3/2012 | Kurs |
| 2012/0068549 A1 | 3/2012 | Karalis |
| 2012/0068832 A1 | 3/2012 | Feldstein |
| 2012/0072030 A1 | 3/2012 | Elliott |
| 2012/0078676 A1 | 3/2012 | Adams |
| 2012/0086284 A1 | 4/2012 | Capanella |
| 2012/0086867 A1 | 4/2012 | Kesler |
| 2012/0089722 A1 | 4/2012 | Enholm |
| 2012/0091794 A1 | 4/2012 | Campanella |
| 2012/0091795 A1 | 4/2012 | Fiorello |
| 2012/0091796 A1 | 4/2012 | Kesler |
| 2012/0091797 A1 | 4/2012 | Kesler |
| 2012/0091819 A1 | 4/2012 | Kulikowski |
| 2012/0091820 A1 | 4/2012 | Campanella |
| 2012/0091949 A1 | 4/2012 | Campanella |
| 2012/0091950 A1 | 4/2012 | Campanella |
| 2012/0098350 A1 | 4/2012 | Campanella |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112691 A1 | 5/2012 | Kurs |
| 2012/0119569 A1 | 5/2012 | Karalis |
| 2012/0119575 A1 | 5/2012 | Kurs |
| 2012/0119576 A1 | 5/2012 | Kesler |
| 2012/0119698 A1 | 5/2012 | Karalis |
| 2012/0136572 A1 | 5/2012 | Norton |
| 2012/0139355 A1 | 6/2012 | Ganem |
| 2012/0184338 A1 | 7/2012 | Kesler |
| 2012/0192084 A1 | 7/2012 | Dura |
| 2012/0204272 A1 | 8/2012 | Svensson |
| 2012/0206050 A1 | 8/2012 | Spero |
| 2012/0206096 A1 | 8/2012 | John |
| 2012/0223573 A1 | 9/2012 | Schatz |
| 2012/0228952 A1 | 9/2012 | Hall |
| 2012/0228953 A1 | 9/2012 | Kesler |
| 2012/0228954 A1 | 9/2012 | Kesler |
| 2012/0228960 A1 | 9/2012 | Karalis |
| 2012/0233205 A1 | 9/2012 | McDermott |
| 2012/0235500 A1 | 9/2012 | Ganem |
| 2012/0235501 A1 | 9/2012 | Kesler |
| 2012/0235502 A1 | 9/2012 | Kesler |
| 2012/0235503 A1 | 9/2012 | Kesler |
| 2012/0235504 A1 | 9/2012 | Kesler |
| 2012/0235505 A1 | 9/2012 | Schatz |
| 2012/0235566 A1 | 9/2012 | Karalis |
| 2012/0235633 A1 | 9/2012 | Kesler |
| 2012/0235634 A1 | 9/2012 | Hall |
| 2012/0239117 A1 | 9/2012 | Kesler |
| 2012/0239202 A1 | 9/2012 | Voysey |
| 2012/0242159 A1 | 9/2012 | Lou |
| 2012/0243158 A1 | 9/2012 | Gentil |
| 2012/0248886 A1 | 10/2012 | Kesler |
| 2012/0248887 A1 | 10/2012 | Kesler |
| 2012/0248888 A1 | 10/2012 | Kesler |
| 2012/0248981 A1 | 10/2012 | Karalis |
| 2012/0254909 A1 | 10/2012 | Serdiuk |
| 2012/0256494 A1 | 10/2012 | Kesler |
| 2012/0274586 A1 | 11/2012 | Southworth |
| 2012/0284672 A1 | 11/2012 | Madonna |
| 2012/0313449 A1 | 12/2012 | Kurs |
| 2012/0313742 A1 | 12/2012 | Kurs |
| 2012/0324589 A1 | 12/2012 | Nukala |
| 2012/0331108 A1 | 12/2012 | Ferdowsi |
| 2012/0331394 A1 | 12/2012 | Trombley-Shapiro |
| 2013/0007949 A1 | 1/2013 | Kurs |
| 2013/0013750 A1 | 1/2013 | Butler |
| 2013/0018952 A1 | 1/2013 | McConnell |
| 2013/0018953 A1 | 1/2013 | McConnell |
| 2013/0020878 A1 | 1/2013 | Karalis |
| 2013/0033118 A1 | 2/2013 | Karalis |
| 2013/0038402 A1 | 2/2013 | Karalis |
| 2013/0041973 A1 | 2/2013 | Zhou |
| 2013/0054863 A1 | 2/2013 | Imes |
| 2013/0057364 A1 | 3/2013 | Kesler |
| 2013/0062966 A1 | 3/2013 | Verghese |
| 2013/0069441 A1 | 3/2013 | Verghese |
| 2013/0069543 A1 | 3/2013 | Mohan |
| 2013/0069753 A1 | 3/2013 | Kurs |
| 2013/0073094 A1 | 3/2013 | Knapton |
| 2013/0088154 A1 | 4/2013 | Van Hoof |
| 2013/0099587 A1 | 4/2013 | Lou |
| 2013/0157509 A1 | 6/2013 | Srivastava |
| 2013/0167039 A1 | 6/2013 | Howell |
| 2013/0171981 A1 | 7/2013 | Woo |
| 2013/0175874 A1 | 7/2013 | Lou |
| 2013/0181541 A1 | 7/2013 | Karalis |
| 2013/0198653 A1 | 8/2013 | Tse |
| 2013/0199420 A1 | 8/2013 | Hjelm |

(56) References Cited

U.S. PATENT DOCUMENTS

| | | |
|---|---|---|
| 2013/0200721 A1 | 8/2013 | Kurs |
| 2013/0208186 A1 | 8/2013 | Malone |
| 2013/0218829 A1 | 8/2013 | Martinez |
| 2013/0221744 A1 | 8/2013 | Hall |
| 2013/0234481 A1 | 9/2013 | Johnson |
| 2013/0234531 A1 | 9/2013 | Budgett |
| 2013/0241439 A1 | 9/2013 | Nishigaki |
| 2013/0246901 A1 | 9/2013 | Massand |
| 2013/0249410 A1 | 9/2013 | Thompson |
| 2013/0262687 A1 | 10/2013 | Avery |
| 2013/0278073 A1 | 10/2013 | Kurs |
| 2013/0278074 A1 | 10/2013 | Kurs |
| 2013/0278075 A1 | 10/2013 | Kurs |
| 2013/0283325 A1 | 10/2013 | Chiniara |
| 2013/0300353 A1 | 11/2013 | Kurs |
| 2013/0304924 A1 | 11/2013 | Dhara |
| 2013/0307349 A1 | 11/2013 | Hall |
| 2013/0314543 A1 | 11/2013 | Sutter |
| 2013/0320773 A1 | 12/2013 | Schatz |
| 2013/0334892 A1 | 12/2013 | Hall |
| 2013/0334973 A1 | 12/2013 | Wagenaar Cacciola |
| 2014/0002012 A1 | 1/2014 | McCauley |
| 2014/0021798 A1 | 1/2014 | Kesler |
| 2014/0028112 A1 | 1/2014 | Hui |
| 2014/0035378 A1 | 2/2014 | Kesler |
| 2014/0035704 A1 | 2/2014 | Efe |
| 2014/0044281 A1 | 2/2014 | Ganem |
| 2014/0044293 A1 | 2/2014 | Ganem |
| 2014/0049118 A1 | 2/2014 | Karalis |
| 2014/0052974 A1 | 2/2014 | Masters |
| 2014/0054961 A1 | 2/2014 | Metcalf |
| 2014/0062211 A1 | 3/2014 | Hamam |
| 2014/0067865 A1 | 3/2014 | Kirigin |
| 2014/0074930 A1 | 3/2014 | Kumashio |
| 2014/0084703 A1 | 3/2014 | Hall |
| 2014/0084859 A1 | 3/2014 | Hall |
| 2014/0091636 A1 | 4/2014 | Ofstein |
| 2014/0091756 A1 | 4/2014 | Ofstein |
| 2014/0103738 A1 | 4/2014 | Campanella |
| 2014/0108956 A1 | 4/2014 | Varenhorst |
| 2014/0109210 A1 | 4/2014 | Borzycki |
| 2014/0111304 A1 | 4/2014 | Hashim-Waris |
| 2014/0135648 A1 | 5/2014 | Holoien |
| 2014/0139426 A1 | 5/2014 | Kryze |
| 2014/0150059 A1 | 5/2014 | Uchida |
| 2014/0159589 A1 | 6/2014 | Pandharipande |
| 2014/0159652 A1 | 6/2014 | Hall |
| 2014/0167618 A1 | 6/2014 | Wang |
| 2014/0175898 A1 | 6/2014 | Kurs |
| 2014/0181704 A1 | 6/2014 | Madonna |
| 2014/0181935 A1 | 6/2014 | Beckmann |
| 2014/0195149 A1 | 7/2014 | Yang |
| 2014/0195291 A1 | 7/2014 | Aaron |
| 2014/0195805 A1 | 7/2014 | Koo |
| 2014/0203659 A1 | 7/2014 | Madawala |
| 2014/0203921 A1 | 7/2014 | Baker |
| 2014/0215551 A1 | 7/2014 | Allain |
| 2014/0229578 A1 | 8/2014 | Chu |
| 2014/0236659 A1 | 8/2014 | Hapse |
| 2014/0244043 A1 | 8/2014 | Foster |
| 2014/0253813 A1 | 9/2014 | Bakar |
| 2014/0259047 A1 | 9/2014 | Bakar |
| 2014/0269531 A1 | 9/2014 | Luna |
| 2014/0274005 A1 | 9/2014 | Luna |
| 2014/0277757 A1 | 9/2014 | Wang |
| 2014/0277763 A1 | 9/2014 | Ramachandran |
| 2014/0278057 A1 | 9/2014 | Berns |
| 2014/0282013 A1 | 9/2014 | Amijee |
| 2014/0285113 A1 | 9/2014 | Huang |
| 2014/0297758 A1 | 10/2014 | Kidron |
| 2014/0300277 A1 | 10/2014 | Ono |
| 2014/0302795 A1 | 10/2014 | Chacon |
| 2014/0354429 A1 | 12/2014 | Henderson |
| 2015/0035440 A1 | 2/2015 | Spero |
| 2015/0069915 A1 | 3/2015 | Ogawa |
| 2015/0179012 A1* | 6/2015 | Sharpe ............... G07C 9/00904 340/5.28 |
| 2015/0201480 A1 | 7/2015 | Ogawa |
| 2015/0229644 A1 | 8/2015 | Nozawa |
| 2015/0296594 A1 | 10/2015 | Blum |
| 2015/0330780 A1 | 11/2015 | Yuzawa |
| 2015/0370272 A1 | 12/2015 | Reddy |
| 2016/0171566 A1 | 6/2016 | Pugh |
| 2016/0327922 A1 | 11/2016 | Sekiguchi |
| 2016/0342950 A1* | 11/2016 | Pignataro .......... G06Q 10/1095 |
| 2017/0208664 A1 | 7/2017 | Mead |

FOREIGN PATENT DOCUMENTS

| | | |
|---|---|---|
| AU | 2013203947 A1 | 5/2013 |
| CN | 102239633 A | 11/2011 |
| CN | 102439669 A | 5/2012 |
| CN | 102870338 A | 1/2013 |
| EP | 0935263 A2 | 8/1999 |
| EP | 2367146 A1 | 9/2011 |
| EP | 2388977 A1 | 11/2011 |
| EP | 2439686 A1 | 4/2012 |
| KR | 20140007006 A | 1/2014 |
| WO | 2007008646 A2 | 1/2007 |
| WO | 2008118178 A1 | 10/2008 |
| WO | 2009085896 A1 | 7/2009 |
| WO | 2009108958 A1 | 9/2009 |
| WO | 2009108959 A1 | 9/2009 |
| WO | 2010093997 A1 | 8/2010 |
| WO | 2011034759 A2 | 3/2011 |
| WO | 2011099873 A1 | 8/2011 |
| WO | 2011112795 A1 | 9/2011 |
| WO | 2012037279 A1 | 3/2012 |
| WO | 2012170278 A3 | 12/2012 |
| WO | 2013008252 A2 | 1/2013 |
| WO | 2013059441 A1 | 4/2013 |
| WO | 2013112185 A2 | 8/2013 |
| WO | 2013122483 A1 | 8/2013 |
| WO | 2014007656 A1 | 1/2014 |
| WO | 2014011059 A1 | 1/2014 |
| WO | 2014035260 A1 | 3/2014 |
| WO | 2014035263 A1 | 3/2014 |
| WO | 2014038966 A1 | 3/2014 |
| WO | 2014054953 A1 | 4/2014 |
| WO | 2014094107 A1 | 6/2014 |
| WO | 2014139781 A2 | 9/2014 |

OTHER PUBLICATIONS

Join.me forum and FAQ, Apr. 3, 2014.

Cisco, WebEx Meeting Center User Guide for Hosts, Presenters, and Participants, Version 8.23, Copyright 1997-2011 Cisco and/or its affiliates.

Krumm, et al., The NearMe Wireless Proximity Server, UbiComp 2004, The Sixth International Conference on Ubiquitous Computing, pp. 283-300, Sep. 7-10, 2004.

NFS Technology Group, Rendezvous—Technology for Meeting Room, Desk Scheduling and Event Management, http://myrendezvous.net/rendezvous-event-booking-software/calendar-management/.

Citrix, GoToWebinar User Guide, Copyright 2015 Citrix Systems.

CiviCRM Books: User and Administrator Guide for Version 4.5, Published Sep. 2014, http://book.civicrm.org/user/current/email/scheduled-reminders/.

Lee, TechnicLee—My Thoughts on Technology, Business, and Innovation, Posted in Outlook, Scripting, Jan. 20, 2012, http://techniclee.wordpress.com/2012/01/20/sending-a-meeting-reminder-email-in-outlook/.

Events and Room Reserve Scheduled Task Setup for Email Notifications, Article No. 268, Apr. 22, 2013, http://kb.evanced.info/article.php?id=268.

Oracle Communications, Oracle Data Sheet—Calendar Server, Copyright 2015 Oracle and/or its affiliates, http://www.oracle.com/us/industries/communications/communications-calendar-server-ds-071728.pdf.

(56) References Cited

OTHER PUBLICATIONS

Stirworks, Inc., The Height-Adjustable, Standing Stir Kinetic Desk, http://www.stirworks.com/, Copyright 2015 Stirworks, Inc., 6 pages.

* cited by examiner

SPACE GUIDANCE AND MANAGEMENT SYSTEM AND METHOD

CROSS-REFERENCE TO RELATED APPLICATIONS

This application is a continuation of U.S. patent application Ser. No. 15/170,550 filed on Jun. 1, 2016, and which is entitled "SPACE GUIDANCE AND MANAGEMENT SYSTEM AND METHOD," which claims priority to U.S. provisional patent application Ser. No. 62/328,339 which was filed Apr. 27, 2016 and which is entitled "SPACE GUIDANCE AND MANAGEMENT SYSTEM AND METHOD"; and also claims priority to U.S. provisional patent application Ser. No. 62/171,401 which was filed on Jun. 5, 2015 and which is titled "Space Guidance And Management System And Method" and also claims priority to, and is a continuation-in-part of, U.S. patent application Ser. No. 14/871,097 which was filed on Sep. 30, 2015 and which is titled "Method And System For Locating Resources And Communicating Within An Enterprise" which further claims priority to U.S. provisional patent application Ser. No. 62/059,602 which was filed on Oct. 3, 2014 and which is also titled "Method And System For Locating Resources And Communicating Within An Enterprise", each of which is incorporated herein in its entirety by reference.

U.S. patent application Ser. No. 15/170,550 also claims priority to, and is a continuation-in-part of, U.S. patent application Ser. No. 14/730,996 which was filed on Jun. 4, 2015 and which is titled "Environment Optimization For Space Based On Presence And Activities" which claims priority to U.S. provisional application No. 62/008,283 which was filed on Jun. 5, 2014 and which also is titled "Environment Optimization For Space Based On Presence And Activities", each of which is also incorporated herein in its entirety by reference.

STATEMENT REGARDING FEDERALLY SPONSORED RESEARCH OR DEVELOPMENT

Not applicable.

BACKGROUND OF THE DISCLOSURE

The field of the invention is space management technology and architecture for distinguishing physical spaces and helping people take optimal advantage of affordances within a generally open office plan.

Many companies employ open office plans for use by many and in some cases substantially all of their employees where each employee is assigned to a workstation generally located within a large ambient space (e.g., a portion of a floor within a building) within a facility. One primary advantage often associated with open office plans is cost savings. To this end, an open plan necessarily means that fewer architectural walls are constructed within the large ambient space and therefore costs associated with such walls are avoided. In addition, the amount of space required to provide workstations in an open office plan is usually less than cases where architectural walls divide each employee's space from the larger ambient space and therefore an open plan can reduce costs associated with space. This is because walled spaces tend to feel claustrophobic when compared to open office spaces and therefore when full walls are provided, larger spaces are generally required.

Another advantage associated with open office environments is that people tend to communicate and therefore collaborate more readily in open environments when compared to how they interact where individual spaces are physically separated by full wall structures. To this end, in an open environment, employees are more aware of who is present in a space, who is available in a space, what other employees are working on, etc., and therefore, are more likely to participate in impromptu meetings or short collaborations that can impact effectiveness appreciably.

Yet one other advantage often associated with open office plans is that the affordances required to provide individual workstations within such plans are relatively easy and inexpensive to reconfigure when different station juxtapositions are considered advantageous for some reason. For instance, where three additional workstations are required for three additional employees, a set of 22 existing workstations may be rearranged in a space to make space for the three additional workstations.

While totally open environments have been adopted in some facilities, in many facilities, while the open office plan is employed, at least some partial dividing walls and/or screen assemblies are provided so that employees have at least a minimal sense of privacy at their workstations. For instance, the office furniture industry has provided frame based partial wall structures for decades that include walls to divide one workstation from another so that the view of a first employee in a first station is at least obstructed into adjacent stations when the first employee is seated in the first station and so that the views of other employees in the adjacent stations are at least obstructed into the first station when the other employees are seated. As another instance, screen members are sometimes provided that at least partially block viewing angles into workstations from adjacent stations to increase the level or privacy.

In a further effort to reduce costs, many employers now have at least some if not most of their employees work from home or otherwise remotely at least some of the time. In these cases, many employees still have to be in employer facilities at least periodically if not often. For this reason, many employers still provide workstations for employees, albeit for temporary use when the employees are located in specific facilities. Unless indicated otherwise, the act of temporarily using a workstation located in an open office plan will be referred to hereinafter as "hotelling" and workstations provided for hotelling purposes will be referred to as "hotelling stations".

While open office plans like those described above and hotelling have proven advantageous in many cases, open office plans and hotelling in general have several shortcomings. First, many employees that temporarily hotel in an open office space feel undervalued by their employers as their workstations are completely impersonal. In this regard, hotelling stations often are not adjustable to accommodate different employee preferences. For instance, a first employee may prefer a thirty inch high worksurface, a display screen supported at a first height, a first light intensity and a first ambient temperature while a second employee prefers a standing height worksurface, a display screen supported at a second height, a second light intensity and a second ambient temperature. In many cases, especially in open office plans, there is no ability to adjust any of these environmental parameters to personal preferences. In instances where parameters can be adjusted to personal preferences, in many cases those preferences are never adjusted by employees either because an employee does not understand how to adjust the preferences or because parameter adjustment is just too burdensome. As another instance, known hotelling stations are not decorated or otherwise customized to specific employee preferences. For instance, a first employee may love nature and prefer to immerse himself in a space that includes images of nature while a second employee has three kids and would prefer to have images of those kids in her peripheral view.

Second, many employees at open plan hotelling stations act as if they are in separately enclosed offices and have impromptu meetings at their temporary stations as opposed to going to a private conference room where their meetings will not interrupt other employees proximate their stations. Sound from these impromptu meetings often travels substantially unimpeded within an open office environment and can adversely affect other employee's concentration. This is particularly true in cases where employees are sharing and discussing digital content on a computer display screen or the like where discussion is often necessary.

Third, in many cases employees passing by other employees at workstations in open spaces assume or at least act as if it is acceptable to stop by and start a conversation with the employees at the stations. These types of interruptions are often unwanted but the disrupted employees often feel uncomfortable shutting down a fellow employee that initiates the communication. The end result is that work efficiency is appreciably reduced.

Fourth, some activities simply require greater privacy than afforded at an open space hotelling station. For example, where a first employee needs to participate in a telepresence session via the employee's laptop or the like with a remote employee to discuss employee performance review, the information discussed will often be of a personal and private nature. In these cases, an open space station is insufficient to meet employee needs.

Fifth, where teleconferencing is to take place, most open space hotelling stations are not optimally equipped to facilitate telepresence. For instance, most hotelling stations do not have optimized lighting, sound or even optimized high definition imaging equipment (e.g., a high definition camera) and/or the arrangement of such equipment is not optimized for use with the other station affordances as telepresence is usually only a secondary feature associated with the station. In addition, many enterprises choose not to provide telepresence cameras and other equipment at hotelling stations because such equipment is cost prohibitive and so that employees are not encouraged to participate in telepresence sessions at their stations which routinely disturb other employees in the general area.

Sixth, while all open space hotelling stations in a facility may have similar configurations and may operate in similar fashions, not all stations will be "equal" when it comes to the environmental characteristics associated with each space which are often very different at different locations within a larger space. To this end, consider first and second different hotelling stations located in a single large open space where the first station is located in a far corner of the large open space and the second station is located just outside a restroom and proximate a coffee station. In this example, it can be expected that noise proximate the first station will be substantially less than the noise expected proximate the second station. Similarly, it can be expected that foot traffic proximate the first station will be relatively less than the foot traffic proximate the second station. As another example, consider a case where a first station is proximate a large exterior window of a large open space and a second station is centrally located within the large space and is distant from any exterior windows. In this case, it can be expected that there will be substantially more natural light proximate the first station that proximate the second station. Where an employee does not routinely hotel in a specific facility, the employee would blindly select a hotelling space which, in many cases, would have environmental characteristics that are not optimized for the employee's preferences.

Seventh, in many cases an employee may prefer to be located in an open space in some relative juxtaposition to other hotelling employees in the space or in adjacent spaces. For instance, in some cases a first employee that is on a specific team of employees handling a project may want to spend a day in relative seclusion to facilitate individual focused work activities and therefore may want to be stationed at a hotelling station that is remote from other employees on the team. In contrast, a second employee may want to be located proximate other employees on the team so that collaborative activity may be facilitated. In each of these cases and in other cases where a first employee wants to work in a hotelling space that is relatively juxtaposed to other employees on a team or, for that matter, other employees in general, the only known solution is for the first employee to walk around in the space and visually search for the locations of other employees and to select a hotelling space based on her visual investigation.

Eighth, all other things being equal, most employees would like to be located at a convenient location to the locations of other resources within a space that the employee will use. Most importantly, in many cases, employees like hotelling spaces that are proximate the locations of other resources that the employees are scheduled to use during a given day such as, for instance, conference or meting spaces. Thus, where a first employee is scheduled to attend three meetings during a day that are to take place in three adjacent conference rooms, it is highly likely the first employee would like to use a hotelling space that is proximate the three conference rooms as opposed to on the other side of a large facility. No known existing system allows an employee to identify an optimal hotelling space based on proximity to other scheduled resources.

To deal with at least some of the problems described above, in most cases where hotelling workstations are provided in an open plan, at least some space in the open plan is still divided from the larger space via architectural wall structures for private meetings between groups or teams of employees. Thus, for instance, in a space that includes 100 individual workstations, six full walled conference spaces may be provided including three spaces sized for up to ten employees and three spaces sized for up to four employees each. Hereinafter, unless indicated otherwise, a full walled conference space will be referred to as a conference room. Employees may have no choice but to move to conference rooms to hold meetings, to share digital content in an amplified format, to facilitate teleconference activities, or when additional privacy is required by an employee that wants to facilitate individual focused work.

Even in cases where one or more employees use a conference room to facilitate activities, the rooms are not optimized for such activities. For instance, lighting in a large conference room typically includes area lighting as opposed to task lighting required for optimized individual focused work activities. In addition, area lighting often cannot be adjusted in color, intensity, etc., to meet a user's preferences and many conference rooms have area sound systems that are not optimized for individual use or appreciation. Similarly, large spaces like a conference room typically are not equipped with subspace environmental controls for heating, air circulation, etc. Moreover, many employees that have worked alone in a large conference room designed for several employees have a sense of being swallowed up in the space as opposed to "fitting" well within the room.

Even in cases where conference rooms are provided in open office spaces, there are often several barriers to use. First, in the case of a hotelling arrangement, a hotelling employee unfamiliar with a large facility space may not know the locations of conference spaces and may not care to spend the time and effort to figure out the locations. Second, even when an employee knows the locations of conference rooms in a space, many times the conference rooms most closely located to an employee's hotelling station will be booked when the employee would like to use resources therein and therefore, to use a different conference room, the employee would have to travel an extended distance which the employee may not be willing to do. Third, many activities may only have short time durations and an employee may think it is not worth the effort to access conference room resources for such a short time even though those resources would appreciably increase the value of the activity. For instance, a first employee may want to share a set of ten images with a second employee to discuss a new product line and it may be useful to view and discuss those images in an amplified format. The first employee may not want to go through the trouble of reserving a conference space for the few minutes required to share the images. Fourth, in many cases where amplification or telepresence resources are provided in conference rooms, those resources are not easy to boot up requiring a series of steps by an employee. Exacerbating matters, many facilities or enterprises include more than one type of amplification or telepresence system and employees are often times intimidated by the thought of trying to boot up a system that they are unfamiliar with, especially if the system is only required for a short duration. Fifth, many employees are under the impression that the affordances and expenses associated with conference rooms should only be utilized for large group meetings or particularly important activities.

The barriers to use described above typically result in an underutilization of conference space resources even though those resources could facilitate and enhance many employee activities. Instead of using conference space resources when it would be advantageous, employees routinely opt for poor substitutes and simply "make do" with the resources at their hotelling stations. For instance, instead of using a telepresence system in a conference space to facilitate a discussion with a remote employee, a local employee may simply use a phone. As another instance, instead of sharing digital content with a remote employee directly, a local employee may have a remote employee link to a copy of a document and each may have to flip through their instance of the document simultaneously to view the same content. As another instance, instead of first and second employees amplifying content to share and collaborate, the first and second employees may huddle around a laptop display screen to view the content. As still one other example, instead of using a space with substantial visual blocking structure to facilitate individual focused work, an employee may opt to use a hotelling station that does not include such affordances.

Thus, what is needed is a space management system that can help people efficiently select and use optimal space affordances within unfamiliar enterprise spaces where optimal means, effectively, consistent with an employee's current preference set in terms of activities to be performed, location relative to various scheduled and unscheduled resources, environmental characteristics associated with affordance locations, locations of specific other employees and/or employees generally, or any combination of the above or other preferences. What is also needed is a system that can help guide employees within unfamiliar enterprise spaces to affordances to be used by the employees as well as a system that softly or quietly encourages good open space plan use by all employees. What is further needed is a system that automatically customizes hotelling stations and other space affordance configurations given preferences of employees using spaces as well as information related to activities to be performed in those spaces and that automatically adjusts space affordance settings to optimal values for supporting different types of activities. It would be advantageous if a system with the attributes described here could be implemented substantially automatically, requiring only minimal if any actions on the part of an employee to take advantage of the affordance attributes.

What is also needed is an overall space layout that provides a set of different affordance configurations including a separate affordance type for each of several different types of activities that typical employees engage in throughout the course of a day. Here, instead of trying to support many employee needs via a one size fits all workstation, several different affordance configurations should be provided where each one is optimized for a small set of specific activity types and employees should move about from configuration to configuration when different activities are to be performed. Again, transition from one configuration to another should be quick and simple and should require minimal if any actions on the part of an employee in addition to traveling from one configuration to the next.

BRIEF SUMMARY OF THE DISCLOSURE

Recognizing that different activities can be optimally supported by different affordance characteristics, several different affordance configurations have been developed, one for each of the different typical types of employee activities. In the exemplary embodiment described in this disclosure, seven different affordance configurations have been developed to meet the needs of a typical set of employees in a generally open office space including a reception configuration, a café configuration, a personal bench configuration, a focus station configuration, a content amplification kiosk configuration, an enhanced privacy configuration and a team studio configuration. The reception configuration is optimized to greet employees as they arrive within a facility space and the café configuration is optimized to help arriving employees transition into the space both physically and psychologically while the other five configurations are designed to optimally support different types of work activities. The personal bench configuration is designed to operate as a sort of day long (or generally long period) base station for use by an employee when the employee is not using one of the focus stations, amplification kiosks, enhanced privacy configurations or team studios to perform some specialized activity. The focus station is optimized to facilitate individual highly focused work when visual and audio distractions need to be minimized but total privacy is not necessary. The amplification kiosk is optimized to facilitate content amplification and sharing among small groups of employees as well as to facilitate telepresence sessions when complete privacy is not required. The enhanced privacy configuration is optimized for content amplification, to enable telepresence sessions, for sharing content remotely and for individual focused work and can be controlled to dial privacy up to a completely private level and down to suit an employee's needs at different times. The team studio configuration is optimized for use by mid-sized teams of employees (e.g., up to 8 or 12) that need to share and develop content both locally and with remote team members and, in at least some cases, can be controlled to dial privacy level up or down depending on circumstances.

In particularly advantageous embodiments systems have been designed that make it particularly easy for employees to find optimized affordances within a large facility space in at least two ways. First, instances of each of the seven affordance configurations are peppered throughout a facility space so that they are proximately and quickly accessible to employees at any locations within the larger space. Here, advantageously, because many of the affordance configurations are only optimized for relatively specific activities, superfluous affordances that are rarely used at those configurations can be eliminated and therefore the costs associated with each of the configurations can be minimized. Thus, for instance, in the case of one of the amplification kiosks, because total privacy is not required, the expense associated with a full walled conference space is avoided. Here, the cost savings in privacy walls can be used to equip a space with additional amplification kiosks which means that kiosks can be placed at more locations in a large space and hence proximate more employees for easy access. Similarly, a relatively large number of focus stations can be located at different locations within a large space to increase the level of access thereto by employees.

Second, in at least some embodiments a guidance system is provided to help employees locate resources that are optimized for specific activities and based on employee preferences, habits, etc. In general, a database is provided that includes facility resource maps and that can be populated with information about different affordance configurations within the space that is useful in suggesting different configurations for use by different employees. The database may, in some cases, also include configuration or space schedules, employee schedule information and a set of employee preferences. While an employee is located in the facility space, in at least some cases, the employee's location and the locations of other employees are tracked. A system server uses the database information to make resource suggestions to the employee within the space. For instance, when an employee first arrives in a space, the system server may, based on the employee's identity, preferences and other factors, identify one or more personal benches to suggest to the employee as a base station for use while in the larger space and may issue the suggestion via a reception configuration. As another instance, while an employee is working at her personal bench, the server may issue a warning via a screen or other indicator device at the bench indicating that the employee has a meeting in 10 minutes in Team Studio 2 and that it will take the employee 5 minutes to travel from her current location to Team Studio 2. In addition to issuing suggestions and warnings related to affordances and schedules, the server may also indicate locations of suggested configurations or locations of resources that the employee is scheduled to use as well as suggested paths to those resources on a facility map to expedite the employee's travel from one configuration to the next.

In addition, in at least some embodiments it is contemplated that when a system server suggests a resource at a specific location, the server may continue to track employee location in a facility space and continue to guide the employee to the suggested location. To this end, in some cases visual guidance indicators may be presented throughout a space and guidance may entail assigning a specific symbol or indicator to each of employee being guided in a space and presenting a string of those symbols or indicators along a path through the space to the location of a target resource. For example, where a server suggests a personal bench to an employee via a reception configuration, the server may assign the color pink as a guiding indicator to the employee. Here, the server may present a string of pink illuminated indicators along a path through space to the suggested bench.

In at least some embodiments screens and other visual indicators will be provided throughout a space for other than guidance purposes which can be used by a system server secondarily as visual guidance devices. For instance, where notification display screens are provided at personal benches, each of those screens or portions thereof may be used to present guidance signaling or indicators to traveling employees. In at least some cases the server will only use bench or other affordance configuration screens for guidance where the bench or other configuration is not being used by an employee when possible. Thus, for instance, where first and second benches are adjacent each other and an employee is located at the first bench but no employee is at the second bench, the server may only use the second bench screen for guidance so that the guidance activity does not disturb the employee at the first bench.

In at least some embodiments it is contemplated that, in addition to including affordance configurations that are optimized to facilitate specific tasks, the configurations will be controlled in an automated or semi-automated fashion to expedite the process of accessing those configurations and using the resources presented at those configurations. For instance, when a first employee is scheduled to use one of the enhanced privacy spaces to facilitate a telepresence session with a second remote employee, the system server may identify a telepresence system that the second employee will be using in a different facility to participate in the session and may make a connection between the telepresence systems to be used by the first and second employees automatically 5 minutes prior to the scheduled commencement time of the session. As another instance, as an employee approaches an amplification kiosk, the server may recognize the identity of the approaching employee and may automatically perform some process to expedite the task of accessing the employee's digitally stored content to be shared via a large display screen at the kiosk. For instance, where the employee uses a laptop computer, the server may present a password on the kiosk screen and a password data entry field on the screen of the employee's laptop so that the employee can enter the password in the field to associate the employee's computer with the kiosk screen for sharing a desktop image from the laptop. Similarly, when an employee moves away from the kiosk with her laptop, once the employee is at least a threshold distance away from the kiosk, the server may automatically disassociate the laptop with the kiosk to free up the kiosk for use by other employees and to make sure that the departing employee's desktop image is no longer shared via the kiosk screen.

In at least some embodiments at least some of the affordance configurations will include actuators useable by a system server to control at least some configuration affordances to automatically change aspects of the configurations to meet specific employee preferences. For instance, in at least some cases each personal bench configuration includes a height adjustable main work surface or table top so that the height of the surface can be adjusted to specific employee preferences. As another example, each bench configuration may include a task chair with adjustable aspects where those aspects can be adjusted to meet user preferences. Other adjustable bench characteristics are contemplated. By providing actuators for each adjustable characteristic at a configuration, a server may automatically adjust affordance characteristics for an employee prior to arrival of the employee at an assigned bench or other affordance configuration.

In addition to adjusting configuration characteristics to meet employee preferences, in at least some cases where an emissive surface or screen is included in a configuration, employee content may be used to automatically personalize the configuration for a specific employee. For instance, where a first employee prefers nature scenes, the emissive surface may be controlled to present images of natural settings and where a second employee prefers images of her children, the emissive surface may be controlled to automatically present images of her children when she is present.

Moreover, where an emissive surface or screen is included in a configuration, in at least some cases a system server may greet an arriving employee in a way designed to make the employee feel welcome and special upon arriving at the configuration. For instance, where an employee arrives at an assigned bench, a welcoming salutation may be presented via an emissive surface at the bench. Here, in addition to welcoming the arriving employee, the salutation can serve as confirmation for the employee that the employee is at the right bench in a large open space.

In general it has been recognized that even seemingly identical or substantially identical affordance configurations are not, in use, equal and that employees are often ill-equipped to identify which of several seemingly identical configurations best matches their preferences. For instance, first and second identical personal bench configurations may be located in a quiet, low foot traffic area and in a relatively loud and high foot traffic area, respectively. Here, clearly, the first and second bench configurations are in different sub-environments which will render the first more appealing to some employees than the second and the second more appealing to some employees than the first. Many other environmental characteristics or attributes are contemplated that may affect an employee's choice between different affordance configurations including but not limited to intensity of lighting, lighting color, amount of natural light, temperature, air circulation, proximity to resources like restrooms, coffee stations, other types of affordance configurations (e.g., specific team studios or enhanced privacy spaces, etc.) etc. In addition, proximity to moving resources like other employees generally, specific employees, employees on a specific team, the locations of configurations scheduled for specific meetings, etc., may affect an employee's choice of affordance configurations and the server may use any of these or any combination thereof to identify one or more configurations to suggest to an employee.

It has also been recognized that a simple preference signaling system may be provided as part of at least some affordance configurations that can be used by employees to encourage preferred behavior by other employees without requiring possibly uncomfortable circumstances. To this end, in at least some embodiments a signaling system is provided where an employee can cause a "Do Not Disturb" indication to be presented at a location on an affordance configuration that is observable by other employees in the general area. Here, when the do not disturb indication is presented, other employees are encouraged to avoid disturbing the employee using the associated affordance configuration. Similarly, in some embodiments the signaling system may enable an employee to cause a "Silence" or "Quiet" indication to be presented at a highly visible location on a configuration for general viewing by other employees. Here, when the silence indication is presented, other employees are encouraged to minimize noise, conversations, etc., in the general area of the associated affordance. In at least some cases where a silence indication is presented, if a noise level in the area exceeds some threshold level, a server may automatically present a quiet reminder in a highly visible location until the noise level dips below the threshold level.

In some cases some or all of the behavior guidance signaling may be automated. For instance, in cases where a specific subarea of a larger space is intended to be quiet, a silence signal may be automatically presented at each personal bench configuration. Similarly, when noise level in a quiet subarea exceeds a threshold level, a quiet silence reminder may be automatically presented until the noise level drops below the threshold level.

While a single server may be used to control an entire space management system as described herein, in other cases more than one server or processing system may be employed where the multiple systems cooperate to perform various tasks. For instance, one server or system may manage an employee location tracking process to identify locations and identities of employees in a facility space while another server or system controls employee guidance within the space based on the location and identity information.

In some cases it is contemplated that each affordance configuration may include its own processor for controlling actuators associated with the configuration and for interacting with employees moving about in a facility space under the overall control of one or more central or remotely located servers or other processors. Similarly, different affordances at each or a subset of the configurations may have its own processor which is controlled by a central server or the like. Here, each affordance or configuration processor may be wirelessly or otherwise linked to an intranet, the internet or some other network such as an enterprise LAN or WAN and may have a unique network address useable for communication with one or more central servers. The server may be programmed to receive information from the processors and to provide control signals and other information to the processors for performing any of the functions, methods and processes described hereafter.

In at least some cases it is contemplated that a system server may obtain information from sensors located throughout enterprise space that can be used to determine environmental characteristics of different areas in the larger space and more specifically the characteristics of subareas that are occupied by specific affordance configurations. In some cases it is contemplated that the characteristics or attributes of a subspace may change over the course of a typical day and therefore the attributes ascribed to different affordance configurations may be time of day specific.

In at least some cases employees that use affordance configurations will be able to provide feedback on their experience using the configurations. Data reflecting configuration feedback received by employees can be used subsequently to fine tune recommendations for those specific employees. In addition, data reflecting configuration feedback from employees can be used when selecting specific affordance configurations to suggest to other employees subsequently based on preferences.

In at least some cases it is contemplated that a system server can be programmed to dynamically adjust assignments of personal benches to employees based on employee preferences to change at least some aspects of subarea environments in an open office space when needed. For instance, where team studios and enhanced privacy configurations are arranges generally to divide up a large open office space into first, second and third subspaces and 100 personal benches are divided into first, second and third subsets including forty, twenty and forty, respectively, as employees arrive at a reception configuration, a system server may suggest benches via a reception display screen in the first space and the third space to employees that prefer a quiet bench and employees that are indifferent to the level of noise in the area of the bench they use, respectively. Hereinafter, unless indicated otherwise, subspaces in a larger space to which employees are assigned where the employees prefer a quiet environment will be referred to hereinafter as "quiet spaces" and other subspaces where employees are indifferent to the level of noise in the space will be referred to as "loud spaces". At times where the first subset of forty benches in the quiet space are filling up faster than the third subset of forty benches, the server may automatically start assigning the 20 benches in the second subspace to additional employees that prefer a bench in a quiet space. On the other hand, at times where the third subset of forty benches in the loud space are filling up faster than the first subset of forty benches, the server may automatically start assigning the 20 benches in the second subspace to additional employees that prefer a bench in a loud subspace. Thus, in this example, the server is programmed to dynamically assign characteristics of the second subspace to render that space either quiet or loud, as a function of instantaneous need based on employee preferences. While this example is simple, many other more complex dynamic space characteristic changes are contemplated. For instance, at time a majority of employees in a large space may prefer a relatively warm environment and at other times a different majority of employees in the same large space may prefer a relatively cool environment. Here, the system server may adjust temperatures in different subspaces of a large open office space to change the number of benches in cool subspaces to the number of benches in warm subspaces to meet instantaneous needs. As another instance, a system server may change a routing path of employees through a large open office space if the noise characteristic of a specific subspace along an initial path changes from loud to quiet.

In some embodiments a universal interface (UI) may be provided at a subset or at several of the affordance configurations so that employees at each configuration type are generally familiar with the UI attributes and therefore are likely to use the UI more readily. In at least some cases the UI will be extremely simple and intuitive. In some cases the UI will be designed as the "face of a space" and will have control features that can be dialed up and down by an employee for controlling configuration affordances as well as content presented in the space. When dialed down, the UI will be minimal and while presented quietly within a space, will nevertheless be rendered closely available to employees using space affordances.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 120 is a screen shot that may be presented on a conferee's personal portable computing device where the conferee is offered the option to decline a remote view that includes the conferee;

FIG. 121 is a partial perspective view and a partial top plan view of a height adjustable workstation interface that is consistent with at least some aspects of the present disclosure;

FIG. 122 is a partial perspective and partially exploded bottom view of the assembly of FIG. 121;

FIG. 123 is similar to FIG. 122, albeit showing the assembly is a different state of being assembled;

FIG. 124 is a flow chart that represents one height adjust control scheme that is consistent with at least some aspects of the present disclosure; and FIG. 125 is a partial perspective view that shows yet another height adjustable workstation interface that is consistent with at least some aspects of the present disclosure.

DETAILED DESCRIPTION OF THE DISCLOSURE

Figure 1:
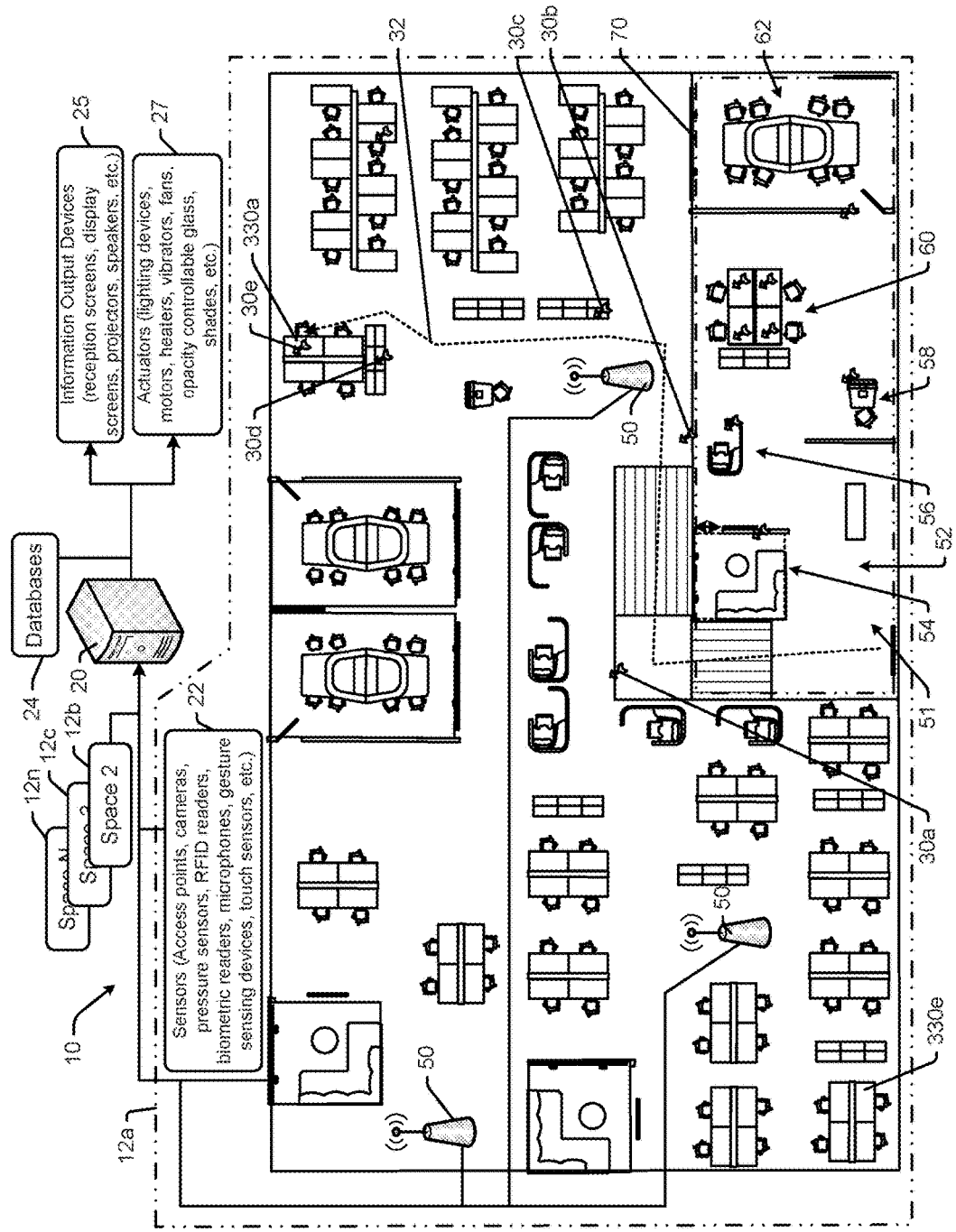
FIG. 1 is a schematic view of an exemplary space guidance and management system that is consistent with at least some aspects of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Unless indicated otherwise, a person (e.g., an employee of an enterprise, a contractor, a supplier, a client or customer, etc.) that is located in an enterprise space and uses that space for any purpose will be referred to herein as an "employee". In addition, unless indicated otherwise, the phrase "system server" will be used herein to refer to any type of computing device or configuration of devices capable of performing some, all or any subset of the processes described herein. For instance, a system server may include a dedicated system server, a workstation, a personal computer, a laptop computer, a tablet type computing device, a local computing device associated with a specific affordance configuration, a remote processing device, etc.

In addition, while the system server may include a single computing device, in many cases it is contemplated that the system server may include a number of linked servers or other computing devices, each performing different functions and processes or the set cooperating to perform different functions and processes as described in this specification. For example, a first server may run space scheduling software designed to maintain schedules for all enterprise spaces and affordance configurations, a second server may run employee schedule software designed to maintain schedules for employees associated with an enterprise, a third server may track locations of employees as they move about in enterprise space and a fourth server may run software for driving system actuators or output devices such as displays screens, indicator lights or lighting devices, speakers, telepresence systems, motors to drive moveable system components, or any other types of actuators that may affect enterprise space environment characteristics.

In still other cases, it is contemplated that many processors may be located throughout an open office space that can perform various tasks associated with specific devices in the space where the tasks are coordinated by a central server. For instance, in at least some cases, a separate processor may be provided for each affordance configuration or even for each different controllable component associated with an affordance configuration where each processor is assigned a virtual network address useable to communicate with the server. Here, the server may receive data from at least a subset of the networked processors for processing and may provide control signals and data to at least a subset of the networked processors to perform different functions, methods and processes that are described hereafter. In at least some cases, system processors may be programmed to communicate directly with each other instead of through the central server to perform various tasks. In particularly advantageous embodiments, the system processors and server(s) are linked via a wireless network where each processor is linked to a transceiver for transmitting data to other system devices and for receiving data and commands from other system devices. This type of system where devices and components are linked together in a network is sometimes referred to as an internet of things.

In the disclosure that follows, various furniture, wall and device configurations are described that may be used by employees within a large and generally open office environment. A specific furniture, wall and device configuration will be referred to hereinafter as an "affordance configuration", unless indicated otherwise. Moreover, in the disclosure that follows, various affordance configurations are described that may be temporarily used by employees. For instance, a personal bench (see FIG. 17) may be used by an employee as a sort of temporary home base throughout the course of a day. Herein, unless indicated otherwise, when an employee is temporarily using a configuration, the term "own" will be used to refer to the temporary association between the employee and the configuration. Thus, for instance, where an employee is scheduled to use a personal bench for 6 hours, the relationship between employee and bench will be referred to as ownership. Similarly, when an employee takes control of an individual focus station (see FIG. 34) for a two hour period, it will be said that the employee "owns" the focus station during the two hour period.

Many of the concepts described in this disclosure may employ light indicators where different colors of light can be generated to indicate different conditions or states or other types of information. Similarly, where information is presented on a display screen often times the examples in this disclosure will describe fields, icons, etc., as being highlighted, colored, or otherwise visually distinguished in some fashion using different color. In the figures described hereafter, unless indicated otherwise, different colors will be represented by different styles of cross hatching or patterns. For instance, left up to right cross hatching will be used to indicate a green color, left down to right cross hatching will be used to indicate a red color, dual horizontal and vertical hatching will be used to indicate a pink color, dual diagonal hatching will be used to indicate a blue color, horizontal hatching will be used to indicate a yellow color and vertical hatching will be used to indicate a gray color. In addition, vertical hatching is also used at times in this disclosure to indicate an opaque or semi-opaque glass member or other vision obscuring effect (e.g., a blurring of an image on a display screen).

Referring now to FIG. 1, the present disclosure will be described in the context of an exemplary space management system 10 that includes, among other things, a plurality of generally open office plan spaces 12a, 12b, 12c, . . . 12n, a server 20, sensing devices/sensors 22, information output devices 25 and actuators 27.

Figure 2:
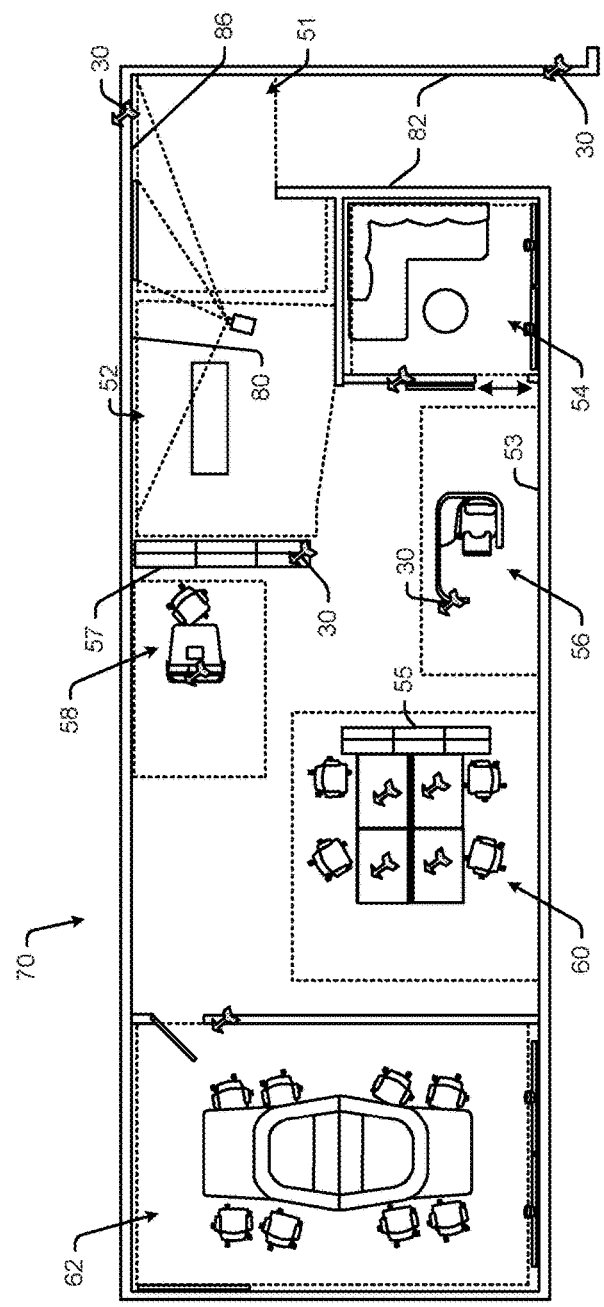
FIG. 2 shows a portion of the map representation shown in FIG. 1 including exemplary reception and café configurations, a personal bench configuration, a focus station, a content amplification kiosk, an enhanced privacy station and a team studio configuration that are consistent with at least some aspects of the present disclosure.

Each space 12a, 12b, etc., includes a set of activity supporting affordance configurations. Referring also to FIG. 2, one subspace 70 of space 12a in FIG. 1 is shown in a larger view where subspace 70 includes several different activity supporting configurations including a reception configuration 51, a "café" configuration 52, an enhanced privacy configuration 54, a focus station 56, an amplifier kiosk 58, a personal bench configuration 60 and a team studio configuration 62. Here, it has been recognized that throughout the course of a day, most employees work differently at different times and that different types of activities can be supported optimally via different affordance configurations. The seven different activity supporting configurations 51, 52, 54, 56, 58, 60 and 62 reflect the realization that employees work best and are most efficient when they have access to different affordance configurations for accomplishing different tasks at different times.

In most cases, regardless of what else is going on during an employee's day at a facility, it will be useful for an employee to reserve a space for personal use as a sort of day "base station" where the employee can store personal goods, charge personal portable electronic devices, access personal or other computing devices to perform various tasks such as content generation, content review, etc., and where the employee can routinely return between other activities at other locations within the facility space when time permits. Hereinafter, unless indicated otherwise, spaces reserved for personal use within facility space will be referred to as personal benches. While personal benches may take several forms in at least some embodiments, in the present disclosure, exemplary personal benches are described that are configured to have at least some adjustable features that can be controlled to accommodate at least some personal preferences such as, for instance, worksurface height, lighting effects, temperature, air flow, etc. Here, while adjustable features are provided, for the most part, personal benches have substantially similar characteristics and operate in a substantially similar way.

Figure 17:
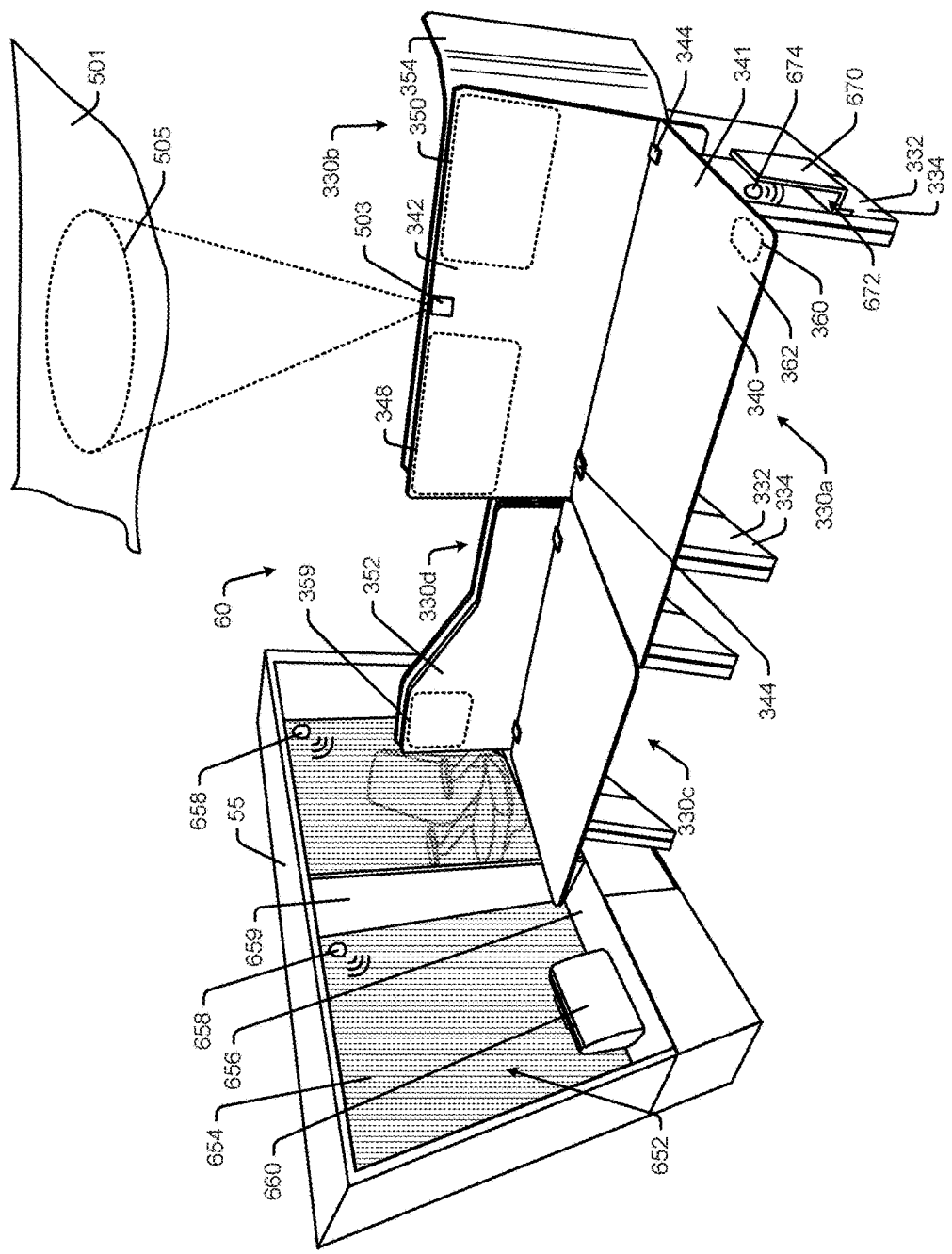
FIG. 17 is a perspective view of an exemplary personal bench configuration shown in FIG. 2, with a bench work surface in a low seated position.
Figure 18:
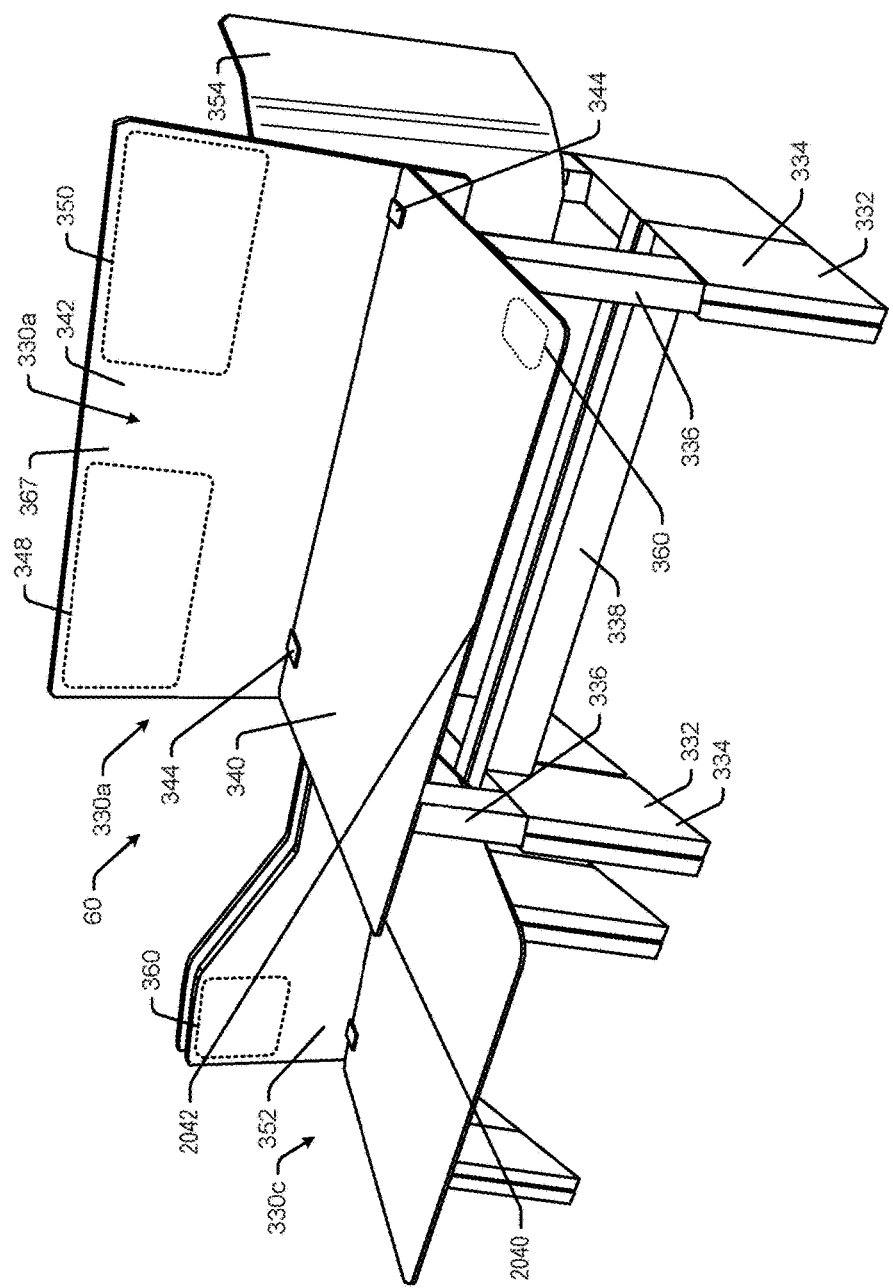
FIG. 18 is similar to FIG. 17, albeit showing one of the bench stations with a work surface member in a standing height position.
Figure 19:
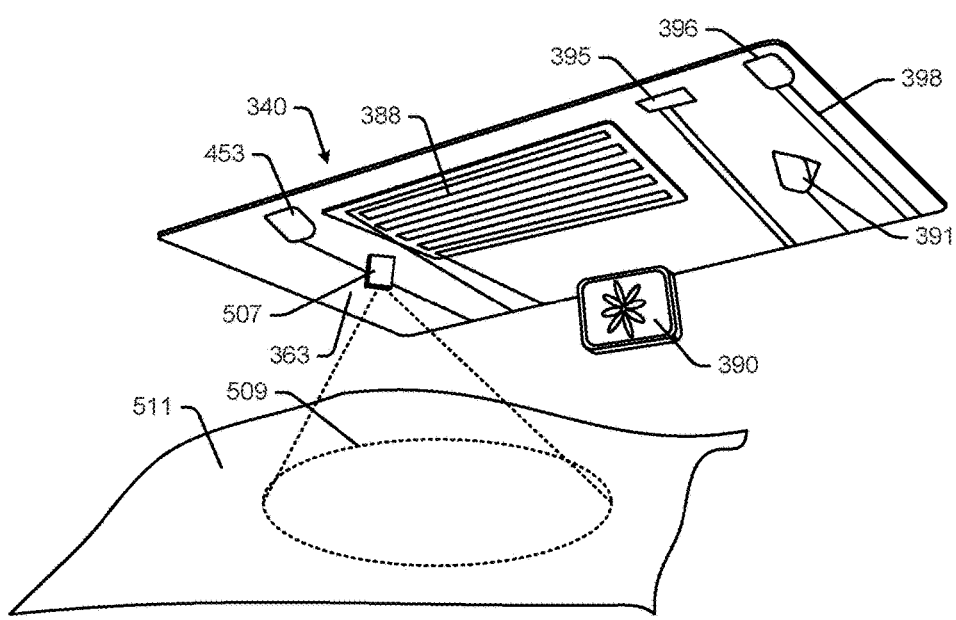
FIG. 19 is a schematic image illustrating an undersurface of the exemplary work surface shown in FIG. 18.

In at least some embodiments a personal bench will be included in a larger configuration that includes several personal benches to minimize space and mechanical structure required to provide personal benches. Thus, for instance, in some cases, a personal bench configuration will include four work surfaces and associated privacy screen subassemblies supported by support structure for simultaneous use by up to four separate employees. An exemplary four pack bench configuration 60 including four personal benches is shown in FIGS. 17 and 18 and will be described in greater detail hereafter.

Figure 34:
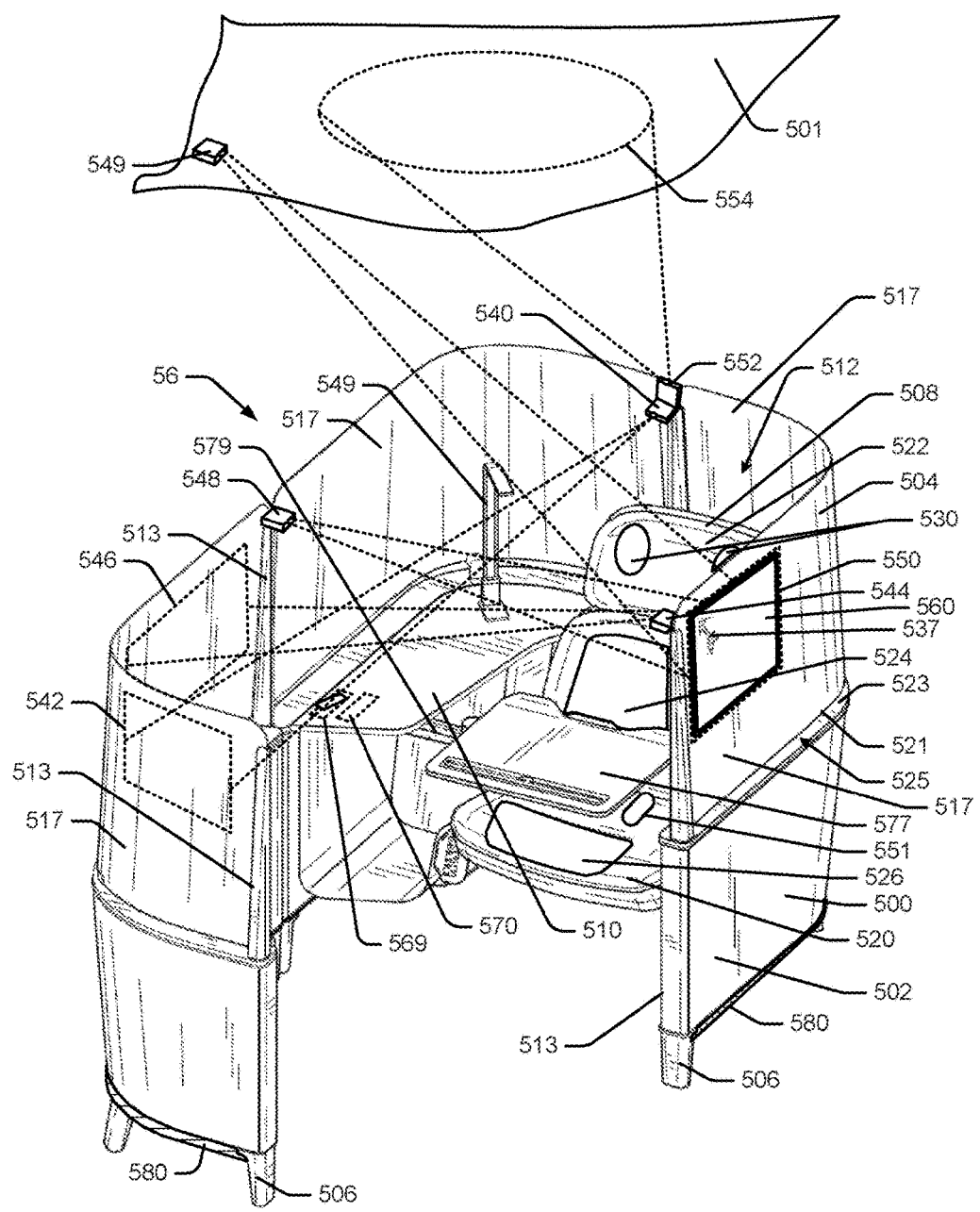
FIG. 34 is a perspective view of an exemplary focus station shown in FIG. 2 that is consistent with at least some aspects of the present disclosure.
Figure 35:
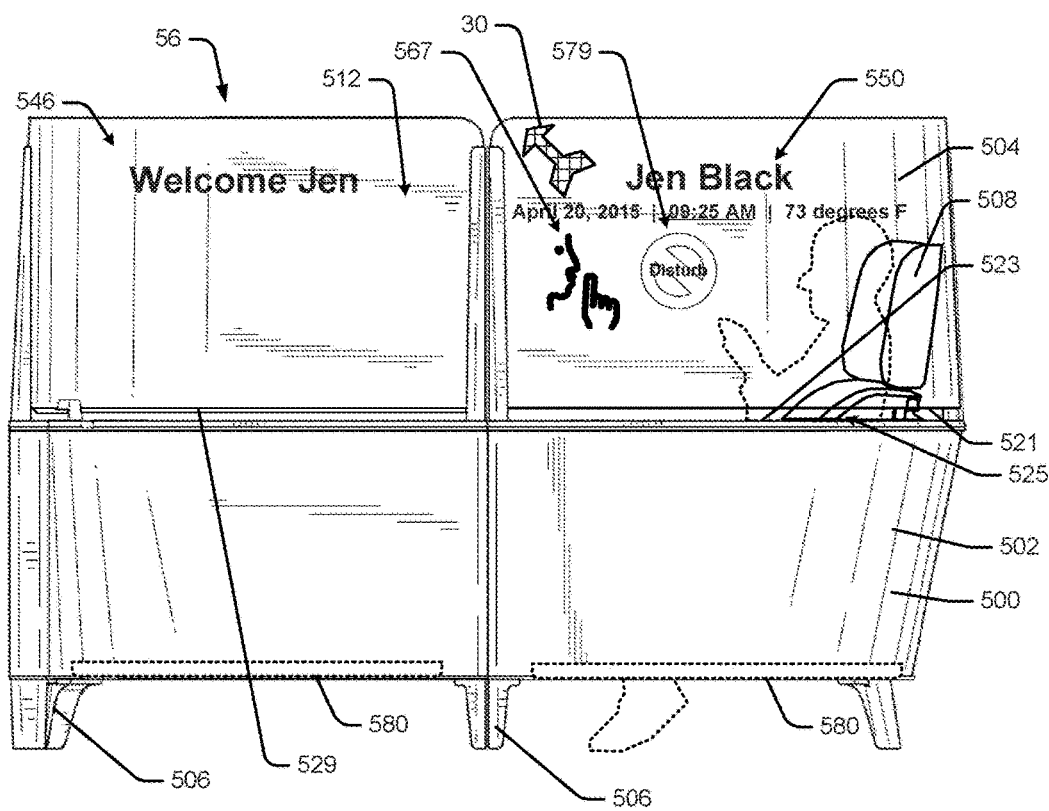
FIG. 35 is a side perspective view of the focus station of FIG. 34.
Figure 36:
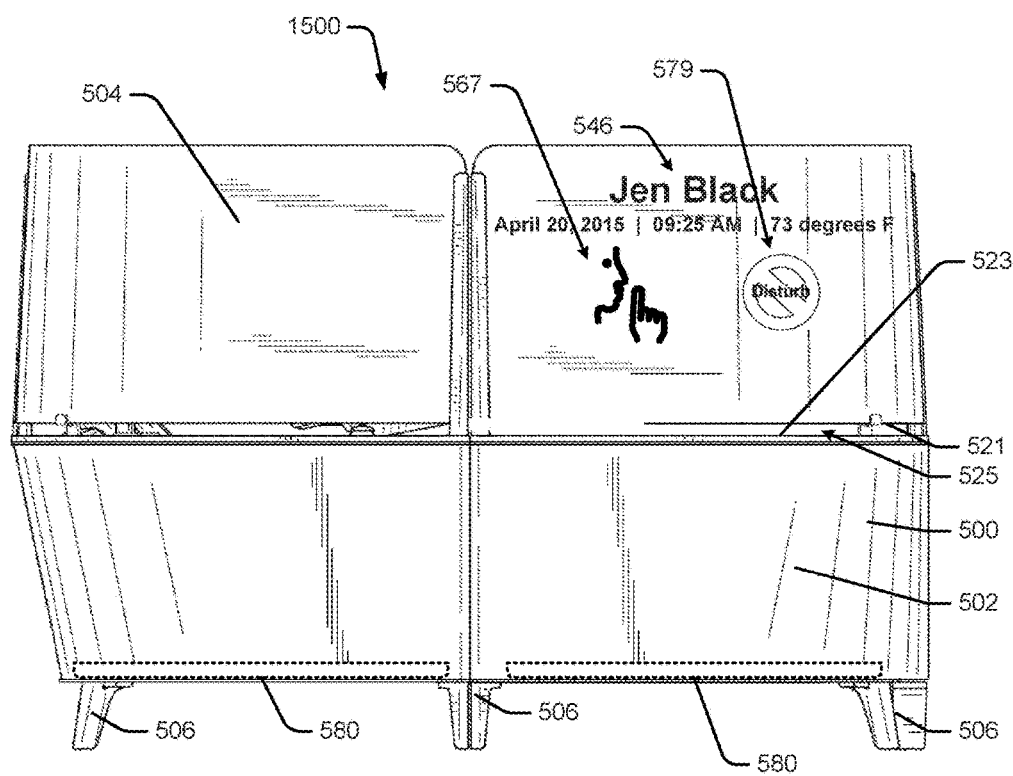
FIG. 36 is another side perspective view of the focus station shown in FIG. 34.
Figure 37:
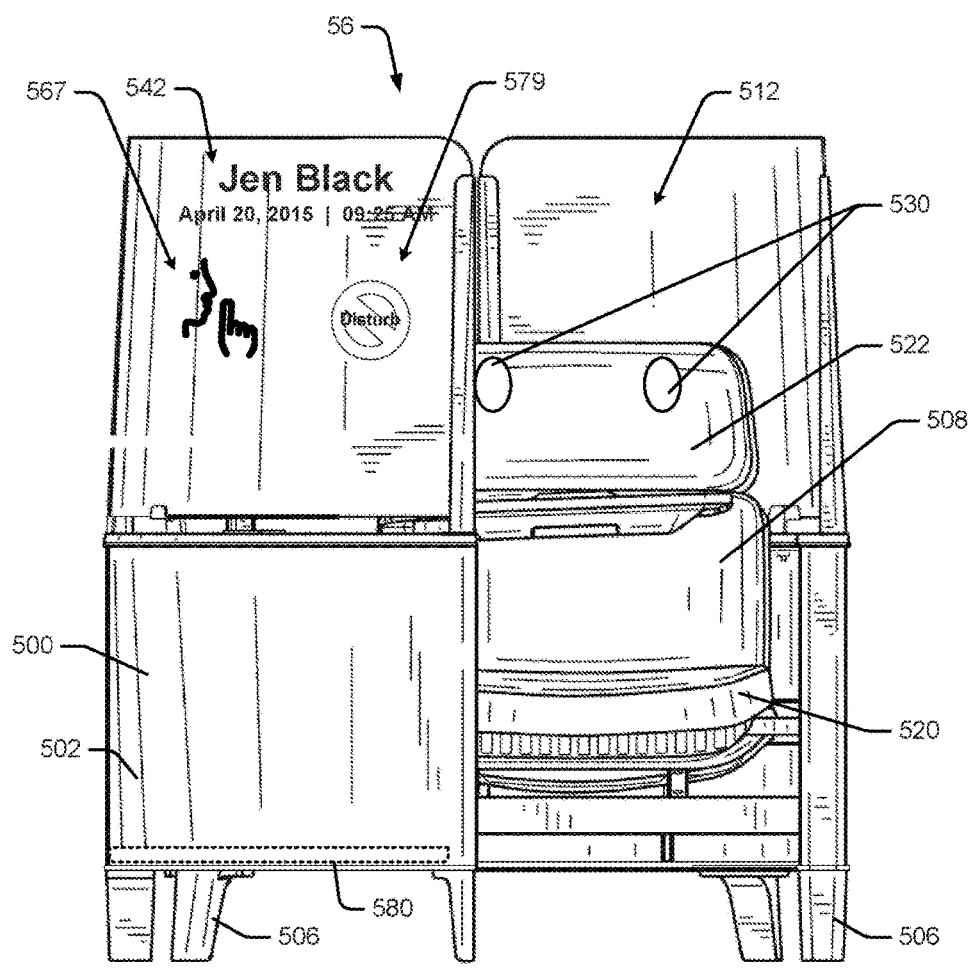
FIG. 37 is a front perspective view of the focus station shown in FIG. 34.
Figure 38:
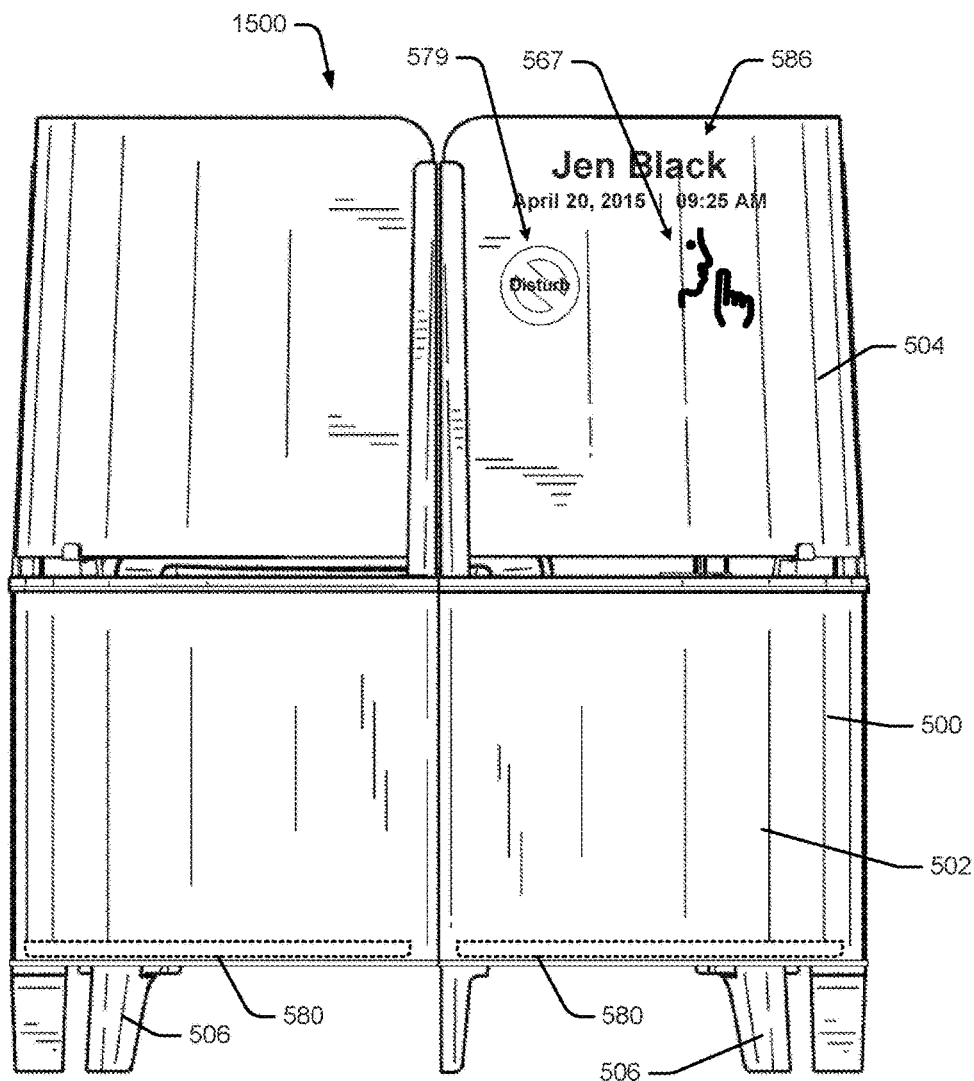
FIG. 38 is a rear perspective view of the focus station shown in FIG. 34.
Figure 39:
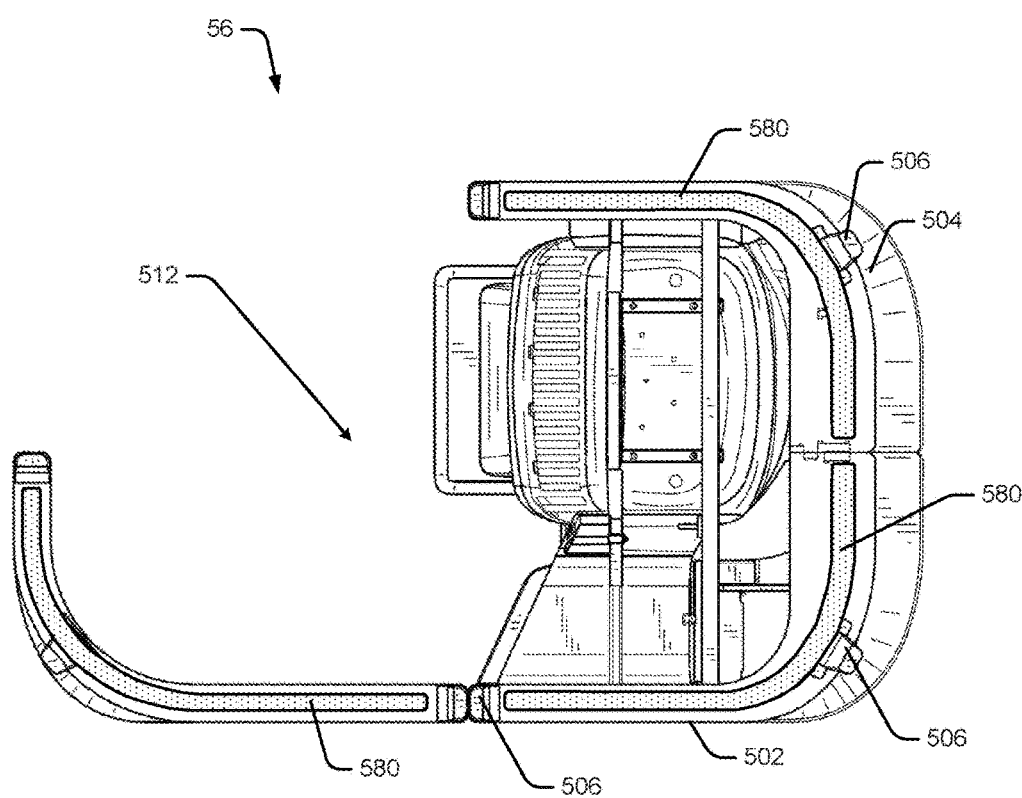
FIG. 39 is a bottom plan view of the focus station shown in FIG. 34.

While most employees will value hotelling at a single personal bench during at least a portion of a day to perform many tasks, most employees, at times, need to perform tasks that a typical personal bench is not optimized to facilitate. For instance, a first employee may have a two hour period during which the she is not scheduled for any specific activities from noon to 2 PM with a two hour meeting starting at 2 PM. The first employee may also need to intensely focus on a specific set of materials to prepare for the 2 PM meeting. Here, while the first employee may own a personal bench for the day, the bench, being part of a four pack bench assembly and/or at least located within a space that includes other proximate benches temporarily owned by other employees, is clearly not optimized for intensely focused work activities. Here, in at least some embodiments, other affordance configurations are provided that are highly optimized for intensely focused individual work and those configurations can be used by employees on an as needed basis. An exemplary "focus station" configuration 56 is shown in FIG. 34 which will be described in greater detail hereafter.

Figure 42:
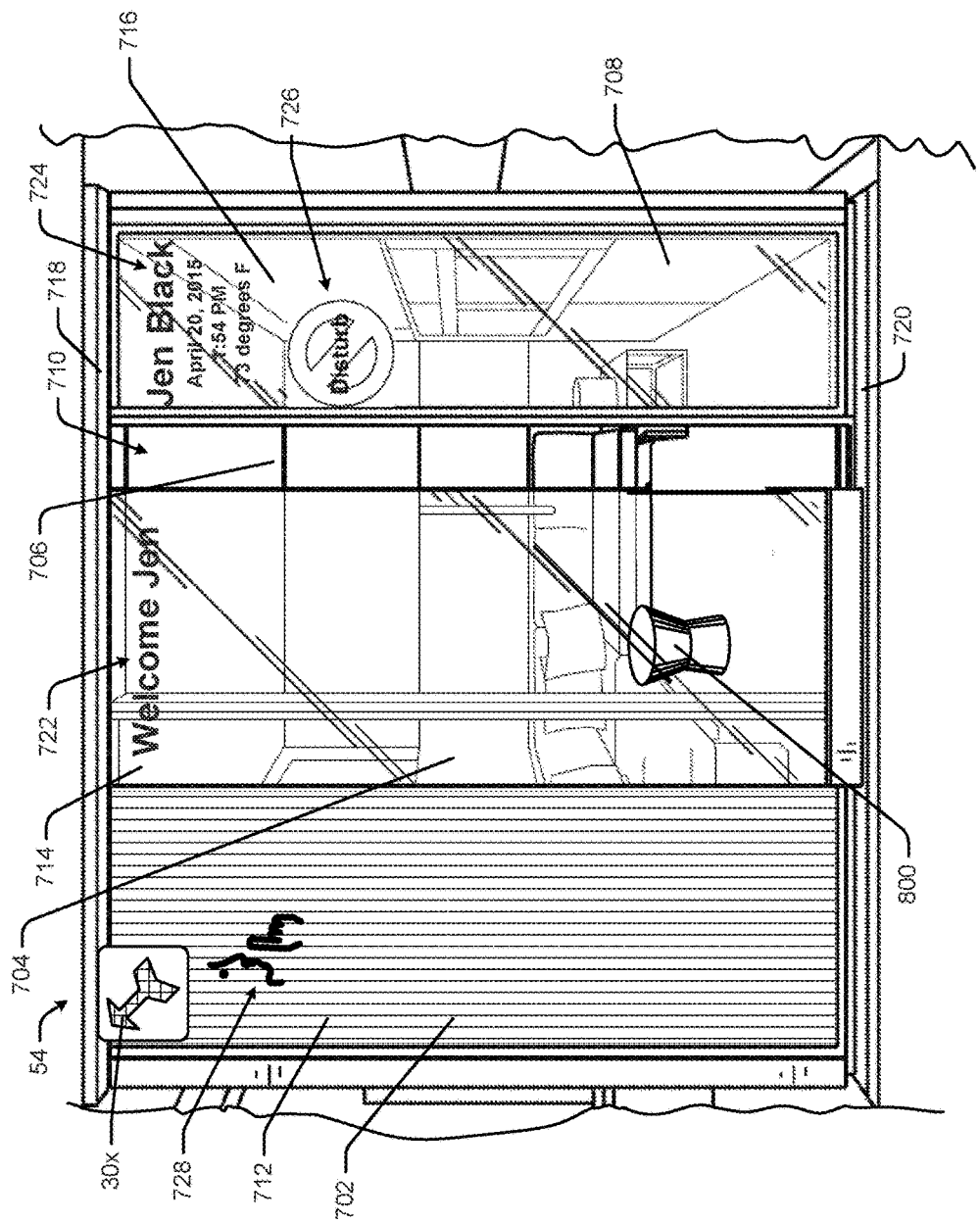
FIG. 42 is a plan view of an exemplary enhanced privacy station shown in FIG. 2 that is consistent with at least some aspects of the present disclosure.

As another instance, at times a first employee may need to participate in a teleconference session with one or more remote employees. Clearly a personal bench that is proximate other personal benches does not facilitate telepresence activities in an optimal way. Here, separate optimized enhanced privacy configurations are provided within a facility space to be used by employees on an as needed basis. An exemplary enhanced privacy configuration 54 is shown in FIG. 42 which is described in greater detail hereafter.

Figure 55:
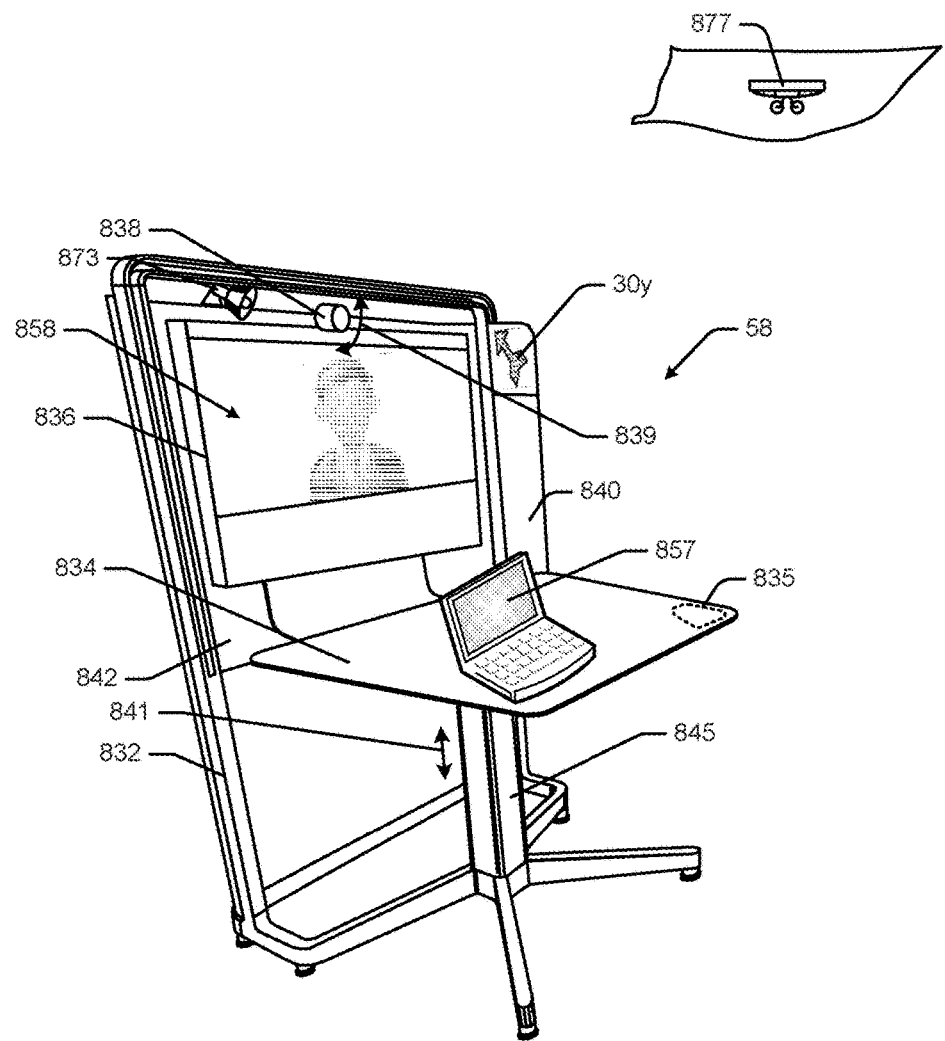
FIG. 55 is a perspective view of an exemplary content amplification kiosk shown in FIG. 2 that is consistent with at least some aspects of the present disclosure.

As yet one more instance, at times a first employee using a personal portable computing device (e.g., a laptop, a pad type device, a smart phone, etc.) may want to amplify content for personal viewing or so that the content can be shared with a second or more employees in a small group and the employee may be indifferent to privacy. Again, the personal benches in the present disclosure are not optimized for content amplification. In this regard, at least the disclosed personal benches in many embodiments are not equipped with large display screens or projectors required to amplify content. In addition, personal benches in the present disclosure are located proximate other personal benches so that any sharing of content with second or more employees may be disruptive to employees located at other proximate personal benches. The privacy afforded by one of the enhanced privacy configurations is not needed in this case as privacy is not a concern. Thus, in some cases, content amplifying stations may be provided at different locations within a facility space for use by employees on an as needed basis. An exemplary content amplifying station 58 is shown in FIG. 55 and is described in detail hereafter.

Figure 63:
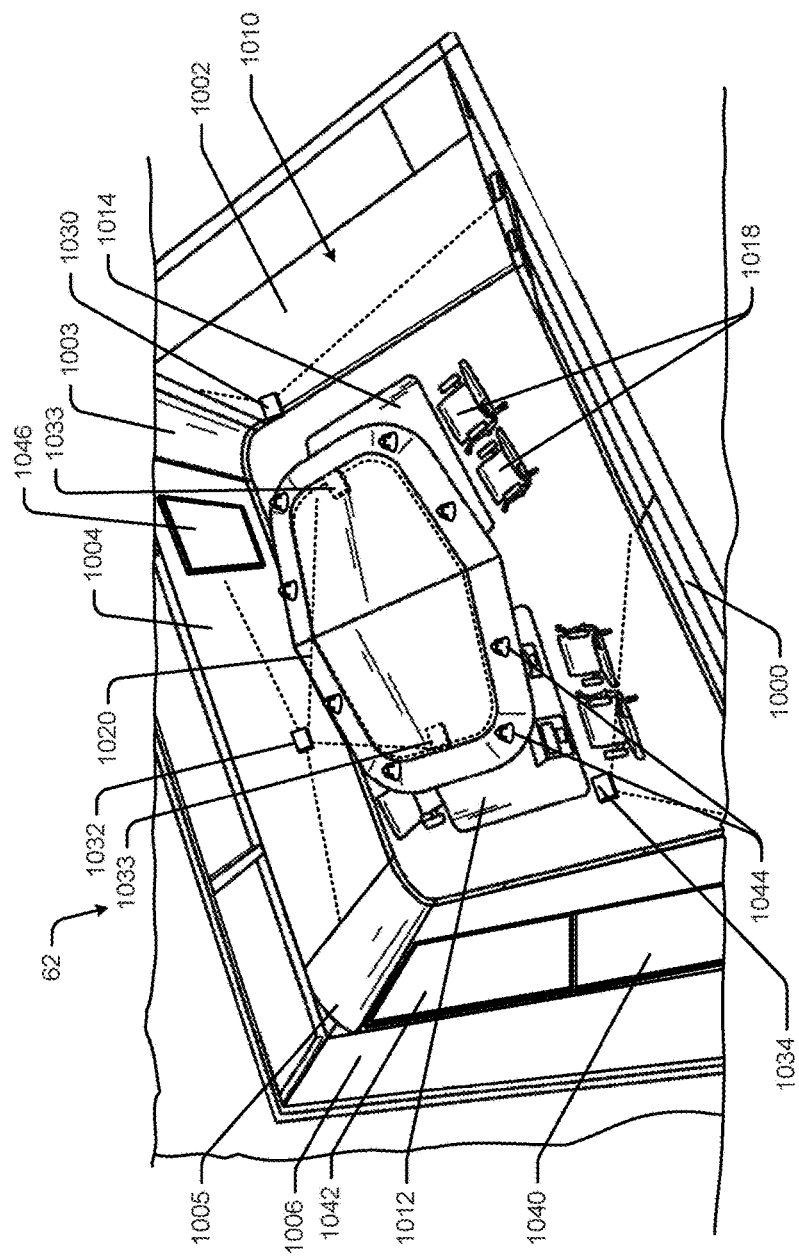
FIG. 63 is a top perspective view of an exemplary team studio shown in FIG. 2 that is consistent with at least some aspects of the present disclosure.

As another instance, personal benches are not optimized for team or larger group meetings due to lack of space, lack of content sharing affordances (e.g., large display screens, audio equipment, etc.), an inability to shield content from others and the fact that any meeting at a personal bench would necessarily disrupt other employees located at adjacent benches. To facilitate team meetings, optimized team studio configurations are provided in at least some embodiments consistent with the present disclosure. An exemplary team studio configuration 62 is shown in FIG. 63 and is described in detail hereafter.

In particularly advantageous embodiments, it is contemplated that one or more of each of the personal bench configuration, the focus station, the content amplifier kiosk, the enhanced privacy configuration and the team studio configuration will be grouped together in each subspace of a facility so that employees in each subspace have ready and spatially proximate access to any of the different types of space affordance configurations needed throughout a typical day. Thus, for instance, see subspace 70 in FIGS. 1 and 2 that includes an enhanced privacy configuration 54, a focus station 56, a content amplifier kiosk 58, a four pack personal bench assembly 60 and a team studio configuration 62.

While not shown specifically in FIG. 1, advantageous ratios of personal benches to amplification kiosks to enhanced privacy configurations to focus stations to team studios are contemplated. For instance, where a subspace is routinely used by 12 employees, it will be optimal to have more than 12 personal benches in that subspace to accommodate more than 12 employees at times when the number of employees exceeds the average. In addition, even if the maximum number of employees that use a subspace at the same time is 20, it will be optimal to have more than 20 personal benches in that subspace as different benches will be located in different sub-environments within the space and the space should include enough benches in each of the sub-environments to meet personal preferences of most if not all of the maximum number of employees in the space. For instance, if the maximum number of employees that uses a subspace is 20 at any given time, if the maximum number of employees that prefer natural light at any given time is 13 and the maximum number of employees that prefer synthetic light is also 13 at any given time, then, optimally, 26 benches should be provided in the subspace where 13 are located in substantial natural light and 13 are located in substantial synthetic light. Moreover, the number of benches optimal for a space may increase even further when other preferences are considered such as noise level, foot traffic preferences, temperature, air flow, etc.

Typically, the number of focus stations, content amplifying kiosks, enhanced privacy configurations and team studios is smaller than the number of personal benches required in a facility space. To this end, for instance, while focus stations are advantageous, only a fraction of employees in any given space will likely prefer using a focus station to a personal bench at any given time. Thus, where 20 employees temporarily own personal benches in a subspace at one time, the maximum number of focus stations required to support the subset of those 20 employees may be 4. Thus, where 36 or even 30 benches may be required to optimally support 20 employees in a subspace, the optimal number of focus stations may be four or five. Other optimal ratios of different affordance configurations are also contemplated.

Thus, in at least some particularly useful embodiments, the ratio of personal benches to focus stations in a subspace (e.g., 70 in FIG. 2) may be in the range between three to one and six to one and, in particularly advantageous systems, may be in the range between four to one and five to one. The ratio of personal benches to content amplifying kiosks 58 may be in a range between three to one and six to one and, in particularly advantageous systems, may be in the range between four to one and five to one. The ratio of personal benches to enhanced privacy configurations 54 may in the range between three to one and six to one and in particularly advantageous embodiments may be in the range between four to one and five to one. The ratio of personal benches to team studios 62 may be in a range between six to one and fifteen to one and in particularly useful embodiments may be in a range between seven to one and nine to one.

In addition to configurations and stations 54, 56, 58, 60 and 62, exemplary subspace 70 also includes a café configuration or space 52 and a reception configuration or space 51. The reception configuration 51 includes a reception display screen that can help arriving employees understand space layout, resource characteristics and resource (e.g., affordances and employees) locations within the facility space as will be described in detail hereafter and that can help employees take ownership of personal benches that are optimized to meet employee specific preferences.

Café configuration 52 is provided at an entry area of subspace 70 and is designed to help employees transition into the subspace from outside the subspace. To this end, the café configuration may present an abstract image on a surface that is a visual metaphor for some aspect of the space. For instance, the abstract image may be controlled to mirror the energy within the space so, for example, if only one employee is located in the space and that employee is using a focus station 56 to perform individual focused work, the image may be simple and slow moving. As another example, if fifteen employees are located in the space and several intense meetings are occurring, the image may include more complex components that are swirling or moving at a relatively fast pace. This concept is described in greater detail hereafter.

Referring yet again to FIG. 2 and as described in greater detail hereafter, each of the configurations and stations 54, 56, 58, 60 and 62 includes, among other components, at least some type of view blocking wall or screen structure to block at least some views of employees located at each of the configurations or stations by other employees. In at least some embodiments, the stations and configurations as well as other configuration walls and affordances (e.g., shelf units) are arranged so that no employee at a use position associated with any one of the stations or configurations has a direct and unimpeded view into at least some of the other stations and configurations. For instance, it should be appreciated that no employee at any use location associated with any of configurations or stations 54, 58, 60 or 62 or, for that matter, in the café space 52 or the reception space 51, has an unimpeded view into the internal portion of focus station 56 in FIG. 2. This is because station 56 is juxtaposed so as to open to a side opposite a likely high foot traffic area and toward a wall structure 53. In addition, a shelf unit 55 is located adjacent bench configuration 60 to further impede the view of employees at bench configuration 60 into the focus station 56. Similarly, content amplifier kiosk 58 is arranged to have a wall structure 57 directly behind a station use location which impedes views of content on a large display screen on which content may be amplified at station 58.

While seven specific affordance configurations are described herein and each of those configurations includes features and aspects that have various advantages, it should be appreciated that other systems may have other supporting configurations or may only include a subset of the supporting configurations described herein. Nevertheless, it has been recognized that there are at least seven different categories of activities that most employees participate in at one time or another while in office spaces and that seven different affordance configurations can be provided where each configuration is optimized for one of the seven different activity categories.

In most cases, even where personal benches have similar or substantially identical configurations, different employees will prefer to use one or a subset of personal benches to other benches within a large facility space for various reasons. For instance, a first employee may be on a project team with other employees and may prefer to own a personal bench located proximate other employees on her project team. The first employee may also prefer that her personal bench be located as close as possible to a conference space scheduled to be used by the team from 10 AM to noon. A second employee may prefer to own a personal bench located remote from all other employees, in a relatively quiet space and as close as possible to a large exterior window so that the second employee is located in natural sun light during the day.

In at least some embodiments a set of personal bench suggestion factors and each employee's preferences and habits for each of the suggestion factors may be stored in a database. One or more automated "reception" configurations may be provided at different key locations throughout a facility space to, among other things, present information about the space and resources therein to help employees discover and use optimal space resources given their own suggestion factor preferences. In addition to helping employees discover and use resources, the reception configurations can also help employees locate resources including an optimized personal bench, conference spaces, specific resources like telepresence systems, other employees located within a facility space in general, specific employees (e.g., employees on a specific team) within facility space, the locations of personal benches and other resources used by specific employees or locations of resources being used by employees in general within a facility space.

Referring again to FIG. 1, the sensor devices 22 may include many different types of sensor devices located throughout space 12a including but not limited to wireless access points (see 50 in FIGS. 1 and 2), cameras, pressure or weight sensors (see 551 in FIG. 34), RFID sensors, presence sensors, biometric readers, microphones, gesture sensing devices, touch sensors (e.g., associated with an electronic display screen or emissive surface), etc. The sensor devices are provided to, in general, sense activities and conditions within space 12a as well as in some cases, to receive control commands from employees within space 12a.

Access points 50 may be used to generate information useable by system server 20 to ascertain locations of employees within space 12a via any one of many well known triangulation techniques. In other cases, system cameras throughout space 12a may be able to generate images useable by a system server to determine identities and locations of employees within space 12a. Other identity and location sensing systems are contemplated. Hereinafter, unless indicated otherwise, it will be assumed that system 10 is equipped with a wireless location tracking system that identifies employee locations within space 12a as well as the identities of specific employees in space 12a. In addition, access points 50 enable wireless communication between server 20 and component or affordance configuration processors.

Information output devices 25 may include any of several different types of devices including but not limited to display screens or other emissive surfaces, projectors and associated surfaces projected on to, speakers, light device or any other type of visual output device that can be controlled to indicate visually distinguished states or information. For instance, see the reception display 84 shown in FIGS. 4 and 5 that serves as a relatively informative output device. As another instance, simple LED or incandescent lighting devices may serve as information output devices 25.

Herein, unless indicated otherwise, numeral 30 will be used to refer to visual indicators generally which are a particular subset of the information output devices 25 for indicating conditions or some type of information in a "glanceable" fashion. Here, the term "glanceable" means that an employee can simply view the indicator and discern the meaning of information being conveyed from the appearance of the indicator alone. Thus, for instance, white light may indicate that an affordance configuration is not currently being used by another employee and therefore is available for use by any employee while green light may indicate that the configuration is currently in use or reserved for use. Other colors or different visual effects would be associated with other states, conditions or information. In the figures, a right up to left arrow (see 30a in FIG. 1, 30f through 30i in FIG. 30, etc.) is used generally to indicate a visual indicator but it should be understood that many different types of visual indicators are contemplated.

Each indicator device 30 is linked to system server 20 either wirelessly or in a wired fashion to be controlled according to processes to be described hereafter. An exemplary visual indicator device 30 may include a bulb type device or some type of LED engine but it should be recognized that indicator devices used in the system 10 may take many different forms such as, for instance, an LED assembly, incandescent lights, a neon light device, an emissive surface, a portion (e.g., a border, a top ribbon, a colored icon, etc.) of a display screen or emissive surface, light projected onto one or more surfaces, light transmitted through a light pipe or other light diffusing structure, etc. Where a display screen or emissive surface provides a visual indicator function, in many cases only a portion of the screen or surface will be used for that function and other sections of the screen may be simultaneously used to present other information. Some visual indicators may be used for different purposes at different times. For instance, a display screen at a personal bench may, at times, be used to present schedule warnings to an employee using the bench and may, at other times, be used as a visual guidance indicator to guide an employee along a path within a large open space.

The visual indicator devices 30 may be stand alone devices or may be linked to or otherwise integrated into one or more of the affordance configurations. For instance, in FIG. 1, device 30a is shown mounted adjacent a wall structure within space 12a and in that case likely would include a standalone device such as an LED array that can be controlled to generate any of several different clearly distinguishable colors of light. As another instance, device 30e is shown as associated with a personal bench assembly and that device would, as described hereinafter, likely be integrated into the bench assembly.

In many embodiments, the visual indicators will indicate different types of information by simply generating different colors of light where each light color is associated with a different condition or has a different meaning. In other cases, different patterns of on-off illumination may indicate different conditions or information. In still other cases a visual indicator may indicate different conditions or information by changing the pattern of light or the appearance of the visual indicator. Pattern or on-off sequencing to indicate conditions or information is particularly advantageous where an employee is color blind and cannot distinguish different colors. Where many different colors of light are required, one particularly useful technology is the technology used in the Hue LED light bulbs sold by Phillips which can be controlled to generate many different clearly distinguishable light colors and it is contemplated that at least some embodiments here would employ the Hue technology.

Referring yet again to FIG. 1, actuators 27 include various devices located throughout space 12a that are linked to system server 20 and that can be controlled thereby to change the environment within space 12a and specifically the environment associated with at least a subset of the affordance configurations located within space 12a. For instance, referring to FIG. 17, bench assembly 60 includes a height adjustable leg assembly for each of four personal bench workstation table top members so that the heights of the table tops can be independently adjusted to meet specific employee preferences. Each height adjustable leg assembly includes one or more motors (not illustrated) that can be controlled to change table top height and each of those motors is an actuator.

As another example, referring to FIG. 34, in at least some embodiments speakers 530 are provided in the upper section of the focus station seat assembly so that sound tracks can be played for an employee occupying the station. Here, the backrest speakers or their driver devices are actuators. As yet one more example, one or more opacity controllable glass walls may be provided as part of the enhanced privacy configuration 54 or the team studio configuration 62 (see again FIG. 2) to visually separate those configurations from other areas in space 12*a* when visual privacy is required. Here, the drivers for the opacity controllable glass walls are actuators. Thus, based on what is occurring in space 12*a* and how different affordance configurations are being used, system server 20 may automatically control any set of the actuators in space 12*a* to adjust space attributes. Other actuators (e.g., heat generator controllers, fan controllers, light controllers, etc.) are contemplated and at least a subset are described hereafter in greater detail.

Figure 3:
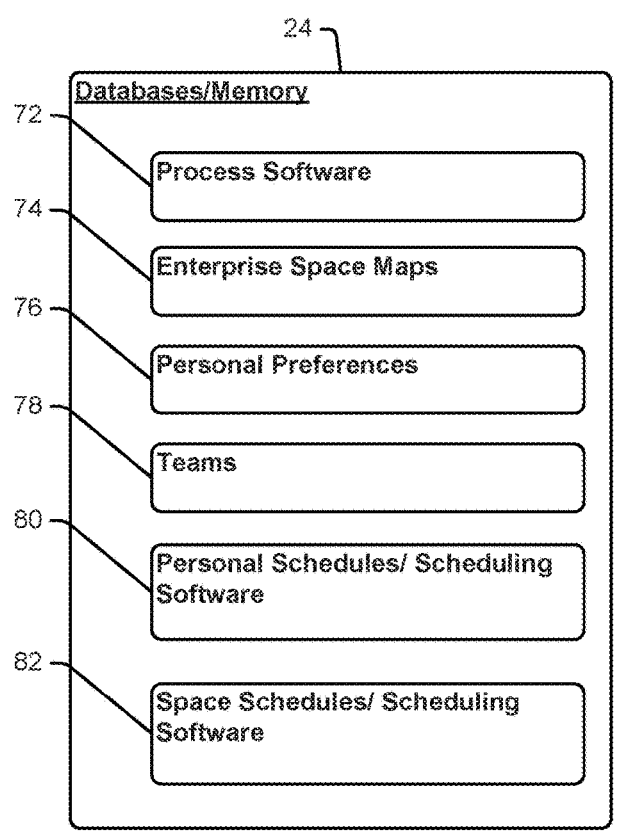
FIG. 3 is a schematic diagram of the exemplary and simplified databases shown in FIG. 1.

Referring now to FIG. 3, an exemplary simplified database 24 is illustrated that includes, among other things, process software 72, enterprise space maps 74, a personal preferences database 76, a teams database 78, a personal schedules database and scheduling software 80 and a space schedules database and scheduling software 82. Process software 72 is run by server 20 to perform various processes that are described hereafter. At a high level, software 72 has been designed to perform four basic tasks including (1) locating employees in space (e.g., "find me"), (2) understand who each employee is and employee preferences (e.g., "know me"), (3) know the resources/affordances within facility space and (4) automatically suggesting available (e.g., unscheduled and unused) resources/affordances in space to employees that are consistent with employee preferences, habits, etc., when available. To this end, at least a subset of the processes prescribed by software 72 include identifying locations and identities of employees or otherwise gaining access to that information from the location tracking system, placing employees at locations on enterprise space maps, detecting relative juxtapositions of other resources and between employees on space maps, identifying optimized spaces and resources for use by specific employees based on employee preferences, employee schedules, space affordances and scheduled affordances and resources and guiding employees about within enterprise space. In addition, the software 72 may include one or more programs that cause the system server 20 to relatively quietly encourage good behavior among employees generally located proximate each other within a facility.

Figure 5:
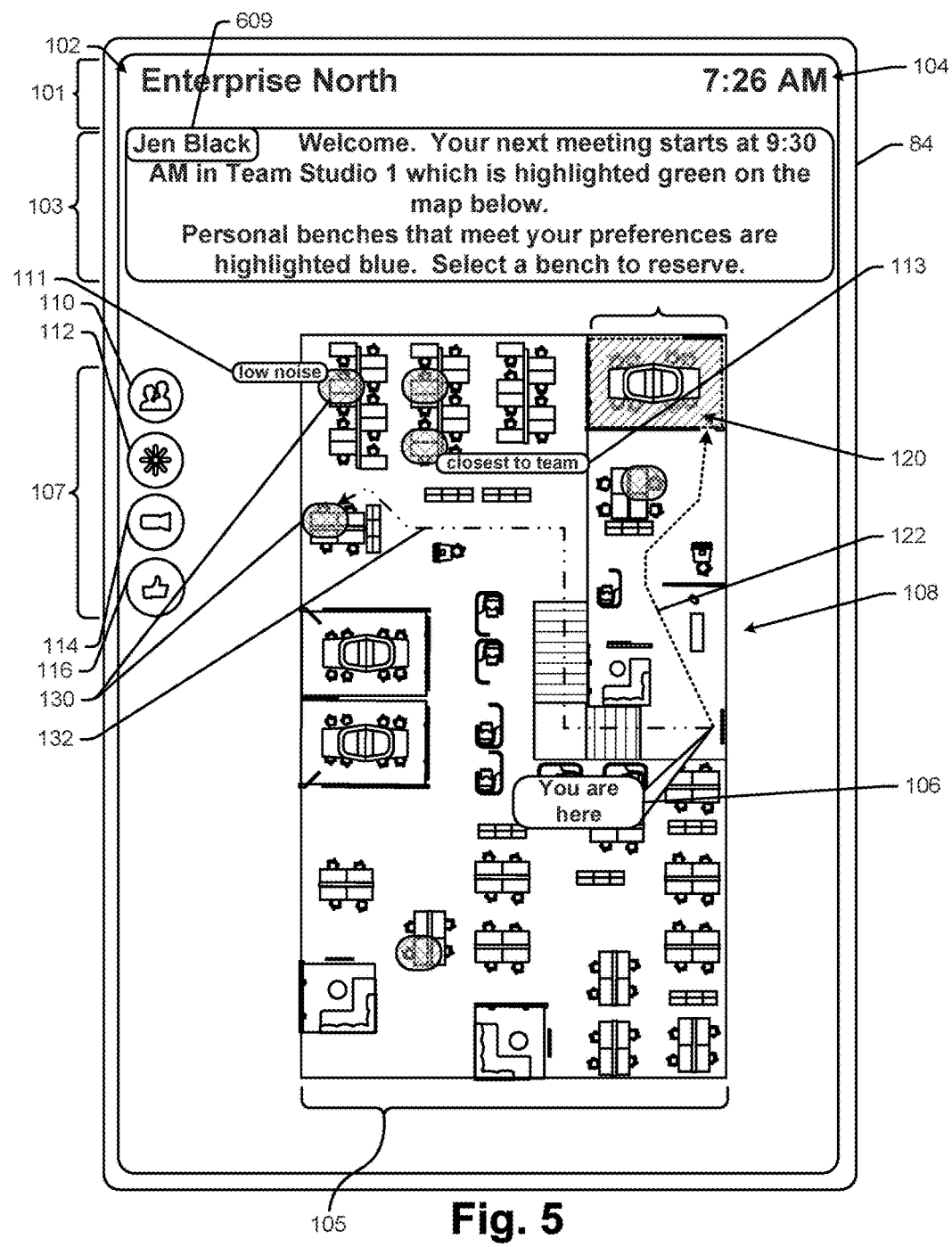
FIG. 5 is an exemplary screen shot that may be presented via a reception screen shown in FIG. 4 for providing guidance to an employee in the space of FIG. 1.

Referring still to FIG. 3, space maps 74 include virtual maps akin to the representation of space 12*a* shown in FIG. 1. Each map can be presented via a reception display screen 84 as shown in FIG. 5 at 108 with additional information applied thereto to indicate locations of other resources on the map, to suggest different resources for use by employees, to provide guidance to employees for locating different resources or resource configurations, etc. In some embodiments, map representations may also be presented on display screens that are included in other affordance configurations. For instance, see exemplary map representation 519 in FIG. 33 and exemplary map representation 1230 in FIG. 80.

Personal preferences database 76 stores a subset of personal preferences and, in some cases, habits, for each employee that has specified preferences at some earlier time (e.g., the first time the employee used an affordance configuration within the space 12*a* or within a different enterprise space) or for which habits have been learned. For instance, a first employee may prefer to use personal benches that are in quiet locations where foot traffic is minimal but where there is a lot of natural light regardless of where employees on her project team are located and regardless of the locations of other activities on her schedule while a second employee may prefer to be located proximate employees on his team regardless of all other factors. These and other preference sets may be stored in database 76. While simple preferences are described here in the interest of simplifying this explanation, it should be appreciated that far more complex preference sets are contemplated. For instance, in addition to including noise, traffic, team location and proximity to other scheduled activity preferences, preference sets in database 76 may also include air flow preferences, a preference to have close access to a telepresence system, temperature preferences, affordance preferences (e.g., a certain type of task chair), preferences related to juxtaposition with respect to a restroom, a kitchen, a café configuration, common printers used within a subspace, etc.

As another instance, the system may enable employees to specify preferences that have different levels of importance. For instance, a first employee may specify that natural light is particularly important to her and therefore that natural light is a top priority when selecting a personal bench for use. Here, secondary considerations may include a low noise level and minimal foot traffic. In this case, when identifying a personal bench to suggest to the first employee, the system server 20 may first identify any benches that have high levels of natural light and may only consider the secondary considerations if more than one available bench with a high level of natural light is identified.

In still other cases, employees may be able to specify different preferences for different days of the week or at different times of a day. For example, a first employee may prefer a relatively cool space prior to noon and a relatively warm space after lunch. In this case, if possible, the system server may suggest a personal bench that has the temperature characteristics preferred by the first employee. For instance, a personal bench that is located near a south facing window may be cool in the morning when sun light does not pass directly through the window and may be relatively warm in the afternoon when direct sun light passes through the window. This station may be ideal for the first employee in this example.

Where an employee preference cannot be met when suggesting a personal bench, the system server 20 may suggest a bench that is the best option given other employee preferences and may, if a different bench opens up that is more consistent with the employee's preferences, provide notice to the employee that the other bench opened up and encourage the employee to move to the other bench. Similarly, when the conditions associated with a specific bench unexpectedly change and that bench is no longer consistent with an employee's preferences, the system may sense the change in conditions and may identify and suggest a different bench. For example, where the sub-environment around a bench is typically quiet and that bench is assigned to a specific employee that prefers a quiet bench, if the space around the bench suddenly becomes persistently loud (e.g., a meeting in the area ends), server 20 may identify and suggest a different bench based on a low sensed noise level.

Where an employee has not previously specified preferences, preference database 76 may store a default set of preferences to be used until the employee does something to indicate preferences. For instance, default preferences may include low noise, minimal foot traffic, near a rest room, natural light, near team members, near spaces in which other activities are scheduled for a specific employee, a mid-level temperature, etc.

Regarding habits, in a case where an employee does not directly specify preferences and instead simply selects a particular bench for use by travelling through a space 12*a*, finding an available (e.g., un-owned) bench that the employee likes and taking ownership of that bench, server 20 may be programmed to automatically build a preferences list for the employee based on characteristics of the selected bench. In this case, at some future time server 20 can use the employee's habits that are reflected in the stored preferences to suggest benches in other spaces (e.g., 12*b*, 12*c*, etc.).

Data used to characterize affordance configurations and subspaces within enterprise facilities in general may be developed using sensors located within the space and/or via employee feedback. For instance, sound sensors may be integrated into each of the affordance configurations (e.g., benches, focus stations, content amplifier kiosks, etc.) or mounted nearby each of the configurations to sense the level of noise occurring at the locations associated with each of the configurations. As another instance, images from cameras in space 12*a* may be used to assess the level of foot traffic in each area of the space 12*a*. In the alternative, after using a configuration, server 20 may poll an employee for feedback related to various aspects of the space including perceived noise level, temperature fluctuation, lighting, perceived level of foot traffic, etc. The configuration characterizing data may be stored in the enterprise space maps 74 (see again FIG. 3) where a different set of configuration characterizing data is stored for each of the affordance configurations (e.g., 54, 56, 58, 60 and 62 in FIG. 2).

Teams database 78 in FIG. 3 includes a list of project teams or other sets of employees that are somehow associated with each other (e.g., sales representatives, IT specialists, etc.) and members of each team or other associated group. For instance, where seven employees work together as a team on project AA, the project AA team and all seven members would be listed in database 78. The teams in database 78 are used by server 20 to provide information on team members associated with specific employees in ways described hereafter.

Personal schedules and scheduling software 80 includes software that manages schedules of all employees and that stores data that specifies those schedules. Thus, for a first employee, the schedule database may indicate that she has first and second team meets scheduled for an 8 AM to 10 AM time slot and a noon to 2 PM time slot, respectively, and that the remainder of her day is not scheduled. The scheduling software 80 facilitates changes to the first employee's schedule including changing existing scheduled activities and adding additional activities to open time slots in her schedule. In particular, for the purposes of this disclosure, server 20 may indicate current association of the first employee with specific affordance configurations within space 12*a*. For instance, a first employee's temporary ownership of one of the personal benches may be added to the employee's schedule, a first employee's temporary ownership of one of the focus stations may be added to the employee's schedule, etc.

Space schedules and scheduling software 82 includes software that manages schedules of all facility spaces and affordance configurations and that stores data that specifies those schedules. Thus, for a team studio configuration 62 (see again FIG. 1), the schedule database 82 may indicate that first, second, third and fourth one hour team meetings are scheduled for that space at 8 AM, 10 AM, 11 AM and 3 PM, respectively and that the configuration is available for use as needed at other times during the day. The scheduling software facilitates changes to the configuration schedules including changing existing schedules and adding new scheduled activities. For instance, when a first employee takes ownership of a specific personal bench, that ownership is reflected in the space schedule for the specific bench.

Figure 4:
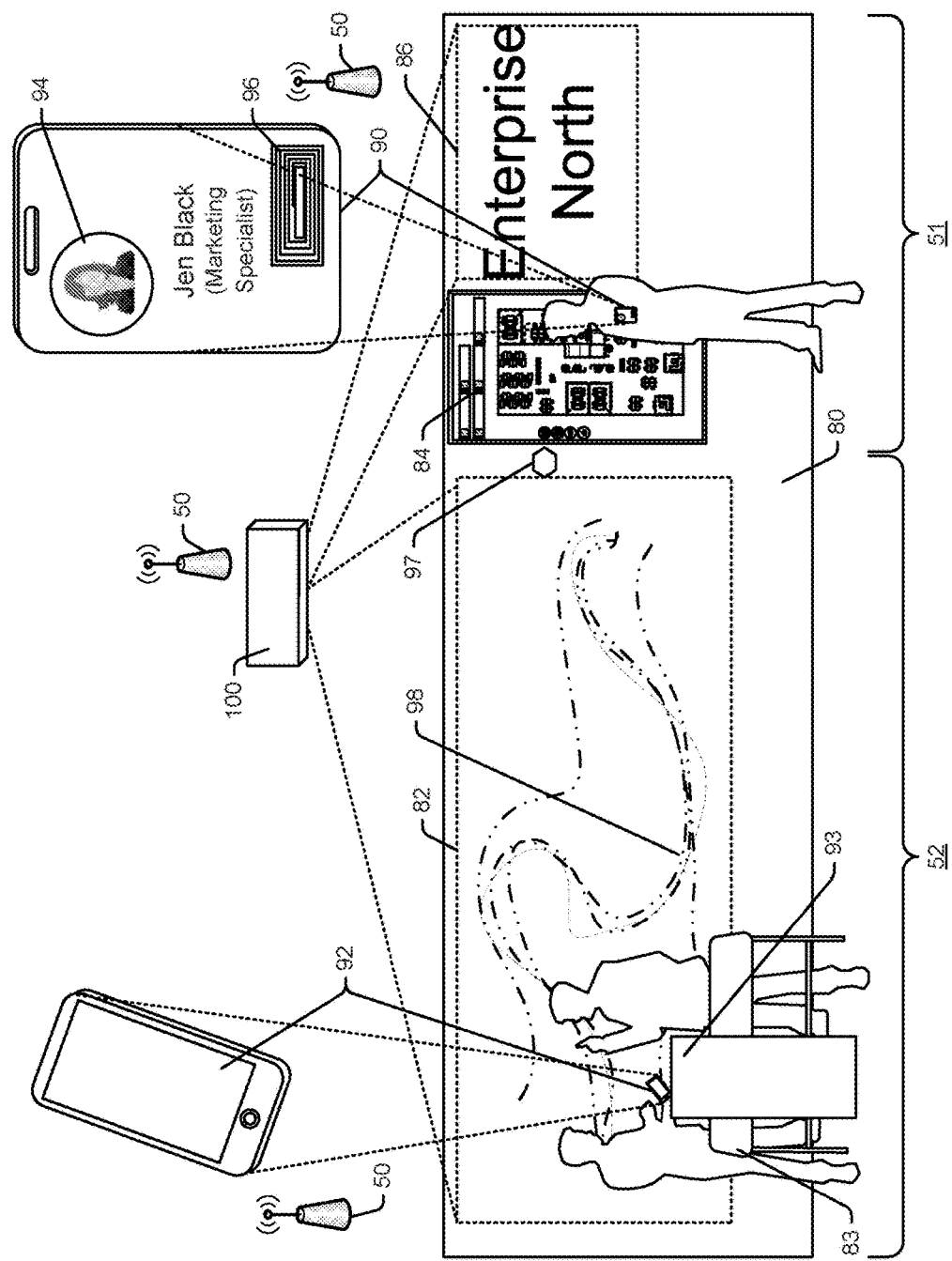
FIG. 4 is a schematic view showing an exemplary reception configuration and an exemplary café configuration from FIG. 2 that are consistent with at least some aspects of the present disclosure.

Referring now to FIG. 4, in at least some cases it is contemplated that employees in space 12*a* (see also and again FIG. 1) will use, wear or otherwise be spatially associated with some type of device that can be used to identify the employees and determine employee location. For instance, in some cases an employee will wear an identification badge 90 that includes, in addition to her image 94, name and other identifying information, an identification tag 96 that stores badge user information such as name, title, employee number, etc., where the employee information stored in the tag can be accessed by sensor devices located throughout space 12*a*. Here, for instance, tag 96 may be equipped to transmit identification data via wireless signals to access points 50 in space 12*a* where strength of signal or time of flight associated with the signals received at the access points 50 can be used to triangulate the location of badge 90 and hence the employee associated therewith in space 12*a*. In other cases, proximity sensors 97 (see FIG. 4) may sense tag 96 when the tag 96 is relatively close (e.g., within 2 feet) to the sensor and employee location can then be assumed to be proximate the sensor that reads the data from tag 96. Tag 96 may be provided as part of some other wearable item such as a ring, a bracelet, a necklace, etc.

Referring still to FIG. 4, in other instances, one or more employee's may use a smart phone or other personal computing device (e.g., a pad type device, a laptop computer, a smart watch, etc.) that can triangulate its own location from signals received from the access points in space 12*a* or from other beacons and which can then transmit identity and location information to system server 20 via the access points for use in driving system processes. In still other cases the portable devices 92 may transmit signals to access points for triangulation to identify device and hence employee locations.

In still other embodiments, sensor 97 may be any type of sensor device that can obtain information useable to identify specific employees and that employees are proximate the device 97. For instance, device 97 may be a high definition camera that can obtain images of employees that are of a high enough quality that they can be used to identify specific employees via face recognition or some other type of biometric data.

While each of the different affordance configurations and stations 51, 52, 54, 56, 58, 60 and 62 have advantageous component combinations and structures and facilitate advantageous processes and methods and each will be described hereafter in detail, there are synergies between the configurations and stations that are particularly advantageous and therefore, the configurations will be described in the context of the overall space affordance system hereafter. The advantages associated with the overall system may best be understood in the context of an example of how the system operates over the course of a day to help an exemplary employee and other employees use space resources/affordances. To this end, assume that a first employee Jen Black arrives at facility space 12*a* (see again FIG. 1) at 7:26 AM for a meeting that is to begin in about two hours at 9:30 AM in Team Studio 1 with other employees on a project team. In FIG. 5, Team Studio 1 is shown highlighted green (e.g., left up to right cross hatched) in the upper right hand corner of space 12*a* representation 108 at 120. Also assume that while Jen has not been in the facility including space 12*a* before, she has been in other enterprise facilities and has specified specific preferences regarding personal bench location and environment characteristics in general that can be used to help locate preferred benches in other spaces including space 12*a*. Specifically, assume that Jen has previously indicated that she prefers a personal bench that is located proximate team members where noise is relatively low (e.g., a quiet space) and foot traffic is minimal. Also assume that Jen has specified that she would, if possible, like to be located at a personal bench proximate spaces where she is scheduled to participate in other activities (e.g., team studios, enhanced privacy configurations, etc.). Further assume that several of Jen's team members arrived prior to Jen and already own personal benches in space 12*a*.

A. Reception and Café Configurations

Figure 6:
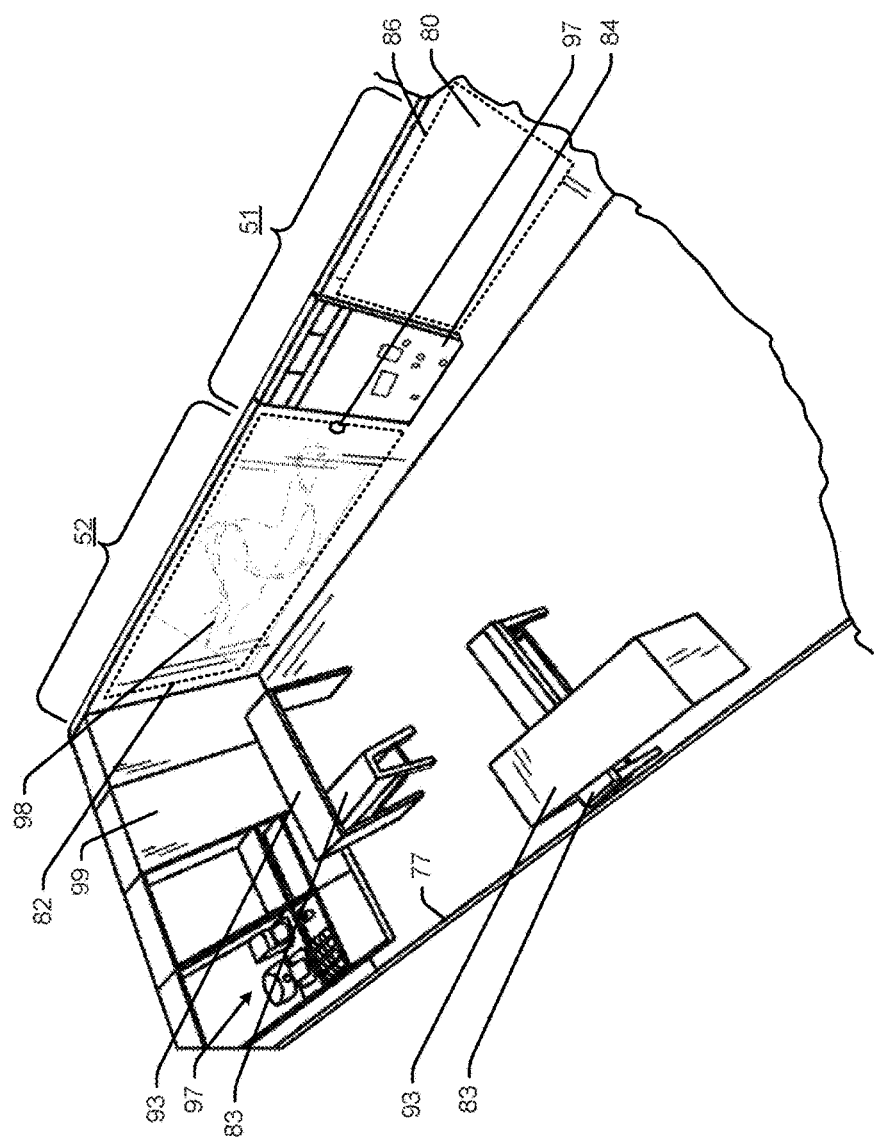
FIG. 6 is a perspective view of the reception and café configurations shown in FIG. 4.

Referring again to FIGS. 1, 2 and 4 and now also to FIG. 6, when Jen first arrives at space 70, Jen first encounters reception configuration 51 and then café configuration 52. The reception and café configurations are immediately adjacent each other and, in fact, the reception configuration opens into the café configuration in the exemplary embodiment. Nevertheless, the reception and café configurations are described as being separate here because they facilitate different activities. In other embodiments configurations 51 and 52 may be separated by walls, screen or other mechanical structure or spatial distance.

In at least some embodiments it is contemplated that synergies may result when the spaces occupied by a reception configuration and a café configuration are contiguous (e.g., the reception space opens into the café space). To this end, the reception configuration 51 is provided to physically transition an employee into a space by helping her understand space layout and resource locations, understand which employees and teammates are present in the space and their locations and the locations of personal benches temporarily owned by each, by indicating a location of a next scheduled activity for the employee and by suggesting a specific personal bench for use by the employee that is best aligned with the employee's preferences, schedule, etc. In effect, the reception configuration provides information that helps an employee physically find resources in a larger area.

In addition to making a physical transition, it has been recognized that many employees also need to make a psychological transition into a work space environment. In this regard, it is typically difficult for most employees to psychologically switch from one activity to another in short order and instead, at least a short psychological transition is often required. In prior known systems, no independent space and associated configuration was provided to facilitate the psychological transition and therefore, employees would make that transition at or proximate a hotelling space (e.g., at a personal bench of some type to be used by the employee for the day). Not only are personal benches not optimized to facilitate this type of transition, where a transition occurs at a bench, the transition often disrupts other employees that occupy adjacent personal benches or other proximate affordance configurations. For instance, where a transition occurs at a personal bench, the transitioning employee may be taking off a jacket or other garments, making small talk with other employees in the area, asking where coffee, tea, water or other refreshments can be obtained, etc.

In addition, in many cases a transitioning employee may have a different energy level than a space being transitioned to which can cause disruption in the flow of work by other employees in the space. For instance, where a transitioning first employee just left a high energy meeting ten minutes before arriving in a space where team members in the space are working on a development phase of a project and are deep in individual focused work activities, the first employee's energy may disrupt the flow of the other employees in the space. As another instance, where a transitioning first employee arrives in a high energy space with low energy and would prefer to talk about last night's football game instead of project activities, arrival can disrupt flow in a similar fashion.

The café configuration is designed to help facilitate an employee's psychological transition. Ideally both the physical and psychological transitions occur substantially simultaneously and therefore, providing both the reception and café configurations sequentially in the same general space without division is particularly advantageous. In addition, it is believed that the psychological transition does not interrupt the physical and vice versa so providing both, albeit sequentially, in the same contiguous space, minimizes costs associated with architectural structure or additional space that would otherwise be needed to separate the two areas.

Referring still to FIGS. 4 and 6, the exemplary reception/café space 51/52 includes a large content wall 80 and an oppositely facing wall 77 that, in the illustrated embodiment, are substantially parallel. In addition, a far end of the space is at least partially divided from other subspace 70 area by a wall or dividing structure 97/99 that is arranged substantially perpendicular to the front surface of content wall 80.

The reception portion of content wall 80 includes first and second information output devices or arrangements that provide content adjacent a reception space (e.g., space at 51). In at least some embodiments the first information output device includes a projector 100 mounted to a ceiling structure (not shown) to project content onto a portion of content wall 80 as shown at 86. In at least some embodiments the scale of content presented in area 86 is large and there is no need for an employee to interact with the content and therefore a projected image will often be optimal from a cost perspective. Here, the projected content includes a space identifier (e.g., a name) associated with the subspace 70 which, in the present example, is "Enterprise North".

Referring also and again to FIG. 2, in at least some embodiments walls 82, screens or other mechanical structure are provided that guide employees toward the projected content in area 86 so that as an employee walks along the guided path, the employee's gaze or visual point of view is directed right at the projected content in area 86. In at least some embodiments, area 86 has a width dimension between three feet and seven feet and a height dimension between two feet and nine feet and in particularly advantageous embodiments the width dimension is between three feet and six feet and the height dimension is between three feet and four feet.

The second information output device associated with reception area 51 in the exemplary embodiment includes an electronic welcome display screen or emissive surface 84 located immediately adjacent the projected content at 86. In at least some embodiments, screen 84 has a width dimension between two feet and four feet and a height dimension between two feet and five feet and in a particularly advantageous embodiment the width dimension is between two and one half feet and three and one half feet and the height dimension is within a range between three feet and four feet. In at least some embodiments the height dimension of screen 84 is similar to the height dimension of area 86. Screen 84 may be any type of display screen but a high definition screen is particularly advantageous so that detailed information in a relatively small format can be displayed at times. In at least some embodiments screen 84 is touch sensitive or at least a portion of screen 84 is touch sensitive so that the screen 84 can operate as an input device to receive input and be controlled by an employee to present various types of information.

Referring still to FIGS. 4 and 6, the content projected in area 86 is presented in a relatively large format so that the content can be read from a relatively long distance away from area 86. For instance, each letter presented in area 86 may have a height dimension anywhere between four inches and twenty inches and in particularly advantageous embodiments may have a height between 10 and 14 inches. In contrast, the content presented on screen 84 is smaller in size where, for instance, most text letters presented have a height dimension within a range between one quarter inch and two inches. Here, some content on screen 84 may be larger but in general content is presented in a smaller format than the content presented in space 86 so that employees need to be closer to screen 84 than to space 86 to easily comprehend most of the presented content. In addition to drawing an employee in for a good view of presented content, the smaller content on screen 84 makes it at least somewhat difficult for other employees in the general area to see the content presented to a proximate employee on screen 84 and therefore the smaller content feels at least somewhat private.

In some cases and indeed in the present example, an employee may interact at least somewhat with content presented on screen 84. Nevertheless, it is intended that the amount of interaction with content on screen 84 be limited in particularly advantageous embodiments so that the limited functions associated with screen 84 can be accomplished quickly and employees can be moved on to the café space rapidly without "camping out" at screen 84 for more than a short time. Thus, for instance, while detailed content (e.g., white papers authored by, long biographies, etc.) about employees already in the subspace 70 or personal documents of an employee transitioning into subspace 70 could be presented via screen 84, in particularly advantageous embodiments that detail of information will not be accessible via screen 84 so that employees move through space 51 relatively quickly. Here, screen 84 is intended to welcome and orient employees and not as a general content output device.

Referring to FIG. 5, exemplary screen 84 includes four general areas including a high level orientation area 101, a detailed content area 103, a map area 105 and an interface tool area 107. High level orientation area 101 presents general information to orient an employee with respect to location and time and, for instance, may present a name associated with subspace 70 (e.g., Enterprise North) and the current time of day (e.g., 7:26 AM). Other general content types (e.g., weather report, etc.) are contemplated.

Content area 103 presents various types of information and may present different information types at different times depending on how an employee interacts with content presented in spaces 105 and 107. One type of information always presented on screen 84 when an employee is within a threshold distance of screen 84 is a clear indicator of which employee the content on screen 84 is intended for. To this end, see the intended content recipient tag at 69 which is consistently presented in other figures showing screen 84 that follow. In addition to her name, in at least some embodiments, an image or avatar associated with Jen Black may also be presented as part of tag 69 or otherwise independently in area 103. Identity tag 69 is important to make sure that an employee viewing screen 84 know if the content presented is for that employee or for some other employee.

In at least some embodiments screen 84 will only present content for one employee at a time regardless of how many employees are located adjacent screen 84. Here, in at least some cases, content will be presented to a first arriving employee of a group of employees proximate screen 84 and content for that employee will persist until that employee moves away from (e.g., outside some threshold distance like 5-10 feet) screen 84 with another employee located within that threshold.

Although not shown, in other cases it is contemplated that screen 84 may be dividable into two or more subspaces where content can be presented simultaneously to two or more arriving employees. Here, it is advantageous if screen 84 has larger dimensions than described above so that each arriving employee can be presented with all of the information described hereinafter, customized to their preferences and circumstances.

Referring again to FIG. 6, in some embodiments, high definition screen 84 may extend laterally and cover area 86 so that the content described above as being presented in area 86 may be presented via screen 84. In this case, when two employees arrive in space 51 at generally the same time and each wants to use the welcome or reception display, a portion of the screen covering area 86 may temporarily present a second set of welcoming tools (e.g., a full set of the content shown in FIG. 6) to the second employee. In the alternative, screen 84 in FIG. 6 may extend to the left and cover at least a portion if not all of area 82 so that a second set of welcoming tools can be temporarily provided when needed to the left of screen 84. In still other cases the entire wall surface or substantially the entire wall surface 80 may be provided via a single emissive surface where any of a space identifier, one or more welcome tool sets and an abstract image (see 98) can be presented at any time and in a field located at any location on the emissive surface.

Referring again to FIG. 5, exemplary content in area 103 includes the identity tag 69 and a salutation to greet a newly arriving employee. The exemplary salutation in FIG. 5 is "Welcome". In addition, field 103 presents information related to Jen Black's schedule by indicating that "Your next meeting starts at 9:30 AM in Team Studio 1 which is highlighted green on the map below." Map area 107 includes a map 108 of the space 12a and highlights Team Studio 1 green as indicated by the left up to right cross hatching at 120. In addition, space 103 presents information related to personal benches in space 12a that Jen Black may want to use during the day by presenting the message "Personal benches that meet your preferences are highlighted blue." Map area 107 includes blue highlighting as indicated by the double diagonal cross hatching at 130. In FIG. 5, several options for personal benches are highlighted blue, a subset of which are labeled 130. Thus, in the illustrated example, the information in area 103 welcomes an arriving employee, indicates a next meeting time and location and suggests personal benches to be owned by the employee for the day.

The benches suggested and highlighted on map representation 108 are based on several suggestion factors as described above including personal preferences that may include but are not limited to noise level, foot traffic level, air circulation, juxtaposition with respect to natural light, location with respect to restrooms, location with respect to a coffee station or other resources, etc., available and unscheduled space, juxtaposition with respect to other spaces in which the employee is scheduled to attend meetings during the day, juxtaposition with respect to team members or other employees, etc. One other factor that may be used by server 20 to identify benches to suggest to a specific employee is how long the employee will be in the subspace 70 or general space 12a. For instance, where an employee will only be located in space 12a for an hour, server 20 may be programmed to suggest benches where other employees are scheduled for short stays to minimize disruption to employees scheduled to own benches for longer periods.

At least some characteristics associated with personal benches may be based on historical conditions in a space 12a while other characteristics may be determined instantaneously and in real time. For instance, locations of team members in space 12a that are associated with a specific project would be determined real time while noise level or the amount of foot traffic near a personal bench may be determined either in real time or based on past measured or reported conditions. For example, in the case of real time noise level, it is contemplated that microphones (e.g., one type of sensor) may be positioned throughout space 12a that can be used to identify noise levels in real time and report those levels to a system server for processing. In this case, if a specific bench is in a loud subarea of space 12a at a specific time, the noise characteristic for that subarea would be loud for that time. In the alternative, where a bench is in an area where the noise level is generally low based on prior sensed data, even if the area is instantaneously noisy, the noise characteristic may still be quiet given the historical noise level in the space. Similarly, foot traffic, natural light, air flow, etc., characteristics associated with each bench may be determined either real time or based on historical data.

While several suggested benches are indicated in FIG. 5, in other embodiments it is contemplated that only one seemingly optimal bench, based on user preferences and other suggestion factors, may be highlighted to suggest use to a specific employee. In other cases where several benches that meet or are close to meeting an employee's preferences are highlighted, one of those benches may be specially highlighted or otherwise visually distinguished to indicate a particular bench that is most consistent with the employee's preferences. For instance, in some cases where suggested benches are highlighted blue, an optimal suggested bench may be highlighted a brighter blue than others. In still other embodiments, where a small subset of the suggested benches are optimal for different reasons, one of the suggestion factors that is most interesting may be indicated along with each associated bench. For instance, see in FIG. 5 that a "low noise" tag 111 is spatially associated with one of the suggested benches while a "closest to team" tag 113 is spatially associated with another of the suggested benches.

Referring still to FIG. 5, map representation 108 includes a 2D top plan view of space 12a in the illustrated example. While representation 108 includes all of space 12a, in other embodiments representation 108 may include only a portion of space 12a such as subspace 70 associated with the specific location of an employee located proximate screen 84.

In addition to presenting a representation of an associated space and highlighting various space affordances or subareas to indicate next meeting location and suggested personal benches, representation 108 may also include an indication of where screen 84 and hence the employee viewing screen 84 are located (see 106) and paths to different spaces highlighted on the representation 108. For instance, one path 122 may indicate how to get to the location of the employee's next scheduled meeting while a different path 132 may indicate how to get to a personal bench that is suggested for the specific employee or that the employee has taken temporary ownership of.

In some cases, a system server 20 may be programmed to only present paths or highlights that are temporally relevant. For instance, in the case of representation 108 in FIG. 5, Team Studio 1 highlighting at 120 may not be presented unless that meeting is scheduled to occur within a short time period of an employee arriving at screen 84. For instance, in the present example highlighting 120 and the related next meeting information in space 103 may not be presented unless that meeting is to take place in the next 30 minutes. Here, in the FIG. 5 example, because the next meeting does not occur for more than 2 hours, highlighting 120 and the related message in space 103 would not be presented. By only presenting temporally relevant information, the employee is only focused on schedule information required at the current time and can move through the reception space more rapidly so that other arriving employees can use screen 84 to transition into an associated space.

Although not shown in FIG. 5, the subspace 70 (see again FIG. 2) in which the employee is located may also be highlighted differently to indicate to the employee how the subspace is related to the larger overall space 12a. For instance, the subspace 70 may be highlighted yellow to distinguish that space from other are in space 12a.

Figure 10:
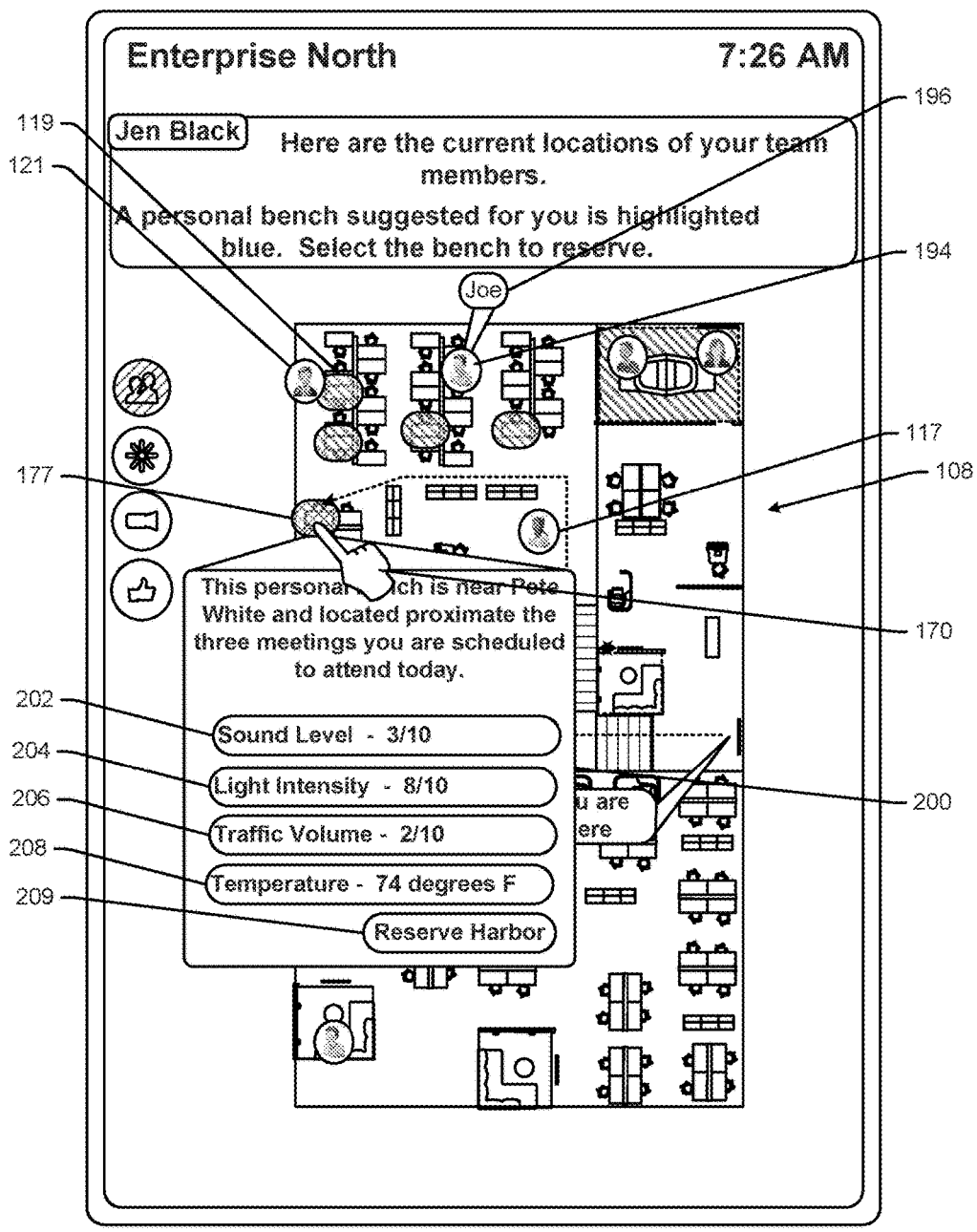
FIG. 10 is similar to FIG. 5, albeit showing the reception screen presenting another information set.

In other cases, additional useful information may be presented on map representation 108 automatically when a specific employee arrives at screen 84. For instance, see in FIG. 7 that "TM" tags are associated with different personal benches in representation 108. Here, each "TM" tag indicates a bench that is currently owned by a team member on a team that is associated with the employee that is viewing screen 84. Thus, the employee viewing screen 84 can obtain a good sense of where team members are with respect to space 12a in general and, more specifically, with respect to one or more benches being suggested to the employee for use. While labeled "TM", the team member bench tags may take other forms such as, for instance, information that specifically identifies each team member such as names (see 196 in FIG. 10), initials, small images (see 194 in FIG. 10), etc.

As another instance, in addition to or instead of indicating the locations of personal benches temporarily owned by team members, representation 108 may indicate current locations of team members via a TM tag or some member identity indicator. For instance, in FIG. 10 left down to right cross hatched highlighting at 119 (only one labeled while several are shown) that indicates red highlighting may identify benches with team members while image icons (e.g., 121 and 117) indicate current locations of team members. See specifically that the team member indicator 117 is shown spaced from any bench in representation 108 and therefore, the team member associated with icon 117 is likely not located at one of the benches.

In addition, while not shown, it is contemplated that locations of all employees in space 12a and/or bench ownership status in space 12a may be indicated in representation 108 with or without specific identifying information, so that the arriving employee has a complete sense of who is located in space 12a as well as the locations of owned benches. Here, where all employees including team members are represented, team members may be represented differently such as, for instance, being differently highlighted, by including additional identifying information, etc. In addition, while all owned benches may be indicated, those owned by team members may be differently visually distinguished (e.g., different shading or highlighting, including team member identifying tags, etc.).

As yet another instance, a system server 20 may be able to identify other resources, in addition to a space related to a next meeting for an employee, that the employee may want to use in the near future (e.g., in the next 30 minutes). For instance, where an arriving employee is scheduled to participate in a teleconference session with another remote employee 15 minutes after arriving at screen 84, server 20 may recognize that a telepresence system is required and may automatically indicate locations of telepresence systems that are available (e.g., not currently scheduled for use) throughout space 12*a* or in a smaller subspace (e.g., 70) associated with the current location of the employee. To this end, see for instance FIG. 13 that shows several highlighted benches (e.g., 262) and other spaces and associated camera icons (collectively identified by numeral 260) that may be automatically shown when an employee that requires a telepresence system in the near future arrives in front of screen 84.

Although not shown, other resources that may be required in the near future by an arriving employee based on the employee's schedule may be automatically indicated to the arriving employee. For instance, Steelcase manufactures and sells MediaScape systems that allow employees to share content on one or more large common display screens within a space in an egalitarian fashion. U.S. patent application Ser. No. 14/053,213 which was filed on Oct. 14, 2013 and is titled "Egalitarian Control Apparatus And Method For Sharing Information In A Collaborative Workspace" describes several versions of the MediaScape system and is incorporated herein in its entirety by reference. Where an arriving employee's schedule indicates that the employee is going to participate in a collaborative conference in the next 30 minutes, the system server may indicate unscheduled MediaScape configurations in the area that can be reserved or used by the arriving employee if desired.

As another instance, where an arriving employee is scheduled to have a meeting with two other employees in ten minutes and all three employees are located in space 12*a* and where no meeting space has been reserved for the meeting, server 20 may be programmed to automatically identify available affordance configurations suitable for three employees and that meet employee preferences in space 12*a* and may suggest one or more of those configurations to the arriving employee.

In any case where any resource (e.g., a configuration including a telepresence system, a three person conference configuration, etc.) is suggested or indicated to an employee, it is contemplated that the employee may take temporary ownership of the resource via screen 84. For example, see again FIG. 13 where telepresence icons 260 are indicated. In this case, selection of a highlighted affordance configuration 262 associated with one of the icons 260 may open up a space scheduling window and enable the employee to reserve the affordance for immediate use or use at some other time during the day (e.g., for a subsequent telepresence session. If an employee reserves an affordance configuration 262 for a specific telepresence session (e.g., one to occur in the next 10 minutes) server 20 may automatically identify a second telepresence system that is scheduled to be used by a second remote employee to participate in the session and may boot up and create a link between the two systems automatically prior to the scheduled session. Similarly, if an employee reserves an affordance configuration for a meeting with two other local employees, server 20 may automatically add the configuration information to the other employee's schedules and/or send messages (e.g., e-mails, text, voice, etc.) to those employees indicating the configuration and configuration location for the meeting.

In at least some cases it is contemplated that the system server 20 may only automatically suggest personal benches to a subset of employees arriving at screen 84 based on scheduled activities for the employee. For instance, where an arriving employee's schedule indicates that the arriving employee will be leaving the subspace associated with screen 84 in less than 10 minutes to travel to a different and remote location (e.g., to hop on a plane), the server may simply greet the employee without automatically suggesting a personal bench for use. Similarly, if an employee has historically never taken ownership of a suggested bench, that preference may be stored in database 76 and used to decide not to present bench options to the specific employee.

In many cases, as indicated above, screens 84 may be located at many different locations within the large space 12*a*. Here, based on where an employee is scheduled to be and where the employee is currently located, the screens 84 at different locations may present different information. For instance when an employee enters space 12*a* and arrives at a first screen 84, in some cases the first screen 84 may automatically present personal bench options and other information as described above to help the employee select an optimized personal bench. If the arriving employee takes ownership of one of the suggested benches via the first encountered screen 84, the subsequent screens 84 encountered may simply operate as part of a guidance system for the employee further instructing or guiding the employee to the owned bench. Thus, the second and later encountered screens 84 would not automatically continue to offer benches to the employee once a bench has been selected.

In an alternative system, where an employee's team and/or the meeting spaces that the employee is scheduled to use are located remotely from the first screen 84 encountered by an arriving employee, the first screen may simply greet the arriving employee and indicate a general subspace proximate team members and/or resources to be used by the employee to which the employee should travel and may also indicate a path to the general subarea or resources for the employee to follow. Then, when the employee arrives at the subspace proximate team members and/or resources (e.g., meeting space) to be used by the employee, a reception screen 84 proximate or spatially associated with that space may present more detailed information including suggesting personal benches for the employee to temporarily own.

The idea of having different reception screens perform different processes based on employee schedules, affordance configuration locations and preferences is particularly useful in the context of large spaces like, for instance, an enterprise campus that includes several buildings where each building includes several floors. Here, for instance, reception screens 84 at campus entrances may provide guidance instructions to specific employees to guide those employees to specific floors in specific buildings and then other screens 84 on each building floor may suggest specific affordance configurations to employees as they arrive.

Referring again to FIG. 10, selection of highlighted bench icon 177 opens a window 200 designed to facilitate bench selection. Window 200 in FIG. 10 includes general textual information about the selected suggested bench and specific environmental characteristics associated with the suggested bench. To this end, the general information in window 200 indicates that the bench is near Pete White (a team member) and also near spaces in which the employee is scheduled to attend three meetings. The environmental information includes a sound level field 202, a light intensity field 204, a traffic volume field 206 and a temperature field 208. Fields 202, 204 and 206 indicate relative sound, light and traffic levels, respectively, on a scale of 1 to 10 so that a viewing employee can get a sense of those attributes for the selected bench. Field 208 simply indicates temperature at the bench in degrees Fahrenheit. Window 200 also includes a "Reserve Bench" icon 209 that is selectable to reserve an associated bench. An employee can simple touch an area outside window 200 to close the window if the employee does not want to take ownership of the bench for some reason.

Figure 11:
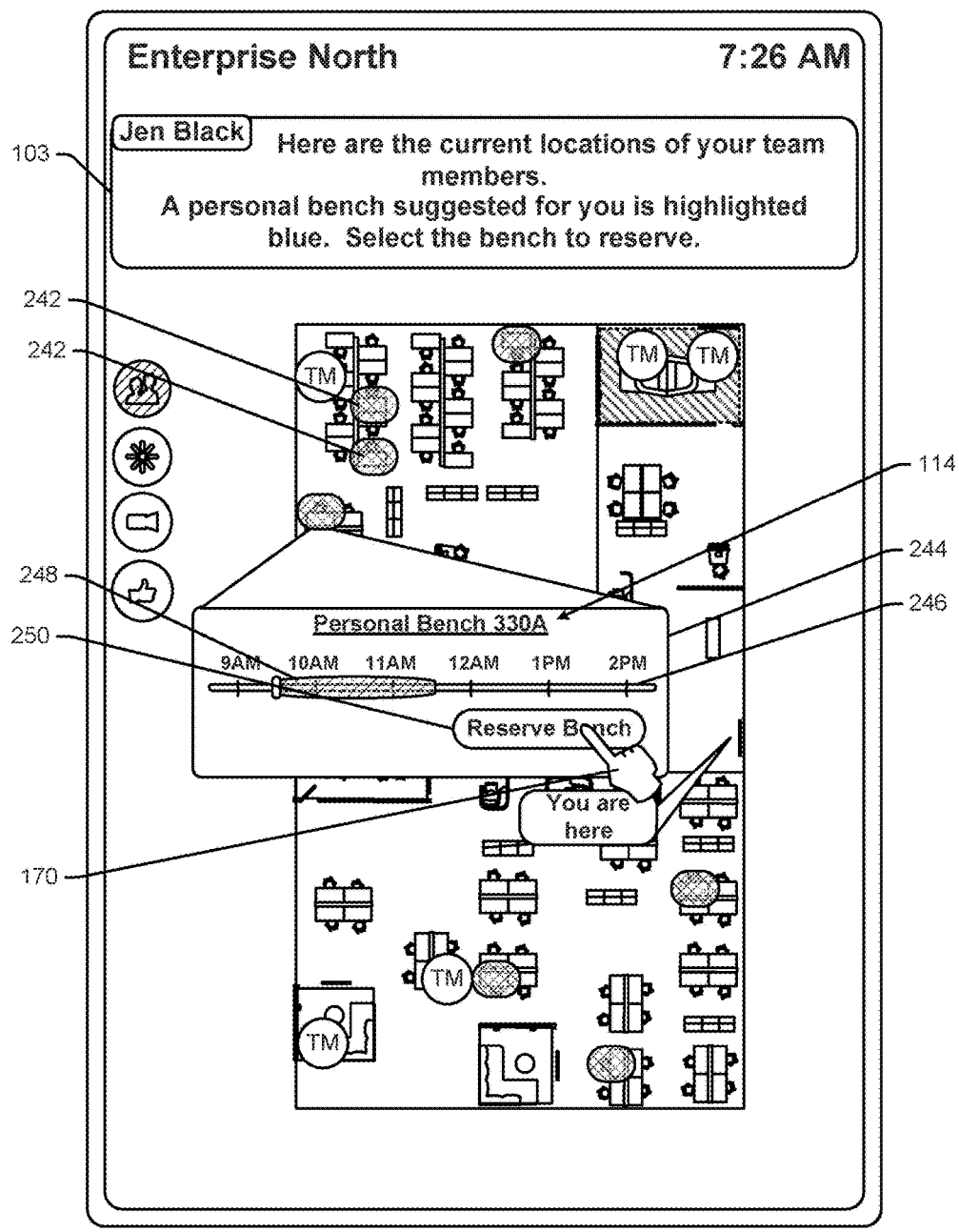
FIG. 11 is similar to FIG. 5, albeit showing the reception screen presenting another information set.

When Reserve Bench icon 209 is selected, another window 244 as shown in FIG. 11 may be opened so that the employee can select a period over which the bench should be reserved for use by the employee. In FIG. 11 the window 244 includes, among other things, a time line 246, a slot indicator 248 on line 246 indicating a time slot to reserve and a Reserve Bench icon 250 for reserving an associated bench. Here, the length of slot indicator 248 can be changed by selecting an end thereof and dragging along the length of line 244 until a desired time slot is indicated.

In other cases, referring again to FIG. 10, when an employee selects the reserve bench icon 209, the server will simply reserve the associated bench for use by the employee for the remainder of the day. In still other cases, while the server will reserve the space for the remainder of the day, the server may automatically, based on location or other information related to the employee, free up the reserved bench. For instance, where the server reserves a specific bench for Jen Black in space 12*a*, if Jen Black uses the reserved bench for three hours until 10:30 and then leaves space 12*a* and Jen's schedule indicates that Jen is travelling to San Francisco at 10:30, the server may free up the station automatically for use by another employee.

In at least some embodiments, content presented in representation 108 may only initially be limited to certain types of content and more detailed content may be accessible via employee request. To this end, for instance, in some cases as shown in FIG. 5, representation 108 may only indicate a next meeting location and one or more suggested personal benches for use by an arriving employee along with tools 110, 112 and 114 in area 107. Here, tools 110, 112 and 114 may be selected by an employee via touch to access additional information via representation 108. The tools 110, 112 and 114 shown in FIG. 5 include a team member tool, a personal bench tool and a telepresence tool, respectively.

Figure 7:
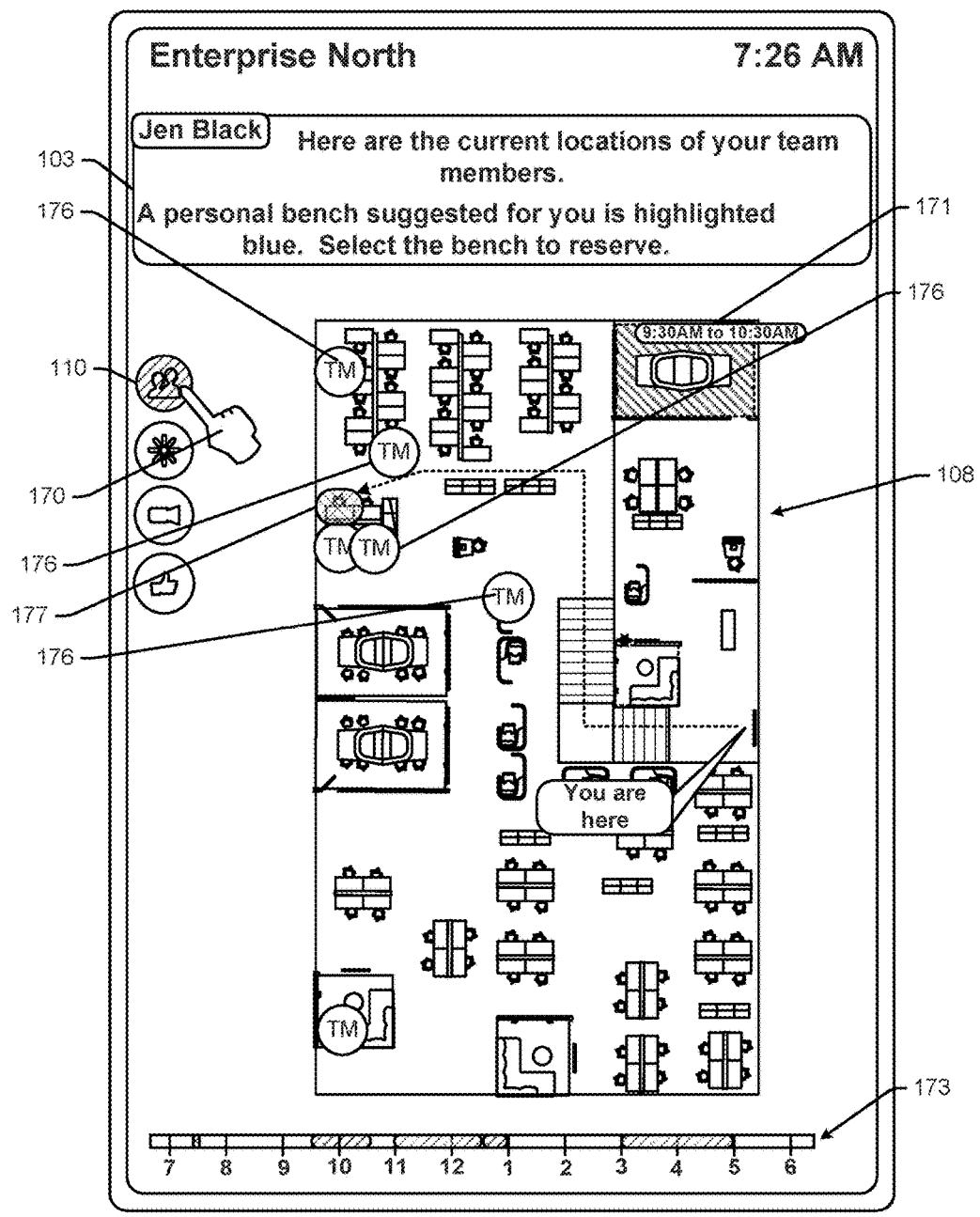
FIG. 7 is similar to FIG. 5, albeit showing a different screen shot of the reception screen.

Referring to FIG. 7, a pointer icon is shown at 170. Icon 170 may be presented via screen 84 to invite an employee to touch the screen and interact therewith. In the alternative, icon 170 may simply represent an employee's hand which can be used to select different virtual icons or the like presented on screen 84. Hereinafter, unless indicated otherwise, it will be assumed that icon 170 is presented on the screen 84 and that the icon will automatically move to any point on screen 84 that is touched by an employee interacting with the screen 84.

In FIG. 7, pointer icon 170 is shown selecting team icon 110 which, when selected, is highlighted green. When icon 110 is selected, the team member tags 176 are presented on representation 108 to indicate current locations of team members. Again, instead of being generic, the tags 176 may each including employee identifying information like an image, a name, initials, an associated avatar, or some combination thereof. Instead of presenting team member locations, the locations of personal benches associated with team members may be indicated either generically (e.g., via highlighting) or via identifying information for the team members temporarily owning specific benches. In still other embodiments, both team member locations and the locations of personal benches owned by each team member may be indicated either generically or with team member specific identifying information. Space 103 explains what is presented on representation 108.

Figure 9:
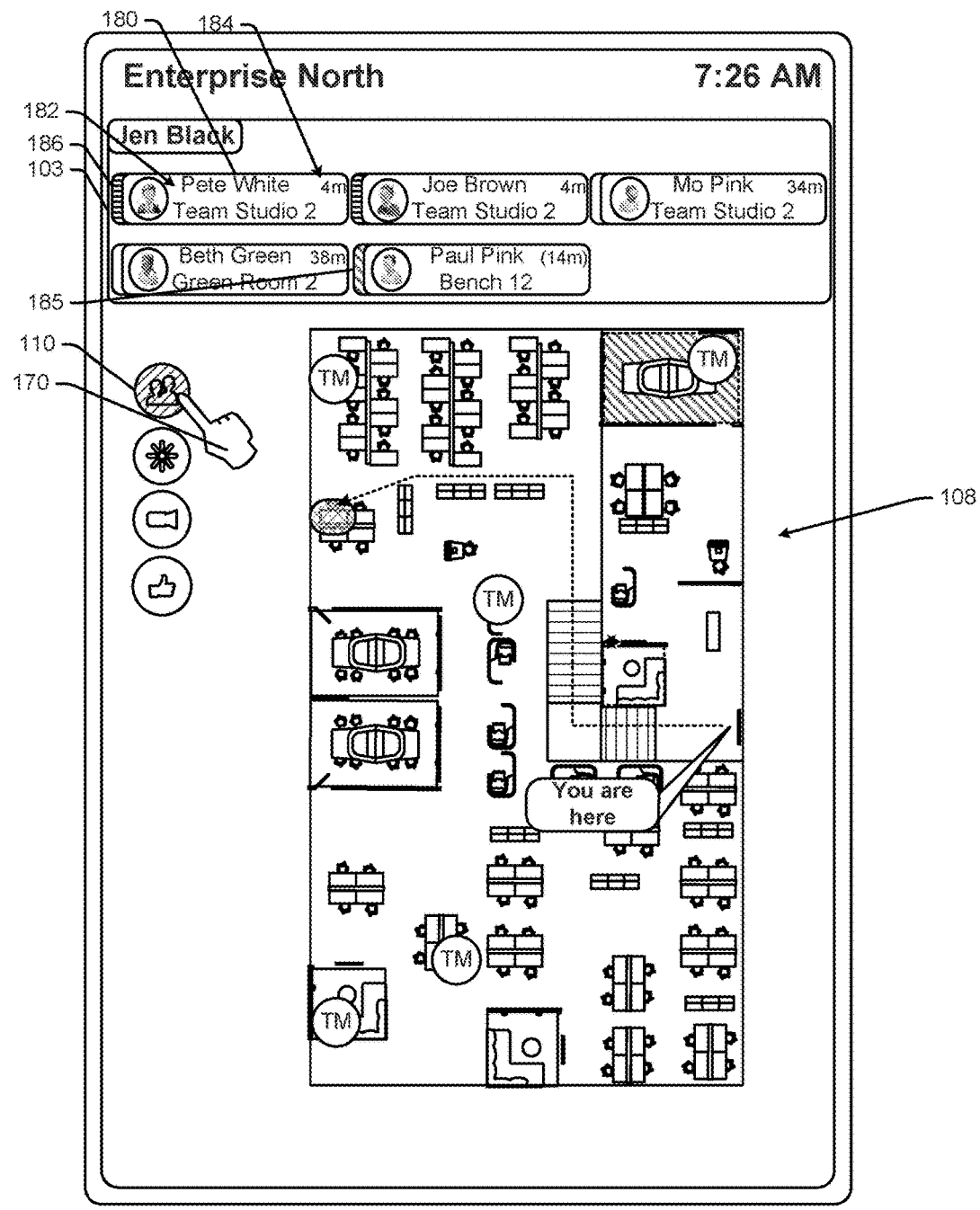
FIG. 9 is similar to FIG. 5, albeit showing the reception screen presenting a different set of information.

Referring now to FIG. 9, an alternative view of information that may be presented when team icon 110 is selected or automatically upon arrival of Jen Black is shown. In FIG. 9, team member specific information is presented in space 103 while team member locations are also shown on representation 108. The member specific information in space 103 includes, for each team member represented in representation 108, a small image, name, current location and a time based schedule indicator that indicates when the current status of an associated team member is scheduled to change. For instance, see field 180 corresponding to employee Pete White that includes an image of Pete White, the name Pete White and an indication of where Pete White is currently located 182. In addition, a time based schedule indicator 184 indicates that Pete White's current status, in a meeting in Team Studio 2, is scheduled to change in 4 minutes. Field 180 may be visually distinguished in some fashion so that the time based schedule information can be discerned in a glanceable fashion (e.g., with a simple glance at the field). For instance, in FIG. 9, the left edge portion 186 (e.g., a glanceable indicator) of field 180 is horizontally hatched to indicate the color yellow which, in the present example, may indicate that the employee associated with field 180 is going to change status (e.g., leave the current meeting) in the next 5 minutes.

Referring still to FIG. 9, similarly, fields like field 180 are provided for four other team members located within space 12*a* and each presents information similar to the information presented in field 180. As shown, each of the glanceable indicators may be highlighted differently as a function of when the status of an associated employee is expected to change. For instance, an indicator 185 is highlighted differently (e.g. red as indicated by the left down to right hatching) than indicator 186 to indicate that employee Paul Pink is 14 minutes late for a meeting in space 12*a*. As shown, the "14 m" indicator is also shown in round brackets to indicate a late status which is useful to distinguish statuses for people who are color blind where indicators 186, 185, etc., are color coded. Other statuses may be indicated via the status indicators 186, 185, etc., including busy, free, out to lunch, etc.

Figure 12:
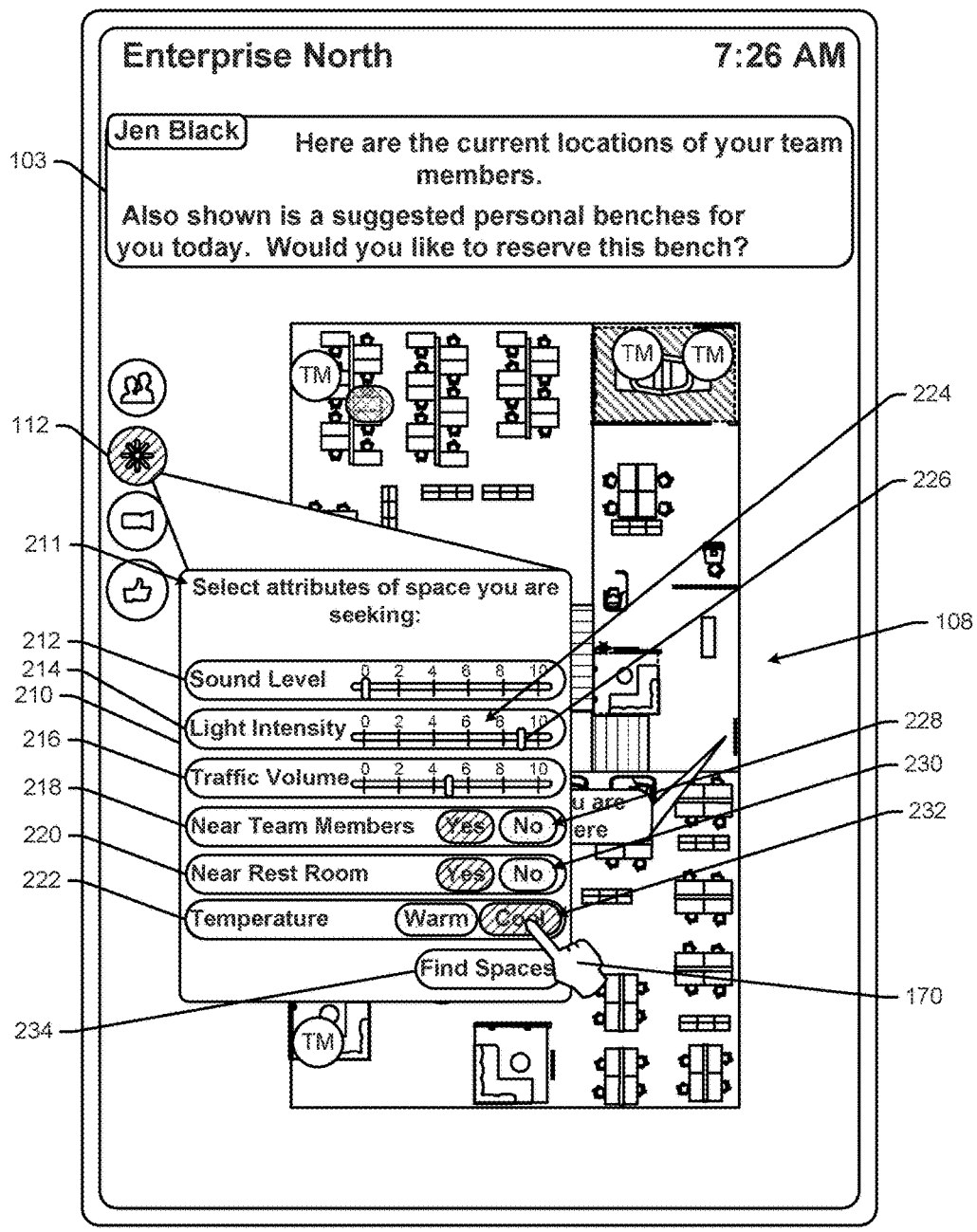
FIG. 12 is similar to FIG. 5, albeit showing the reception screen presenting another information set.

Referring to FIG. 12, when personal bench tool 112 is selected, a preferences window 210 is opened in the illustrated example which allows an employee to specify instantaneous preferences for a personal bench. Here, even where an employee's general preferences have already been stored in database 76 (see again FIG. 3) and may have already been used to suggest one or more personal benches via a representation 108, an employee may want a different set of preferences to be used to identify a bench for temporary ownership at a current time. For instance, a first employee that generally prefers a bench near a high level of foot traffic may, on a specific day, want a bench that is in a low foot traffic area. Window 210 can be used to specify different bench characteristics.

Referring still to FIG. 12, window 210 includes general instructions at 211 for selecting bench attributes and attribute fields including a sound level field 212, a light intensity field 214, a traffic volume field 216, a "near team members" field 218, a "near restroom" field 220 and a temperature field 222. Each field 212 through 222 provides tools for setting parameter preferences. For instance, the light intensity field 214 includes a 0 through 10 sliding scale 224 where an employee can move a selection icon 226 about the scale 224 to select different values. Fields 212 and 216 include similar sliding scales 224. Fields 218 and 220 are for indicating desire to be near team members and near a restroom, respectively, and each includes Yes and No icons 228, 230 for selecting preference options. Temperature field 222 includes "warm" and "cool" icons 232 for selecting temperature generally. Window 210 also includes a "find bench" icon 234 selectable to submit the preferences chosen by an employee to the system server 20 for identifying benches that meet or come close to meeting an employee's preference set.

As indicated above, if an employee has yet to specify personal preferences for a personal bench, at least initially, in at least some embodiments, server 20 may use default preferences to identify one or more benches to suggest to a specific employee. Once an employee uses one of screens 84 once to specify personal preferences, those preferences may be automatically stored by server 20 in database 76 for future use in any enterprise space (e.g., in any space 12a, 12b, etc., associated with the enterprise). If, after specifying preferences, an employee subsequently specifies a different set of preferences via selection of icon 112, in at least some embodiments those new preferences may be automatically used to update the employee's preferences for future use in all enterprise spaces. In other cases, there may be a hysteresis type process where preferences are not immediately changed and, instead, an employee may need to specify a new preference two or a small subset of times for server 20 to store a new preference setting.

Figure 13:
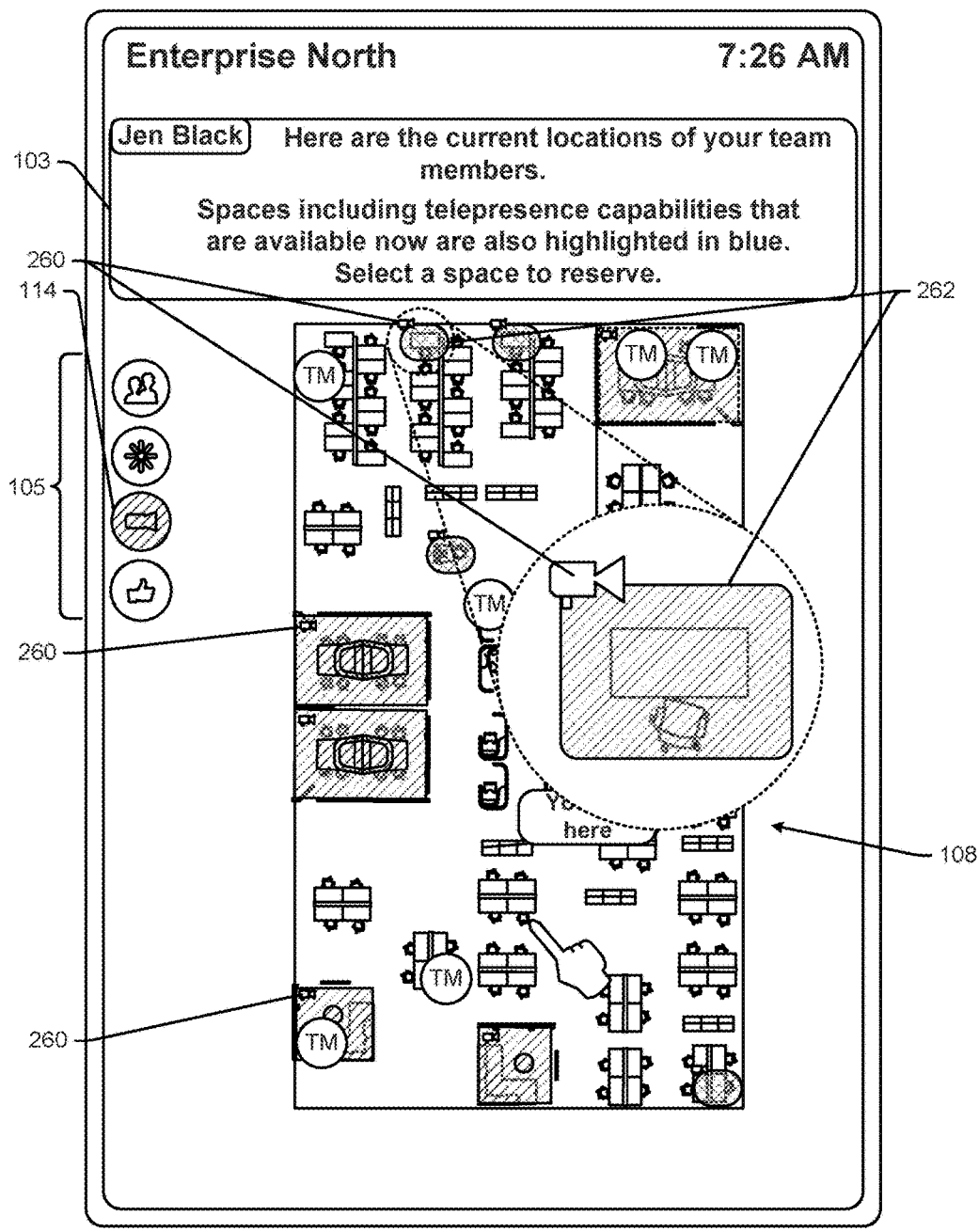
FIG. 13 is similar to FIG. 5, albeit showing the reception screen presenting another information set.

Referring to FIG. 13, icon 114 can be selected by an employee to identify affordance configurations within the associated space 12a that have equipment to facilitate telepresence session. In FIG. 13, when icon 114 is selected as indicted by cross hatching, any affordance configuration having telepresence equipment that is not currently being used or scheduled to be used in the near future may be highlighted green (see exemplary highlighting 262) or some other color and a camera icon (see icons 260) may be presented with each highlighted space or configuration. Instructions in section 103 may indicate that one of the telepresence afforded spaces can be selected to be reserved. If a highlighted space is selected, although not shown, a space selection window may open up on screen 84 that includes tools akin to the tools shown in FIG. 11 for selecting a telepresence afforded configuration for use.

Other resource revealing tools may be provided in screen section 105 where special resources can be reserved or at least their locations can be presented. For instance, again, where MediaScape type configurations are provided in a space 12a, a MediaScape revealing tool may be provided in section 105 that can be selected to obtain information on available MediaScape type configurations. As another instance, there may be an enhanced privacy configuration tool icon in section 107 or even several enhanced privacy configuration icons, one icon for each of several (e.g., 3) different enhanced privacy configuration sizes, that can be selected to see available enhanced privacy configurations highlighted on representation 108. Here, scheduling windows may be openable by selecting highlighted spaces or affordance configurations.

Figure 14:
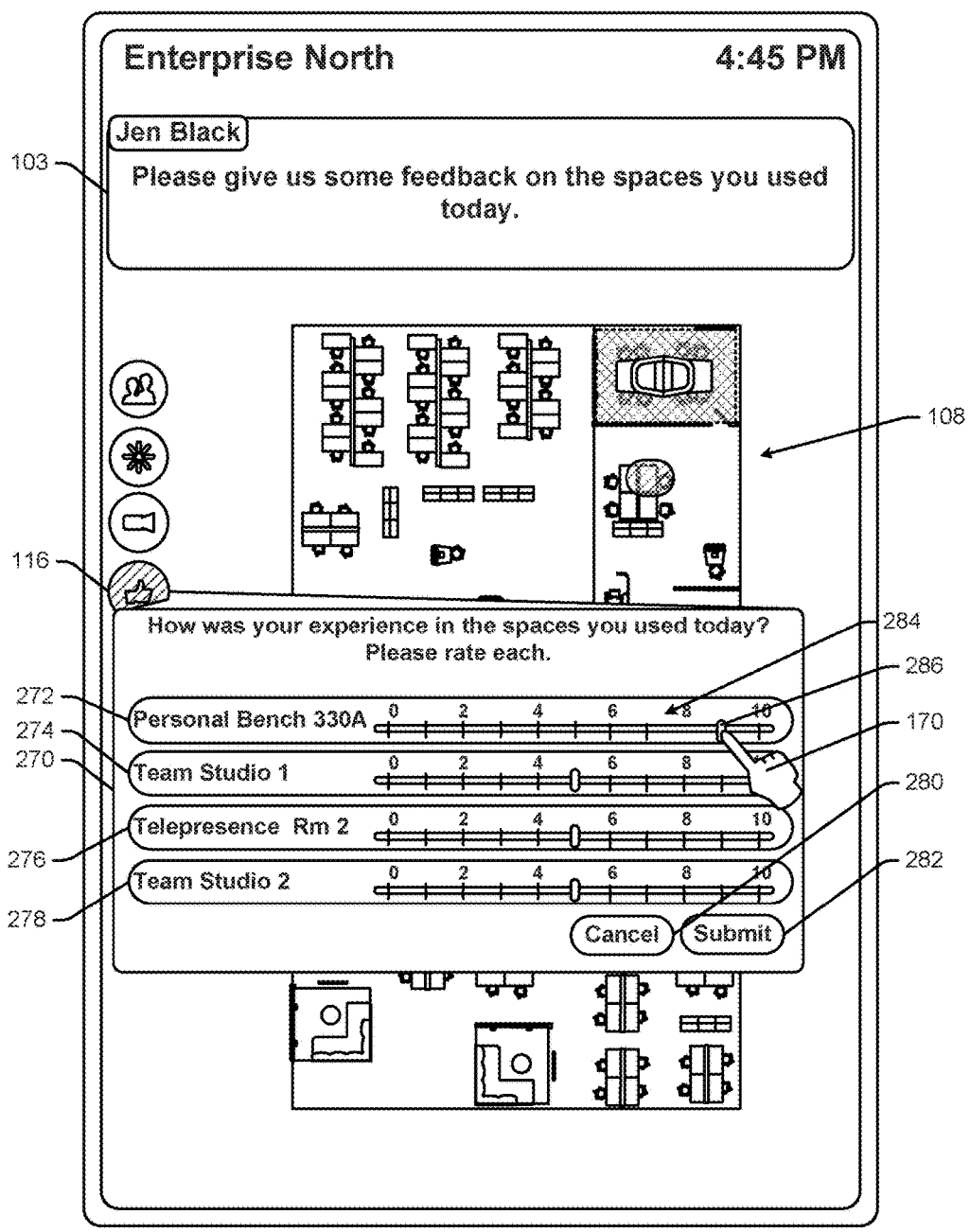
FIG. 14 is similar to FIG. 5, albeit showing the reception screen presenting another information set.

In addition to presenting content to an employee recently arriving at space 12a or subspace 70, screen 84 may be controlled by a system server 20 to present content to an employee leaving the space 12a or subspace 70. For instance, in at least some embodiments, in addition to sensed data related to configurations and spaces, the system may seek data directly from employees that use the configurations and spaces, which can then be used subsequently to better select spaces that meet other employee preferences. To this end, see, for instance, FIG. 14 where screen 84 presents a window 270 that includes tools for providing feedback related to specific spaces used by a specific employee during a prior period (e.g., a few hours) while the employee was present in the space 12a. In the illustrated example, employee Jen Black leaving the space associated with screen 84 used four spaces or affordance configurations during occupancy of the area including personal bench 330a represented by field 272, Team Studio 1 represented by field 274, Enhanced privacy configuration 2 represented by field 276 and Team Studio 2 represented by field 278. Each field allows an employee to rate the associated space. Exemplary field 272 includes a rating scale 284 with a scale from 0 to 10 and a moveable icon 286 which can be moved to change a space/configuration rating. Other fields 274, 276 and 2178 include similar rating tools. As shown in FIG. 14, in at least some embodiments, each of the spaces or configurations to be graded may be highlighted on map representation 108. In some cases, when one of the selection icons (e.g., 286) is selected, an associated space in representation 108 may be specially highlighted so that the employee is clearly aware of which space is being rated.

Figure 15:
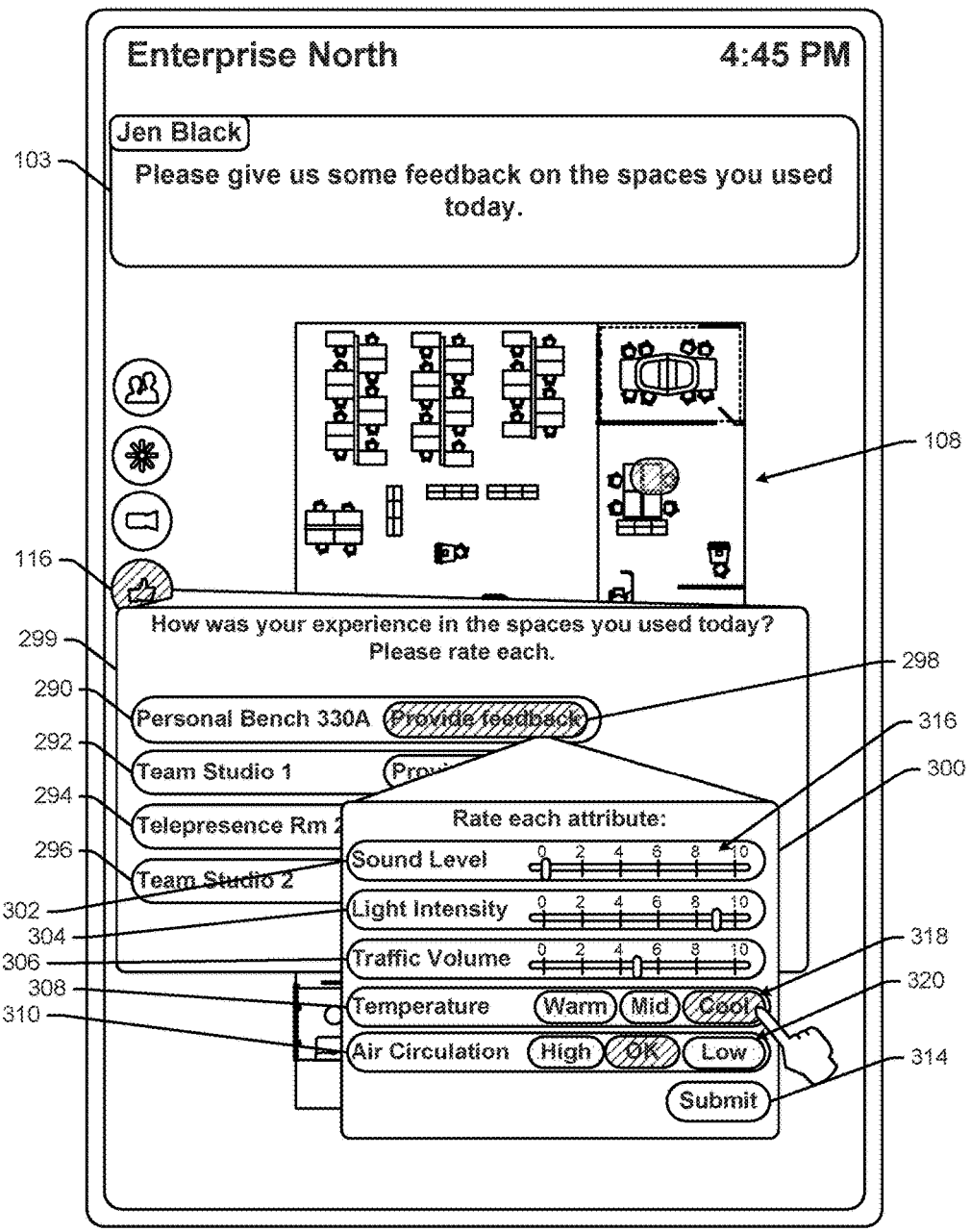
FIG. 15 is similar to FIG. 5, albeit showing the reception screen presenting another information set.

FIG. 15 shows an alternate space rating system where a window 299 is provided that includes a field 290, 292, 294 and 296, for each of the four spaces/configurations used by an employee including a personal bench 330a field, a Team Studio 1 field, an enhanced privacy configuration 2 field and a Team Studio 2 field, respectively. Here, each of the fields 290, 292, 294 and 296 includes a "Provide feedback" icon (see exemplary icon 298) that can be selected to provide feedback on an associated space/configuration. When feedback icon 298 is selected, a sub-window 300 is opened which includes additional fields 302, 304, 306, 308 and 310 for rating sound, light, traffic volume, temperature and air circulation, respectively, for personal bench 330a. Field 302 includes a sliding scale 316 with 0 through 10 options and a moveable selector icon for setting a rating value for sound level. Each of fields 304 and 306 includes a sliding scale similar to scale 316 in field 302. Temperature field 308 includes three selection options including warm, mid and cool to indicate perceived temperature in the space associated with the personal bench at 318. Similarly, at 320, field 310 includes High, OK and Low options to indicate perceived air circulation. Window 300 also includes a submit icon 314 selectable to submit an employee's entries in the fields above.

In at least some cases, when an employee provides high ratings for a specific personal bench or some other affordance configuration (e.g., a specific team studio, a specific focus station, etc.), server 20 may store that information for the employee so that it can be subsequently used to identify the configuration in the future and suggest that configuration to the employee the next time the employee is in space 12a. In effect, server 20 can take high rankings for specific configurations into consideration when identifying benches or other resources to suggest to specific employees.

In at least some embodiments screen 84 will be controlled to automatically seek feedback based on spaces used by an employee as the employee is leaving a space. Thus, the windows in FIGS. 14 and 15 may be presented automatically when a specific employee is leaving. In other cases, icon 166 for providing feedback may need to be selected as indicated in each of FIGS. 14 and 15 in order to open the feedback windows or tools.

In some cases the system server may be programmed to calculate the likelihood that an employee is leaving a space associated with a screen 84 "permanently" or if the employee will likely be back in a relatively short time. Here, in some cases "permanently" means that the employee is leaving the space and will not return subsequently the same day. For instance, where an employee is leaving a space but is scheduled to be back in that space for another meeting that same day, server 20 may not poll the employee for feedback when the employee is leaving and may instead wait until the employee is likely leaving for the remainder of the day (e.g., when the employee has no other scheduled meeting(s) in the space during the remainder of the day). Similarly, if an employee is scheduled to be located in a space 12a for several days, server 20 may not poll the employee for feedback until the employee is sensed leaving the space 12a after her last meeting on the last day of the scheduled stay. In this way, the polling for feedback will be perceived as less of a burden. In a similar vein, if an employee has used 10 spaces over the course of a few days of hotelling in a larger space 12a, server 20 may be programmed to only seek feedback on the four spaces most utilized by the employee to avoid annoying the employee with the requirement for excessive feedback.

Referring yet again to FIGS. 4 and 6, while wireless access point based triangulation may be used to identify employee locations as described above, in other cases one or more presence sensors 97 may be provided proximate or integrated into screen 84 for sensing employee presence and identity. While screen 84 is described above as touch sensitive, in other embodiments other interface configurations are contemplated. For instance, in at least some cases sensor 97 may be a 3D gesture sensor so that an employee can simply gesture to interact with content on screen 84. For instance, a sensor like the Kinect sensor by Microsoft could be used to sense gestures and move a pointing icon (see again 170 in various figures) about screen 84 to select on screen icons. Other interface configurations are contemplated.

While not shown, other map representations may be accessed by an employee via screen 84 to show specific space attributes. For instance, in at least some cases server 20 may use real time or historical noise volume sensed within space 12a to generate a noise volume map of space 12a to show relative noise levels throughout. As another instance, server 20 may use sensed light in space 12a to generate a light map indicating relative light intensities, may use sensed foot traffic in space 12a to generate a foot traffic path indicating relative foot traffic volume in different locations of space 12a, etc. These types of attribute specific maps, in at least some cases, may be accessible via additional control tool icons presented in screen area 105 (see again FIG. 5).

In still other cases, other types of information may be automatically presented via screen 84 to help an employee get started with her day. For instance, when an employee arrives at screen 84, a simple list of tasks to be accomplished by an employee may be automatically presented via screen 84. As another instance, if the employee has a free slot of time during her day, server 20 may identify another team member that is also unscheduled for that time and may suggest a meeting, an affordance configuration for the meeting, etc. As another instance, an arriving employee's full day schedule may be automatically presented with specific meeting information or in some general way such as a simple time line with bars indicating scheduled blocks of time. For example, see the timeline for Jen Black shown at 173 in FIG. 7. As yet one more instance of additional useful information, a map representation 108 may highlight all spaces in which Jen Black is scheduled to participate in activities during a day and may provide time period tags like tag 171 in FIG. 7 for each highlighted space indicating the time when Jen is scheduled to be in the space.

In some embodiments it is contemplated that server 20 will monitor employee schedules and location and may automatically update bench ownership as a function thereof. For instance, where a first employee is scheduled to temporarily own a bench 330a in space 12a until 1 PM, if the employee schedules another meeting for 2 PM in space 12a, server 20 may automatically change the ownership period of bench 330a to extend past the end of the 2 PM period. In this case, server 20 may notify the first employee of the bench ownership extension via a simple message presented at bench 330a, via an e-mail or text sent to a personal portable computing device, etc.

In the illustrated example, the space adjacent wall surface 86 and screen 84 is completely open and does not include any tables, benches, stations or other affordance configurations of any type. The intention here is to encourage employees to move through space 51 as quickly as possible and the lack of tables, chairs and other structure encourages transition, especially where café configuration 52 with touch down tables and seating structure is located immediately adjacent space 51.

Referring again to FIGS. 4 and 6, exemplary café configuration 52 includes an image or video projected onto wall space 82 that forms part of wall 80 on a side of screen 84 opposite space 86. In at least some cases a single ceiling projector may project images into each of areas 82 and 86 while in other cases dedicated projectors for each area may be provided. In at least some embodiments the video projected onto space 82 will be selected or generated by the system server to reflect some condition sensed within the associated space (e.g., subspace 70 in the present example). For instance, one parameter or space attribute that may drive video selection may be the amount of energy sensed by noise, movement, content generation, etc., within the space 70. Here, where noise, movement, etc., is substantial, the server 20 may determine that there is substantial energy in the space 70 while low levels of noise and movement may indicate low energy. A fast moving video may be presented in space 82 when high energy is sensed in space 70 and a relatively slower moving video may be presented in space 82 when low energy is sensed in space 70. For instance, a swirling set of abstract lines as shown at 98 may be sped up or slowed down as a function of sensed energy. Here, the idea is that employees entering space 52 will be affected by the imagery presented in the space and will gear their own energy up or down as a function of the presented imagery.

Other sensed attributes may affect the café imagery. For instance, space temperature, lighting, air flow, etc., may drive server 20 to select different imagery.

In at least some cases, in addition to reflecting energy level in a space, other attributes related to how the space is being used may also be reflected in the projected image. For instance, where employees in a space are primarily participating in team meetings, the colors in the abstract image may be different (e.g., red) than where most employees in the space are working independently at temporarily owned benches which may be indicated by green. As another instance, where one or more remote employees are currently communicating with locally disposed employees, the presented image may be modified in some fashion to distinguish from a case where no remote linkage is occurring. As one other instance, the café image may reflect the status of one or more long term team projects for a team located in an associated subspace. For instance, where a project has five main stages, the image presented may be different and depend at least in part on which stage of the project the team is currently working on. The café imagery may reflect one or more attributes ascribed to the space as opposed to sensed attributes, the imagery may be slow moving or include a peaceful natural scene and if a space is intended to encourage conversations and collaboration, the imagery may be fast moving or include a city street or other high energy scene.

Thus, in at least some embodiments, the image presented in space 82 is generated using real time data collected from an associated subspace (e.g., 70 in FIG. 2) and reflects the energy or some other space use attribute perceived in the space. The imagery can serve as a natural stimulus to help bring the associated space to life and may serve to trigger interaction between employees. The dynamic visualization is intended to create an atmosphere that helps employees connect. The imagery is intended to be non-rhythmic sensory stimuli that provides a humanized and natural ambiance that does not demand any additional effort or consciousness attention in at least some embodiments.

In at least some embodiments area 82 is substantially larger than screen 84 and area 86 so that the presented imagery can have a substantial impact on employees located within area 52. For instance, in at least some embodiments area 82 may have a width dimension between five feet and fifteen feet and a height dimension between three feet and the full height of the wall 80 (e.g., 8-9 feet tall). In some cases structure 97/99 or at least a portion thereof may include another wall segment on which a portion of the imagery presented in area 82 can extend and/or the stimulating imagery may be presented on other wall surfaces within the general area 52 such as well 77 (see again FIG. 6).

In addition to including area 82 on wall 80, exemplary café configuration 52 includes one or more standing height tables 93 and associated benches 83 for temporary use by employees located in area 52. Here, in at least some cases, the tables and benches are specifically designed and selected to encourage no more than temporary use by employees as those employees transition into other areas of subspace 70 for longer term use. To this end, exemplary tables 93 have relatively thin width dimensions within a range between one foot and two feet so that it would be difficult at best for any employee to spread out much material thereon for sharing purposes or during a focused work activity. In addition, by providing benches 83 that are relatively high and that do not include backrests, "perches" are provided that may be comfortable over short periods (e.g., a few minutes), but that would become uncomfortable for most employees relatively quickly. In particular, the benches shown at 83 are elongated and extend under associated tables from one side to the other thereof which encourages employees that want to temporarily perch to sit sideways along the long edges of the table tops which, again, is not conducive to long term work activities.

As seen best in FIG. 6, a coffee, tea and other refreshments station 97 is presented proximate the tables and benches 93 and 83 as are shelves and closet units 99. Here, employees that are carrying materials when they arrive in space 70 may want to set those materials on one of the shelves or avail themselves of the closets at 99.

Referring again to FIGS. 2, 4 and 6, again, as an employee approaches subspace 70, the walls 82 guide the employee's vision toward area 86 to confirm that the employee is headed toward the right area. As the employee enters reception area 51, the employee moves generally toward screen 84. As the employee approaches screen 84, server 20 tracks the employee's location, accesses information related to the employee's preferences, team members, and scheduled meetings and, based on those suggestion factors and perhaps other factors, identifies one or a subset of personal benches to suggest to the employee as well as the location of a next scheduled meeting for the employee, locations of other employees on a team with the arriving employee, locations of benches used by other team members in subspace 70 or generally in space 12a, etc. Server 20 uses the information associated with the arriving employee to generate content as described above which, among other things, suggests at least one bench for use by the employee assuming that the employee's schedule indicates that the employee will be in the general area 12a for an extended period.

The employee is welcomed by screen 84 and suggestions are presented to the employee via screen 84. The employee may interact with screen content as described above and, eventually, takes some step to associate with one of the suggested benches or a different bench if the employee so chooses. Next, the employee moves into the café space 52, sets down any materials on one of the tables temporarily, sheds any excessive garments and grabs a coffee at station 97. While performing these "unwinding" tasks, an energy mirroring video is played in area 82 to help ramp the employee's energy up or down given the energy level sensed in other portions of subspace 70. At this time there may be additional employees in café space 52 and the employees in space 52 may engage in various forms of communication as they start to adjust to movement into the other subspace areas. By the time the employee is ready to move past the café space, the employee should be more ready to start whatever activities she is scheduled to perform in subspace 70.

In at least some embodiments it is contemplated that screen 84 may also be controlled in conjunction with visual indicators 30a, 30b, etc., in space 12a to guide employees to assigned personal benches and then, also, in at least some embodiments, to other resources to be used by the employees at different times. For example, in at least some embodiments, a different color may be assigned to each employee that is currently being guided within space 12a and the visual indicators 30a, 30b, etc., may be controlled to present guiding colors to employees as they move about within space 12a. For instance, for a first employee, the guiding color may be pink and for a second employee the guiding color may be blue. Once a first employee reaches her destination, the guiding color may be assigned to a different employee to guide the other employee from one location to another. Here, if the first employee is to be guided subsequently to some other space resources, some color unused to guide another employee at that time may be assigned temporarily to the first employee for guidance purposes.

Guiding information may be presented in some other way such as via symbols (e.g., letters, numbers, images, etc.) instead of or in addition to color to aid persons that are color blind. Guiding colors can be used to find any space or affordance configuration in space 12a or, indeed, to find any resource (e.g., a restroom, a café space 52, etc.).

Figure 16:
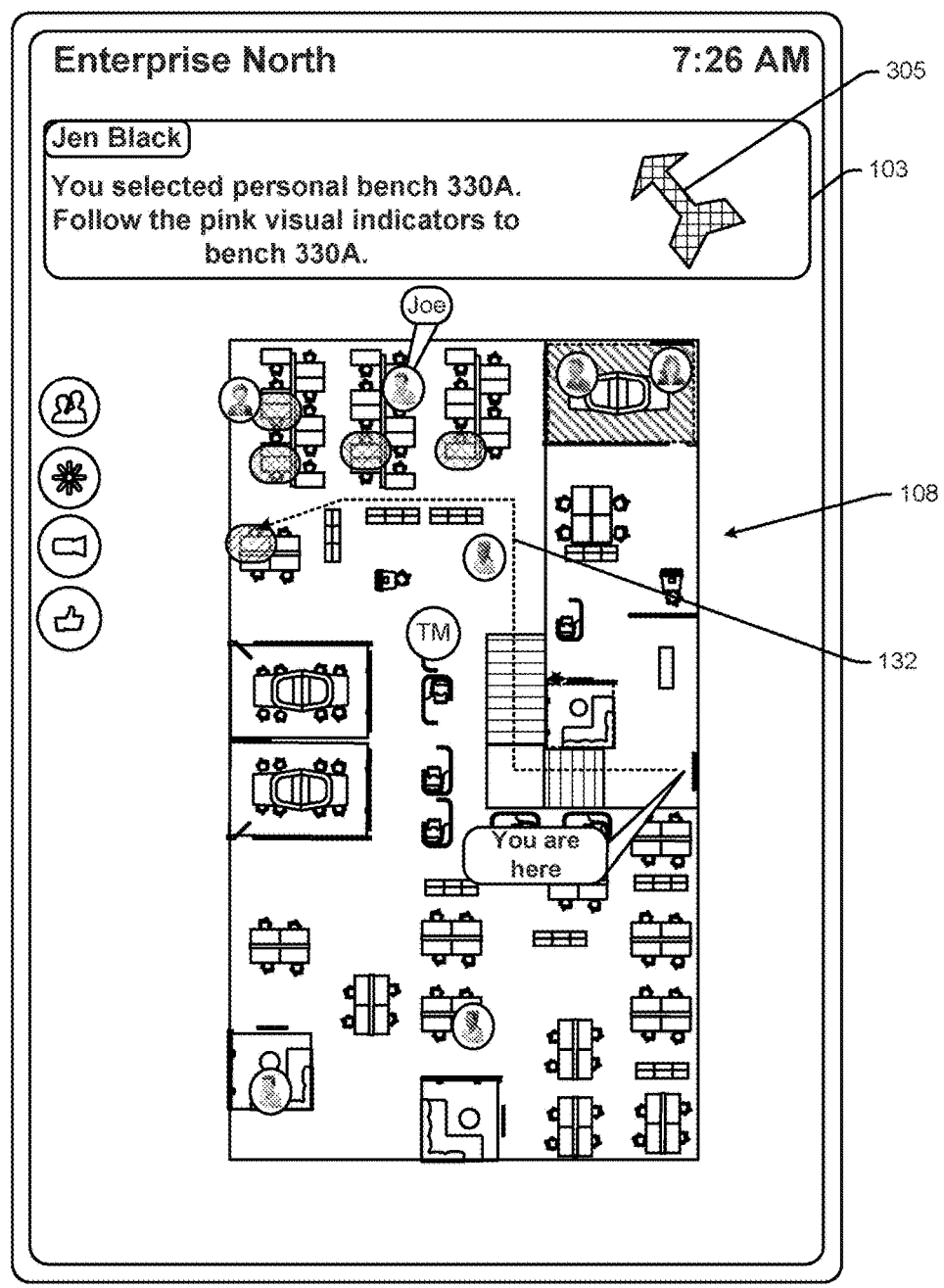
FIG. 16 is similar to FIG. 5, albeit showing the reception screen presenting another information set.

In FIG. 16, screen 84 shows an exemplary screen shot that may be presented after an employee has accepted ownership of a particular bench to notify the employee of an assigned guiding color that can be used to locate the associated bench. In FIG. 16, instructions in space 103 indicate that the employee has selected personal bench 330a and also indicate that the employee's guiding color is pink (as indicated by the horizontal and vertical hatching) as shown at 305. Once a color has been assigned to a specific employee, the employee can move into the café area, unwind and then move on into the larger space following a string of visual indicators through space 12a to the associated personal bench.

Referring again to FIG. 1, a trail of visual indicators is shown at 30a, 30b, 30c, 30d and 30e that will lead an employee from screen 84 in space 51 to personal bench 330a. Again, each indicator 30a, 30b, etc., may include a standalone indicator device that is mounted to a wall or other affordance in space 12a or may include a light device or other indicator device that is integrated into some affordance configuration. Thus, for instance, indicator 30a may be mounted to a wall while indicator 30e is integrated into bench 330a. Where an indicator 30e is integrated into some other assembly, that indicator may serve multiple functions including more than just providing guidance signals to employees on the move.

In at least some cases it is contemplated that, as an employee moves through space 12a, server 20 will continue to track the location of the employee and will only present the employee's assigned visual indicator (e.g., the assigned guiding color) when the employee is located at a position where the employee can see an illuminated indicator. In addition, where one indicator is located at a position where two employees are travelling and need guidance, the single indicator may be controlled to provide guidance to more than one travelling employee by toggling between two guiding colors, one guiding color for each of the travelling employees or by presenting each of the guiding indicators simultaneously (e.g., half an indicator may be pink and the other half blue).

Figure 8:
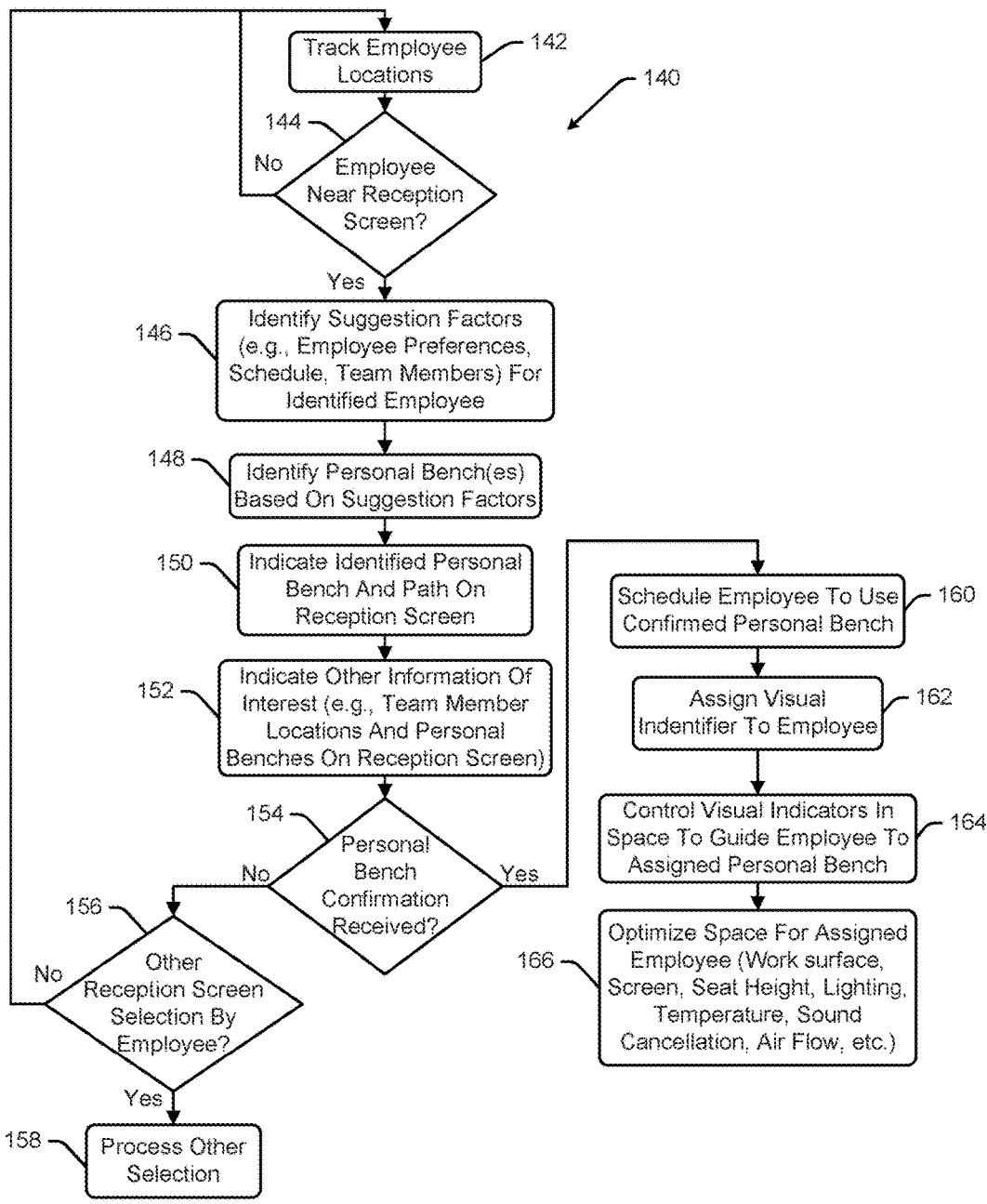
FIG. 8 is a flow chart showing an exemplary method that is consistent with at least some aspects of the present disclosure.

Referring now to FIG. 8, a process 140 for helping an employee take ownership of and then locate a personal bench that optimally meets her preferences is illustrated. At block 142, system server 20 tracks the locations of all employees in enterprise spaces 12a, 12b, etc. At block 144, server 20 determines if an employee is located proximate one of the reception screens 84 and determines the identity of the employee. Where an employee is not located near a reception screen, control loops back through blocks 142 and 144. Once an employee is identified near a screen 84, control passes to block 146 where server 20 access the personal preference database 76 (see again FIG. 3) and identifies suggestion factor preferences associated with the identified employee.

Referring still to FIG. 8, at block 148, server 20 identifies one or more personal benches that are at least somewhat optimized based on the specific employee's suggestion factors. At block 150, server 20 indicates the identified bench and a path (see path 132 in FIG. 16) thereto via the screen 84 adjacent the employee. At block 152, server 20 presents other information of interest to the employee via screen 84 such as locations of team members, benches assigned to team members, locations of particularly interesting resources (e.g., telepresence systems, MediaScape systems, etc.).

At decision block 154, server 20 monitors for confirmation from the employee that the employee intends to temporarily own the suggested bench. Where no confirming signal is received from the employee, control passes to block 156 where the server 20 monitors for other screen selections such as selection of one of the control icons 110, 112, 114, etc. (see again FIG. 5). Where another screen selection has been made, control passes to block 158 where the other selection is processed. Continuing at block 154, if an employee confirms selection of the suggested bench, control passes to block 160 where server 20 updates the space schedule 82 (see again FIG. 3) to associate the employee with the selected bench. At block 162 server 20 assigns a visual identifier to the employee. Here, as indicated above, in many cases the visual indicator will be a specific color that is temporarily assigned to the employee for guidance purposes (e.g., the identifier is a visual indicator guidance color). In other cases the visual indicator may have some visually distinguishable graphical characteristic to it so that color blind employees can distinguish their indicator from others.

Referring still to FIG. 8, at block 164, server 20 controls a string of visual indicators in space 12a to guide the employee to her temporarily owned personal bench. Again, here, the string of guiding indicators may be controlled to present the employee specific indicator via each indicator only when the employee is at a location where the employee can see the specific indicator and may stop presenting the indicator once the employee has moved past the indicator on her path to the owned bench. At block 166, as the employee is traveling to her associated bench, server 20 may be programmed to use at least a subset of the employee preferences from database 76 to customize or optimize affordances at the associated bench for use by the specific employee. Here, for instance, server 20 may control actuators (e.g., motors) in a height adjustable leg structure at the associated bench to place a work surface at a preferred height for the employee. Other affordances that may be automatically controlled to optimize for employee preferences at a bench may include but are not limited to heat elements, cooling devices (e.g., fans or air conditioners), chair adjustments, lighting devices, white noise or other sound generating devices, etc.

In at least some embodiments it is contemplated that personal bench ownership may be established without requiring any specific action by an employee other than to travel to the bench. For instance, in some cases when an employee arrives in a space and is proximate a reception screen 84, server 20 may identify a single bench that is optimal for use by the employee and may suggest the bench to the employee along with indicating a visual indicator guidance identifier (e.g. a color). Here, the employee may glance at screen 84 while passing by and identify the employee's specific guidance identifier. As the employee moves past screen 84, server 20 can recognize that the employee has moved along and may automatically start controlling the first in a string of visual indicators to present the employee's guidance identifier and guide the employee to the suggested bench. Where the employee continues along the guidance path, the server 20 will continue to control the next in the string of visual indicators to guide the employee to the suggested bench. Where the employee diverges from the indicated path, server 20 may be programmed to disassociate the employee with the suggested bench. Here, some amount of deviation may be acceptable without disassociation and, in some cases, server 20 may be able to reroute the employee via a modified string of visual indicators. Once the employee gets to the suggested bench, server 20 may greet the employee via a message presented at the bench and may start to support the employee in ways describes hereafter.

In any case, after a bench is suggested to a first employee and while the first employee is travelling along a prescribed path to the suggested bench, an indicator of some type may be controlled at the suggested bench to indicate ownership by the first employee. If the first employee deviates from the path, the ownership indication can be changed to indicate no owner and that the bench is available for use by some other employee. By indicating bench ownership after the suggestion and prior to deviation from a path, a situation is avoided in which another employee may take ownership of the suggested bench while the first employee is travelling to the bench.

It has been recognized that while an employee is travelling to a temporarily owned bench, the employee may observe a different bench that the employee would prefer for some reason. In at least some cases it is contemplated that an employee may simply occupy a different bench that is not owned by another employee and the act of occupancy may be used as a signal that the employee intends to temporarily own the occupied bench. In this case, the previously suggested bench would be disowned and opened up for use by other employees.

B. Bench Configuration

Referring now to FIGS. 17 and 18, an exemplary personal bench configuration 60 that provides first, second, third and fourth personal benches 330a, 330b, 330c and 330d, respectively, is illustrated. Each of benches 330a, 330b, 330c and 330d is similarly constructed and operates in a similar fashion unless indicated otherwise hereafter and therefore, only bench 330a will be described in detail here in the interest of simplifying this explanation.

Bench 330a includes a leg support assembly 332, a work surface assembly 340, and a screen assembly 342. Leg support assembly 332 includes first and second telescoping leg subassemblies and a horizontal beam member 338. Each telescoping leg subassembly includes a lower leg structure 334 and a telescoping upper leg member 336. The lower leg structure forms a vertical channel that receives the upper leg member 336 for sliding vertical motion between a retracted position as shown in FIG. 17 and a fully extended position as shown in FIG. 18. When fully retracted, a top surface 362 of the work surface assembly is at approximately 24 to 28 inches high and when fully extended, the top surface 36 is at approximately 34 to 42 inches high so that the work surface 340 can be used in a seated position or a standing position and can support employees of different heights. Although not shown, motors and gear assemblies are provided in each of the lower leg subassemblies 334 for driving the upper leg members 336 to different extended positions.

Referring still to FIG. 18, horizontal beam 338 extends between top ends of the first and second lower leg structures 334 and provides lateral stability thereto. In addition, although not shown, beam 338 may include a wire management channel or trough in its top surface for receiving and managing power and data cables. In the illustrated example, rear ends of lower leg members 334 that form each of the first personal bench 330a and the second personal bench 330b are mechanically attached to each other so that bench 330b resides immediately adjacent and rearward of bench 330a. In at least some embodiments, each lower leg structure 334 may also be mechanically fastened via bolts or other mechanical fastening devices to an ambient floor surface.

Referring to FIGS. 17 and 18 and also to FIGS. 19 through 22, work surface subassembly 340 includes a table top member 341 and an interface configuration generally identified by numeral 360. Top member 341 forms a top surface 360 and a bottom surface 363. In at least some embodiments, top member 341 is a rectilinear rigid member constructed using wood, plywood, laminates, metal, plastic, or any other substantially rigid material. In a particularly advantageous embodiment, top member 341 includes a lower substrate member 343 and a top cover member 345 (see FIG. 20) that forms top surface 362 where lower member 343 forms an opening 396 that is covered by cover member 345. Here, for instance, lower member 343 may be a wood or fiber laminate member while top cover member 345 includes a thin plastic member that, in at least some embodiments, is at least somewhat transparent so that at least some light directed at an undersurface of member 345 passes there through. To this end, see FIG. 21 where each round dotted line circle indicates a light pattern corresponding to light passing through top member 345.

Non-transparent ink, a sticker or other non-transparent indicia may be applied to an undersurface of member 345 so that a light pattern that is the opposite of the indicia passes through member 345. Exemplary indicia in FIG. 21 associated with devices 400, 402, 404, 406, 407, 408 and 410 include an up arrow, a down arrow, a quiet indicator, a heat indicator, a do not disturb indicator, a fan or air circulation indicator and a white noise indicator, respectively. In other embodiments indicia may be applied to the top surface of member 345 opposite sensor devices mounted there below.

Exemplary interface configuration 360 includes a plurality of sensor devices labeled 400, 402, 404, 406, 408, 410 and 412 that are mounted within opening 396 and that butt up against or are adjacent the undersurface of member 345. In the illustrated embodiment, each of sensor devices 400, 402, 404, 406, 407, 408 and 410 is similarly constructed. Exemplary device 410 includes a capacitive sensor assembly 420 and an indicator light device 422. The capacitive sensor assembly 420 is designed to sense an employee's touch on a top surface of member 345 opposite the device 420. Capacitive sensor devices are well known and therefore are not described here in detail.

Light device 422 may be any type of lighting device including, for instance, an incandescent light bulb, an LED, a set of LEDs, etc. In some cases device 422 may only be capable of generating a single intensity of light while in other cases device 422 will be controllable to generate different light intensities to indicate different states. Similarly, in some cases device 422 may only generate light of a single color while in other cases device 422 may be able to generate light of two or more different and clearly discernible colors. Device 422 directs light upward to subtend the undersurface of member 345 and, where indicia is applied to member 345, causes the area around the indicia to be illuminated so that the indicia is perceivable when the top surface of member 345 is observed by an employee. Hereinafter, unless indicated otherwise, the dashed round representations 400, 402, 404, 406, 407, 408 and 410 in FIG. 21 will be referred to as an up button, a down button, a quiet button, a heat button, a do not disturb button, an air circulation button and a white noise button, respectively.

Figure 20:
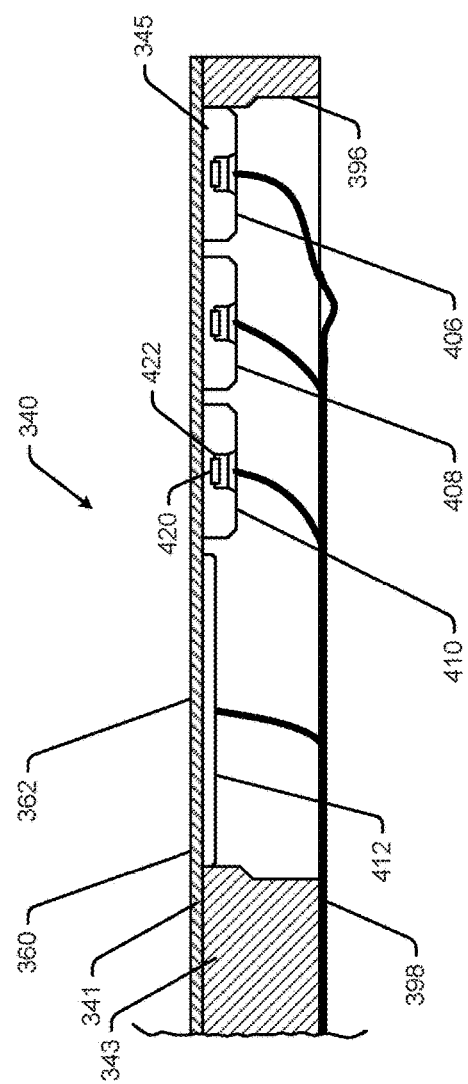
FIG. 20 is a cross-sectional view of a user interface that is provided as part of the bench configuration shown in FIGS. 17 and 18.
Figure 21:
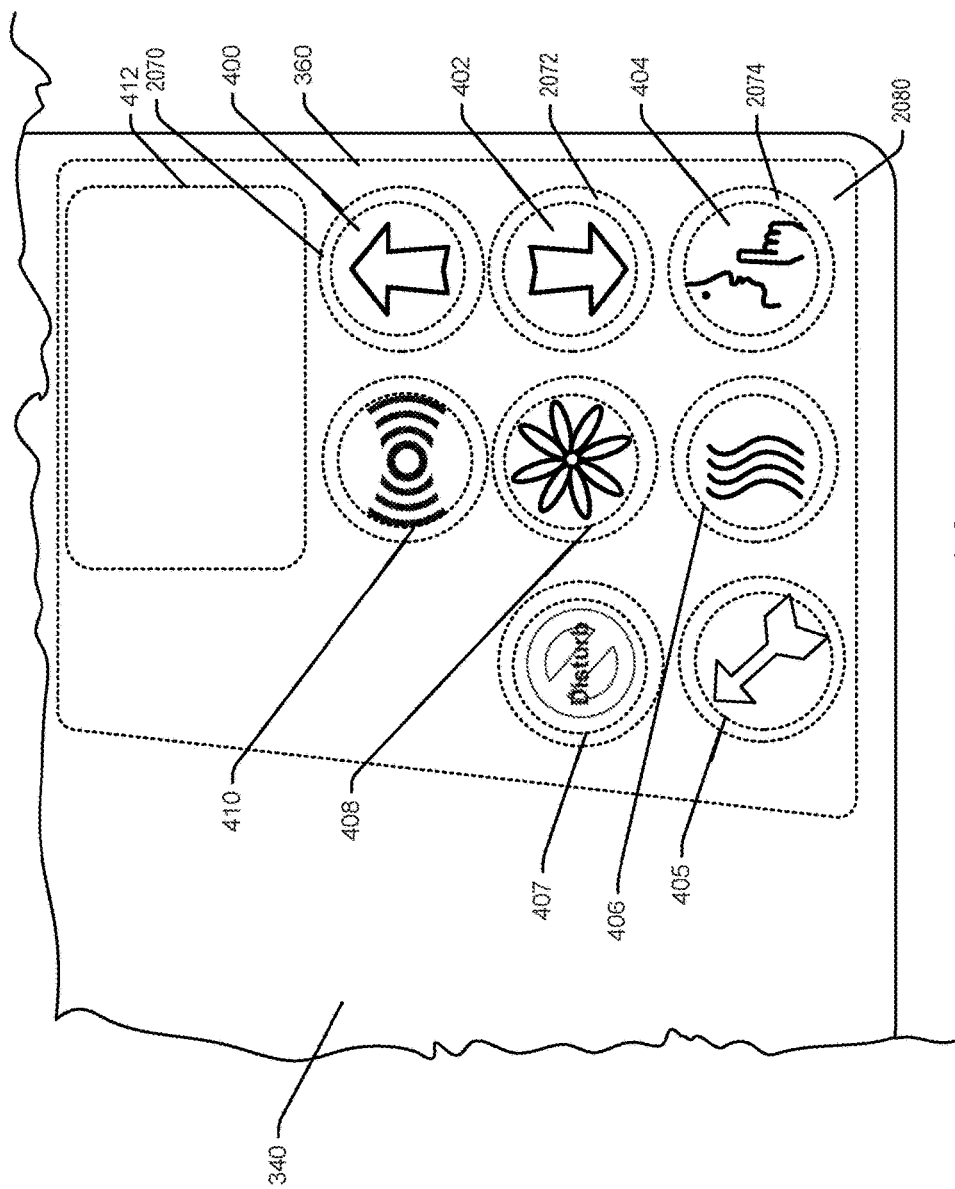
FIG. 21 shows a top plan view of the interface configuration shown in FIG. 20.

Referring still to FIGS. 20 and 21, device 412 is a plate or surface type RF ID reader that can be used to wirelessly read an employee's RF ID badge (see again 90 in FIG. 4) or some other employee identifier device. Here, for instance, device 412 may include an excitation coil designed to excite a transmission coil 96 in an employee badge so that the badge transmits an employee identifier to device 412 when the badge is within a sensing zone (e.g., within 3 inches) adjacent the top surface of member 345.

Figure 27:
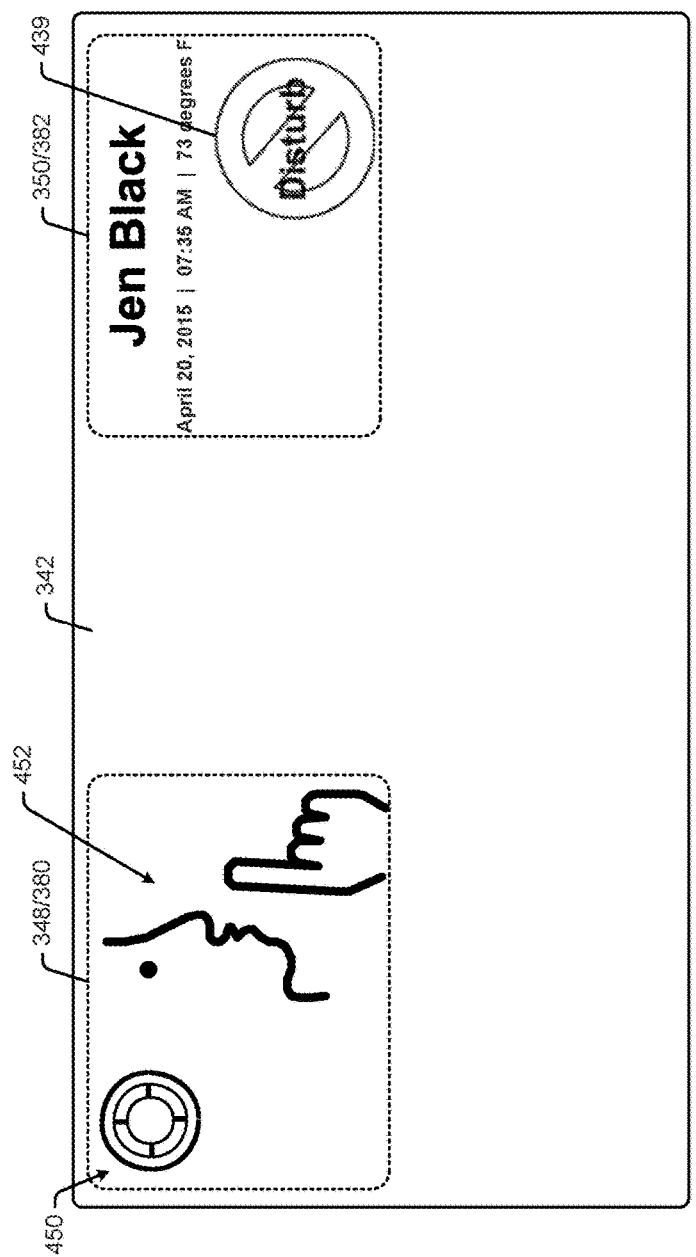
FIG. 27 is similar to FIG. 23; albeit showing other messaging types.

Each of buttons 400, 402, 404, 406, 407, 408, 410 and device 412 is linked to a processor that can use signals from the buttons and device to perform various functions. For instance, the processor may be included with bench 330a or configuration 60 or the system server 20 (see gain FIG. 1) may be linked to the buttons and device to receive signals there from and to use those signal to perform various functions. For instance, while system 10 is intended to facilitate employee association with a specific bench when an employee enters a space as described above, in some cases an employee that is not associated with a bench but is in a facility space may want to take temporary ownership of a proximate bench for a period. In at least some embodiments, device 412 allows an employee with a readable badge to claim an un-owned bench for at least temporary use by simply passing the employee's badge over device 412. As another instance, the up and down buttons 400 and 402 may be used by an employee to control leg subassemblies 332 to raise or lower top member 340 to different heights to accommodate user preferences. Similarly, buttons 406 and 408 related to the heat and fan indicia, respectively, may be used by an employee to adjust heat generated by heating element 388 and air circulation controlled by fan assembly 390 (see again FIG. 19). Button 407 is useable to post a do not disturb indicator as shown in FIG. 27. Button 410 related to the noise indicia may be used by an employee to adjust the volume of white noise generated by speaker 391 (see FIG. 19).

In at least some embodiments signals from at least some of the buttons in FIG. 21 may cause control of associated actuators to cycle through different states. For instance, in the case of heating element 388 in FIG. 19, element 388 may be controllable to set heat output to any of first (e.g., a lowest level) through fifth (e.g. a highest level) different levels. With element 388 initially off, a first activation of button 406 may set element 388 to the first heat generating level, a second activation may set element 388 to the second level, and so on, until the fifth level is reached, after which a next activation would cycle element 388 again to the off state. Similarly, button 408 may be selected multiple times to cycle through different fan speeds and button 410 may be selected multiple times to cycle through different volumes of white noise.

Referring still to FIGS. 20 and 21, in at least some embodiments where white noise volume cycles through multiple different levels as button 420 is consecutively selected, light device 422 may be controlled differently to visually indicate an instantaneous volume level. For instance, where white noise can be turned off or to low, medium or high levels, light device 422 may be able to generate first through fourth light intensities indicating the off, low, medium and high levels, respectively. Similarly, the light devices associated with buttons 408 and 406 may be controllable to indicate different heat element and fan speed settings.

In at least some embodiments, system server 20 (see again FIG. 1) may be programmed to automatically control any of the actuators associated with bench 330a to modify the environment associated therewith so that associated aspects of the environment are consistent with employee preferences. Thus, for instance, where employee Jen Black prefers to work in a standing position with a work surface height of 36 inches and prefers a temperature of 72 degrees, when Jen Black arrives at screen 84 and is associated with bench 330a, prior to Jen Black arriving at bench 330a, server 20 may automatically adjust upper leg member 336 extensions to place top surface 362 at a 36 inch height and may control heating element 388 to increase the temperature at bench 330a to 72 degrees. In addition to controlling work surface height and heating element 388, the system server may automatically control many other types of actuators associated with a bench 330a.

Figure 22:
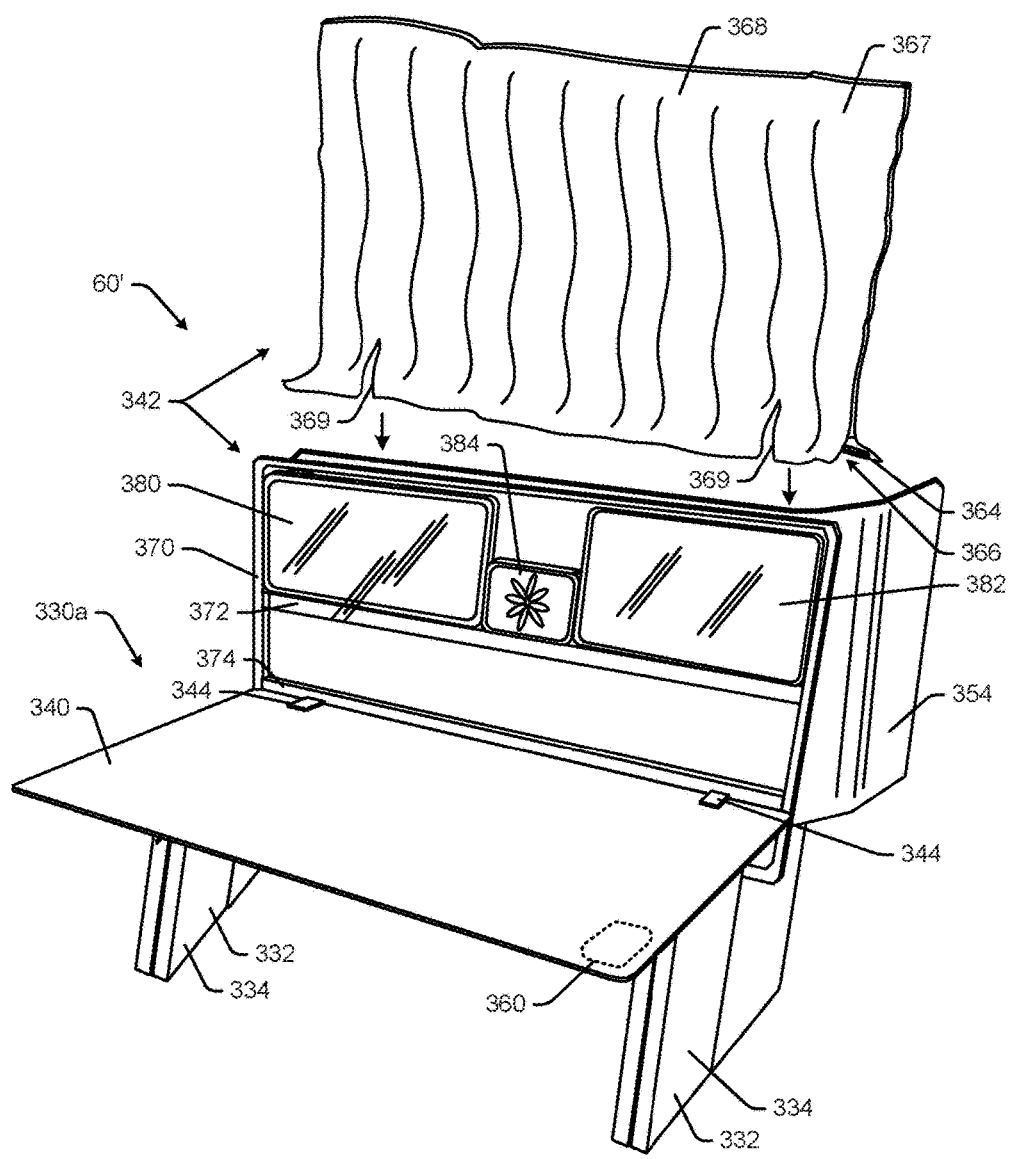
FIG. 22 is a partially exploded view of a portion of the bench assembly or configuration shown in FIG. 17.

Referring again to FIGS. 17 and 18 and also to FIG. 22, exemplary screen assembly 342 includes a frame structure, first and second flat panel display screens 380 and 382 and a cover assembly 368. The frame structure includes an outer rectilinear frame 370, first and second horizontal beam members 372 and 374, respectively, and first and second brackets collectively identified by numeral 344. Outer rectilinear frame 370 includes first and second spaced apart and vertically arranged parallel members and first and second spaced apart and parallel horizontal members that traverse the distance between upper and lower ends of the vertical members, respectively, to form a rectangular central frame opening. Horizontal beam 272 is connected at and extends between locations about mid-way along the length of the first and second vertical frame members. Similarly, horizontal beam 374 is connected at and extends between locations about mid-way between beam 272 and the lower horizontal frame member that forms part of the outer frame 270.

First and second brackets 344 are mounted to lower beam 274 and extend to one side thereof to be mounted to a rear edge of top member 340 via mechanical clamping mechanisms (not illustrated). When brackets 344 are mounted to top member 340, the frame structure is adjacent the rear edge of member 340 and extends substantially vertically upward therefrom. In at least some embodiments beam 374 and the rear edge of member 340 may form a small (e.g., one half inch) gap so that power and data cables can be passed there through to link computing or other devices to power and data receptacles that reside under top member 340. Each of the frame members and rail members 370, 372 and 374 have a thickness dimension (e.g., front to back dimension) that is relatively thin. For instance, in some embodiments the frame members and beams may have a thickness dimension between one quarter of an inch and two inches and, in particularly advantageous embodiments, the frame and rail members have a thickness dimension between one half an inch and one inch.

Referring still to FIG. 22, screens 380 and 382 are flat panel electronic displays that have a thickness dimension that is no greater than the thickness dimension of the frame and rail members 370, 372 and 374. Screen 380 is mounted in an upper left corner of the central frame opening and, in the illustrated example, is supported by rail member 372 as shown. Screen 380 is mounted to the frame structure via brackets, screws, or any other type of mechanical fastener so that the front face thereof is facing the general direction of top member 340. Similarly, screen 382 is mounted to the frame structure in the upper right hand corner of the central frame opening via brackets, screws, or any other type of mechanical fastener so that the front face thereof is facing the general direction of top member 340. Because screens 380 and 382 have thickness dimensions that are equal to or less than the thickness dimensions of the frame members, the screens 380 and 382 are completely located within the space defined by the frame members after installation. Although not shown, power and data cables extend from each of the screens to power and data receptacles that reside below top member 340.

Referring yet again to FIG. 22, in at least some embodiments, a fan assembly 384 may also be mounted to the screen frame assembly via some type of mechanical fastener. Fan assembly 384 is a thin profile fan and has a thickness dimension that is less than the thickness dimension of the frame and beam members 370, 372, 374 so that, when mounted within the frame opening, the fan is completely located within the space defined by the frame members. In the illustrated example, fan 384 is mounted between screens 380 and 382 and is supported by the upper horizontal rail member 372.

Referring still to FIG. 22, cover assembly 368 includes a fabric envelope or sock 367 and a closure sub-assembly 364. Sock 367 includes first and second substantially rectangular sheets of fabric material that are sewn together along a top edge and first and second lateral edges to form an internal substantially rectangular pocket that is open along a lower edge at 366. In the alternative, sock 367 may include a substantially rectangular and seamless knit sock that is closed along a top end and along first and second lateral ends and that is open at 366. In at least some embodiments the pocket has a shape substantially similar to the shape formed by frame structure 370. In some cases, the pocket is slightly smaller than the frame structure dimensions and the fabric is stretchable so that the fabric can be stretched to fit over the frame structure 370. Once installed on the frame 370, sock 367 should be taught both vertically and horizontally. Hereinafter, unless indicated otherwise, once installed on the frame 370, the phrase "front facing fabric" will be used to refer to the portion of fabric sock 367 that resides on the same side of frame 370 as top member 340 and the phrase "rear facing fabric" will be used to refer to the portion of sock 367 that resides on the side of frame 370 opposite top member 340.

Referring still to FIG. 22, first and second slits 369 are formed in a lower edge of the front facing fabric that are aligned with brackets 344 so that each bracket is received in one of the slits 369 upon sock installation. A closure mechanism or configuration is provided along the lower edges of the front and rear facing fabric sheets so that sock 367 can be closed around and therefore secures to frame structure 370. For instance, the closure mechanism may include Velcro strips 364 along the lower edges of the front and rear facing fabric sheets.

To install sock 367 on frame structure 370, the open lower end of the pocket at 366 is aligned with the frame structure 370 and sock 367 is forced over structure 370. As sock 367 is slid down, brackets 344 are received in slits 369 and eventually the lower ends of the fabric sock are pulled below the bottom member of frame 370 and are fastened via the Velcro strips or other fastening mechanism. In at least some cases, power and data cables will pass through open portions of the sock 367 along the closed lower edge.

Referring still to FIG. 22, at least sections of the front facing fabric portion of sock 367 are specifically designed to pass display screen light from screens 380 and 382 while obstructing a view through the sock 367 into the pocket defined thereby. Thus, for instance, in FIG. 18, sections 348 and 350 of sock 367 may have an extremely small knit pattern that is akin to nylon or a similar fabric material so that light from screens 380 and 382 located there behind can be seen there through. Similarly, in at least some cases at least the portion of the front facing fabric portion of sock 367 that is aligned with fan assembly 384 is designed to pass air blown from fan 384. While sock 367 may have many different colors and in fact may even have a colored pattern on sections thereof or generally, at least some embodiments include a black colored fabric which, it has been found, hides the internal area of sock 367 and components therein particularly well.

While some embodiments may have different knit patterns at sock sections 348 and 350 than at other areas of the sock 367, in at least some embodiments, at least the front facing fabric portion of sock 367 may have a uniform knit pattern so that the front facing fabric has a uniform appearance when the screens 380 and 382 are turned off or are controlled to present an all black image. In at least some embodiments the rear facing fabric portion of sock 367 may have a different knit pattern than the front facing fabric. In some cases the rear facing fabric will be knot to be completely light opaque. In other cases, the rear facing fabric will be selected so that when combined with the front facing fabric knit, no or substantially no light passes through the combination of fabrics. In still other embodiments the entire sock 367 may be knit with the same pattern so that the entire sock has the same appearance. In still other embodiments, edge portions of the sock 367 may have a different knit pattern that is more stretchable than the front and rear facing fabric sections for one or both of functional and aesthetic reasons. In any case, at least the sections 348 and 350 of the front facing fabric that cover the screens 348 and 350 are knit to pass much of the light generated by each of the screens 348 and 350.

Figure 23:
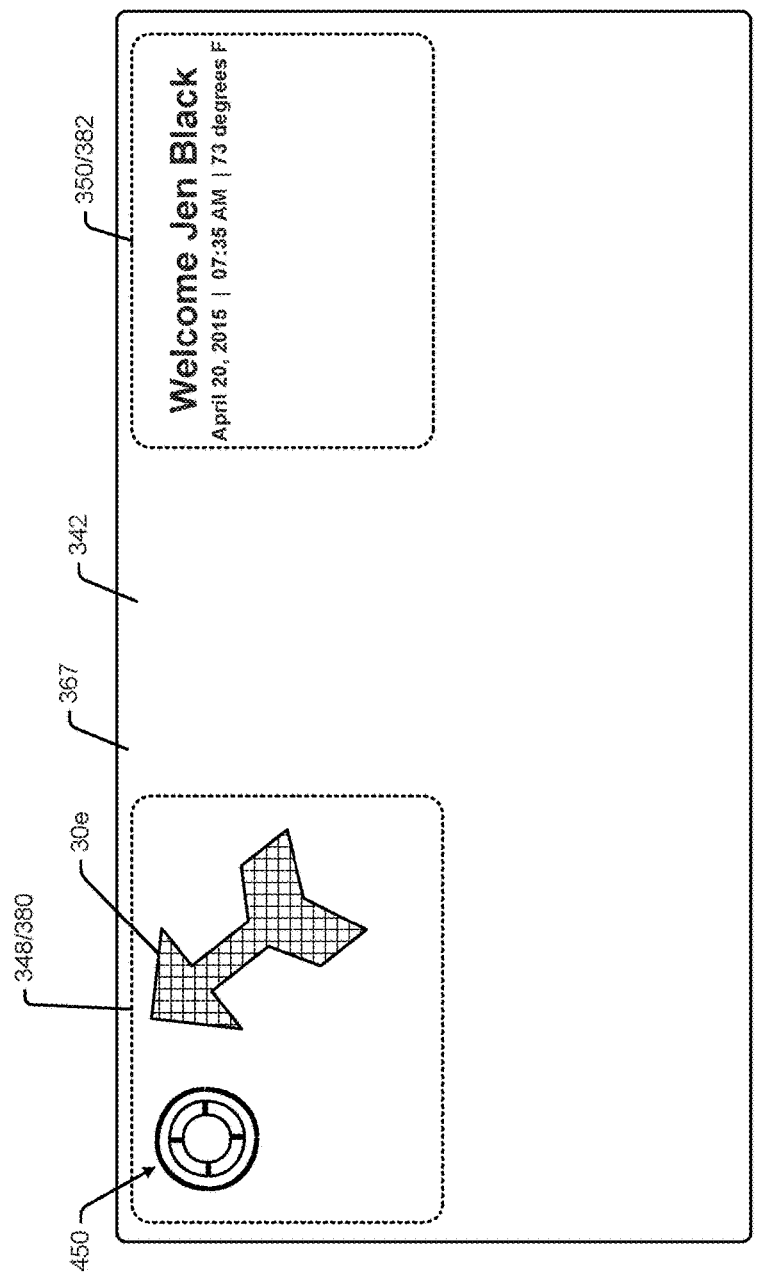
FIG. 23 is a front plan view of one of the screen assemblies shown in FIG. 17.

Referring to FIG. 23 and still to FIG. 22, in operation, when screens 380 and 382 are off or are generating a completely black image, the screen assembly 342 should have a substantially uniform appearance as sock 367 blocks an employee's view into the sock pocket. When an image is generated on either of the screens 380 or 382, the image can be seen through sock 367. Because the sock has a substantially uniform appearance, an employee observing the screen cannot see that the images are presented via two separate screens 380 and 382 and instead has the perception that a large flat panel screen is located within the assembly 342. Two small screens are often less expensive than one large screen and therefore the two screen assembly may be a less expensive alternative to a configuration including one large screen.

In at least some particularly advantageous embodiments, the screens 380 and 382 are not made available to employees for accessing personal content and instead are provided for the sole purpose of managing use of space affordances as well as for encouraging good work behavior within enterprise space. While the sock fabric over the screens still allows sufficient screen light to pass through to facilitate space affordance management, the fabric allows the screens 380 and 382 to sort of fade off and be completely hidden when no information is presented via the screens 380 and 382. Thus, while presented information is observable, the information is presented in a way that is, in reality, in the background and only secondary to content that an employee may be observing on her primary laptop or other computer displays screen supported on top surface 362. Thus, the space management content is subtly presented to a bench owning employee. The ways in which screens 380 and 382 may help manage space and encourage behavior are described in greater detail hereafter.

Figure 24:
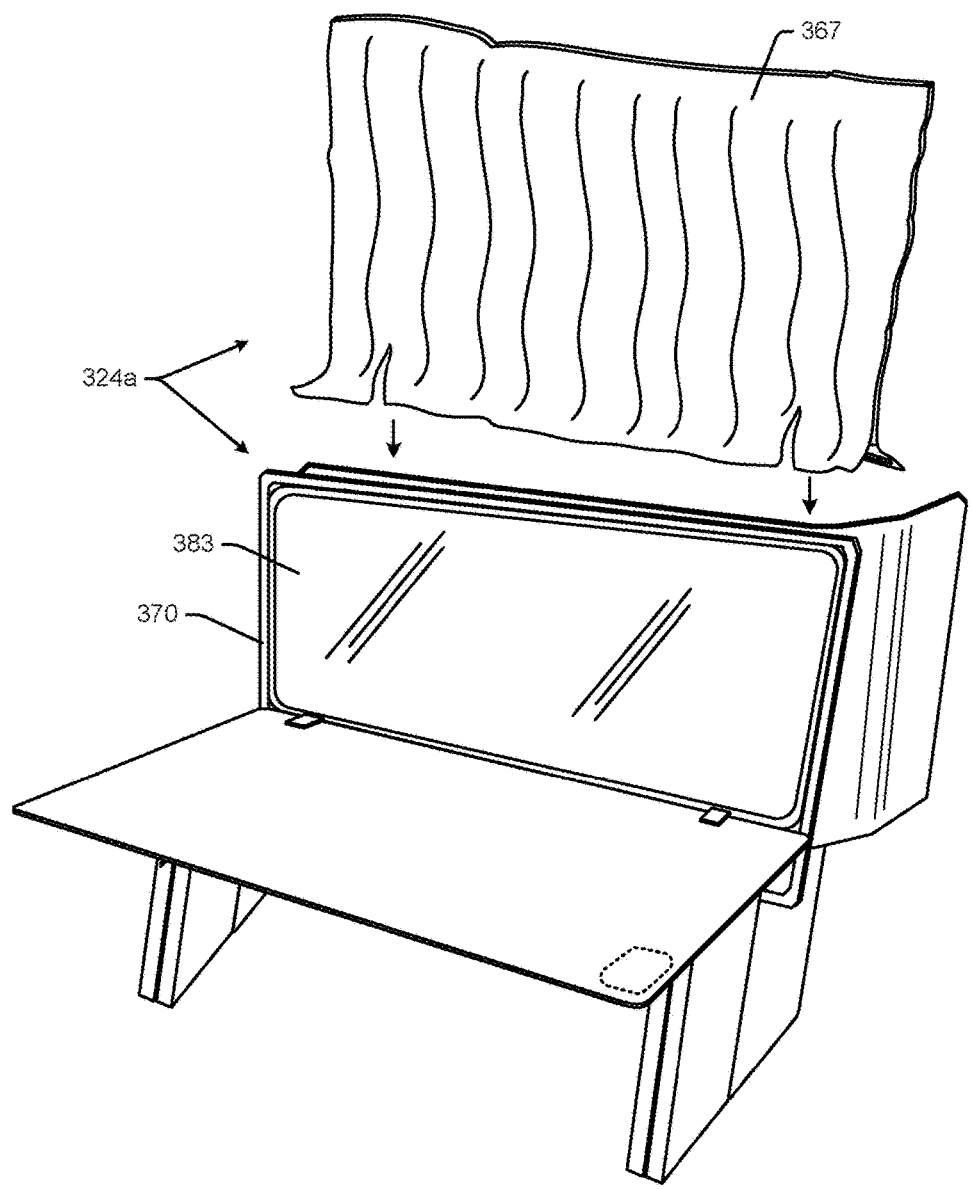
FIG. 24 is similar to FIG. 22, albeit showing a different screen configuration.

Referring to FIG. 24, a second embodiments 324a of an exemplary screen assembly is illustrated. Assembly 324a is similar to the assembly 324 shown in many respects and therefore, in the interest of simplifying this explanation, only differences between the two embodiments will be described here in detail. The primary difference between assembly 324 and assembly 324a is that assembly 324a includes one large flat panel display screen 383 mounted in an outer frame 320a as opposed to two smaller display screens 380 and 382 as in FIG. 22. In any embodiment including large screen 383, the entire front facing fabric panel of sock 367 will be knit to pass screen light or images while substantially hiding the inside of the sock pocket. Here, instead of only being able to present images at the upper right and left corners of the screen assembly 342 as in FIG. 23, images or other content may be presented at any location of the front facing surface of screen 383.

Just as different employees will prefer different ambient temperatures, different rates of air flow, different work surface heights, etc., it has been recognized that different employees will also have different screen arrangement preferences. For this reason, in at least some embodiments, different screen arrangements may be provided at different personal benches in a four pack configuration or, in the alternative, different configurations 60 may have different screen shapes that afford different levels of privacy to employees. Thus, in FIGS. 17 and 18, the primary difference between the personal benches 330b, 330c and 330d and bench 330a is that the screen assemblies associated with each of benches 330b, 330c and 330d are different than the screen assemblies associated with bench 330a. To this end, referring also to FIG. 25, bench 330b includes a screen assembly 354 that has two different sections including a rear section 420 and a side section 422. Rear section 420 is similar to screen assembly 324 described above, albeit including only a single small flat panel screen mounted within a frame structure behind sock section 424 as opposed to two small screens. The side section 422 extends from a right edge of the rear section 420 and generally along a lateral side edge of a work surface top member 421 associated with bench 330b. A second small flat panel screen is mounted in the side section 422 behind sock portion 426 to face the space over top member 421. In other cases the screens at each configuration 60 will have identical or substantially identical shapes and constructions.

Figure 25:
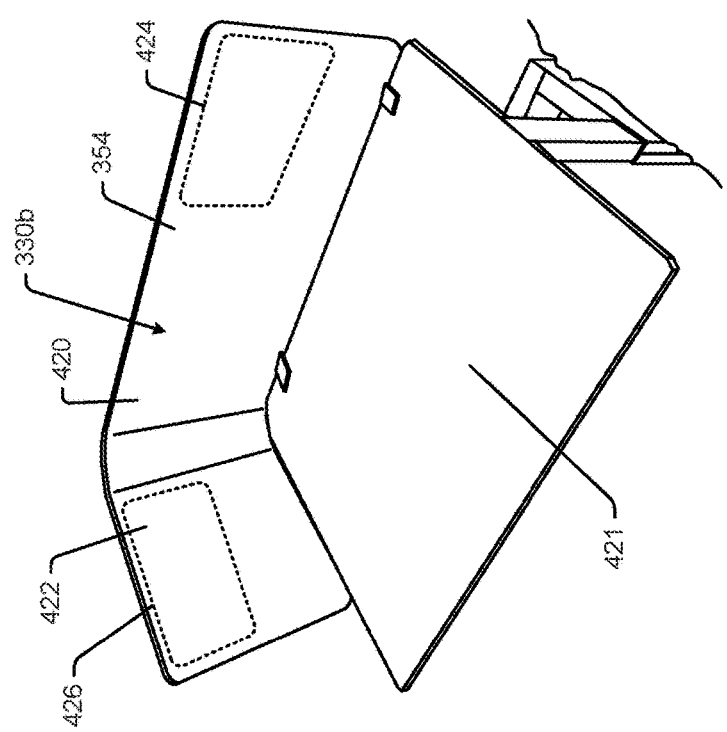
FIG. 25 shows yet another screen configuration where the screen includes a curved portion.

While not shown, a frame structure having the general shape shown in FIG. 25 with dual planar sections and a curved section there between is provided and a fabric sock is stretched over than frame to form the shape illustrated. Here, the screens behind sock sections 424 and 426 can be controlled to provide content as described hereafter. In this case, the sock has a substantially uniform appearance and the combination of the sock, frame and screens presents the illusion that images generated on the screens are part of a curved emissive structure.

Referring again to FIGS. 17 and 18, bench 330c includes a "stepped" screen assembly 352 that has lateral rectangular sections which extend to different heights and a central section that angles upward from a lower lateral section to the upper lateral section. Here, an internal frame structure forms the stepped shape in general. A single small flat panel display screen is mounted to the internal frame adjacent a sock section 359. A sock forms a pocket generally shaped like the internal frame and is stretched thereon and secured as described above. Here, when the screen behind fabric section 359 generates an image, the image is seen through the fabric sock. Fourth bench 330d has a configuration that is similar to the configuration of bench 330c with a stepped screen assembly, albeit where the stepped screen assembly steps in the direction opposite screen assembly 352. Thus, when the work surfaces at benches 330c and 330d are at the same height, the top edges of the screen assemblies at benches 330c and 330d are aligned as shown in FIG. 17. Consistent with the discussion above, referring again to FIG. 3, another employee preference stored in database 76 may be bench screen arrangement. Many other screen configurations that have different shapes to afford different levels of privacy are contemplated.

Figure 32:
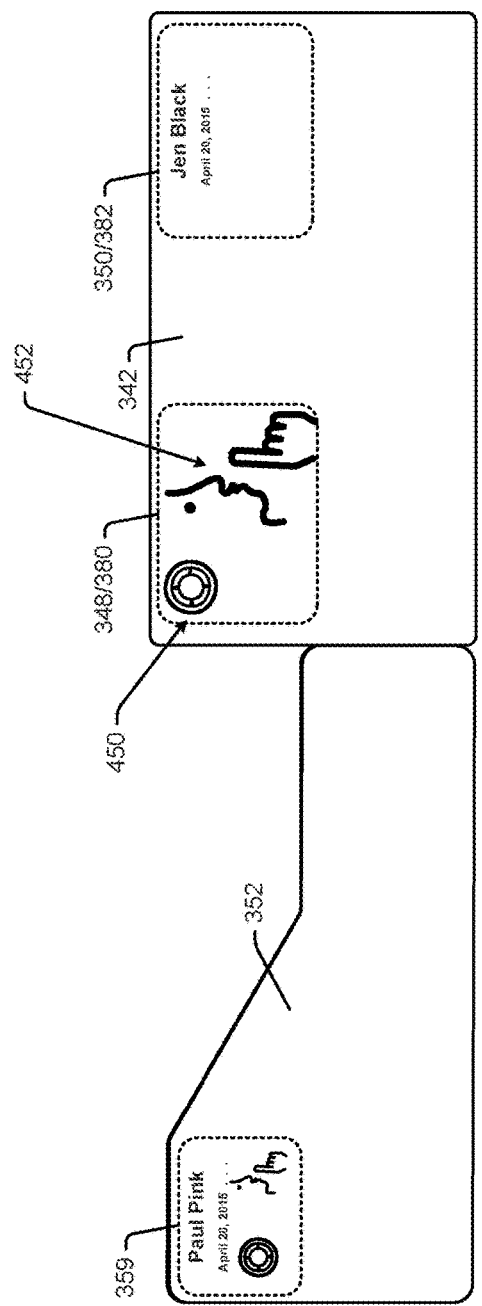
FIG. 32 shows two different types of personal bench screen configurations.

Hereinafter, unless indicated otherwise, it will be assumed that the screen assembly 342 in FIG. 23 and in the figures that follow is associated with bench 330a. In addition, it will be assumed that screen 352 shown in FIG. 32 is associated with personal bench 330c.

Referring again to FIG. 23, screens 380 and 382 at bench 330a may be controlled by system server 20 to perform different tasks at different times and depending upon specific employee ownership. For instance, when no employee is associated with bench 330a, either one of the screens 380 or 382 may be used as part of an employee visual indicator guidance system to guide an employee about within space 12a (see again FIG. 1). For instance, see that the area of screen 380 labeled 30e is vertically and horizontally cross hatched to indicate a pink color. The pink color may be presented as an employee is moving through space 12a to guide that employee to a different personal bench as described above. In other cases, where an employee is travelling to a specific conference space in area 12a that is remote from a current location, area or visual indicator 30a may be illuminated pink as a guide to the employee along one leg of her travel. When an employee moves within sight of an assigned bench, an indicator 30e that is presented by the assigned bench may present a pulsing pink color as an indication of a final destination for the employee and to distinguish that bench from others along the employee's travel path. After a first employee has taken ownership of a bench and prior to the employee arriving at the bench, server 20 may control devices at the bench to indicate ownership to other employees in the area to avoid a case where a different employee takes control or ownership of the bench prior to the first employee arriving at the bench. For instance, lighting devices at the bench may generate yellow light to indicate a travelling owner.

Referring still to FIG. 23, prior to or when an employee arrives at an assigned personal bench 330a, a salutation may be presented by one of screens 380 and 382. For instance, see in FIG. 23 that screen 382 presents the welcoming phrase "Welcome Jen Black", along with some information about the current time and environmental parameters (e.g., a date, a time, current temperature, etc.).

Shortly after (e.g., 3 minutes after) an employee settles in at bench 330a, the welcoming salutation may be automatically removed (e.g., fade away) and be replaced by employee identifying information such as the employee's name. To this end, see FIG. 27 where screen 382 presents the name "Jen Black" as a sort of name plate for the employee that temporarily owns the bench. In addition, while an owning employee is present at a bench, some visual indicators may be controlled to indicate ownership (e.g., a green edge lit device or the like).

In at least some embodiments, an employee may be able to specify other types of information that the employee would like to have server 20 present upon arrival at an owned bench or other affordance configuration. For instance, server 20 may be able to run a plurality of widgets to generate different types of real time information like the current date and time, outside temperature, recent sports team updates, locations or statuses of team members or other specific employees, an employee task list, etc. and may use content from the widgets to populate different sections of the screens 380 and 382. To this end see the exemplary date, time and weather information presented on screen 382 in FIG. 23.

In addition to operating as a temporary employee guidance visual indicator, to welcoming an associated employee, and to presenting identifying information for an associated employee, in at least some embodiments it is contemplated that one or both of screens 380 and 382 may be used as output devices in an employee preference signaling system. To this end, it has been recognized that in most cases employees desire to be respectful of their co-worker's time and work environment preferences. One problem that can occur in generally open space environments is that employees are unaware of co-worker's instantaneous preferences and, in many cases, coworkers will not feel comfortable confronting each other when those preferences are not met. This is particularly true in the case of sound or noise preferences where a co-worker may either desire or need her work environment to be quiet and another employee in her general area is unaware of her preference and therefore makes no effort to minimize sound. In this case, the co-worker's options are to confront the employee or ignore the employee, neither of which are particularly appealing.

To address the unexpressed preferences problem, in at least some embodiments of the present disclosure a signaling system is provided where each employee using one of the personal benches (e.g., 330a, 330b, etc.) shown in FIGS. 17 and 18 can signal to other employees at other adjacent benches, that the employee desires or needs a quiet environment. In this regard, see the exemplary sound preference indicator 450 shown in FIGS. 23 and 26 that may be provided by server 20 on screen 380. The idea here is that any time any employee at any one of the adjacent benches 330a, 330b, 330c and 330d desires a quiet environment, the employee can simply indicate so by changing the appearance of indicator 450. In at least some cases a separate indicator may be presented via a screen 380 at each of the personal benches 330a, 330b, 330c and 330d so that any employee at any of the benches has an indication when any other employee at one of those benches has requested a quiet environment. Thus, see FIG. 32 where separate instances of indicator 450 are provided by screens 359 and 380 at adjacent personal benches.

In some cases each indictor 450 may be extremely simple such as for instance, a symbol where the color of the symbol is changed to indicate different sound preferences. For instance, each symbol instance 450 may be green when no employee has indicated a preference for quiet and may be changed to red when at least one employee at configuration 60 has indicated a quiet preference.

Figure 26:
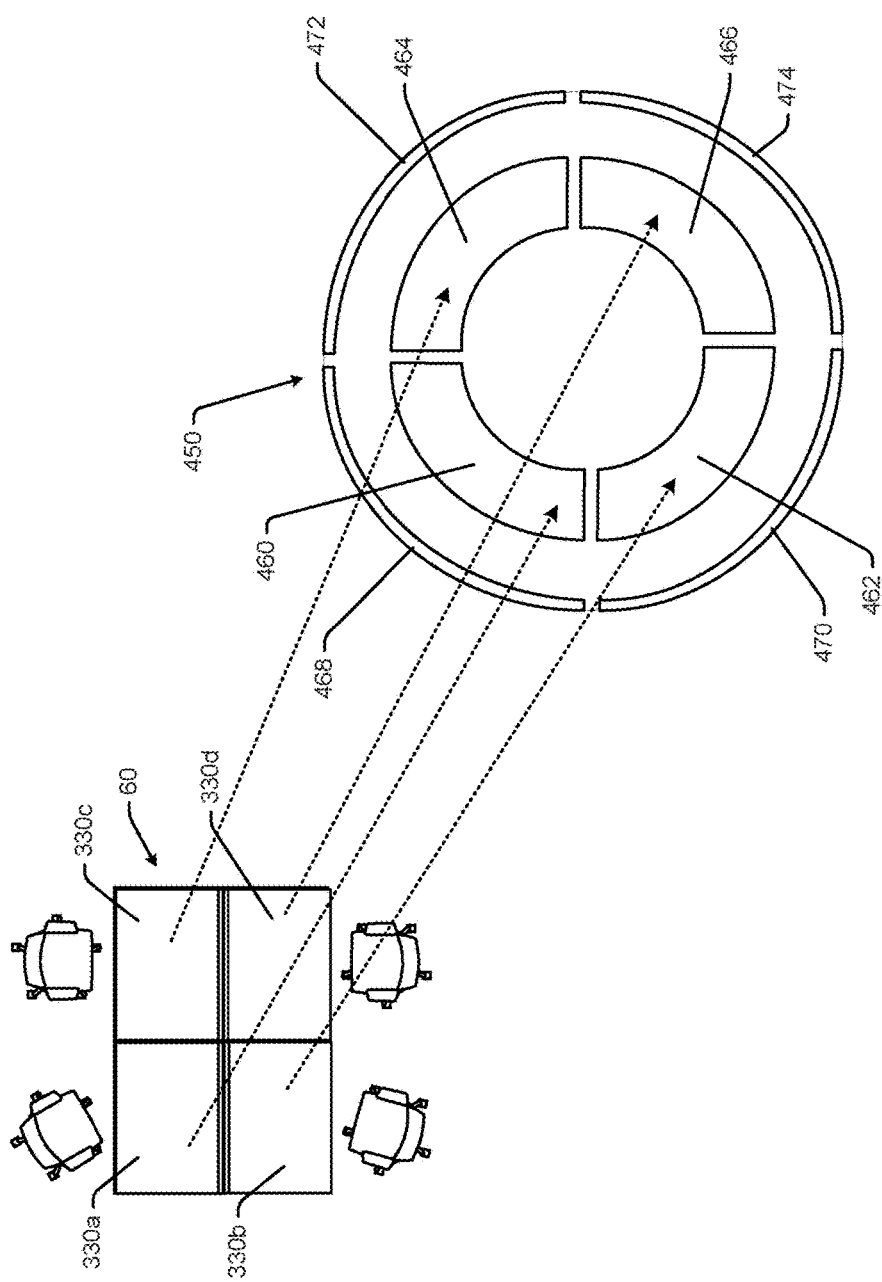
FIG. 26 is a schematic view illustrating a silence preference indicator and showing the relationship of indicator quadrants to different personal bench configurations in a four-pack of personal benches.

In other cases, each indicator 450 may include separate indicators for each of several personal benches located proximate a specific bench. For instance, see in FIG. 26 that indicator 450 includes four separate indicator segments 460, 462, 464 and 466 that are arranged as four quarters of a circular shape. In addition to showing sound preference indicator 450, FIG. 26 also shows a top plan view of the benches 330a, 330b, 330c and 330d associated with configuration 60 in FIGS. 17 and 18. The dashed line arrows in FIG. 26 indicate associations of benches 330a through 330d to the indicator segments. In FIG. 26, the first quarter indicator 460 corresponds to first bench 330a, second quarter indicator 462 corresponds to the second bench 330b, the third quarter indicator 464 corresponds to third bench 330c and the fourth quarter indicator 466 corresponds to fourth bench 330d.

Indicator quarter segments 460, 462, 464 and 466 are arranged to mirror the layout of corresponding benches 330a, 330b, 330c and 330d, respectively. For instance, lower right hand segment 466 is in the same juxtaposition with respect to segments 460, 462 and 464 as is the corresponding fourth and lower right hand bench 330d to the other benches 330a, 330b and 330c.

In operation, in addition to indicating that at least one employee at one of the benches 330a, 330b, 330c and 330d has requested quiet, indicator segments 460, 462, 464 and 466 can be controlled to indicate which bench is occupied by an employee that has expressed a desire for quiet. Thus, for instance, in FIG. 26, if no employee at configuration 60 has requested quiet, each of segments 460, 462, 463 and 466 may be green. If an employee at bench 330a has requested quiet, corresponding indicator 460 may be changed from green to red to indicate that the employee at the corresponding station 330a has requested quiet while the other three segments 462, 464 and 466 remain green. If a second employee at bench 330c requests quiet also, segment 464 associated with bench 330c may also be turned red.

Referring yet again to FIG. 26, as indicated above, a separate indicator 450 may be presented at each of benches 330a, 330b, 330c and 330d so employees at each bench have an indication of quiet preferences at configuration 60. Because benches 330a and 330c face in a direction opposite benches 330b and 330d, the segments in indicators 450 presented at benches 330a and 330c will align differently with the benches 330a through 330d than will the segments in indicators at benches 330b and 330d. Thus, for instance, in FIG. 26, when segment 466 is red and the other segments 460, 462 and 464 are green at each of benches 330b and 330d to indicate that the employee at bench 330d has requested quiet, segment 460 will be red and the other segments will be green at benches 330a and 330c to indicate that the employee at bench 330d has requested quiet.

In at least some cases indicators 450 will be provided to support people who are color blind by changing the appearance of the indicator 450 when the quiet preference changes. To this end, see yet again FIG. 26 where, in addition to including inner segments 460, 462, 464 and 466, indicator 450 includes outer segments 468, 470, 472 and 474 that are associated with the inner segments 460, 462, 464 and 466, respectively. In this case, in addition to or instead of changing segment color from green to red to indicate different quiet preferences, the outer segments 468, 470, 472 and 474 may be turned off and on to indicate quiet preference requests. For example, where no employee at configuration 60 has requested quiet, green segments 460, 462, 464 and 466 may be presented and the outer segments may not be presented. If an employee at station 330d requests quiet, in addition to changing segment 466 to red, server 20 may present a red outer segment 474. Here, a color blind employee should be able to perceive that segment 474 is presented while the other segments 468, 470 and 472 are not presented and therefore should be able to discern that the employee at bench 330d associated with segment 474 has requested quiet.

Referring again to FIG. 21, button 404 may be selectable to toggle between a quiet request and no request. Thus, where an employee selects button 404 a first time, server 20 may issue a quiet preference and when the employee selects button 404 a second time, the server 20 may toggle back to the no request state.

Even when a quiet preference has been expressed and is indicated via indicators 450, employees may forget the preference request at times and may start a conversation or otherwise generate sound in an area. While an employee that requested quiet could remind other employees in the area that she wants a quiet environment, the need for such confrontation will make at least some employees uncomfortable.

To address the quiet reminder issue, in at least some embodiments of the present disclosure, sound sensors may be provided throughout a space 12a to generate data useable to assess if sound volume is above some threshold level in a subarea of space 12a and, where volume is above the threshold level, a quiet reminder may be presented via the screens 380 and 382 in the subarea. For instance, see again FIG. 19 where a sound sensor 453 (e.g., a microphone) is shown mounted to the underside of work surface top member 340 for measuring the level of sound generated at an associated bench. See also FIG. 27 where a quiet reminder indicator 452 is shown. Here, if the volume of sound sensed by sensor 453 is above a threshold level, server 20 may present indicator 452 via screen 380. The indicator 452 may be presented until the excessive volume subsides or for a few seconds thereafter. The indicator 452 may be presented at each bench in a configuration 60 where volume level is above the threshold level at at least one of the configuration 60 benches or may only be presented at specific benches where the volume exceeds the threshold level.

In at least some cases where at least one sound sensor (e.g., microphone) is located at or at least proximate each personal bench, server 20 may run a program on received sounds at a set of sound sensors to identify one or a small group of benches from which the excessive volume is emanating and may only provide the quiet reminder indicator 452 at that bench or set of benches. For instance, in FIG. 26, where an employee at bench 330a is using a phone to talk loudly to a remote person, the volume at each of benches 330a through 330d may exceed the threshold level even though only the employee at bench 330a is speaking loudly. Here, the sound sensors (e.g., 453) at each of the benches 330a through 330d may pick up sound that exceeds the threshold level. However, by comparing the picked up sounds, server 20 may be programmed to recognize that the picked up voice signal is the same voice signal at each bench and that the signal is substantially louder at bench 330a than it is at the other benches. In this case, server 20 may be programmed to recognize that the sound is emanating from bench 330a and therefore may only present the quiet reminder indicator 452 at bench 330a.

In at least some cases it is contemplated that when an employee has requested quiet at a bench and temporarily leaves the bench (e.g., goes to a rest room), the system may sense that the employee has at least temporarily left the bench and may change the quiet preference status indicated to others in the area. Thus, for instance, referring yet again to FIG. 26, if a first employee at bench 330d has expressed a preference for quiet which is indicated by making segment 466 red, if the first employee gets up and leaves bench 330d, the location tracking system in space 12a may be used to recognize that the first employee has left bench 330d and segment 466 may be changed to green. In the alternative, in the same set of circumstances, when the first employee at least temporarily leaves bench 330d, server 20 may change segment 466 to yellow to indicate that the employee associated with bench 330d is only temporarily gone and that, when she returns, she will continue to prefer a quiet environment. Thus, the change is status of segment 466 should indicate to others at configuration 60 that they can converse or otherwise perform relatively noisy tasks for at least some time. In this example, when the first employee is on her way back to bench 330d, when the employee gets within some threshold distance (e.g., 30 feet) from bench 330d, server 20 may change segment 466 back to red prior to her arrival at bench 330d to indicate to others at configuration 60 that the first employee is returning.

Figure 28:
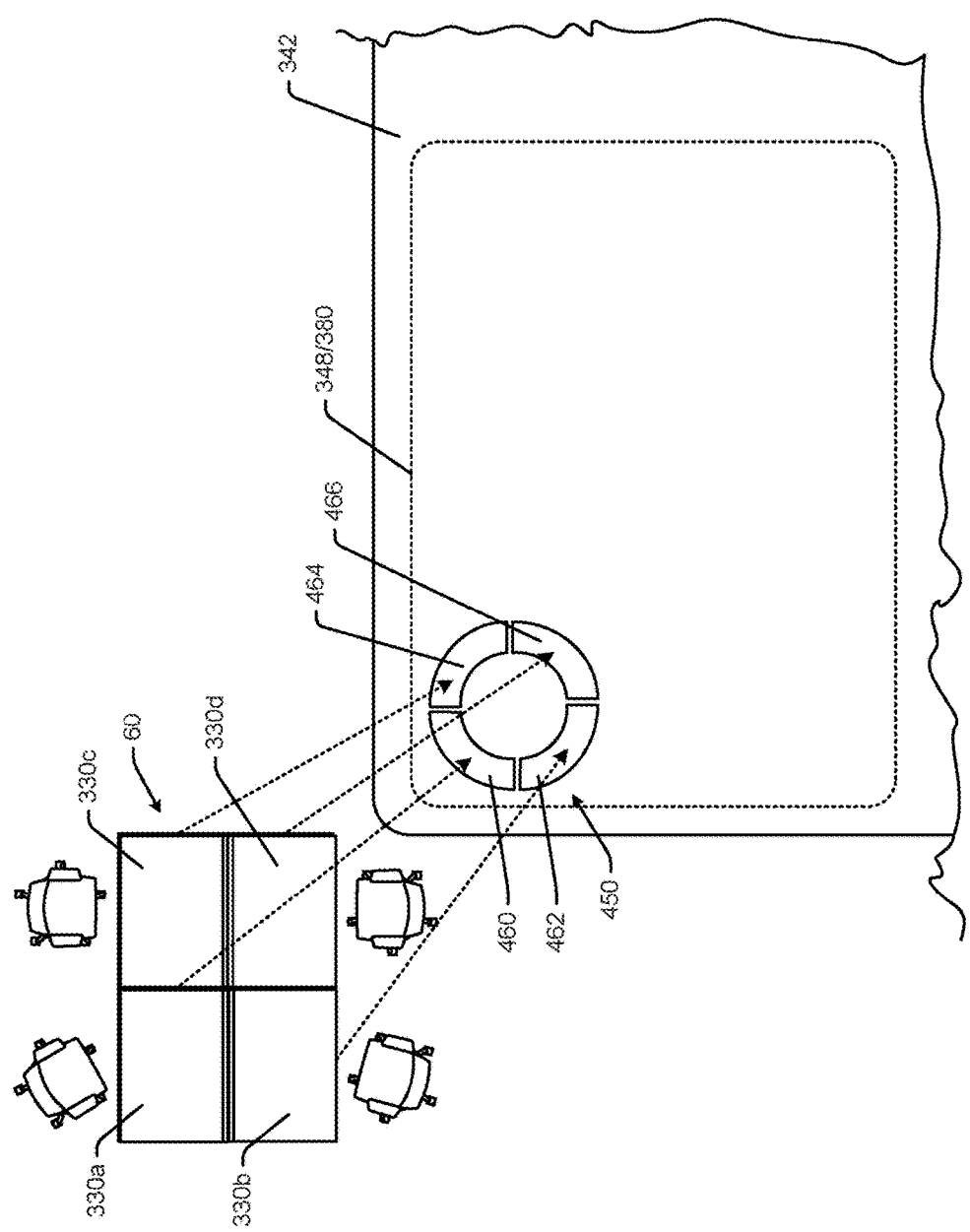
FIG. 28 is similar to FIG. 26, albeit showing an exemplary silence preference indicator in a different state.

Referring now to FIG. 28, exemplary four quarter indicator 450 is shown at a time when no employee at configuration 60 has indicated a quit preference. Consistent with the above description, only the inner segments 460, 462, 464 and 466 are shown. Each of segments 460, 462, 464 and 466 may be colored green indicating that no one has requested quite at configuration 60.

Figure 29:
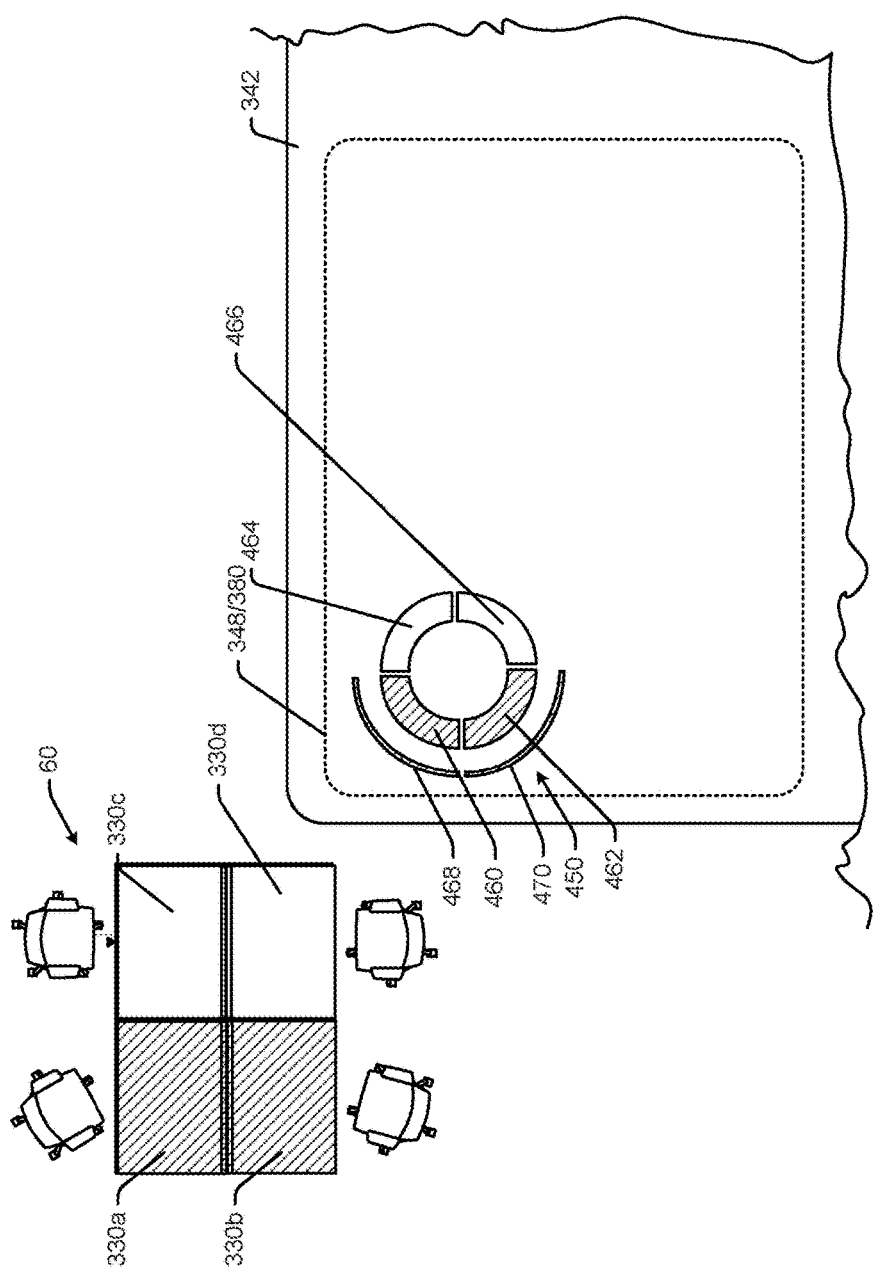
FIG. 29 is similar to FIG. 28, albeit showing the silence preference indicator in another state.

Now assume that first and second employees at benches 330a and 330b have each indicated that they prefer a quiet environment. In FIG. 29, the quiet preferences of employees at benches 330a through 330d are indicated by crosshatching which indicates a quiet preference request and no cross hatching which indicates no quite preference request. In FIG. 29, each of segments 460 and 462 are shown highlighted via cross hatching to indicate a red color. In addition, outer segments 468 and 470 are now presented to aid color blind employees in assessing the quiet request status. Segments 464 and 466 remain green in this example.

In some cases the quiet indicator may default to indicate that no request for quiet has been issued and therefore employees that want a quiet environment would have to affirmatively generate a quiet request. In other cases, the quiet indicator may default to indicate quiet and employees would have to affirmatively indicate that they do not care about the volume of noise in a space. In some cases the quiet indicator default may be different in different subareas of a space 12a, where some areas designated to be quiet may default to indicate quiet and other areas designated to be less quiet may default to indicate the opposite state.

In at least some embodiments it is contemplated that when an employee is associate with one personal bench but there is a different bench that more closely meets the employee's preferences, server 20 may control screens 380 and 382 to suggest a different bench association. For instance, assume that a first employee at bench 330a in FIG. 29 has indicated a preference for quiet as reflected by the cross hatched segments 460 and 468. Also assume that the quiet volume threshold is repeatedly exceeded by other employees at benches 330b, 330c and 330d over a short period of time. Moreover, referring again to FIG. 1, assume that server 20 is monitoring sound volume at bench 330e in the lower left hand corner of space 12a as illustrated and that the volume level at bench 330e is relatively low. In this case, server 20 may be programmed to recognize that the first employee's sound preference is best achieved at bench 330e instead of at bench 330a and may, therefore, suggest via screen 382 that the first employee move to bench 330e. To this end, see FIG. 30 where server 20 suggests a bench change to the first employee. Here, if the first employee decides to move to the newly suggested station, server 20 may assign a visual indicator guidance color (e.g., pink, blue, orange, etc.) to the first employee and then illuminate a string of the visual guidance indicators with the assigned color to guide the employee to the new space. In this regard, see the assigned guidance color at 471 and the string of visual indicators 30f, 30g, 30h and 30i in FIG. 30 illuminated with the guidance color to lead the first employee to the new bench.

In a similar fashion, screens 380 and 382 may be driven by server 20 to automatically provide other information to an employee. For instance, system server 20 may track an employee's schedule and provide schedule warnings to the employee. For example, see FIG. 31 where server 20 presents a scheduling message to Jen Black via screen 382 indicating that a next meeting starts in 10 minutes in Team Studio 2. See also that the server suggests that Jen Black take her supplies with her and associate with a different bench after her meeting. Here, the server 20 may suggest a different bench based on the employee's preferences, locations of team members after the employee's next meeting and the location of Team Studio 2.

Figure 30:
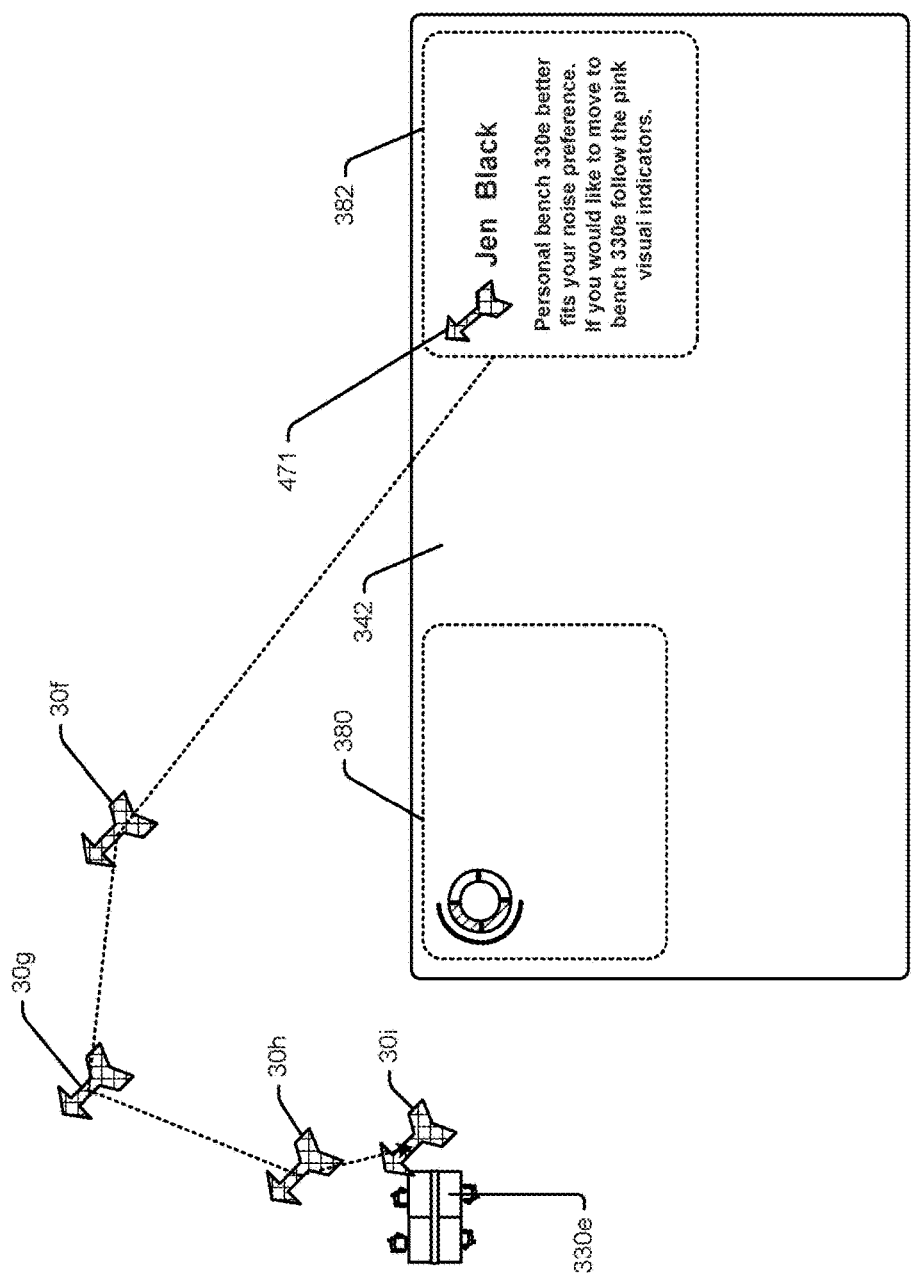
FIG. 30 is similar to FIG. 23; albeit showing an exemplary string of visual guidance indicators for leading an employee to a different location within an enterprise space.
Figure 31:
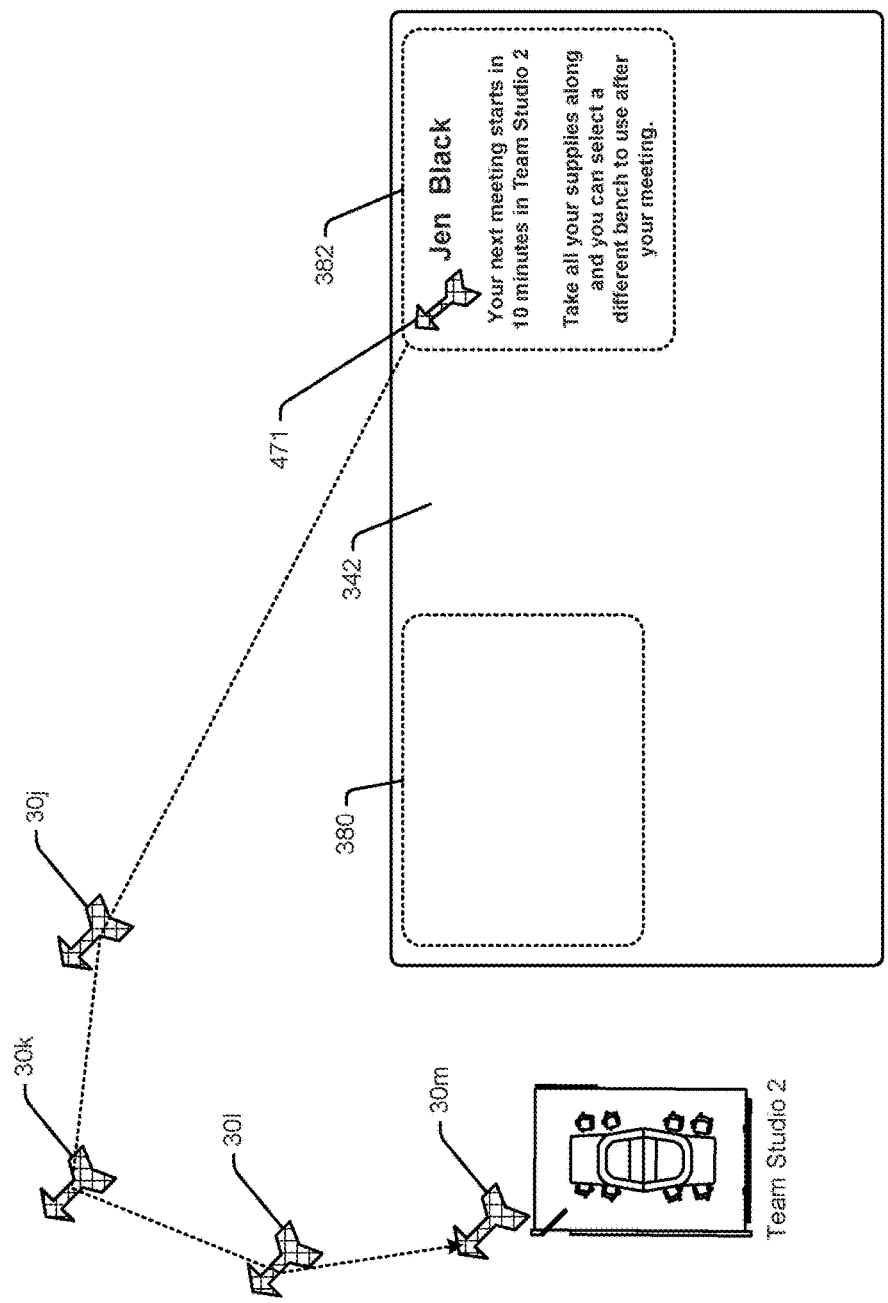
FIG. 31 is similar to FIG. 30, albeit showing a different set of visual guidance indicators.

As in the case of FIG. 30, in FIG. 31, the server selects a visual guidance color for the employee and indicates the color at 471. In addition, server 20 illuminates a string of visual guidance indicators with the assigned color to guide the employee to Team Studio 2. In this regard, see the assigned guidance color at 471 and the string of visual indicators 30*j*, 30*k*, 30*l* and 30*m* in FIG. 31 illuminated with the guidance color to lead Jen Black to Team Studio 2.

As another instance, while a first employee is working at a personal bench, if a second employee on the first employee's team arrives in the general area, server 20 may present a message to the first employee via one of screens 380 or 382 indicating that the second employee has arrived. The message may be text or, in some cases, may show the location of the arriving employee on a space map. Similarly, if the second employee assumes ownership of a personal bench, server 20 may present a message via one of screens 380 or 382 indicating which bench the second employee temporarily owns. If the second employee has an unscheduled period in his day, server 20 may indicate the unscheduled period upon arrival of the second employee or a few minutes before it occurs so that the first employee can determine if she should attempt an impromptu meeting with the second employee.

In at least some cases, server 20 may be programmed to only present messages to a bench user at specific times. For instance, server 20 may only present messages to an employee at a bench within 10 minutes of any transition in the employee's schedule (e.g., within the first ten minutes after a transition to the bench from some other activity and within the ten minutes prior to a transition from the bench to a next scheduled activity) so that the messages do not disrupt flow of employee activities at the bench. As another instance, server 20 may only present messages to an employee at specific times (e.g., at lunch, during a 2 pm break, etc.) specified in employee preferences.

As yet one other instance, if a first employee associated with a bench gets up and leaves the bench for some reason, server 20 may automatically provide a message via screen 380 and/or screen 382 at the associated bench indicating that the employee has left but intends to return to the bench. Where the employee has left an associated station and is at a scheduled meeting, server 20 may determine the duration of the scheduled meeting from the employee's schedule or from a space schedule and may include a likely return time for the absent employee to the bench.

A do not disturb indicator 439 (see FIG. 27) may be provided that can be controlled by an employee to indicate that the employee does not want to be disturbed by others. In some cases the do not disturb indicator may be in addition to the quiet preference indicator while in other cases the do not disturb indicator may be provided instead of the quiet preference indicator.

In addition to the screen 342 and 342*a* constructions described above with reference to FIGS. 22 and 24 above, other screen constructions are contemplated. For instance see FIG. 33 where other exemplary screens 342*b* and 352*b* are show. Screen 352*b* is similar to screen 352 shown in FIG. 32 except that screen 352*b* also includes an edge light indicator device 495 along the angled portion of the top edge of the assembly 352*b*. Screen assembly 342*b* also, similarly, has an edge light indicator device 493 formed in the upper portion of the lateral vertical edge that is adjacent screen assembly 352*b*. Here, it is contemplated that the edge light devices 493 and 495 may be controlled to generate different color light at different times. For instance, in some cases each device 493 and 495 may be controlled to function as one of the guidance visual indicators in the system to guide employees within space 12*a* to different resources. At other times, devices 493 and 495 may be controlled as part of the preference indicator system. For instance, where an employee at the bench including screen assembly 342*b* has not indicated a preference for quiet, device 493 may be controlled to generate green light and, after the employee indicates a quite preference, device 493 may generate red light. Because device 493 is an edge light, light generated thereby is visible at the bench associated with screen assembly 352*b* as well as by an employee at a bench that is diagonally juxtaposed within the bench including device 493 (e.g., see the diagonal benches 330*a* and 330*d* again in FIG. 17).

Figure 33:
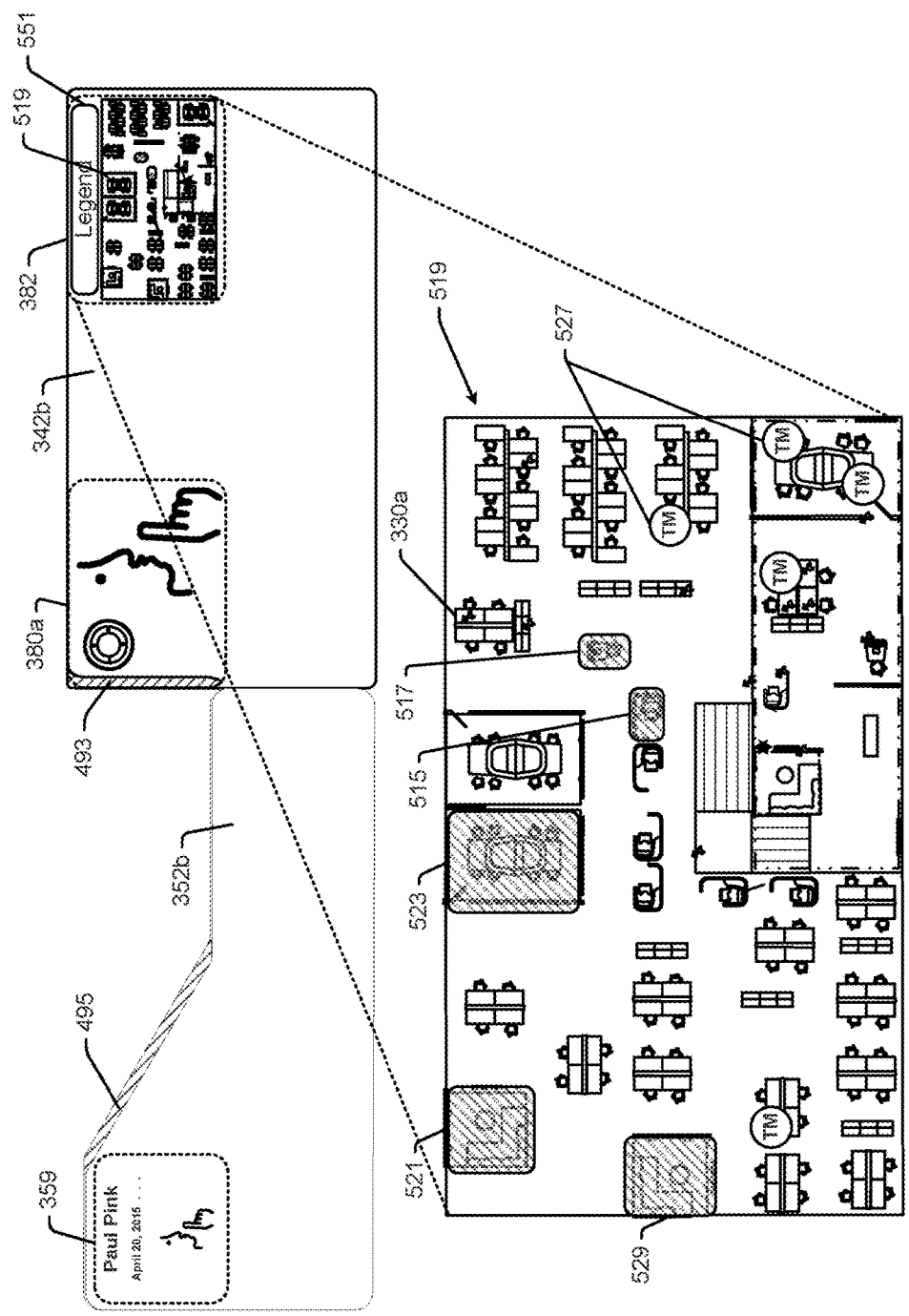
FIG. 33 is similar to FIG. 32, albeit showing yet other types of screen configurations.

Referring still to FIG. 33, device 495 may be controlled in a fashion similar to device 493 as a guidance indicator. Device 495 is advantageously positioned to be viewed, at least at times, by employees at each of the four benches in a configuration 60. To this end, device 495 can be viewed by an employee at the bench including screen 352*b*. Device 495 is low enough that an employee at the bench opposite the bench including screen assembly 352*b* should also be able to see device 495. Because device 495 is angled, employees at the benches that are laterally adjacent and diagonally juxtaposed to the bench including screen assembly 352*b* should also be able to see device 495.

Although not shown, in some embodiments, screens akin to screen 352*b* in FIG. 33 may be provided at each of four benches in a configuration 60 where the lower height ends of the screens are centrally located with respect to the configuration 60. In this case, indicator devices like 495 would be visible from each of the four benches in a configuration, at least when the screen assemblies are at the same height levels.

Referring still to FIG. 33, device 495 is shown as a device separate from screen 359. In an alternative design, screen 380*a* may have a curved emissive edge to it and therefore, a single curved edge screen 380*a* may provide both a flat emissive surface for signaling as well as the edge indicator 493. In this regard, U.S. patent application Ser. No. 14/500, 091 which was filed on Sep. 29, 2014 and which is titled "Curved Display And Curved Display Support" describes curved display systems and is incorporated herein in its entirety by reference.

In other embodiments, a large flat panel display screen may not be covered with a fabric sock. For instance, see again FIG. 24 where a single large screen 383 is provided. In FIG. 24, the sock 367 may not be provided. In this case, additional personalizing content may be automatically provided on screen 383 when an employee is associated therewith. For instance, an employee may want family pictures presented on screen 383 or an image of a nature scene or something to that effect. In still other embodiments, a simple large flat panel display including at least one curved edge may replace the screen assembly in FIG. 24 completely and signaling may be controlled on the flat surface of that screen or on one of the emissive edges in any of the ways described herein. In still other embodiments one or two small flat panel displays may be mounted on the outside of a fabric screen assembly to provide all or a subset of the functions described above with respect to screens 380 and 382.

In still other embodiments visual indications may be provided via bench affordances in other ways. For instance, see again FIG. 17 where bench 330*a* includes an upwardly aligned projector 503 that can project an image 505 on an ambient ceiling surface 501. Here, at least some of the signally described in this disclosure may be presented on ceiling surface 501. For instance, guidance indicators may be provided on a ceiling surface, quiet preferences may be projected on a ceiling surface, etc. In this case, because the ceiling surface 501 above configuration 60 is visible from all benches associated with the configuration, it may be that only one projector is required to present signaling to all configuration 60 stations. Similarly, see FIG. 19 where a projector 507 is mounted to the undersurface 363 of a work surface top member 340 to project signaling at 509 on an ambient floor surface 511. Here, any signaling described in this disclosure could be presented on the floor surface. In still other cases, edge lighting may be provided in one or several edges or edge sections of table top member 341 or light devices may be mounted to the under surface of member 341 to create a glowing light effect below top member 341 for signaling purposes.

Where bench devices are used as visual guidance devices in a space 12*a*, server 20 may be programmed to, if possible, only use bench devices located at benches that are not currently owned by an employee for guidance activities. Thus, for instance, where first, second and third benches are located along an employee's path through space 12*a* such that signaling devices associated with each of the three benches are viewable from a specific location along the path and the first and second benches are currently owned by employees, server 20 would select the third bench and only control the third benches indicator device to facilitate guidance. In this way, while a bench device is used to visually guide an employee through the space 12*a*, the guidance activity should not disturb the employees that own the first and second benches.

In at least some cases server 20 may be programmed to select paths to resources in space 12*a* based on locations of benches and other resources instantaneously owned by other employees. For instance, where five employees are located in a quiet subarea of space 12*a* and a sixth employee uses a reception screen to take ownership of another bench located on the other side of the quiet subarea, server 20 may select an indirect path to the bench owned by the sixth employee so as to avoid additional foot traffic past the quiet subarea. Similarly, server 20 may, in effect, cause some subspace areas to be quiet or to have minimal foot traffic in a dynamic fashion by routing employees along paths that avoid the subspace areas.

In at least some embodiments a bench configuration 60 may be used with other subassemblies designed to perform other functions such as affording additional privacy, providing storage locations for a book bag or brief case, etc. To this end, see again FIG. 17 where a shelving assembly 55 is shown adjacent a lateral edge of configuration 60. Shelf assembly 55 includes rigid planar members that are assembled to form a storage space 562 that opens to the side on which configuration 60 resides adjacent benches 330*c* and 330*d*. A shelf member 656 is provided in space 652 and sliding doors may be provided below shelf member 656 to provide at least some concealed storage space.

In at least some embodiments it is contemplated that a sensor device 658 may be provided in space 652 for sensing if any objects are located in space 652. Here, for instance, if a briefcase 660 is located in space 652, the sensor 658 would generate a signal indicating that an object is located in space 658. The object presence signal would be provided to the system server 20 for processing. In some cases the space 652 will be divided by wall members 659 or shelf members into different spaces to be used by employees associated with each of the benches 330*a*, 330*b*, etc. In this case, a separate object sensor 658 may be provided in each of the subspaces.

When an employee leaves a bench associated with a storage space 652 and an object belonging to the employee is left in the space 652, system server 20 may be programmed to provide a signal to the employee that the object has been left behind. Thus, for instance, the server 20 may transmit an e-mail or other message to the employee warning that the object has been left. As another example, server 20 may be programmed to use one or more of the reception display screens 84 to indicate to the employee that the object has been left behind.

Referring yet again to FIG. 17, instead of or in addition to storage assembly 650, storage shelves may be provided for one, a subset or each of the configuration 60 benches. To this end, see exemplary shelf assembly 670 that is mounted to the lower leg structure 332 and that forms an upwardly opening space 672. A bag, briefcase or other supplies or materials may be placed in space 672 for storage. An object sensor 674 is shown in space 672 for sensing when an object is present in that space.

Referring again to FIG. 17, in at least some embodiments, a rear wall member 654 of the shelf assembly 650 may be formed of opacity controllable glass so that the degree of transparency of that member can be adjusted from essentially clear to substantially completely opaque. Here, server 210 may automatically control opacity of member 654 as a function of preferences of employees that use benches at configuration 60. In other cases, controls may be provided at 360 to control wall opacity via employee commands.

Referring to FIG. 33, in at least some embodiments it is contemplated that a server 20 may be able to present a map representation as at 519 via screen 382 to show resource locations to an employee using a bench 330*a*. A control button 405 in FIG. 21 may be provided as part of the bench interface 360 for selecting a resource map view. Here, in at least some embodiments a default resource map view may include an abbreviated set of information that is selected to be most useful to an employee. For instance, when an employee at a bench accesses a map view, in most cases, a small set of resource information will include the information the employee is seeking. For instance, locations of team members, a next meeting location and locations of the instance of each available affordance configuration (e.g., the closest available focus station, the closest available kiosk configuration, the closest available enhanced privacy configuration, etc.) closest to the employee's location other than a bench will likely include the information the employee is seeking. See, for instance, FIG. 33 where an exemplary map representation 519 of space 12*a* is presented where an employee is at bench 330*a* on the map and the closest available focus station is highlighted at 515, the closest available amplification kiosk is highlighted at 517, the closest available enhanced privacy station is highlighted at 521, and the closest available team studio is highlighted at 523. Team member locations are indicated at 527 and a next meeting space is highlighted at 229. While each of the representation 519 highlights are indicated in the same cross hatching style, in other cases each may have a different color or otherwise be uniquely visually distinguished.

The idea behind presenting the most likely interesting information to an employee is to make it extremely simple for the employee to access that information. In many cases, team member location, next meeting location and the location of a closest resource of a specific type are the most sought types of information managed by the system server 20. In some cases selecting button 405 simply calls up representation 519 on screen 382 for the specific employee (e.g., indicating team members and next meeting location for that employee) and the specific bench location (e.g., indicating closest available resources of each configuration only as opposed to all available resources of each configuration type). If the employee wants to use an amplification kiosk it is likely the employee will want to use the available kiosk that is closest to the bench owned by the employee and therefore it makes sense to indicate only that available kiosk on representation 519. Similarly, if the employee wants to use a focus station or enhanced privacy configuration it is likely the employee will want to use the available configuration that is closest to the bench owned by that employee.

While all of the different closest instances of configurations may be presented on representation 519 in some cases, in other cases, consecutive selections of button 405 in FIG. 21 may cycle through locations of different resource types. For instance, a first selection of button 405 or a "double click" selection of button 405 may cause only team member locations to be presented on representation 519, a second selection of button 405 may cause only the location of a closest available amplification kiosk to be highlighted, a third selection of button 405 may cause only the location of a closest available focus station to be highlighted on representation 519 and so on. Here, when the locations of different types of resources are indicated on representation 519, a text title or legend may be presented to clearly indicate which resource is being shown. For instance, when the location of a closest available focus station is highlighted on representation 519, a legend at 551 may indicate "Closest Available Focus Station", when the location of a closest available kiosk is highlighted on representation 519, legend 551 may indicate "Closest Available Amplification Kiosk", and so on.

In some cases it is contemplated that an employee may be able to select one of the highlighted resources on representation 519 in some fashion to start a visual guidance process similar to the process described above for locating an owned bench. For instance, in a case where selection of button 405 cycles through highlighting different types of closest available resources one at a time, with one resource type highlighted, a prolonged next selection of button 405 may cause selection of the highlighted resource and start a guidance process. Here, as above, the guidance process may include presenting a color or other indicator assigned to the employee via screen 382 and then controlling a string of indicators 30 along a path to the selected resource. Where an employee indicates that she intends to own a selected affordance configuration, a configuration indicator may be controlled to indicate ownership as the employee travels to the configuration. While not shown in FIG. 21, additional interface buttons for selecting other resources to locate may be presented at 360. For instance, there could a separately selectable buttons for locating team members, employees generally, benches or other resources owned by employees, focus stations, kiosks, team studios, etc.

In most cases, because a closest available resource suggested to an employee will be close to the bench temporarily owned by the employee, there may be no reason to provide guidance to the resource. This is especially true in cases where affordance configurations are thoughtfully laid out so that one or more instances of each affordance type are located proximate each bench configuration.

Referring yet again to FIG. 33, in some embodiments edge light devices 495, 493 may be controlled to indicate various states of ownership of associated benches. For instance, when no employee owns a bench, an associated light device 495 may be colored blue to indicate availability for use by any employee. Here, ownership of the bench may be taken by an employee via a reception screen as described above or by the employee simply walking up to the bench and taking ownership (e.g., through use of the bench, via presentation of an RF ID to a bench reader device, etc.). Once an employee takes ownership of a bench, while the owner is located at the bench, the indicator light device 495 may generate green light indicating ownership. When an employee that owns a bench steps away from the bench the light device 495 may generate yellow light indicating an absent owner but that the owner intends to return to the bench.

C. Focus Station

Referring now to FIGS. 1 and 34 through 41, an exemplary focus station 56 includes a single person space defining structure for supporting individual work activities by a single employee. The general construction of station 56 is described in U.S. patent application Ser. No. 14/642,902 which was filed on Sep. 23, 2015 and which is titled "Personal Workspace Assembly" which is incorporated herein in its entirety by reference. In general, station 56 includes a wall structure 500 that defines a personal space 512 and that supports a lounge chair 508 (hereinafter "lounge 508") and an adjacent shelf assembly 510. As shown, wall structure 500 generally includes a full rear wall behind lounge 508, a full first side wall along a first side of the lounge and shelf assembly, a partial front wall extending from an end of the full first side wall substantially parallel to the rear wall and a partial second side wall along a second side of the lounge 508 so that there is a single opening into space 512 between distal ends of the partial front and partial second side walls.

Referring still to FIGS. 34 through 39, wall structure 500 generally includes a lower wall subassembly 502, an upper screen subassembly 504 and leg or foot members 506. The lower wall subassembly 502 includes a fascia members mounted to a skeletal frame (not illustrated in this disclosure) where a top edge 523 of the lower wall subassembly is at about a typical seated work surface height (e.g., within a range between 24 and 29 inches). Leg member 506 support lower wall subassembly 502 a few inches (e.g., 2 to 5 inches) above a supporting ambient floor surface.

Screen subassembly 504 is mounted to the top end of the lower wall subassembly 502 and, in at least some embodiments, includes screen members 517 supported by posts 513 that extend upward from top end 523. In at least some embodiments the screens 517 are suspended above wall subassembly 502 so that a gap (e.g., 1 to two inches) exists between the lower edges 521 of screens 517 and the top end or surface 523 of wall subassembly 502.

Lounge 508 includes a seat member 520 and a back rest structure 522 that are suspended between the first and second lateral or side walls of wall structure 500 where the front surface of backrest structure 522 generally faces away from the rear wall portion of wall structure 500. Shelf 510 is located between a side portion of lounge 508 and an internal side of the first side wall of structure 500. The top surface of shelf 510 is generally at a seated work surface height just to the right of a station user seated in lounge 508.

Referring still to FIG. 34, a table member 577 is mounted by a pivoting arm structure to wall structure 500 within space 512 below shelf member 510 for movement between the use position shown in FIG. 34 in front of lounge 508 and a stored position forward of shelf member 510 and proximate the side wall from which shelf member 510 extends.

In at least some embodiments, system server 20 can determine when an employee takes ownership of station 56. For instance, in at least some cases the location tracking system described above with respect to FIG. 1 may be used to track employee locations in space 12a and specifically to determine when an employee moves into space 512. When an employee moves into space 512, assuming no other employee owns the station, server 20 may be programmed to automatically assign ownership of station 56 to the local employee.

In other cases, some type of sensing device may be dedicated to station 56 and may sense more directly when a user takes station ownership. For instance, a presence sensor device may be mounted in space 512 to sense when an employee is located in space 512 and to assign ownership when appropriate. In this case, the presence sensor may be able to detect employee identity by interrogating an employee badge (see again 90 in FIG. 4), smart phone or other portable device. In the alternative, where a location tracking system is already generally tracking employee locations and identities, the identity of an employee detected via a presence sensor in space 512 may be obtained from the location tracking system. As another example of a sensor dedicated to station 56, a weight or pressure sensor 551 may be mounted to or integrated into seat 520 to detect when an employee sits in lounge 508. Here, again, identity of the employee in lounge 508 may be determined via a general space location tracking system.

Figure 40:
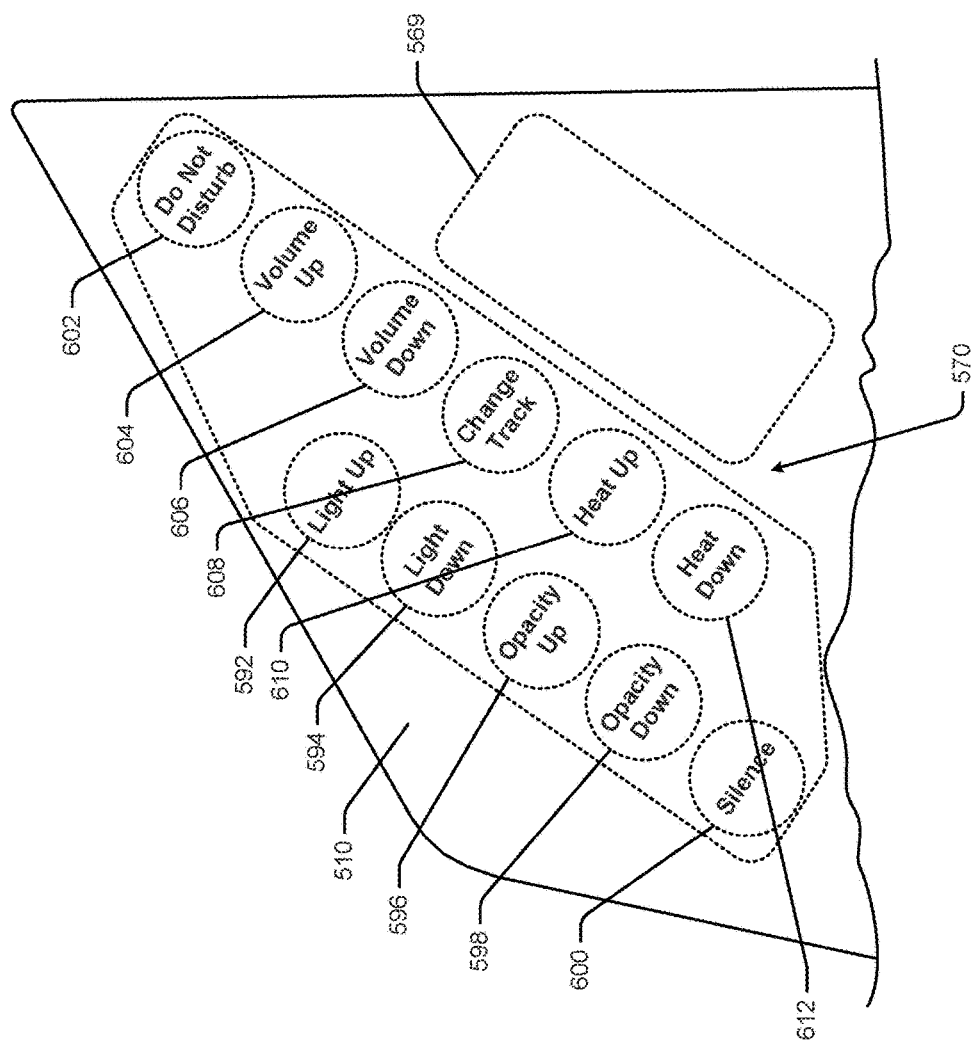
FIG. 40 is a top partial plan view of a user interface that may be provided as part of the focus station shown in FIG. 34.
Figure 41:
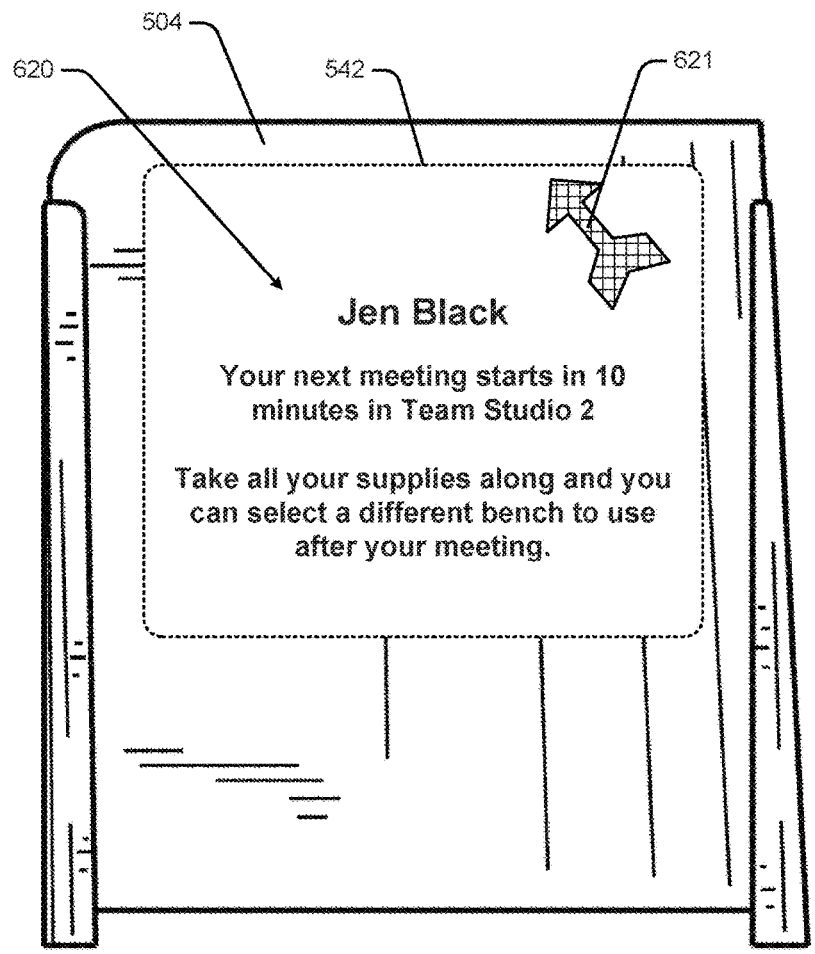
FIG. 41 is a view of an exemplary message that may be presented via the screen assembly shown in FIG. 34.

In still other embodiments, it is contemplates that an RFID sensor or the like akin to sensor 412 in FIG. 21 above may be provided at station 56 for reading an employee badge 90 or other portable RF identifying device. To this end, see again FIG. 34 and also FIG. 40 where an RFID reader 569 is built into shelf member 570. Here, the structure of shelf member 570 may be similar to the structure of member 340 shown in FIGS. 20 and 21. Other buttons shown in FIG. 40 are described hereafter.

Referring again to FIG. 34, in at least some embodiments, station 56 includes one or more types of signaling components. For instance, a projector 548 is shown mounted to the top end of one of the posts 513 for projecting information onto an inside surface of one of the screen members 517 as shown by the dotted rectangular field 550. Here, while content may be projected in some cases for an employee located in space 512, in other cases, the content in field 550 may be intended for viewing outside space 512. For this reason, in at least some embodiments, the screen member 517 projected onto will be light translucent so that images projected on the inside surface thereof can be viewed as content on the outside surface. To this end, see the information at 550 in FIG. 35 that indicates the employee that currently owns station 56. In some cases, to be light translucent, screen members 517 may be formed of a thin white/opaque plastic material.

Other exemplary projectors 540 and 544 are shown mounted to station posts 513 to project information onto other screen fields 542 and 546. Any type of signally or content presentation described above may be presented in any of the fields projected onto the screen members 517. Referring still to FIG. 34, a fourth projector 552 is shown that directs projected content 554 upward onto an ambient ceiling surface 501. In addition, a fifth projector 549 is shown mounted to the ceiling structure 501 to project content into field 550.

Instead of projecting content into screen fields, in some embodiments, a flat panel display screen 560 may be mounted to an external surface of one or more of the screen members 517 for presenting signaling or other content. A way finder visual indicator 537 may be presented in a color temporarily assigned to an employee to help the employee locate a station in cases where the focus stations can be temporarily owned by specific employees. In still other cases, all or at least a portion of one of the screen members 517 may be formed out of a curved emissive surface assembly so that content and signally may be presented on the outside surface of the screen or screens or, in some cases, on the inside surface or surfaces of the screen or screens. Again, exemplary curved emissive surface structures are described in detail in U.S. patent application Ser. No. 14/500,091 which was filed on Sep. 29, 2014 and titled "Curved Display And Curved Display Support" describes curved display systems and which is incorporated herein in its entirety by reference.

Referring yet again to FIGS. 34 through 39, additional signally devices may be mounted to or adjacent an undersurface of lower wall subassembly 502, here, for instance, LED light strips 580 may be mounted to the undersurface. In some cases the signaling devices 580 may be directly viewable below wall subassembly 502 while in other cases light generated by signaling devices 580 may only be indirectly observable after reflecting off an ambient floor surface. Here, it is contemplated that devices 580 may be controlled to generate different lighting effects to signal different circumstances. For instance, prior to an employee establishing ownership of station 56, devices 580 may generate a glowing blue light to indicate that station 56 is not currently owned and is available for use by any employee. Once ownership is established and prior to an employee indicating that she does not want to be disturbed, devices 580 may generate glowing green light to indicate occupancy. If an employee in station 56 indicates that she does not want to be disturbed, devices 580 may generate red light as a do not disturb signal. If an employee that temporarily owns station 56 gets up and leaves the station for a short time, devices 580 may generate yellow light to indicate that station 56 is owned but that the owner is not currently located in the station. Other conditions that may be signaled are contemplated.

In other embodiments, lighting devices (e.g., strips of LEDs) 529 may be mounted to the lower edge 521 of each of at least a subset of screens 517 (see FIG. 35) to direct signally light upward and into the screen members where the screen members are at least somewhat light transmissive or onto an outer surface of the screen members 517 if the members are not light transmissive. In still other cases devices 529 may direct different color signaling light at the top surface 523 of the lower wall structure 502.

In at least some embodiments station 56 will include one or several actuators that can be controlled to adjust station parameters to meet employee preferences. Thus, for instance, see that the FIG. 34 station configuration 56 includes a light device 549. In at least some embodiments employees will, at some point, indicate light intensity preference which can be stored for subsequent automatic light intensity adjustment. As another instance, lounge 508 may include one or more heating elements, vibrating elements or massage elements or combinations thereof in backrest 522 at 524 or in seat 520 at 526. Here, a first employee may prefer a relatively warm lounge while a second employee prefers a cooler lounge. In this case, a heating element at 524 and/or 526 may be controlled to provide different heating levels. In still other cases, screen members 517 may be formed out of opacity controllable glass and different employees may have different preferences for how opaque one or more of the screen members 517 should be. Other station actuators are contemplated. In FIG. 34, speakers 530 are provided in the upper portion of backrest 522 proximate the area occupied by an employee's head when seated in the lounge 508. In at least some cases speakers 530 may be controlled by server 20 to provide audio output such as, for instance, a calming nature inspired sound track (e.g., a babbling brook, a rain storm, rustling wind, etc.), an instrumental sound track, etc. In at least some cases it is contemplated that employees may select preferred tracks which can then be automatically fed to speakers 530 when a specific associated employee assumes ownership of station 56.

Referring again to FIG. 40, a control panel or input assembly akin to the assembly described above with respect to FIGS. 20 and 21 is shown. Each of the selectable buttons or icons in FIG. 40 may be constructed and operate in a similar fashion to the buttons and sensors described in FIGS. 20 and 21. In FIG. 40, the control panel includes a "lighting up" button 592, a "lighting down" button 594, an "opacity up" button 596, an "opacity down" button 598, a "silence" button 600, a "do not disturb" button 602, a "volume up" button 604, a "volume down" button 606, a "change track" button 608, a "heat up" button 610 and a "heat down" button 612. Buttons 592 and 594 can be used to manually control intensity of light generated by device 549. Buttons 596 and 598 can be used to manually control opacity of the screen members 517. Buttons 604 and 606 can be used to control the volume of a sound track generated by speakers 530. Button 608 can be used to cycle through different sound tracks. Buttons 610 and 612 can be used to change the heat setting of a heating element in the lounge at 524 and/or 526. Silence button 600 can be selected to cause server 20 to present a silence indicator on one or more of the outside surfaces of the screens 517 as shown in FIGS. 35 through 38 in at 567. Similarly, the do not disturb button 602 can be selected to cause server 20 to present a do not disturb indicator 579 on any of screens 517 as shown in FIGS. 35 through 39.

In at least some embodiments, it is contemplated that any of the stations 56 may be reserved via one of the reception screens 84 in a fashion similar to that described above with respect to the personal bench configurations 60. Thus, for instance, a specific employee may routinely prefer to use a focus station for 3 hours every morning and, in that case, server 20 may, upon the employee arriving in a space 12a, automatically identify a station 56 optimized for the employee's specific preferences (e.g., relative location with respect to team members, first meeting, all meeting during a day, team member benches or other configurations owned by team members, location with respect to natural light, sound volume, foot traffic, etc.) and suggest that station for use. Once an employee accepts ownership of the station, the server can guide the employee to the station and simultaneously prepare the station for arrival of the specific employee. Upon arrival at a station 56, a suitable salutation may be presented as at 546 in FIG. 35 and the station actuators may be controlled automatically to adjust to affordances to meet employee's preferences.

As in the case of the personal benches described above, server 20 may track employee schedules and locations and may present warnings or notices to the employee about next meetings, other arriving employees and their locations, etc. For instance, see FIG. 41 where a notice 620 is presented in field 542 indicating that Jen Black's next meeting starts in 10 minutes in Team Studio 2. In this case, Team Study 2 may be some distance away from Jen Blacks' current location and therefore the notice also suggests that Jen take all her belongings and take ownership of a different harbor closer to Team Study 2 for the remainder of the day. Again, a guidance or way finder color is assigned to Jen at 621 which operates as the beginning of a string of way finder or guidance indicators to Team Studio 2.

In addition, when an employee leaves an owned station 56 for a short time, server 20 may automatically identify that the employee has left the station and present an indicator to that effect on one or more of the screens 517. When an employee wants silence, the employee can select button 600 to warn others in the area via indicator 567 that the employee prefers silence. When the employee does not want to be disturbed, the employee can select button 602 to indicate that the employee does not want to be disturbed.

In other cases, it is contemplated that only personal benches (see again FIGS. 17 and 18) may be offered by reception stations 84 and that other affordances may have to be claimed for use (e.g., for temporary ownership) in some other fashion. For instance, stations 56 may have to be claimed by employees as part of a walk up process whereby an employee has to actually travel to an unused station 56 and perform some process in order to claim ownership. Thus, for instance, referring again to FIG. 34, an employee may need to actually enter space 512 and be seated in lounge 508 so that sensor 551 senses the seated employee in order to assign ownership of station 56 to the employee. By requiring an employee to be present to claim temporary ownership of a station 56, situations where an absent employee ties up a focus station for some time are avoided.

In some cases, there may be different levels of station 56 ownership. Thus, for instance, when an employee sits in lounge 56, the employee may establish a first level of ownership and, to establish a second more personal level of ownership, the employee may have to present her badge 90 (see again FIG. 4) to RFID sensor 569 for identification. When the first level of ownership is established, server 20 may change something about the appearance of station to indicate ownership. For instance, in some cases the term "Occupied" may be presented on one or more of the screens 517 to indicate general ownership or occupancy of the station 56. When the second level of ownership is established, server 20 may provide more employee specific information on screens 517 like the employee's name to indicate specific ownership. In addition, when the second level of ownership is established, server 20 may automatically control station actuators to customize station settings or attributes to the preferences of the employee that owns the station 56.

D. Enhanced Privacy Station

Referring now to FIGS. 42 through 54, an exemplary enhanced privacy station or configuration 54 is illustrated. Multiple instances of configuration 54 may be provided in enterprise spaces to provide private spaces for periodic temporary use by one employee that needs to focus on her work in an acoustically and visually private space or a small group of employees that similarly need acoustic and visual isolation from others in the general area. While a space 710 defined by configuration 54 is relatively small (e.g., typically less than 15 by 15 feet), by constructing at least one of the walls with glass that can be transparent at least some times, the space 710 can be made to feel much larger and less restrictive. Nevertheless, by providing some way to block views through the glass wall, visual privacy can be achieved when needed. Configuration 54 has been designed to automatically dial space 710 into employee preferences while still enabling an employee to easily and quickly change affordance attributes when desired. In addition, configuration 54 has been designed to consider an employee's schedule and, based thereon, prepare configuration affordances to support the employee in participating in scheduled activities.

Referring still to FIGS. 42 through 54, configuration 54 includes first, second, third and fourth wall subassemblies 702, 704, 706 and 708, respectively. In the illustrated embodiment the second, third and fourth wall subassemblies 704, 706 and 708, respectively, define a substantially rectilinear meeting space 710 where wall subassemblies 704 and 708 are spaced apart and substantially parallel to each other on opposite sides of space 710 and where wall subassembly 706 extends between and substantially perpendicular to internal surfaces of wall subassemblies 702 and 708. While each of the wall subassemblies 702, 704 and 706 includes several different components and structures, in at least some embodiments, the components that form the internal surfaces of those walls have flat outer surfaces and the flat surfaces of the components that form each wall are substantially flush with each other. Thus, for instance, where a flat panel display is mounted within a wall subassembly with other flat components thereabout, the front surface of the flat panel display may be substantially flush with the surrounding surfaces of the other flat components.

U.S. Pat. No. 8,966,842 (hereinafter "the '842 patent") which is titled "Floor To Ceiling Partition Wall Assembly" and which was filed on Sep. 17, 2013 as well as U.S. Pat. No. 8,955,271 (hereinafter "the '271 patent") which is titled "Sliding Door Assembly" and which was also filed on Sep. 17, 2013, are incorporated herein in their entirety by reference. The '842 patent describes a floor to ceiling frame and panel wall assembly while the '271 patent describes a sliding door assembly for use with the floor to ceiling wall assembly of the '842 patent, both of which may be used to construct first wall subassembly 701 as well as one or least a subset of the other wall subassemblies 704, 706 and 708. U.S. patent application Ser. No. 13/913,254 (hereinafter "the '254 application") which is titled "Panel Light Assembly" and which was filed on Jun. 7, 2013 is also incorporated herein in its entirety by reference and describes a light panel assembly that may be used in at least some embodiments to provide light within a wall panel in the configuration 54 or in some of the other configurations (e.g., the team studio 62) described hereafter.

Referring still to FIGS. 42 through 45, first wall subassembly 702 is spaced apart from third wall subassembly 706 and is substantially parallel thereto. First wall subassembly 702 includes, generally, first and second side glass panel subassemblies 712 and 716 (also called panels hereafter) and a glass door subassembly 714 mounted to upper and lower tracks 718 and 720 substantially parallel to glass panels 712 and 716 for sliding motion between an open position (see partially open position in FIG. 42) and a closed position (see closed position in FIG. 48). When panel 714 is in the open position, an employee can enter or exit space 710 and when panel 714 is closed, wall subassembly 702 completely closes off space 710 from the surrounding space (e.g., 12a).

In at least some embodiments, in addition to including a glass member and, in at least some cases, a frame structure of some type, each of glass panel subassemblies 712, 714 and 716 may also include additional controllable components that can be used to change attributes of the glass members in useful ways. For example, in at least some embodiments, one or more multicolor LED strips may be mounted along one or more edges of each of the panels 712, 714 and 716 which are controllable to generate several different colors of light. In at least some cases the LED strips may be arranged adjacent each glass panel so as to direct light into the panel edge causing the panel to light up and glow with a color of the generated light. Here, the LED strips may be controlled as part of the visual guidance system described above to present colored illumination as either a destination configuration or one in a string of indicators indicating a path to another configuration to a travelling employee. In the alternative or in addition to providing guidance signals, the colored illumination presented via panels 712, 714 and 716 may be used to signal different statuses of meetings or activities occurring in space 710. For instance, prior to any employee taking ownership of space 710, the panel light may be white and once an employee takes ownership of space 710, panels 712, 714 and 716 may be illuminated green. As another instance, when an employee that owns space 710 does not want to be disturbed, red light may be generated in panels 712, 714 and 716.

As another example, each of panel assemblies 712, 714 and 716 may include a privacy glass assembly where opacity of each panel can be controlled to be substantially clear or substantially opaque. Here, glass opacity may be controllable automatically based on some preset algorithm or may be controlled by an owning employee in real time to suit the employee's instantaneous preferences. For instance, while door panel 714 is open (e.g., not completely closed), panels 712, 714 and 716 may be controlled to be clear. Once door panel 714 is closed, each of panels 712, 714 and 716 may be controlled to be completely opaque and therefore to block a view from outside space 710 into space 710.

In at least some embodiments, instead of controlling the panels to be completely opaque, each panel may be controlled to obscure a view through the panel only somewhat so that general information about what is on the other side of the panel is still discernible by an employee. Thus, for instance, where a panel is only partially opaque so that some light travels there through, an employee on one side of the panel may be able to make out the general outline of another employee on the other side without being able to determine the other employee's identity, without seeing the other employees facial expressions, etc. Where glass is only partially opaque, the obscured view of another employee on the other side can operate as a warning. For instance, for an employee outside space 710, the obscured view can serve as a warning that space 710 is being used. For an employee in space 710, the obscured view can allow the employee to perceive when another employee is located outside space 710 adjacent wall 702 for some reason.

In at least some cases, while panel opacity may be automatically controlled at times, at any time, an employee that owns space 710 may control opacity to meet the employee's immediate preference. Thus, for instance, if an employee in space 710 perceives another employee outside space 710 through a partially opaque panel 714, the employee in space 710 may clear the panel to see who is outside the space 710. In FIG. 42, panels 714 and 716 are shown clear while panel 712 is shown opaque as indicated by the vertical cross hatching.

Yet one other example of controllable technology that may be provided within one or each of wall panel subassemblies 712, 714 and 716 is controllable signage. For instance, several different types of transparent glass signage technology have been developed that can be used to, in effect, generate still or video graphics on a seemingly or substantially transparent glass panel. To this end, GWS Technology of Hong King is one company that has developed a transparent glass LED system which may be useful in one or more of wall subassemblies 712, 714 and 716. In FIG. 42, see that different messages can be presented on panels 712, 714 and 716 using the transparent glass LED technology including a welcome salutation 722, name plate type information 724, a silence indicator 728 and/or a do not disturb indicator 726. Here, in at least some cases graphics may automatically be presented on panels 712, 714 and 716. For instance, as in the cases of other configurations described above, when Jen Black arrives at room 54 for a meeting, salutation 722 may be automatically presented. Similarly, name plate information 724 may be automatically presented if Jen Black owns space 710. The do not disturb indication 726 may be automatically presented when a meeting commences in space 710 with panel 714 in the closed position. The silence indication 728 may always be presented when a meeting is occurring in space 710 or may be automatically presented only when certain types of meetings like telepresence meetings are occurring in space 710. In still other cases, indicators 726 and 728 may only be presented when an owning employee performs some process to indicate a preference to not be disturbed or for silence.

While some systems may only include one of the lighting, opacity control and signage capabilities, in other cases, panels 712, 714 and 716 may be equipped to provide any combination of those capabilities. For instance, light directed into panels 712, 714 and 716 may be used as part of the visual guidance system but, once a meeting starts in space 710, the opacity control components may be controlled to render the panels opaque or at least somewhat opaque.

Figure 52:
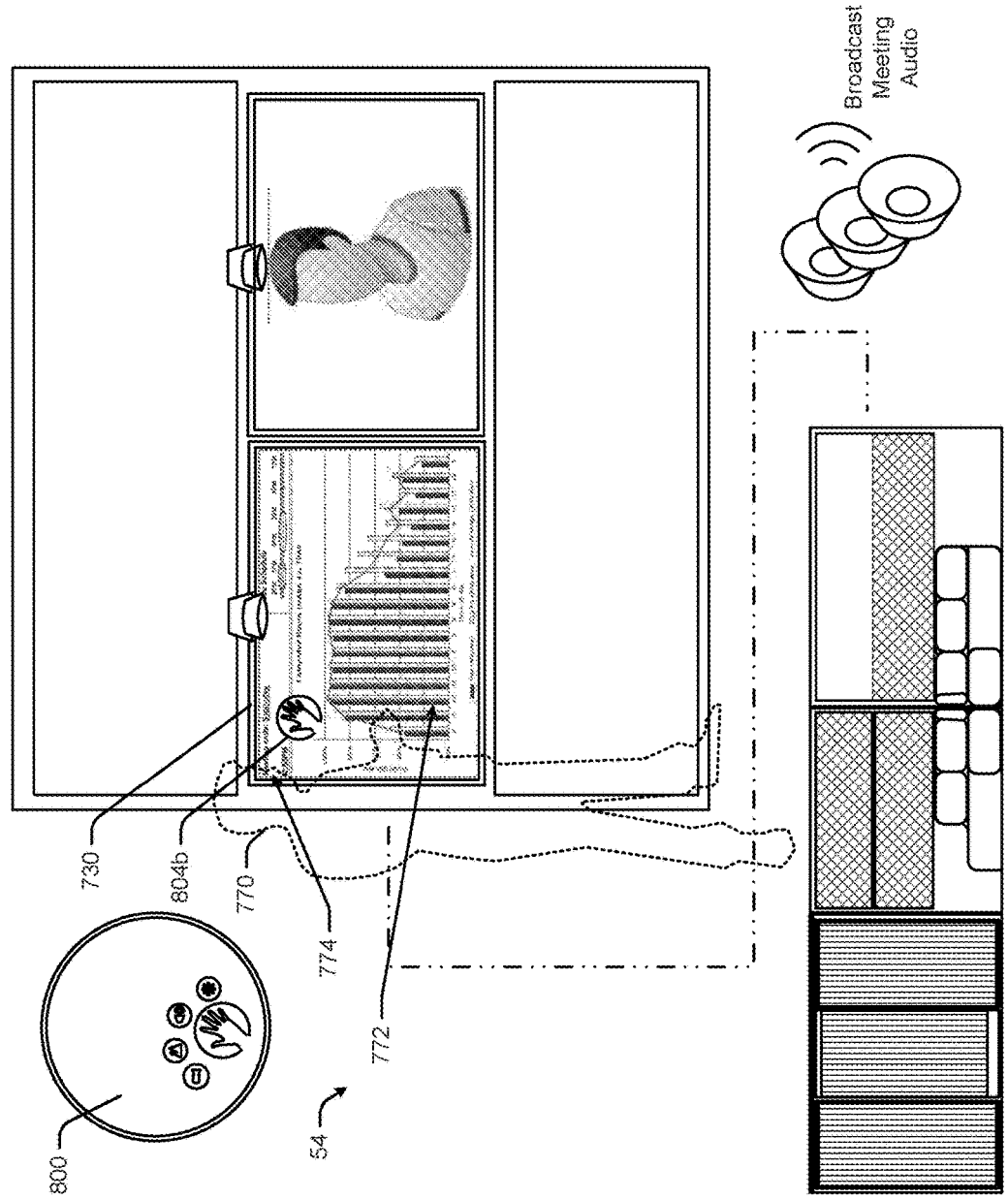
FIG. 52 is similar to FIG. 47, albeit showing the station affordances at yet another point in time.
Figure 53:
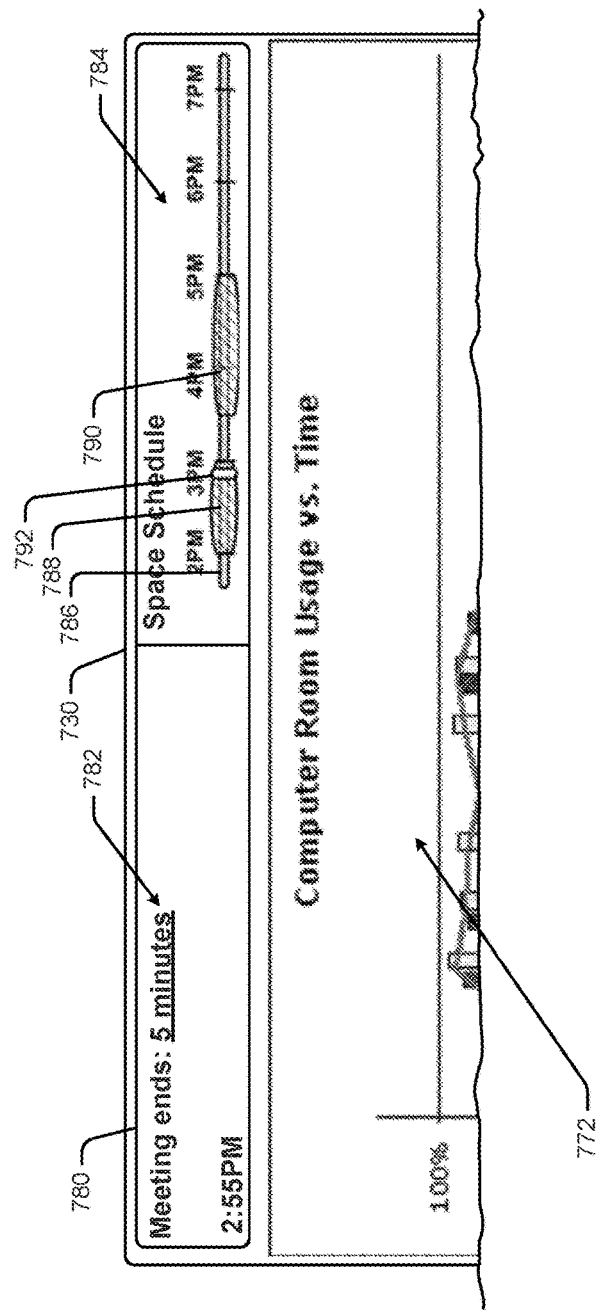
FIG. 53 is a partial view of one of the display screens shown in FIG. 52.

Referring still to FIG. 52, a separate visual guidance indicator 30x is shown mounted to upper track member 718. Here, instead of providing guidance light in panels 712, 714, etc., indicator device 30x may be controlled for guidance purposes.

Referring again to FIG. 44, a flattened top plan view of exemplary room 54 is illustrated where wall subassemblies 702, 704, 706 and 708 are shown aid flat about space 710. FIG. 45 includes yet another view of room 54 include plan views of wall subassemblies 702, 704, 706 and 708 and other affordances included in space 710 including, among others, a couch assembly 738 and a control table assembly 800 (both assemblies 738 and 800 are shown twice in FIG. 45 to indicate relative juxtapositions to components on wall subassemblies 704 and 706 there behind.

Figure 44:
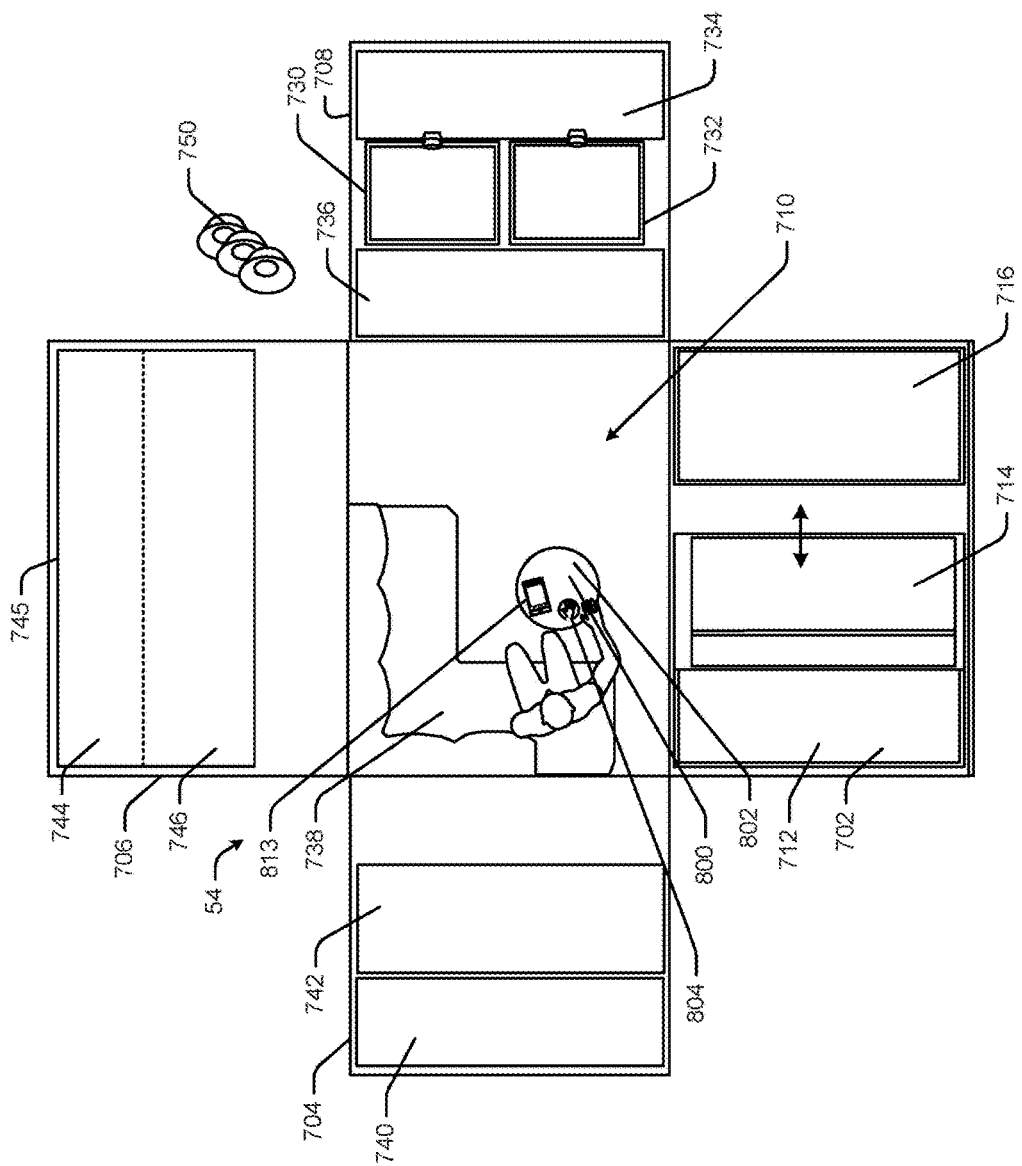
FIG. 44 is a top flattened view of the station shown in FIG. 42.
Figure 45:
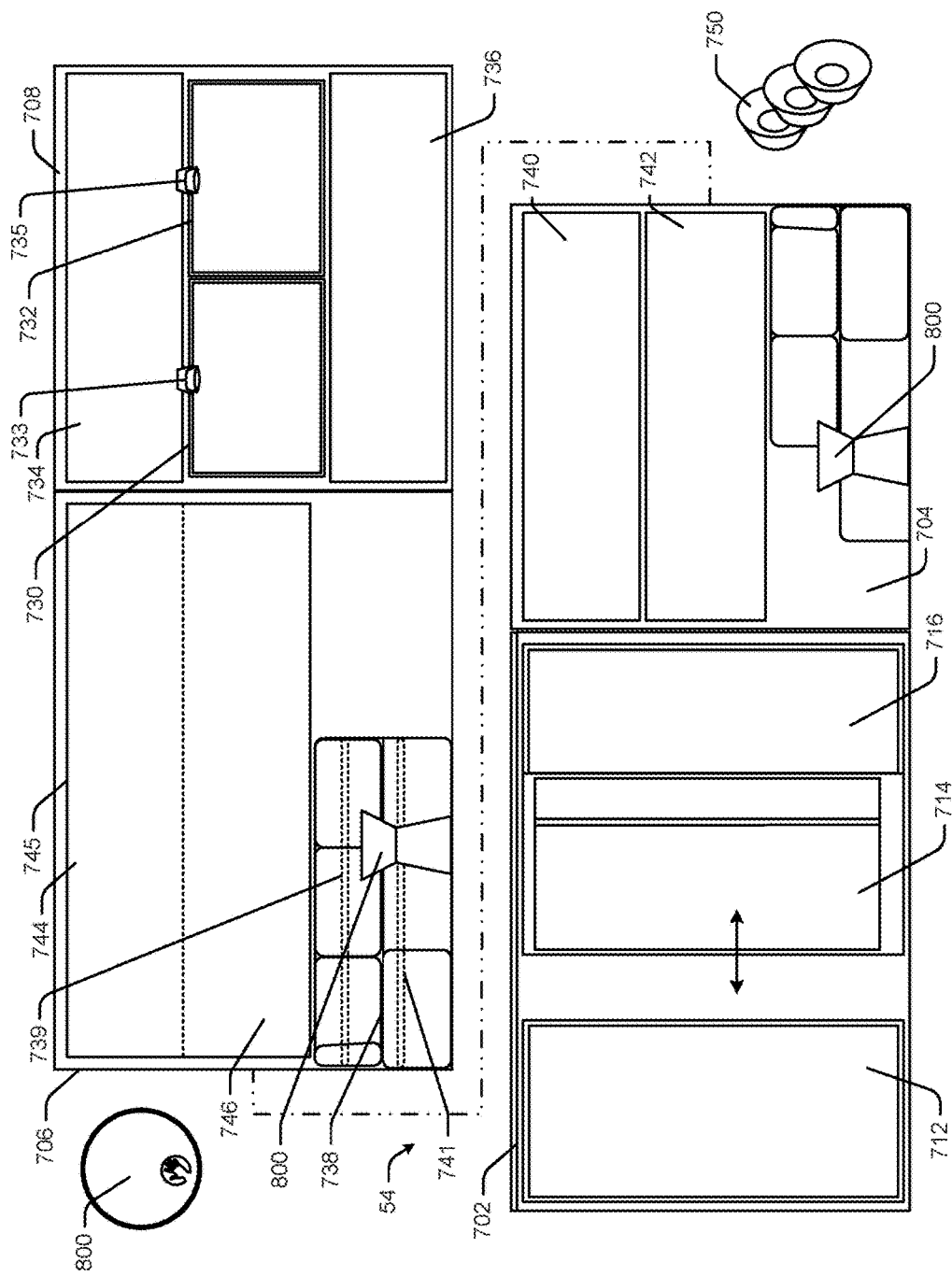
FIG. 45 is a schematic view of the station of FIG. 42 with the four walls that comprise the station laid out in a flat view.

Referring to FIGS. 44 and 45, second wall subassembly 704 includes a large flat panel display screen 742 and a large flat lighting device or panel 740. Screen 742 is a rectilinear screen which has top and bottom edges and first and second lateral edges that define a screen height and a screen width, respectively. The screen width between the lateral edges, in at least the illustrated embodiment, extends substantially the entire width dimension of wall subassembly 704 while the height dimension is substantially one third the height dimension of the wall subassembly 704. Light panel 740 has dimensions similar to the dimensions of display screen 742. Light panel 740 covers substantially the top one third of wall subassembly 704 while display screen 742 covers substantially the middle one third of subassembly 704. Where wall subassembly 704 is nine feet tall, the height dimensions of each of panel 740 and screen 742 are each approximately 3 feet. Other height dimensions are contemplated within a range between two feet and five feet for each of panel 740 and display screen 742. As best viewed in FIG. 45, the couch 738 has a backrest that has a height dimension that comes up to the lower edge of screen 742. The backrest height is such that the eyes of a person of average height sitting upright on couch 738 will be at a height that is substantially aligned with the central portion of screen 742. Thus, when sitting normally on couch 738, an employee's gaze in space 710 will be at the general height of screen 738.

Light device 740, like many of the other light generating devices in this disclosure will, in particularly useful embodiments, be controllable to generate many different light colors for setting ambiance, signaling purposes, etc. For instance, again, the Phillips' Hue technology may be used in panel 740 so that any of many different colors of light can be generated. In some cases panel 740 may include a glass panel and an LED light strip may be provided on the edge of the glass to direct different color light into the panel. In some cases the glass panel may be frosted or etched on one or both sides or may include particulate material to increase the amount of light deflected into space 710.

Display 742 may include an electronic flat panel display or, in the alternative, may include a projector surface on which content may be projected. Where display 742 includes a projection surface, a projector (not illustrated) would be provided in space 710 or may be provided on the opposite side of wall 710 in the case of a back projector configuration and directed at display 742.

Referring still to FIGS. 44 and 45, in at least some embodiments, each of the first and second wall subassemblies 704 and 706 will be similarly constructed and will operate in a similar fashion. Thus, subassembly 706 may include a large light panel mounted above a large flat panel display or emissive screen so that the panel and screen together substantially cover the entire interior surface of wall subassembly 706 above the backrest portion of couch 738.

In other embodiments it is contemplated that a single emissive surface may be provided instead of separate light panel and display screen devices on each of wall subassemblies 704 and 706. To this end, see the exemplary single screen labeled 745 in FIGS. 44 and 45 where the top and bottom half sections are separated by a dotted line and are separately labeled 744 and 746, respectively. In at least some cases a system server may control the upper and lower sections 744 and 746 of screen 745 independently to provide lighting and display screen functionalities as described hereinafter. Clearly in cases where a single emissive surface or screen 745 is provided as part of one of the wall subassemblies 704 or 706 the light and display sections can be divided differently or, where one of those functions is not needed at some time, the entire screen 745 may be controlled to provide the other function at least temporarily. While a single screen 745 is shown as part of wall subassembly 706, hereinafter, the different sections 744 and 746 will be referred to as a light panel and a display screen, respectively unless indicated otherwise.

Figure 43:
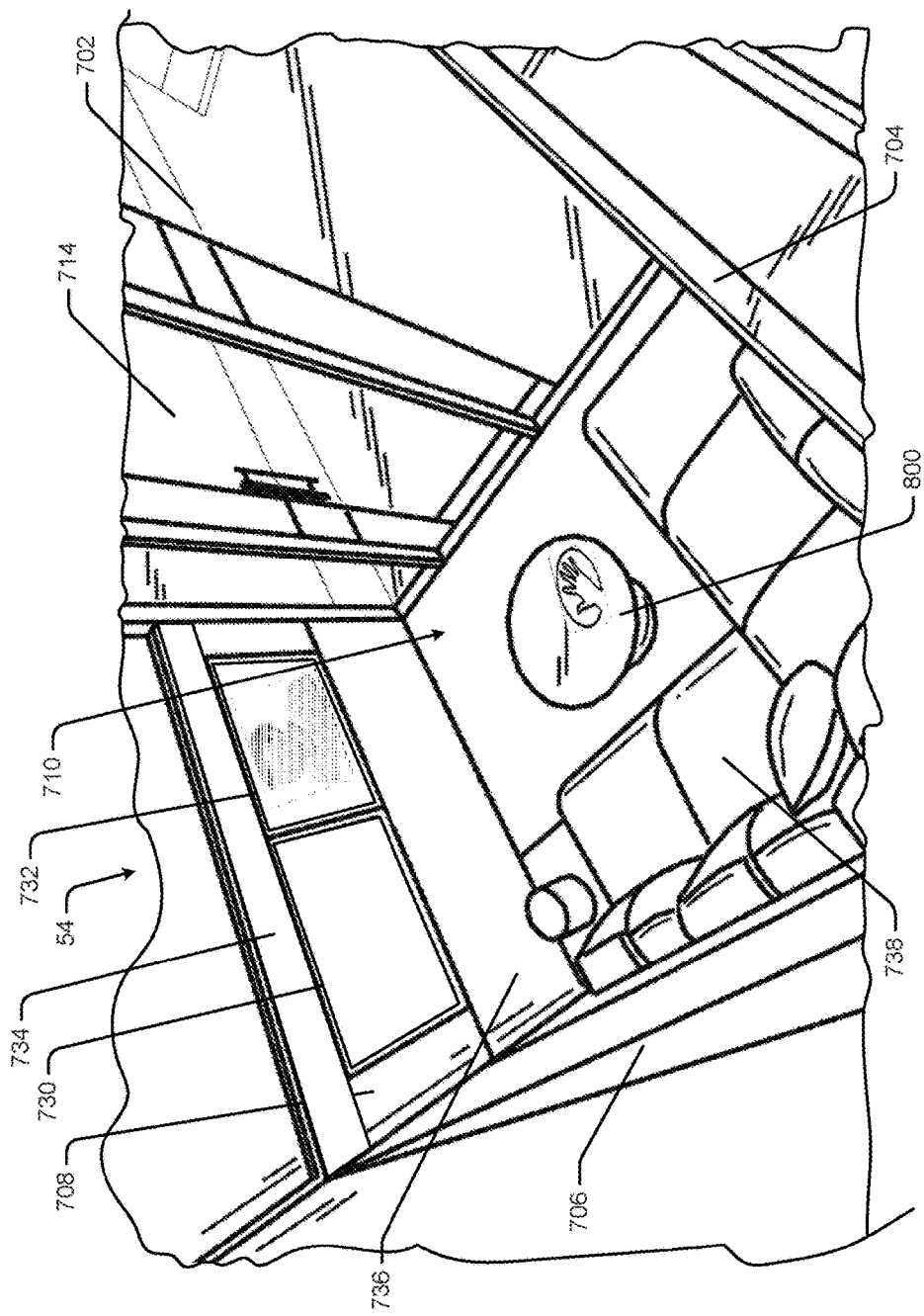
FIG. 43 is a perspective view of the station of FIG. 42.

Referring yet again to FIGS. 44 and 45 and also to FIGS. 42 and 43, fourth wall subassembly 708 includes a first light device or panel 734, a second light device or panel 736 and first and second separate flat panel display screens 730 and 732, respectively. The first and second light panels 734 and 736 have width dimensions that extends substantially the entire width of wall subassembly 706 and height dimensions that are each, about one third the height of subassembly 708, in the illustrated embodiment. Screens 730 and 732 have similar dimensions and each has a width dimension that is less than half the width dimension of wall subassembly 708. Screens 730 and 732 form a central portion of wall subassembly 708 with first and second light panels 734 and 736 arranged above and below the screens 730 and 732. Thus, screens 730 and 732 are at substantially the same height as display screens 742 and 746 on wall subassemblies 706 and 704, respectively. Light panels 734 and 736 are constructed in a fashion similar to the light panels 740 described above.

Referring still to FIGS. 44 and 45, in at least some embodiments, a single emissive surface may provide both screens 730 and 732 where the left and right halves of the screen are simply driven with different content to facilitate dual simultaneous display functions. Similarly, a single emissive surface or screen may form substantially the entire internal surface of wall subassembly 708 and different sections or fields of the single surface may be controlled differently to facilitate different functions (e.g., lighting, telepresence, content amplification, etc.) as described herein. In addition, while the dimensions of the screens and light devices that form wall subassembly 708 described above are of particularly interesting given preferences of most space users (e.g., ability to take in a relatively close range image is limited to a certain size), in some embodiments other dimensions are contemplated. For instance, screens 730 and 732 may have height dimensions that are greater than one third the height dimension of wall subassembly 708. For example, where wall 708 has a height dimension of nine feet, the height of screen 730 may be anywhere between two feet and six feet.

Referring still to FIGS. 44 and 45, two high definition telepresence cameras 733 and 735 are mounted centrally along top edges of screens 730 and 732, respectively. The cameras are generally centrally aligned with screens 730 and 732 so that, when an employee in space 710 looks at one of the screens, the image obtained by the associated camera shows the employee looking generally straight on in the direction of the camera. Thus, in the case of a telepresence system where an image of a remote employee is presented on screen 732, when an employee in space 710 looks at the image on screen 732, camera 735 picks up an image of the employee that can be provided to the remote employee where the local employee is staring right at the remote conferee and an eye-to-eye effect results. In other embodiments only one of the cameras may be provided in room 54. Where only a single camera is provided that single camera may be provided centrally above both screen 733 and 735 in some cases.

Referring yet again to FIGS. 44 and 45, speakers 750 are mounted within one or more of the wall subassemblies that define space 710, in a ceiling structure above space 710 or in one or more of the affordances (e.g., couch 738, table 800, etc.) located in space 710. The speakers 750 may be controlled to provide various outputs. For instance, at times the speakers 750 may be controlled to broadcast an employee's favorite natural (e.g., a babbling brook, rain falling, etc.) sound track. At other times, speakers 750 may broadcast voices of remote employees attending a meeting in space 710 via a teleconference system.

Figure 46:
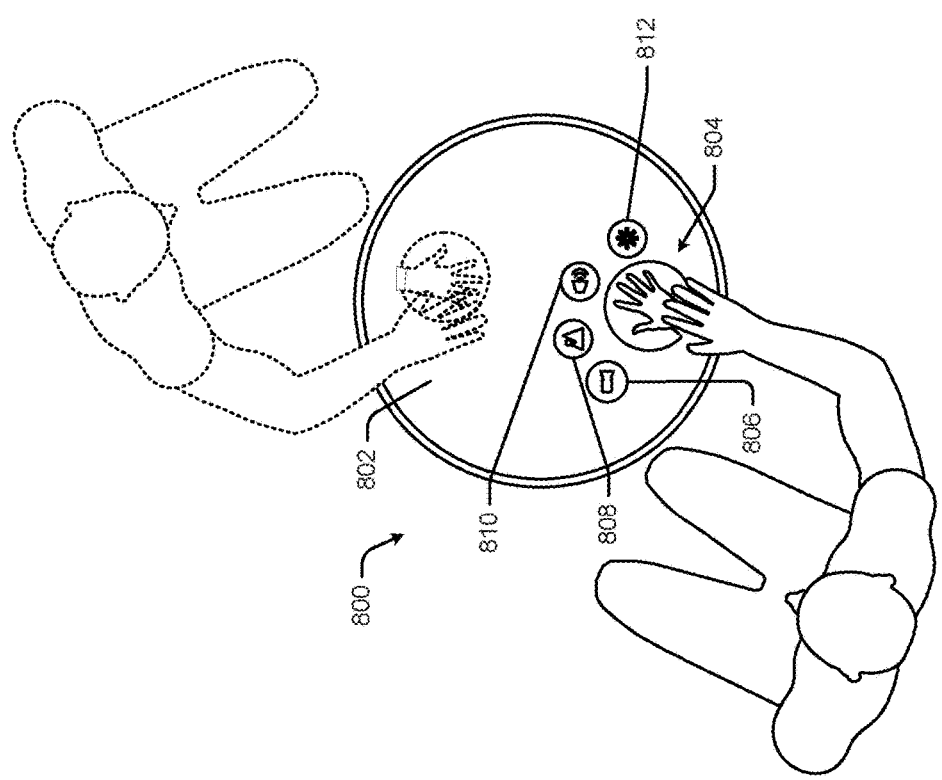
FIG. 46 is a top plan view of an interface table included in the station shown in FIG. 42.

Referring again to FIGS. 42 through 45 and now also to FIG. 46, an exemplary control table 800 includes a base structure or housing in which other table assembly components reside. The table assembly 800 also includes a circular flat top surface 802 that operates, in at least some embodiments, as an output device and an input device, enabling an employee to control various affordances in space 710. To this end, in at least some embodiments, top surface 802 may be formed using a circular touch sensitive display screen member that can present selectable virtual graphical icons to an employee. Here, where an icon is selected, the sensed selection activity results in an associated control signal to a system server which in turn results in control of a space affordance related to the control signal.

In some cases, when an employee first enters space 710 and takes up a position on couch 738, sensors (e.g., access points, cameras, etc.) in space 710 determine the instantaneous location of the employee on couch 738. Once employee location is known, the server may be programmed, as part of a welcoming routine, to present a universal interface (UI) hand icon 804 on screen 802 at a location close to the location of the employee that recently entered space 710. Here, icon 804 is presented as an invitation and a tool for the employee to access other room control tools. In some cases, the employee may respond to presentation of the UI icon by touching top screen 802. When screen 802 is touched, server 20 may be programmed to provide a set of other virtual room control tools as an extension of the UI as shown at 806, 808, 810 and 812 in FIG. 46. The icons in FIG. 46 may in turn each be selected to access more detailed control tools for affordances in space 710 or for controlling content to be shared during a meeting or accessed during use of configuration 54. For instance, selection of icon 806 may indicate a scheduled telepresence session or may allow an employee to control cameras in space 710, selection of icon 808 may enable the employee to change imagery or video on various emissive or projection surfaces in space 710 to meet current preferences, selection of icon 810 may cause audio controls for audio components associated with space 710 to be provided via screen 802, selection of icon 812 may enable an employee to access a space scheduling or employee tracking system, etc.

In addition to enabling control of room affordances, in at least some cases the UI will provide tools that allow sharing of content and that facilitate management of a meeting in space 710. For instance, while not shown, the UI may enable an employee like Jen Black to access an application or database and retrieve digital images, a digital document, a video, etc., to be shared via one or both of the display screen 730 and 735.

While screen 802 is described as being touch sensitive, in other cases the screen or table assembly 800 generally may be equipped with other sensor types such as gesture sensors or voice recognition sensors (e.g., microphones that feed a speech recognition system for detecting specific control commands uttered by and employee in space 710). For instance, to access additional virtual control tools as shown in FIG. 46, an employee may only need to wave her hand above icon 804.

While configuration 54 described above has many different features and aspects and may be controlled in many different ways, a particular set of operating processes or procedures are considered particularly advantageous. To this end, an exemplary use of room 54 is described hereafter. In this regard, it will be assumed that Jen Black has a telepresence meeting set with Paul Pink for 2 PM central time and that Paul is located in San Francisco.

In the description of FIGS. 47 through 54, different snapshots in time of the meeting between Jen Black and Paul Pink are shown in consecutive order. Where room attributes do not change from one image to the next, the attributes are shown the same in consecutive images and will not be described again in relation to the following of two consecutive images. Thus, for instance, see that panel 734 is shown to be illuminated blue as indicated by the dual diagonal cross hatching in FIG. 47 and the consecutive FIG. 48. In that case, while the blue color is described in the context of FIG. 47, the blue illumination will not be described in the context of FIG. 48.

Jen, initially located at a different location in space 12*a*, is notified of the meeting ten minutes before it is scheduled to start and uses the visual indicator guidance system described above and that includes indicator 30*x* in FIG. 42 to travel to configuration 54. When Jen arrives at configuration 54, all of the panels that form wall subassembly 702 are initially clear and a system server, recognizing that Jen is proximate room 54, presents salutation 722 on panel 714. In addition, server 20 presents name plate information at 724 on panel 716. In other cases no salutation or name plate information may be provided on the outer panels and instead that type of information may be presented within the space 710.

In at least some embodiments, a color convention will be adopted by an enterprise where a small subset of different colors (e.g., five clearly distinguishable different colors) will be ascribed to different space statuses within all enterprise spaces. For the purposes of the present disclosure, it will be assumed that for an exemplary enterprise, the color yellow is used to indicate an imminent use status (e.g., that a space is scheduled to be used in the near future and therefore should not be used by an unscheduled employee), the color green is used to indicate that a meeting will commence in the next five minutes within an associated space, the color red will indicate that a meeting is progressing within a space, the color blue will be used to indicate that a meeting in a space will end in the next five minutes and the color white will be used to indicate that a meeting in a space has ended and employees from that meeting are packing up and leaving an associated space. Other color assignments and lighting effects to indicate different statuses are contemplated. For instance, when a meeting is to commence in the next minute, the green light may pulse on and off.

Consistent with the above status indicating convention, prior to the five minute period that precedes the meeting between Jen and Paul Pink, signaling may be presented outside space 710 to indicate that the space 710, while not occupied, is scheduled for use and therefore should not be used by another employee. In the present example light devices in the panels 712, 714 and 716 generate yellow light so that the panels glow yellow for other employees to see. In the alternative or in addition to the panels 712, 714 and 716 generating yellow light, light devices in space 710 may be controlled to generate yellow light that can be seen through the clear panels outside space 710 to indicate the imminent use status of space 710. In still other cases some other dedicated space status indicator (e.g., a Hue light device mounted to upper rail 718 (not illustrated) may indicate status by generating yellow light.

Figure 47:
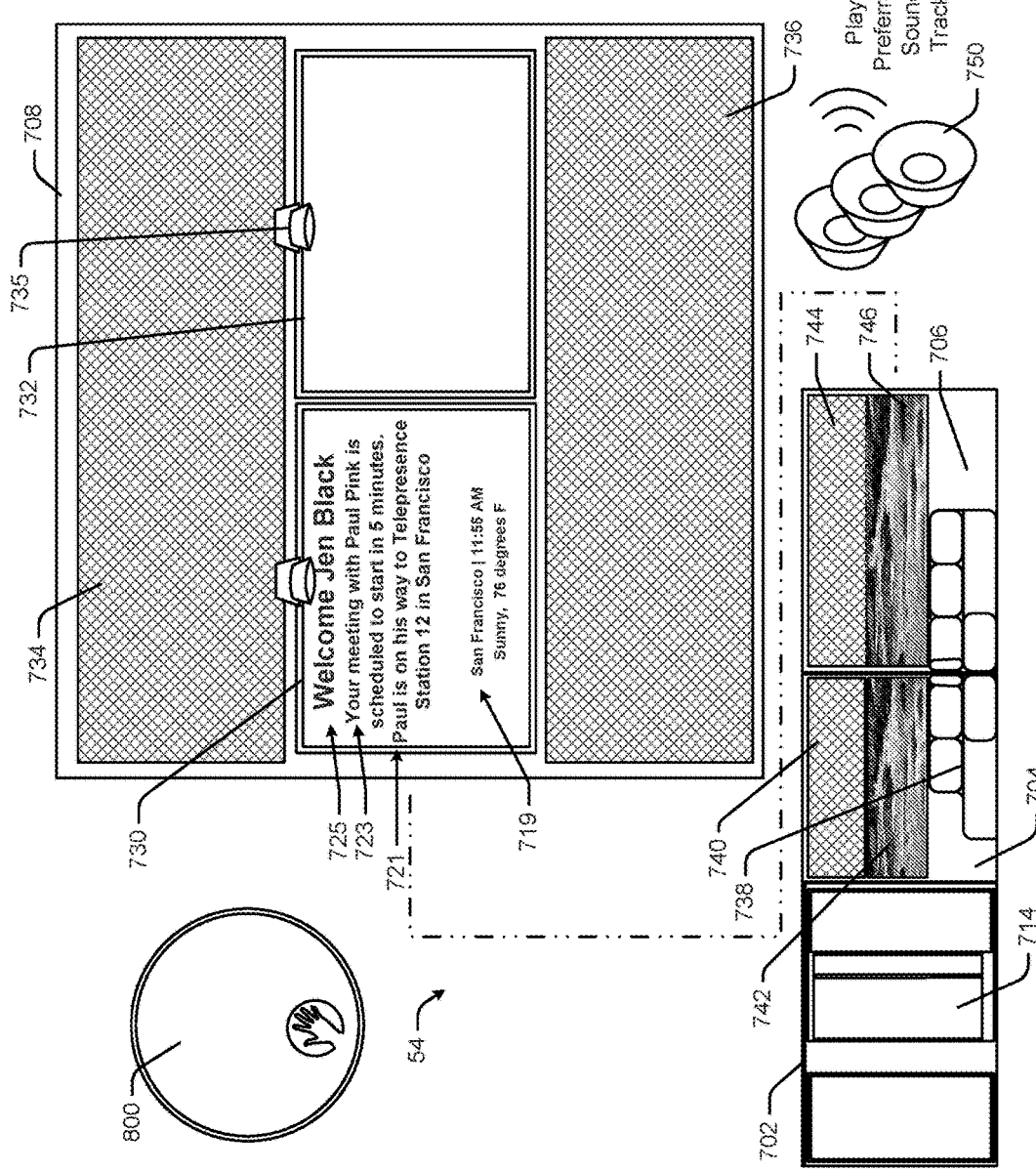
FIG. 47 is similar to FIG. 45, albeit showing station affordances at a different point in time during a use sequence.

Referring now to FIG. 47, as Jen enters space 710 through the open sliding door 714, system server 20 recognizes that Jen is in space 710 and controls various actuators associated with room 54 affordances to customize room attributes to Jen's preferences that are stored in database 76 (see again FIG. 3) and to automatically present at least some scheduling and current status information to Jen. First, Jen's preferences may specify lighting characteristics within the space 710. For example, Jen may prefer light blue illumination prior to any meeting she attends to help her transition from a prior activity to a next activity. Consistent with this preference, server 20 may control light panels 740, 744, 734 and 736 to generate light blue illumination in space 710 as indicated by the double diagonal hatching in FIG. 47. Second, Jen may have specified a favorite nature video track to be used as a dynamic ambient background whenever possible that can be played on screens 742 and 746 as indicated by the scenes in FIG. 47. Third, Jen may have specified a favorite sound track to be used as a background sound whenever possible that can be played via speakers 750 as indicated in FIG. 47. Here, in many cases, the ambient sound track may be tied to the ambient video track to create a more immersive experience.

Referring still to FIG. 47, fourth, left screen 730 may be used to present several different types of information. For instance, another salutation may be provided to Jen as indicated at 725. As another instance, a warning that the next meeting is to begin in 5 minutes with Paul Pink may be presented as at 723. Where location of the remote employee (e.g., Paul Pink) is being tracked, that information may be used to indicate Paul's current location status as at 721 (e.g., "Paul is on his way to Telepresence Station 12 in San Francisco"). Information related to a remote employee's environment may also be presented. For instance, the remote employee's location, time in that location and information about weather in that location may be presented as at 719. By presenting information about the remote employee's environment, it is believed that a greater empathetic connection can be made between local (e.g., Jen in the present example) and remote employees. For instance, if Jen knows that it is 2 AM at a remote employee's location or that there is a snow storm ranging at a remote employee's location, Jen will have a better sense of how the remote employee may be feeling during a session and the sense of a shared experience is enhanced. Once within the 5 minute period prior to the scheduled start time of the meeting, the status lighting outside space 710 is controlled to generate green light indicating that the meeting is about to commence.

Figure 48:
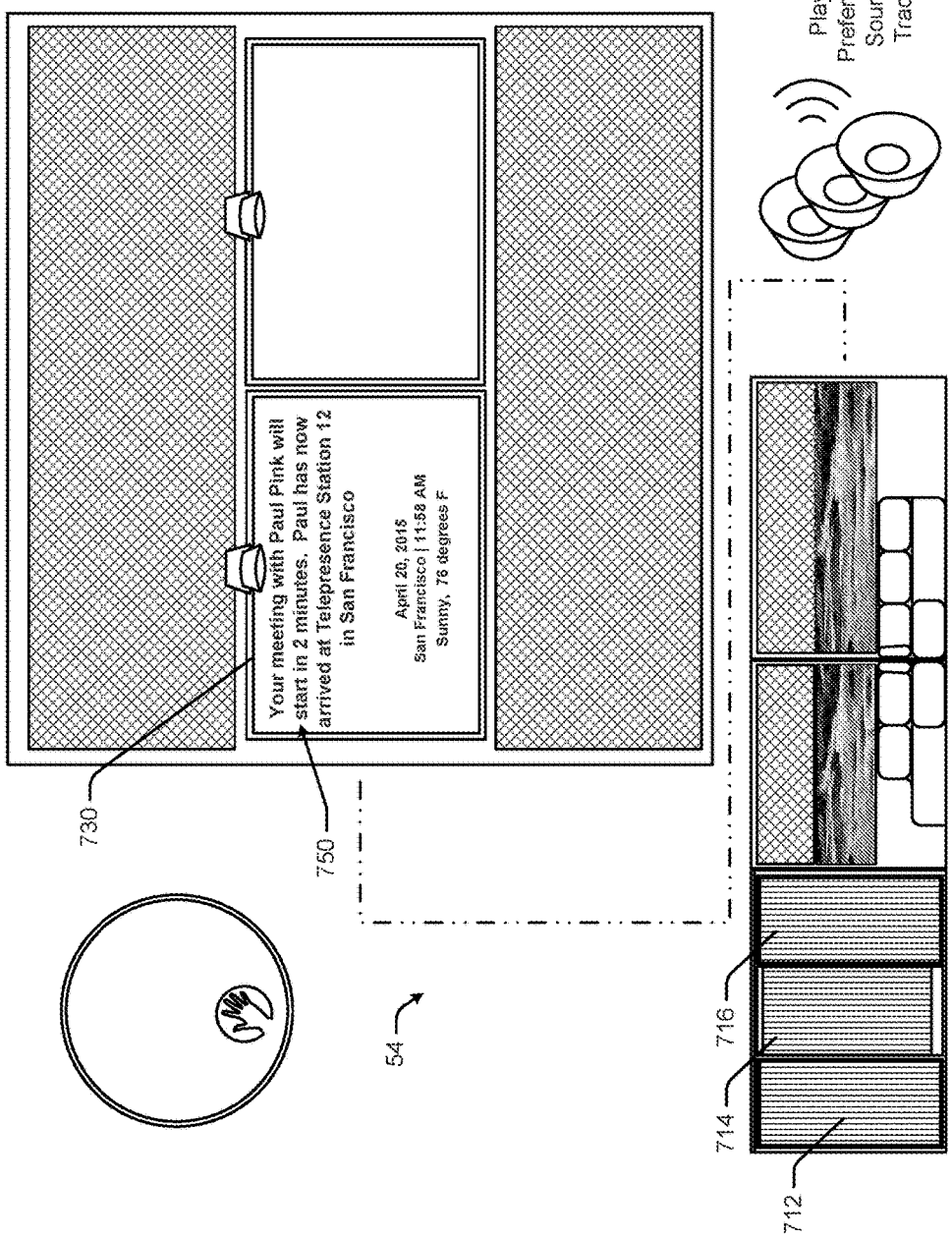
FIG. 48 is similar to FIG. 47, albeit showing the station affordances at a different point in time.
Figure 49:
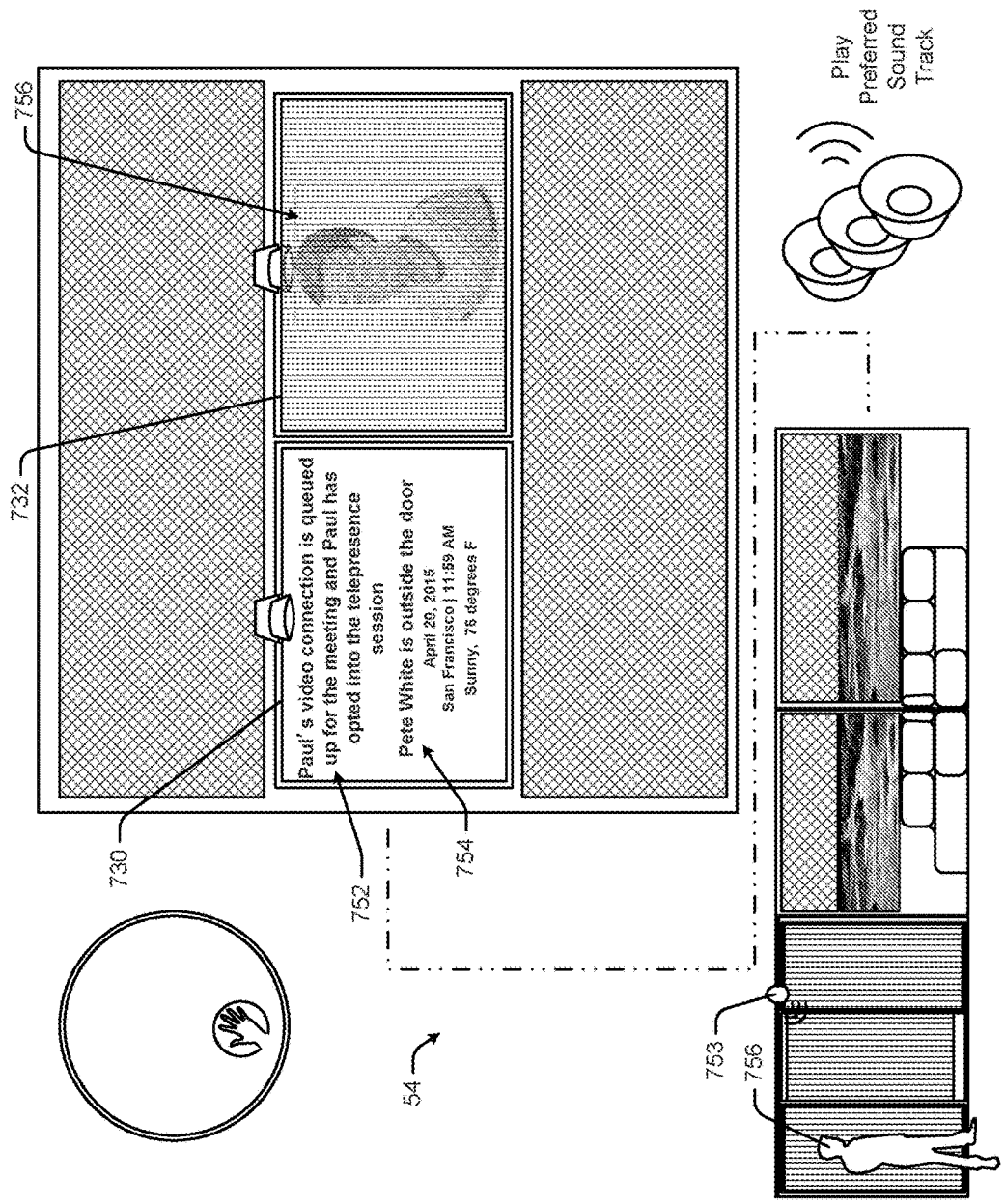
FIG. 49 is similar to FIG. 47, albeit showing the station affordances at yet another point in time.

Referring to FIG. 48, shortly after arriving at space 710 and prior to the scheduled start time of the meeting with Paul, Jen slides glass panel door 714 closed. Here, while not shown, there may be a presence sensor within one of the door tracks 718 or 720 or some area camera (e.g., one of the cameras in space 710) may sense when the door is closed. In at least some embodiments, when door 714 is closed, system server 20 may control panels 712, 714 and 716 to render them opaque so that Jen has visual privacy in space 710. In an alternative system, server 20 may not render the panels 712, 714 and 716 opaque until immediately prior to or upon commencement of the scheduled meeting. In either case, opacity is optimally controlled automatically so that Jen can have the benefits associated therewith without having to perform any otherwise unnecessary affirmative tasks. Referring still to FIG. 48, one other change that is illustrated in FIG. 48 is that the server updates Paul Pink's status on screen 730 to indicate that Paul is now at the telepresence station he will be using during the meeting that is to start shortly. Thus, even prior to establishing a telepresence link with the telepresence system at Paul's location, Jen may be provided with information related to Paul's status.

In at least some cases establishment of a telepresence communication link between a station or telepresence system to be used by Paul during the meeting and station 54 may be automatically completed prior to either of Jen or Paul even arriving at their respective telepresence systems. In other cases the link may be established after at least one of Jen or Paul arrives at their telepresence system or only after both arrive at their systems but without requiring any specific activity to initiate the link. Despite the telepresence link being established, in particularly advantageous systems, audio and video communication between the two systems linked by the communication will not commence until both Jen and Paul perform some simple process to opt into the session. For instance, see the telepresence icon 806 in FIG. 46 that may be selectable to opt into a session.

In at least some cases, communication link status, employee status and session opt in status may be indicated via station 54 affordances. For instance, text messages may be presented via screen 730 as indicated at 750 in FIG. 48 (e.g., "Paul has now arrived . . . ") and 752 in FIG. 49 (e.g., "Paul's video connection is queued up for the meeting and Paul has opted into the telepresence session"). In the alternative, a more glanceable indication of link, employee and session opt in status may be presented. To this end, for instance, regardless of the locations of Jen and Paul in the present example, once a telepresence communication link is established between the telepresence system in space 54 and the system to be used by Paul, a distorted image of the scene captured by the telepresence cameras at each end of the link may be presented at the other end of the link. Thus, for example, see the blurred image 756 shown in FIG. 49. In this case, if Jen sees a blurred image on screen 732, Jen would recognize that the telepresence link has been established but that audio and full video communication is not occurring. Here, if Paul is not yet at the remote end of the link, Paul would not appear in the blurred image and Jen could pick up on Paul's absence immediately. Once Paul arrives and appears in the blurred image, Jen would have a clear understanding that Paul is at the remote end of the link.

Figure 51:
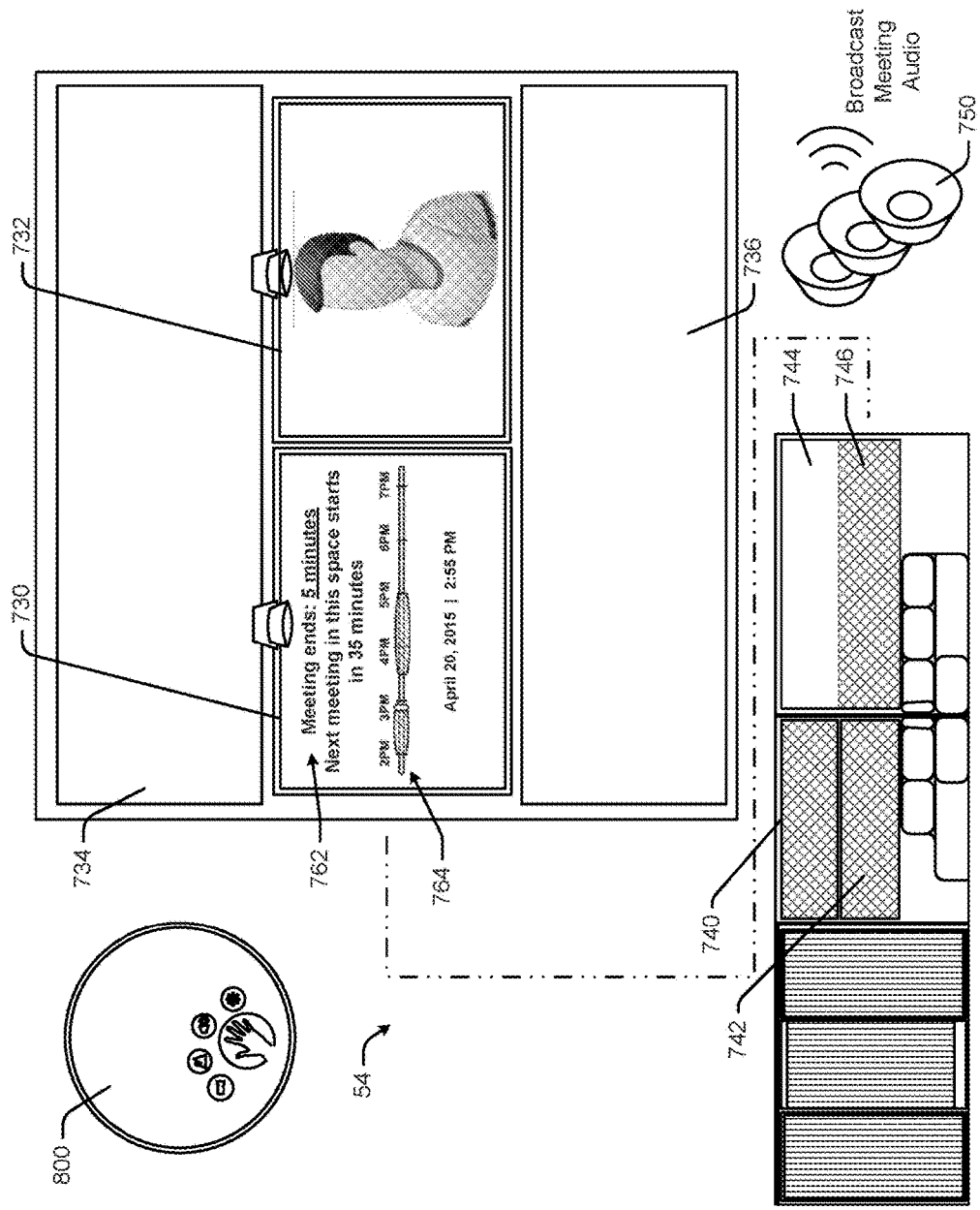
FIG. 51 is similar to FIG. 47, albeit showing the station affordances at yet another point in time.

Prior to Paul opting into the telepresence session, the blurred image 756 may be presented without any highlighting border or frame. Once Paul opts into the session, in some cases, a green border or some other type of indicator may be presented about the blurred image to indicate on Jen's end that Paul has opted into the session and is waiting for Jen to opt in. Similar opt in signaling may be provided at Paul's end of the link so that Paul is aware of whether or not Jen has opted into the session. Once both Paul and Jen opt into the session, full audio and video communication may commence between Paul and Jen as indicated in FIG. 51. Thus, a clear video image of Paul is presented on screen 732 and meeting audio can be broadcast via speakers 750.

In other cases, other sequences of link, employee and session status indications are contemplated. For instance, no remote image may be presented in at least some cases until at least one employee is available at a station 54 or other telepresence system and that employee has opted into the session. Here, once the employee opts in, again, a blurred image may be presented at the other end of the link until the second employee opts in. In still other cases, a remote image may not be presented at a location station 54 until the local employee at least arrives in the station 54.

Referring again to FIG. 49, in at least some embodiments it is contemplated that, while the wall subassemblies 702, 704, 706 and 708 as well as the ceiling structure over space 710 should be sound proof, in many cases at least some sound may penetrate the wall and ceiling subassemblies so that space 710 cannot provide complete audio privacy. In these cases, in at least some embodiments, it is contemplated that either a location tracking system or some type of presence sensor outside wall subassembly 702 may sense when another employee is located outside and relatively close to (e.g., within 6 feet) wall structure 702 and may present a warning to an employee in space 710. A lurking employee warning system is particularly important in cases where the wall panels 712, 714 and 716 are completely opaque as employees in space 710 may have a false sense of privacy. To this end, see in FIG. 49 that a presence sensor 753 is mounted to the outside of wall subassembly 702 for sensing that an employee 756 is located outside space 710. A suitable warning notice is presented at 754. Where a location tracking system can determine the identity of an employee outside space 710, the warning 754 may identify the employee outside space 710. To this end, see the exemplary warning 754 that indicates "Pete White is outside the door".

If Jen is preoccupied with some other activity and does not opt into the session at the scheduled time, the system server, in at least some embodiments, will not automatically start the telepresence communication and instead will provide some type of warning to Jen to indicate that session commencement is late. For instance, see FIG. 50 where Jen still has not opted into the telepresence communication even though the meeting was supposed to start 2 minutes prior. Screen 730 is updated to indicate "Your meeting was supposed to start 2 minutes ago" as shown at 760. In addition to providing the late meeting warning via text, the server 20 may control other room attributes to clearly present an alarm or provide a warning. For instance, speakers 750 may be controlled to audibly indicate that the meeting was to commence. As another instance, see that the color of light panels 740, 744, 734 and 736 has been changed from blue (as in FIG. 49) to green as indicated by the left up to right cross hatching.

Figure 50:
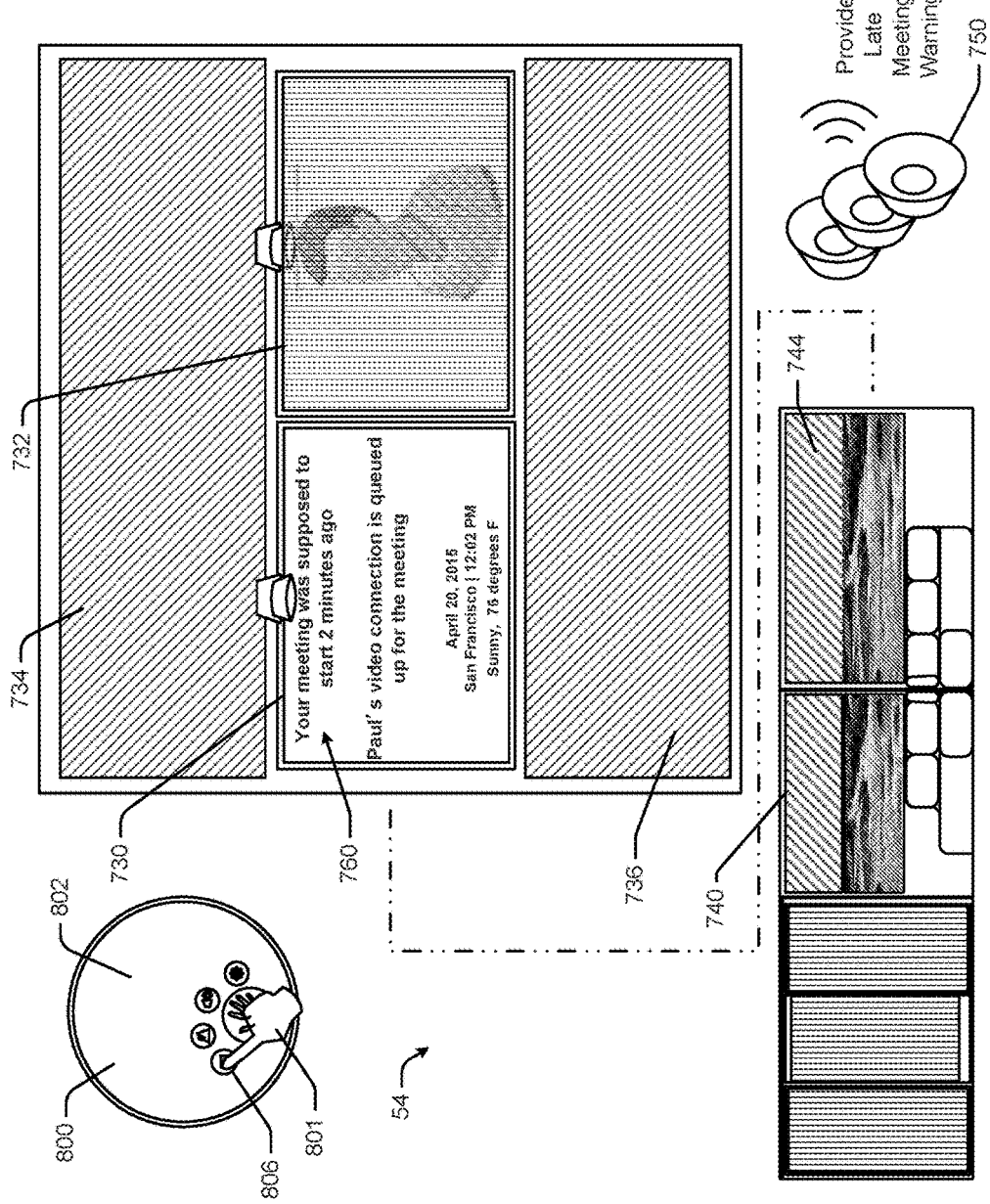
FIG. 50 is similar to FIG. 47, albeit showing the station affordances at yet another point in time.

In FIG. 50, a hand icon 801 is shown as a representation of Jen Black interacting with the table input device or surface 802. Here, for instance, recognizing that the meeting should commence, Jen may touch surface 802 causing the server to present other control icons including an opt into telepresence icon 806. Jen's hand representation 801 is shown selecting icon 806 to affirmatively opt into the session.

Once Jen opts into the session, assuming that the remote employee Paul has already opted in, the server enables audio and video communication between Jen and Paul. To this end, see in FIG. 51 that Paul's image on screen 732 is clear and no longer blurred. See also that the speakers 750 in FIG. 51 are now broadcasting the meeting audio (e.g., broadcasting Paul's spoken words to Jen in space 710).

In addition to supporting the telepresence communications, server 20 may also automatically control other space 710 affordances to enhance the telepresence effect. For instance, light panels 734 and 736 on the first or front wall 708 may be controlled to generate white light or some other light color that is optimal for telepresence activities. Similarly, side wall light panel 744 may be controlled to generate white light to eliminate any front light shadowing effect that could occur. Screens 742 and 746 may be controlled to present light in a color that is known to be optimal as a background for telepresence imaging purposes. Similarly, light panel 740 may be controlled to present an optimally colored background. In FIG. 51 panel 740 as well as displays screens 742 and 746 are shown blue as indicated by the dual diagonal cross hatching. In other embodiments, other images or videos may be presented via the display screens 742 and 746.

Once a meeting starts, lighting devices that generate light visible outside space 710 may be controlled to indicate the progressing or ongoing meeting status. For instance, consistent with the meeting status indicating convention described above, once the meeting starts, the status indicating lighting devices may be controlled to generate red light so that employees outside space 710 have a clear indication that a meeting is progressing in space 710.

Referring still to FIG. 51, as the telepresence meeting between Jen Black and Paul Pink progresses, server 20 may present "shot clock" information that, in general, indicates information about the end of the meeting. For instance, as shown at 762 in FIG. 51, shot clock information may include the time remaining prior to the scheduled ending time of the meeting. In addition, shot clock information may also include at least some information about the schedule of the space being used during the meeting. For instance, the shot clock information may include an indication of when a next meeting is scheduled to commence in the meeting space. Using the next meeting information, Jen can determine if it is possible to use room 54 for a period that extends beyond the scheduled end of the meeting. For instance, if a next meeting in room 54 is not to occur until 30 minutes after Jen and Paul's meeting, then Jen and Paul should have the option to extend their meeting in room 54 without disrupting the schedule associated with room 54. The next meeting information in the example includes the text "Next meeting in this space starts in 35 minutes". In addition, a "glanceable" time line 764 associated with the room 54 schedule is presented. A larger view of the time line is shown at 784 in FIG. 53 where the time line includes a time scale 786, a current meeting bar 788, a current time indicator 792 and a next meeting indicator 790. The graphical representation 784 should allow Jen to quickly assess if she needs to end the meeting with Paul by the scheduled time or if the meeting can be extended.

While not shown, in other embodiments where a remote telepresence attendee like Paul is using an affordance configuration at another location that is also associated with a use schedule, the shot clock information may also include information akin to the space schedule information at 764 for Jen and/or Paul to view so that the schedules of both the space owned by Jen and the space owned by Paul can be considered when determining a meeting end time. In other cases, a server may identify which of Jen's and Paul's space is next scheduled for use after the current meeting and may only present space schedule information for that space as that space's schedule will then be the limiting factor on how long the current meeting can proceed. For instance, where Jen's room 54 is scheduled for next use 30 minutes after the end of the current meeting and Paul's space is scheduled for use 15 minutes after the end of the current meeting, only Paul's space schedule information may be presented to each or at least one of Jen and Paul for consideration.

In many cases employees meeting in room 54 or attending a meeting in room 54 via telepresence will want to share various types of digital content with other local or remote meeting attendees. For instance, in the present example, Paul Pink may want to share a word processor document with Jen Black via one of screens 730 or 732 and Jen may want to share images of a new product with Paul in a similar fashion. In many cases, employees carry their own personal portable devices such as laptops, tablet type devices, smart phones or wearable devices like a smart watch, a badge, etc., where content that may be shared is stored on one of those devices or is accessible via one of those devices (e.g., accessible via a wireless link to a network). In the present example, an exemplary personal tablet type device (hereinafter "the tablet") is shown at 813 in FIG. 44.

Referring still to FIG. 44, in the present example, when Jen brings tablet 813 into space 710, it is particularly advantageous if a system server can recognize tablet 813 in space 710 and automatically or at least semi-automatically associate tablet 813 with space 710 and facilitate content sharing if Jen decides to share content stored on or accessible via device 813. To this end, several methods and processes for automatically or semi-automatically associating a portable computing device with a space or specific set of affordances in a larger space are described in U.S. patent application Ser. No. 13/912,442 (hereinafter "the '442 application") which is titled Personal Control Apparatus And Method For Sharing Information In A Collaboration Workspace" and which was filed on Jun. 7, 2013. The '442 application is incorporated herein in its entirety by reference. In the '442 application, once a device is associated with a space or specific set of display screens, virtual control icons are presented on the portable device screen over the top of a desktop image of content being generated by an application running on the portable device where the control icons enable the employee to select one or more common display screens in a space to share real time desktop images or any other content (e.g., videos) being presented on the portable device screen. Here, in at least some cases, an overlaid virtual interface may be automatically presented on an employee's portable device for sharing underlying desktop content.

Referring to FIG. 52, exemplary shared content 772 is shown on screen 730. In the present example, it is contemplated that the content 772 may be provided via Jen Black's personal portable device 813 (see again FIG. 44) or via a remotely linked computer being used by Paul Pink. When content is shared on screen 730, the shot clock information may be reformatted and placed in a ribbon or field along an edge of the presented content in a smaller version. For instance, see in FIGS. 52 and 53 that a shot clock field is presented at 780. Field 780 includes the time remaining information 782 as well as the glanceable space schedule information described above at 784.

In cases where one or more employees are using configuration 54 to amplify information and no other employee remotely links to the configuration, both screens 730 and 732 can be used to amplify content from two different portable personal devices or, in some cases, from two different applications run on the same portable device or from two other sources.

In some cases an employee may be able to access and share at least some content with local and remote employees using the UI provided as part of station 54. To this end, U.S. patent application Ser. No. 14/640,288 (hereinafter "the '288 application") which is titled "Method And Apparatus For Facilitating Collaboration Sessions" which was filed on Mar. 6, 2015 and which is incorporated herein by reference in its entirety, teaches a conferencing system that enables a user to post content (e.g., files, documents, records, images, etc.) to a session or meeting queue prior to commencement of the session (and in some cases also in real time during the session) that can be accessed during the session to share with other conferees attending the session. In at least some cases a queue type system akin to the system described in the '288 application may be implemented be server 20. In this case, during a session in station 54, the UI may allow an employee to access the session content queue and share records or files in the queue via screens 730 and 732. For example, see the exemplary content queue at 1310 in FIG. 72 where content icons (e.g., 1316, 1318, etc.) may be selectable to access and share content. A queue akin to 1310 may be presented via the top surface of table assembly 800 in station 54 (see again FIG. 46). Where content is shared in space 710, that content is mirrored on remote screens for remotely linked employees to see.

Referring again to FIG. 44, in at least some embodiments, it is contemplated that a system server may automatically move a UI 804 around in space 710 to different screens or emissive surfaces and to different locations on those surfaces to present the UI 804 proximate an instantaneous location of at least one of the employees in space 710. For instance, in FIGS. 44 and 46, if the illustrated employee were to move to a different position on couch 738 as shown in phantom in FIG. 46, the UI may be moved to the location shown in phantom at 804a to be proximate the employee at the new location. Similarly, if an employee stands up and moved to a location proximate screen 730 as shown in FIG. 52, the UI or at least an instance thereof may be moved to the location shown at 804b proximate the employee in space 710.

Consistent with the meeting status indicating convention described above, once within five minutes of the scheduled end of Jen and Paul's meeting, server 20 may control the session indicating lighting outside space 710 to indicate that the end of the meeting is approaching. Consistent with the meeting status indicating convention described above, the status signalling lighting in the present example is controlled to generate blue light indicating the end of a meeting.

When Jen and Paul's meeting is over, the system server may control configuration 54 affordances to help Jen transition out of space 710 and on to another affordance configuration optimized for her preferences, based on her schedule and based on other factors. To this end, see FIG. 54 where the glass panels that form wall 702 are rendered transparent. Here, the wall 702 panels may be rendered transparent automatically when the telepresence session with Paul ends. In the alternative, the wall 702 panels may remain opaque until door 714 is opened by Jen. In still other embodiments, the wall 702 panels may be completely opaque during the telepresence session, rendered only partially opaque once the telepresence session has ended and while door 714 remains in the closed position and then rendered completely transparent when Jen opens door 714. Here, by rendering the panels partially opaque prior to opening door 714, other employees outside space 710 should be able to see movement within space 710 that is indicative of the employees in space 710 wrapping up their meeting and Jen, in space 710, should be able to perceive if anyone is lurking about outside space 710 that may be waiting for her to leave that space while Jen still has at least some visual privacy within space 710.

Figure 54:
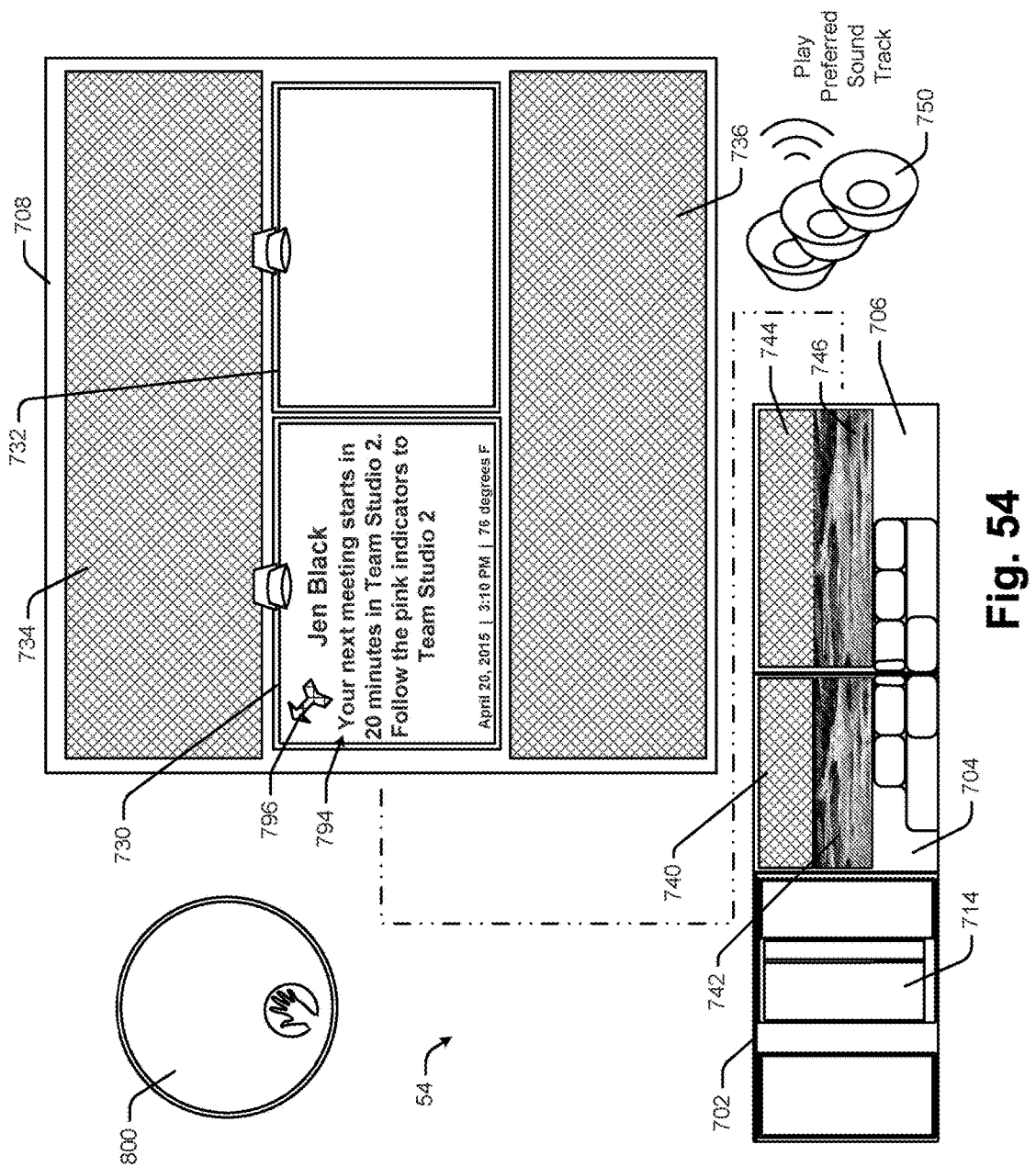
FIG. 54 is similar to FIG. 47, albeit showing station affordances at another point in time.

Referring still to FIG. 54, in addition to changing opacity of wall 702 panels, the server may commence another guidance activity by presenting schedule information to Jen as shown at 794 warning of a next scheduled meeting including time and location of the next meeting. In addition, the server may again assign a guidance indicator color to Jen and present the assigned color as shown at 796. Here, again, Jen should be able to follow a string of visual guidance indicators through space 12a to a destination configuration where her next scheduled activity will occur. Where two or more employees used space 710 during a meeting, guidance information akin to information 794 for each of the employees may be presented via screen 730 or screen 732.

In addition, as Jen is packing up and transitioning out of space 710, server 20 may generate white light viewable from outside space 710 to indicate to other employees in the area that the ending meeting is wrapping up and employees are still packing up and leaving space 710. Once Jen and other local employees leave space 710, the status indicators outside space 710 are controlled to either indicate that space 710 is available for use or to indicate that a next meeting in space 710 will be starting shortly.

Hereafter, several processes for expediting initiation of a telecommunication session where an employee simply walks up to an amplifying kiosk without having first requested a telepresence session are described. In at least some cases it is contemplated that an employee may be able to take ownership of one of the enhances privacy stations 54 by simply walking up to an available (i.e., unowned) station 54 and starting to use that station. Here, the expedited telecommunication session processes described below in the context of an exemplary kiosk may also be supported in a station 54.

E. Content Amplifying Kiosk

In some cases, a first employee may need a space for amplifying her content to share with another local employee or may need to participate in a telepresence session with a remote employee where the first employee does not want to take ownership of a full room configuration (e.g., 54 or 62) for some reason. For instance, in cases where a facility has only a limited number of full room configurations, an employee that only needs content amplifying or telepresence capabilities for a short time may want to leave the full room configurations for use by other employees. As another instance, where an employee does not require complete visual and/or audio privacy, the employee may simply want to access amplifying tools or telepresence tools as quickly as possible and as closely as possible.

The exemplary amplifying kiosk 58 shown in FIGS. 55 through 61 is optimized for semi-private telepresence sessions and content amplification. The general structure of kiosk 58 is described in U.S. patent application Ser. No. 14/320,984 titled "Work And Video Conference Assembly" which was filed on Jul. 1, 2014 and which is incorporated herein in its entirety by reference. In general, kiosk assembly 58 includes an upright frame structure 832 that supports a substantially horizontal table top member 834. The frame structure 832 extends upward adjacent a rear edge of the top member 834 and supports a shroud 842 that wraps about a receiving space that opens forward in the direction of top member 834. A flat panel display screen 836 is mounted in the receiving space to be located adjacent and above the rear edge of top member 834. A high definition camera 838 is mounted centrally above screen 836 which is useable to facilitate telepresence sessions. A directional microphone or sound sensor device 873 is mounted to one of the frame or the shroud and is directed toward an area that is generally aligned with a field of view of the camera 838 so that when an employee is located in the field of view of the camera and speaks, the employee's spoken words can be obtained. The shroud 842 includes wing members 840 that extend laterally to provide at least some privacy for information on screen 836.

Referring still to FIG. 55, a guidance indicator 30y is mounted at the top end of one of the wing members 840 to be viewed from the screen side of shroud 842. While indicator 30y is shown as independent of screen 836, in other cases screen 836 or a portion thereof may be controlled to provide the indicator functionality. As in the other configurations described above, whenever an employee is using or temporarily owns a kiosk, an indicator (see 906 in FIG. 61) indicating the specific employee is presented at the configuration. Here, the indicator lets other employees know that Jen Black temporarily owns the kiosk. In addition, the indicator makes clear who messages, notices, etc., are being provided to by the kiosk subassembly and system server.

Figure 57:
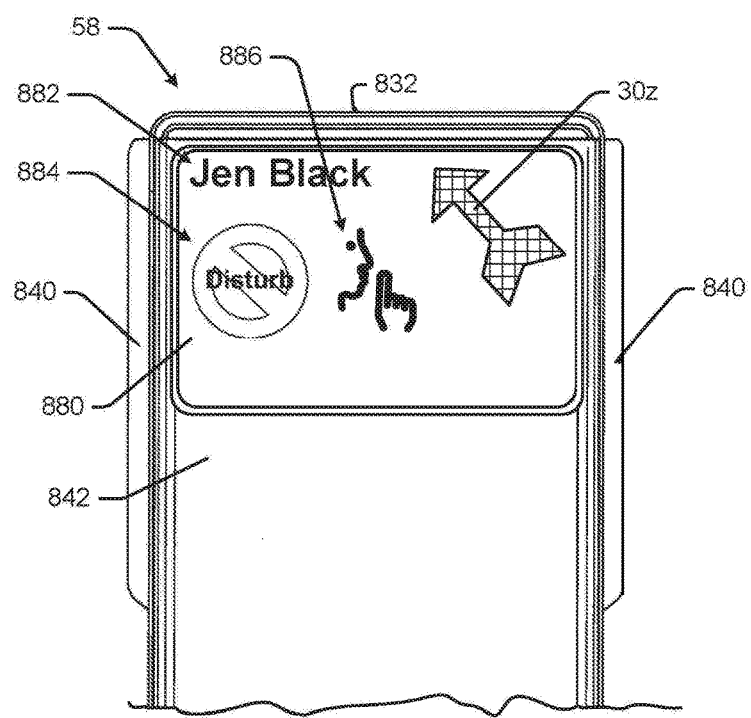
FIG. 57 is a rear plan view of the kiosk shown in FIG. 55.

Referring to FIG. 57, another display screen 880 is mounted to the rear surface of shroud 842 in at least some embodiments. Screen 842 may be controlled to present various types of information as shown such as, for instance, visual guidance indicators 30z, a do not disturb indicator 884, a quiet reminder 886, name plate (e.g., "Jen Black") or kiosk ownership (e.g., "Available", "Occupied", etc.) information 882, etc. Other information may also be provided via screen 880. Screen 880 may be a flat panel electronic screen, projected, etc.

Referring again to FIG. 55, a leg assembly 845 that supports top member 834 may be height adjustable as indicated by double headed arrow 841 so that the height of the table top can be adjusted to meet an employee's preference. In at least some cases the leg assembly 845 will include a motor or other type of actuator that can be controlled by server 20 to raise and lower the table top 834 automatically to meet employee preferences when an employee takes ownership of the kiosk. In at least some cases controls will be provided to allow an employee to adjust table top height as described in more detail hereafter.

Referring still to FIG. 55, in at least some cases camera 838 may be mounted via a swivel assembly and may include a motor or other type of actuator that can be used to adjust the position of the camera's field of view up and down as indicated by double headed arrow 839. In at least some cases it is contemplated that a system server 20 may be programmed to receive images or video from camera 838, examine the images to identify faces of employees at kiosk 58 and to then adjust camera 838 accordingly and automatically to optimize the images presented to a remote telepresence participant. Thus, for instance, where an employee at kiosk 58 moves from a seated position to a standing position, the camera 838 may be controlled to raise the camera's field of view to maintain relative position of the employee in the field of view. In other cases, the camera's orientation and field of view may be linked to the height of the table top 834 so that as the table top is raised and lowered, the trajectory of the camera's field of view is raised and lowered accordingly.

In at least some embodiments, in addition to the table top 834 being moveable up and down, screen 836 may be mounted to the shroud and frame assembly to be raised and lowered to meet preferences or automatically to optimize for different table top 834 heights or different heights or positions of employees at the kiosk 58. To this end, the U.S. application Ser. No. 14/320,984 which is incorporated above by reference in its entirety describes a screen height adjustment system including actuators that may be automatically controlled to change the height of a screen supported within a shroud defined space. The '984 application assembly may be included in at least some embodiments of the kiosk assembly contemplated here.

Figure 56:
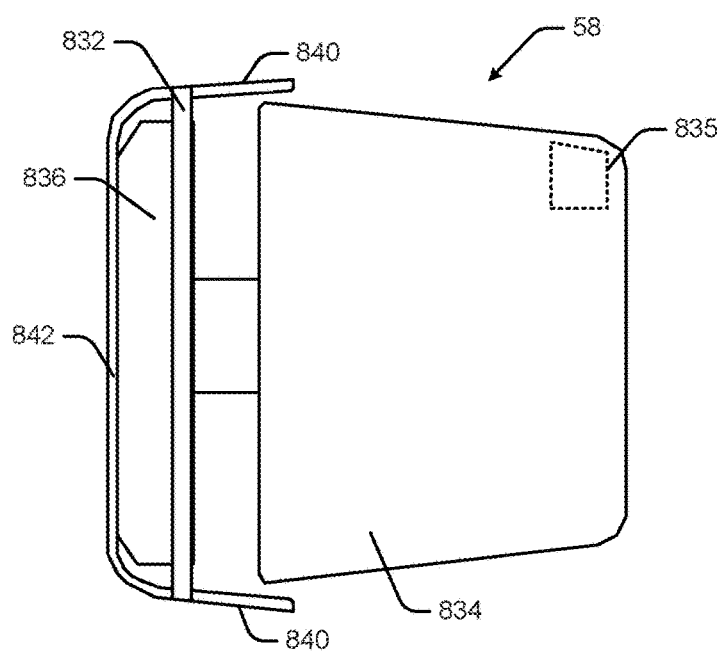
FIG. 56 is a top plan view of the kiosk shown in FIG. 55.
Figure 58:
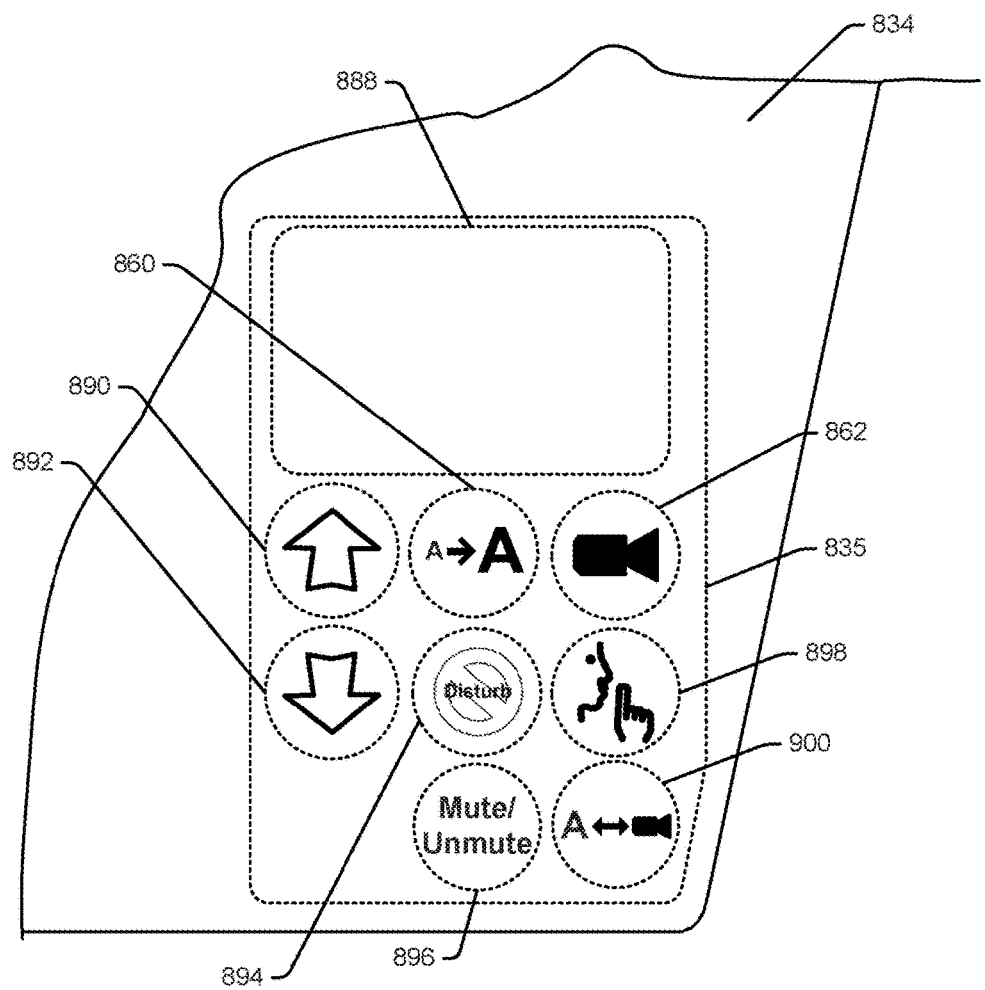
FIG. 58 is a top plan view an exemplary user interface that may be provide as part of the kiosk of FIG. 55.

Referring to FIGS. 56 and 58, in at least some embodiments it is contemplated that a capacitive touch control panel or interface 835 akin to the bench and focus station interfaces described above may be built into kiosk table top member 834 for controlling various features of the kiosk 58. In FIG. 58 the exemplary interface 835 includes a plate type RF ID reader 888, up and down buttons 890 and 892 for adjusting the height of the table top 834 (as well as the camera 838 angle and/or the screen 836 height in some cases), a content amplify button 860, a telepresence button 862, a do not disturb button 894, a quiet button 898, a mute/unmute button 896, and a content/telepresence toggle button 900. RF ID reader device 888 enables employees to walk up to kiosk 58 and take temporary ownership in at least some embodiments. In other cases association with kiosk 58 may be established by a system server offering ownership to a proximate employee and the proximate employee accepting ownership in some fashion. For instance, when an employee walks up to kiosk 58, a server may flash fade buttons 860 and 862 on and off with green illumination and may present an invitation via screen 838 to the present employee asking if the employee would like to use the kiosk 58. The invitation may be generic or may, where employee identity is known, be specific to the present employee (e.g., "Welcome Jen Black. Would you like to use this kiosk?"). Here, the employee could select either of the fading on and off buttons 860 or 862 to take ownership.

In general, kiosk 58 is optimized to facilitate two different types of activities including content amplification and telepresence sessions. To this end, button 860 may be selected to indicate that the employee wants to present content in an amplified format (e.g., a large format) on screen 836. Second, button 862 may be selected to indicate that the employee wants to use the kiosk to facilitate a telepresence session.

When amplification button 860 is selected, the system server may guide the employee through a quick process to associate specific content with kiosk 58 for sharing. Here, the association process may include identifying a document or the like that is stored in a database linked to the server 20. For instance, a session or meeting queue as described in the '288 application that is incorporated by reference above may be accessible to an employee at kiosk 58 for accessing and sharing content. In other cases, the association process may require an employee to link a portable laptop (see 857 in FIG. 55) or other computing device used by the employee to the kiosk either wirelessly or via a cable (not illustrated) that forms part of the kiosk assembly. Again, the '442 application which is incorporated above in its entirety by reference teaches several device to amplifying system association processes, any of which may be used in the systems described in the present disclosure.

When telepresence button 862 is selected, a system server may request other system or other employee information useable to identify another telepresence system to connect to. Here, the server may present a list of telepresence systems and enable the employee to select one system from the list. In a better system, a first employee may indicate a second employee that the first employee wants to commence a session with and the server 20 may be programmed to attempt to locate the second employee proximate a telepresence system in any enterprise facility (or even non-enterprise facilities where the location tracking system can track employee locations in non-enterprise spaces). If the second employee is located and a second telepresence system (e.g., a telepresence system in addition to the one at kiosk 58) is available in the general area of the second employee, the system may cause an e-mail, text or other message type to be transmitted to the second employee to invite the second employee to the telepresence session. Here, the invite message may indicate the location of the second telepresence system.

Upon the second employee accepting the invite, the kiosk or other affordance configuration that includes the second telepresence system may be assigned to the second employee and some type of ownership indication (e.g., yellow light, a salutation for the second employee, nameplate type information) may be presented at that kiosk until the second employee arrives. In addition, once the second employee accepts the invite, server 20 may initiate a telepresence communication link between the telepresence system at kiosk 58 and the second telepresence system so that when the second employee arrives at the second telepresence system, the telepresence session may commence immediately.

Communication link status, employee status and session opt in status may be indicated via kiosk 58 in any of the ways described above with respect to the enhanced privacy station 54. For instance, text messages may be presented via screen 836 indicating that the remote employee's video connection is queued up for the session and that the remote employee has opted into the telepresence session. In the alternative, a more glanceable indication of link, employee and session opt in status may be presented. To this end, for instance, regardless of the locations of Jen and Bart in the present example, once a telepresence communication link is established or after at least one of a local and a remote employee has opted into the session or after both the remote and local employees have opted into the session, a distorted image (see 904 in FIG. 60) of the scene captured by the telepresence cameras at each end of the link may be presented at the other end of the link. I still other cases, prior to a remote employee opting into the telepresence session, the blurred image on screen 836 may be presented without any highlighting border or frame. Once the remote employee opts into the session, in some cases, a green border or some other type of indicator may be presented about the blurred image to indicate that the remote employee has opted into the session and is waiting for the local to opt in. Similar opt in signaling may be provided at the remote end of the link so that the remote employee is aware of whether or not the local employee has opted into the session. Once both the local and remote employees opt into the session, full audio and video communication may commence. As in the case of station 54 above, in other cases, other sequences of link, employee and session status indications are contemplated.

When the second employee arrives at the second telepresence system and after the telepresence communication link is established, the second employee can opt into the session via selection of a telepresence button or the like akin to button 862 in FIG. 58. When the second employee arrives at the second telepresence system, the system server may present a welcoming salutation and instructions to opt in by selecting the telepresence button. Here, the server may first determine identity of the arriving employee and may only allow opt in after confirming the identity of the second employee in some fashion (e.g., an RF ID badge, face or other biometric recognition, etc.).

Figure 59:
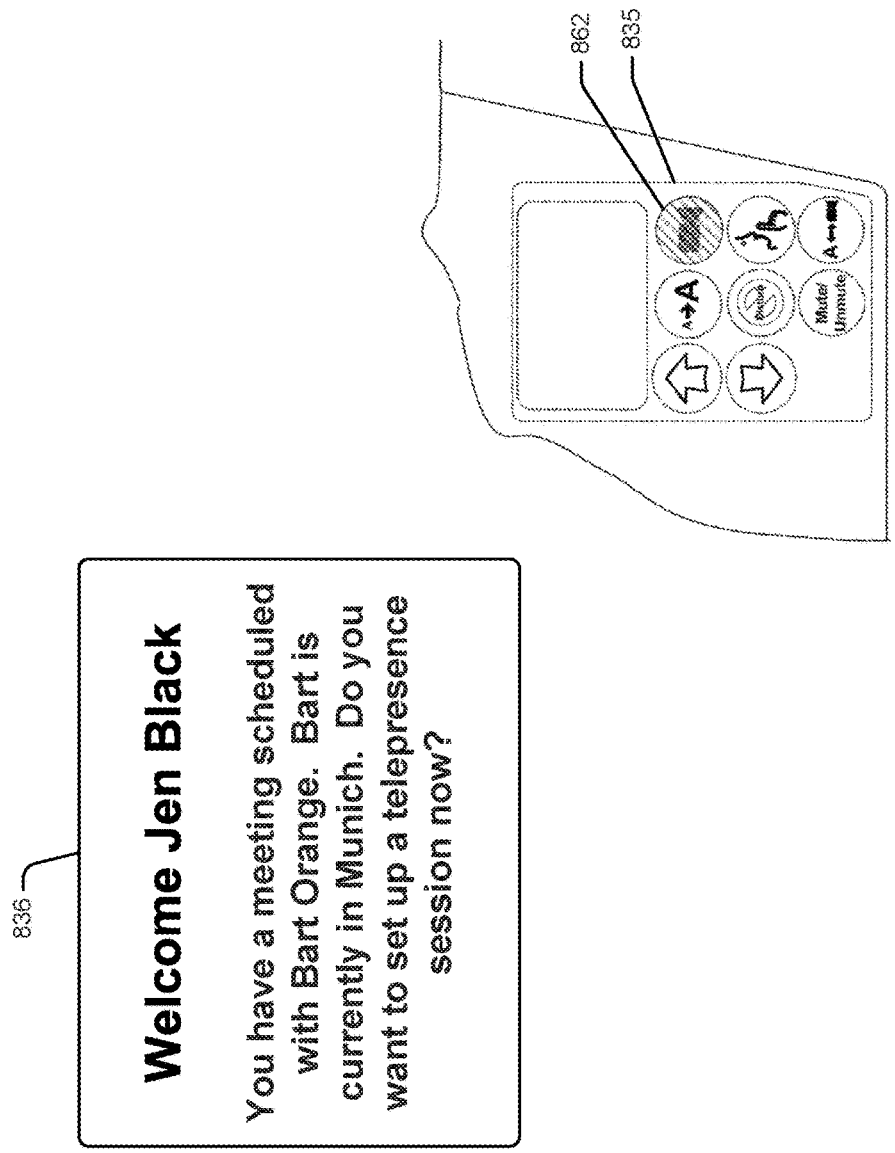
FIG. 59 is a schematic view showing the interface of FIG. 58 and the screen of FIG. 55.
Figure 60:
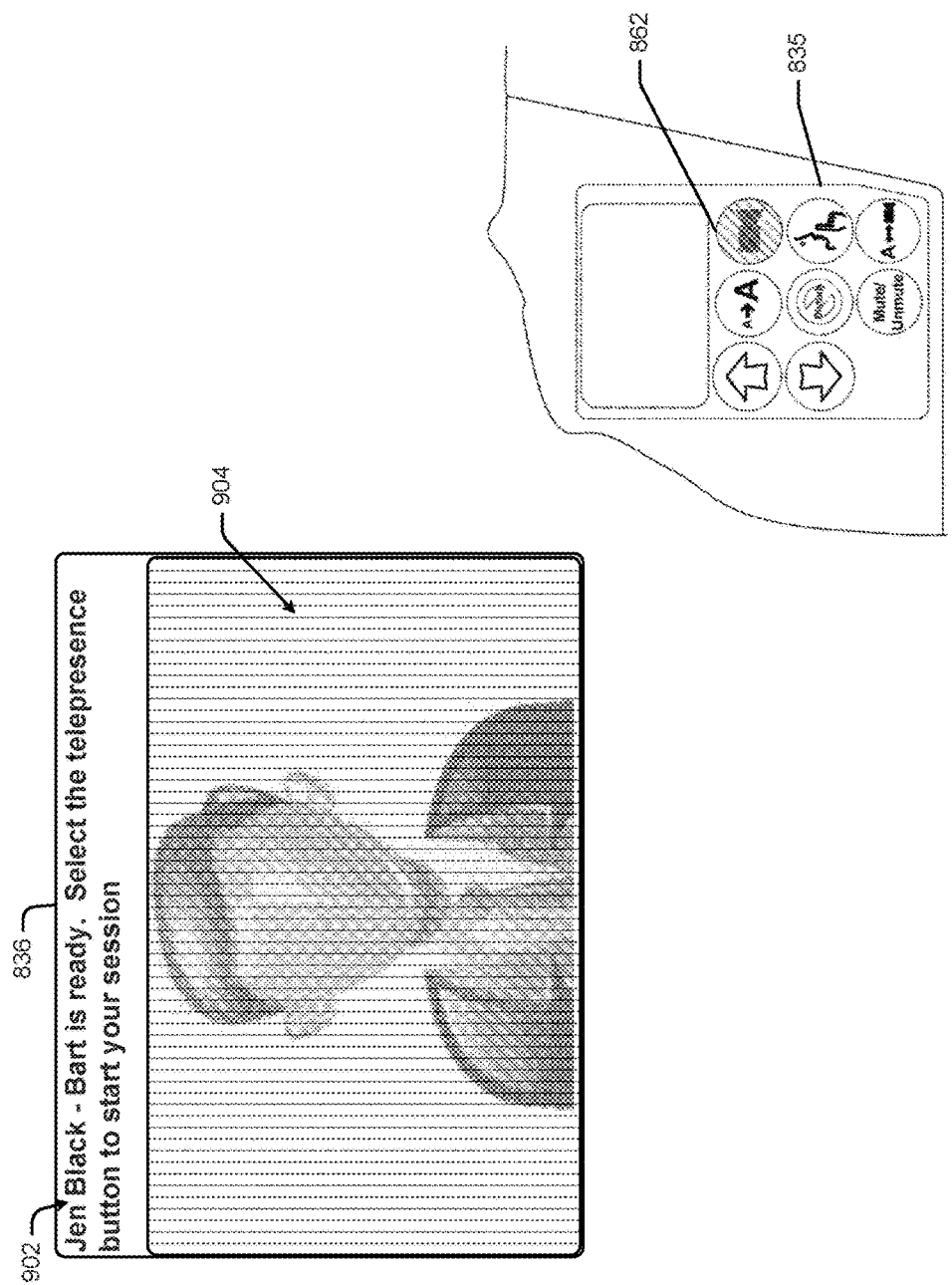
FIG. 60 is similar to FIG. 59, albeit showing the screen at a different point in time.

To expedite the telepresence initiation process even more, when a first employee arrives at kiosk 58, the system server 20 may automatically determine the identity of the first employee and access the first employee's schedule. If the first employee is scheduled for either a telepresence session or, in some cases, any type of meeting with a second or more remote employees, the system may be programmed to at least initially assume that the first employee intends to start a telepresence session with the remote second (or more) employee. Here, the initial greeting salutation may query if the first employee wants to initiate a telepresence session. To this end, see FIG. 59 where screen 836 greets Jen Black when she arrives at kiosk 58, indicates a meeting Jen has scheduled with a second employee Bart Orange, and queries if Jen would like to initiate a telepresence session with Bart. Interface 835 is also shown in FIG. 59 where the telepresence button 862 is shown illuminated green to invite Jen to initiate a telepresence session with Bart Orange. When button 862 is selected, the process of identifying a second telepresence system and making that system available to Bart Orange as described above would commence.

In still other embodiments, where a first employee approaches a kiosk 58 and has a meeting scheduled with a second remote employee within some short threshold time period (e.g., 10 minutes), system server 20 may automatically and immediately attempt to locate the second employee and determine if the second employee is proximate a second telepresence system. Here, prior to either the first or second employee indicating a desire to initiate a telepresence session, the server 20 may initiate a communication link between the first and second telepresence systems and send an e-mail or other invitation to the second employee to participate and indicating a kiosk or other affordance configuration that includes the second telepresence system for use by the second employee. In this case, when the first employee arrives at kiosk 58, the salutation shown in FIG. 59 may be presented and, if the offer of a session is accepted, the session can start more quickly and, in at least some cases, may be initiated immediately as the communication link may already be established and the second employee may already be located at the second telepresence system.

Thus, in a highly automated system contemplated here, first and second employees at different locations but proximate first and second telepresence systems where the first and second employees have a meeting scheduled within a threshold time period may automatically trigger setting up a telepresence session between the first and second telepresence systems and a session offer to the first and second employees that requires opt in from each to be started.

In still other embodiments, where first and second employees are at different locations and proximate first and second telepresence systems and the first and second employees have a meeting scheduled within a threshold time period, where a telepresence communication link is automatically established, blurred images from the first and second telepresence systems may be presented via the screens at the second and first systems, respectively, along with an opt in offer at each system for the first and second employees to accept. In this regard, see FIG. 60 where a blurred image of a remote scene from a remote telepresence system is shown at 904 with a request for the local employee to opt into a telepresence session as shown at 902. Again, button 862 is illuminated to invite the local employee to opt into the session.

Here, prior to one of the employees arriving within the field of view of the camera at a proximate telepresence system, the blurred image presented at the other end of the linked systems would not include the employee. Once an employee moves into the field of view of the camera at a proximate telepresence system the blurred image presented at the other end of the linked systems would include a representation of the employee and be an indication to the other employee that the session is ready to commence. Thus, in this case, two employees that are remote from each other that have a meeting scheduled for a specific time simply need to arrive at proximate telepresence systems at about the scheduled meeting time and the system will automatically initiate a telepresence session using the proximate telepresence systems, only requiring that each employee opt into the session to actually start intelligible audio and video communication.

In still other embodiments it is contemplated versions of any one of the automated or semi-automated telepresence systems described above may be implemented where a remote employee uses a portable computing device with a camera and a screen instead of a second telepresence system provided as part of an affordance configuration. For instance, where a first and second employees at different locations have a meeting scheduled and the first employee is approaching a first kiosk 58, again, the system server may automatically attempt to initiate a telepresence session between the first and second employees. Here, if the server either cannot determine the location of the second employee or the second employee is not near a dedicated telepresence system, the server may automatically attempt to initiate a telepresence session between the telepresence system at the first kiosk and a portable computing device used by the second employee. In this case, the process of initiating the communication link would be similar to that described above. Once the link is automatically made, an option to opt in can be provided to each of the first and second employees, the offer to the first employee being made via the screen at the first kiosk 58.

In at least some embodiments it is contemplated that a kiosk may be used to simultaneously amplify content at the kiosk as well as to participate in a telepresence session. Here, in some cases two substantially similarly sized rectangular windows (not illustrated) may be opened up on screen 836 where content is shared in one window and a telepresence image of a remote employee is presented in the second window in a split screen fashion. In other cases, one or the other of content and a telepresence image may be presented in a large format as shown at 908 in FIG. 61 while the other of the content and telepresence image may be presented in a smaller window or picture in picture window as shown at 910 in FIG. 61. Here, the content to telepresence toggle button 900 may be selected to toggle between content and the telepresence image.

While a telepresence session is progressing, to add content amplification to the session, in at least some embodiments an employee may simply select content amplification button 860. Once button 860 is selected, an employee identifies content to share and then the shared content is presented on display screen 836. Again, the content to share may be provided by a cable connected or wirelessly linked laptop (see again 857 in FIG. 55) or in some other fashion. Similarly, to add telepresence to a meeting while kiosk 58 is already being used to amplify content, button 862 is selected and some process for identifying another telepresence system to link to would commence.

In at least some embodiments, as indicated at 884 and 886 in FIG. 57, some type of signaling designed to affect behavior of employees in the general area of kiosk 58 is controlled by system server 20. For instance, referring also to FIG. 58, when an employee selects the do not disturb icon 894, the do not disturb indicator 884 is presented persistently via screen 880 on the back surface of the shroud 842. As another instance, when an employee selects the silence or quiet button 898, indicator 886 may be persistently presented to encourage employees in the general area to keep noise down. In other cases indicator 886 may only be presented when sound sensors (e.g., microphones) in the area including kiosk 58 pick up noise at a level that exceeds a threshold level. In still other cases, whenever a telepresence session is progressing at kiosk 58, indicator 886 may be automatically persistently presented or, again, may be presented when noise level in the area about the kiosk rises above a threshold level. In at least some cases the system server may be programmed to compare voices of employees at kiosk 58 and picked up by directional microphone 873 to voices picked up generally by microphones 877 in an area about kiosk 58 and the quiet indicator 886 may only be presented when noise other than the voices of the employees at kiosk 58 exceeds the threshold level.

Figure 61:
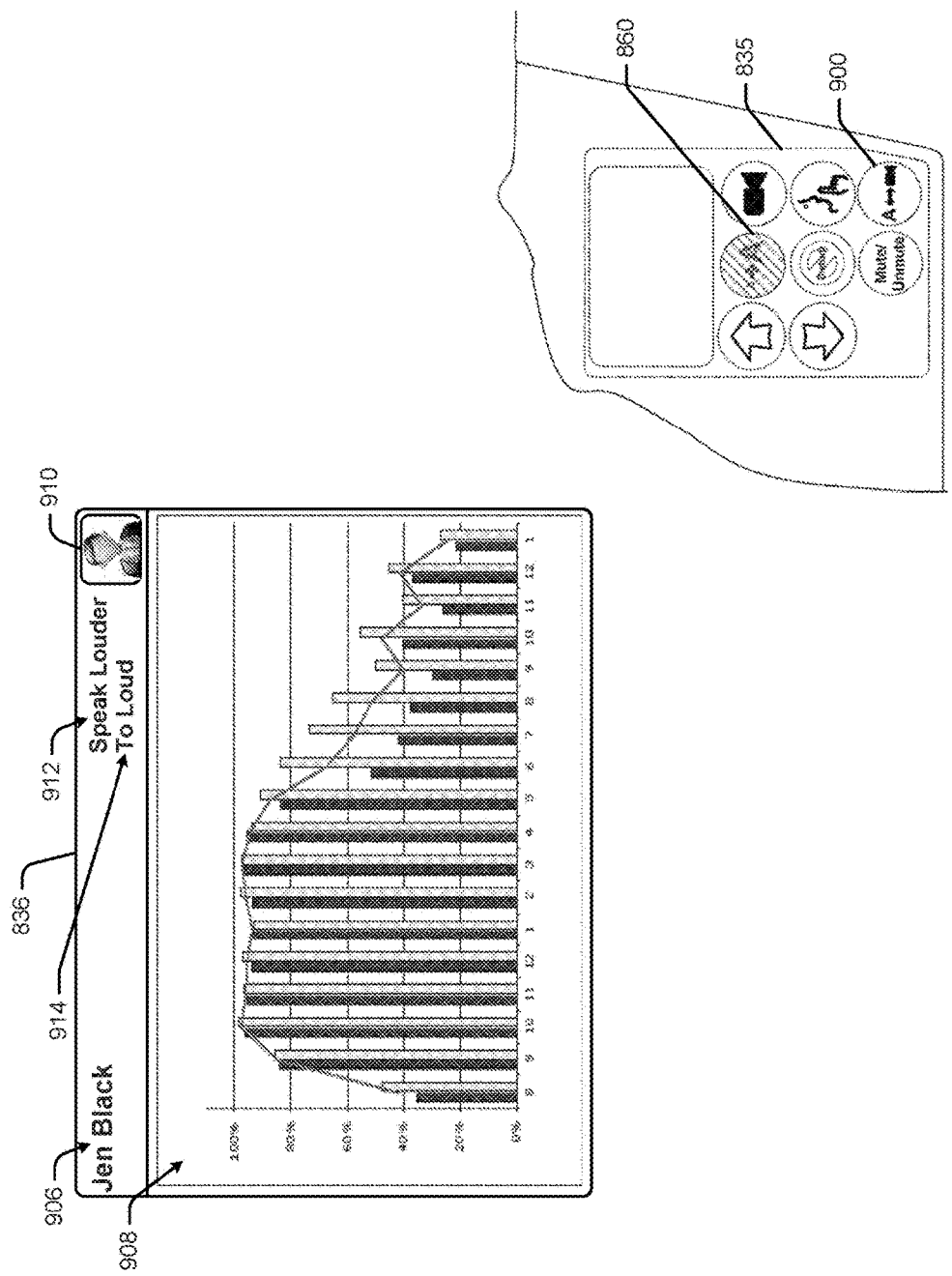
FIG. 61 is similar to FIG. 60, albeit where the screen presents content as opposed to presenting a large representation of a remote employee.

In at least some embodiments it is contemplated that the system server may monitor the volume of words spoken by employees at kiosk 58 and may perform some process to avoid the case where audible content can be heard by other employees that are not participating in activities at the kiosk or at locations remotely linked to the kiosk. For instance, unless an employee purposefully and knowingly turns up the telepresence volume, in some cases, the server may limit the telepresence volume to a maximum level intended to avoid broadcast past a small area associated with kiosk 58. As another instance, where an employee using kiosk 58 is speaking too loudly, an indicator 914 as shown in FIG. 61 may be presented to encourage a lower volume. An employee's volume may be determined via sound received at microphone 873 or via sound received by the microphones 977 in the general area of kiosk 58 or by any combination thereof. For instance, again, sound picked up by the general area microphones 877 may be compared to sound picked up by kiosk microphone 873 to identify the source of the sound (e.g., from the kiosk or from the area generally) and, where the sound from employees at the kiosk alone exceeds the threshold level, the indicator 914 may be presented.

In still other cases, it is contemplated that microphones (not illustrated) located at a connected end of a telepresence session may be used to measure the volume of voice from a local employee and to indicate if the local employee should speak louder. For instance, in the present example, if Jen Black is speaking too softly for Bart Orange on the other end of a telepresence session to hear well, the server may present a message 912 encouraging Jen to speak louder as shown in FIG. 61. While not shown, in some cases the interface 835 (see again FIG. 61) may include another button selectable by a local employee for indicating to a remote employee linked to a telepresence session that the remote employee should speak more loudly.

In some embodiments noise level or volume level indicators may only be presented when one or more other employees are at locations where the volume level could be disruptive. For instance, if only one employee is located in space 12a in FIG. 1, it makes no sense to indicate that the employee's volume level is to high and therefore the indicator 914 in FIG. 61 may not be presented. In some cases whether or not indicator 914 is presented or not given a specific volume level will be based on locations of other employees in space 12a. For instance, where a second employee is forty feet from a kiosk 58 and a microphone proximate the second employee does not pick up any sound from the kiosk 58, no indication 914 would be present but if the second employee moves to a location twenty feet from the kiosk where a proximate microphone senses sound at a volume level that exceeds a threshold level from kiosk 58, indicator 914 would be presented.

In some embodiments, at least some affordance control tools may be provided on the display screen of a personal portable device. To this end, for instance, see FIG. 62 where a portable laptop computer 857 is illustrated that includes, among other components a display screen 920 for presenting content and a subset of kiosk control tools. Exemplary content is shown at 922 while exemplary kiosk control tools are shown in a left edge ribbon or toll bar section of screen 920. The exemplary kiosk control tools include a telepresence icon 924, a content amplification icon 926, a do not disturb icon 928, a silence request icon 930, a mute/unmute icon 932 and a speak louder icon 934. Here, the icons 924, 926, 928, 930 and 932 control the kiosk structure 58 in ways that are akin to the way the similarly labeled buttons in FIG. 58 control the kiosk components. Speak louder icon 934 is selectable to indicate to a remote employee linked via a telepresence system to the kiosk 58 to speak louder.

Figure 62:
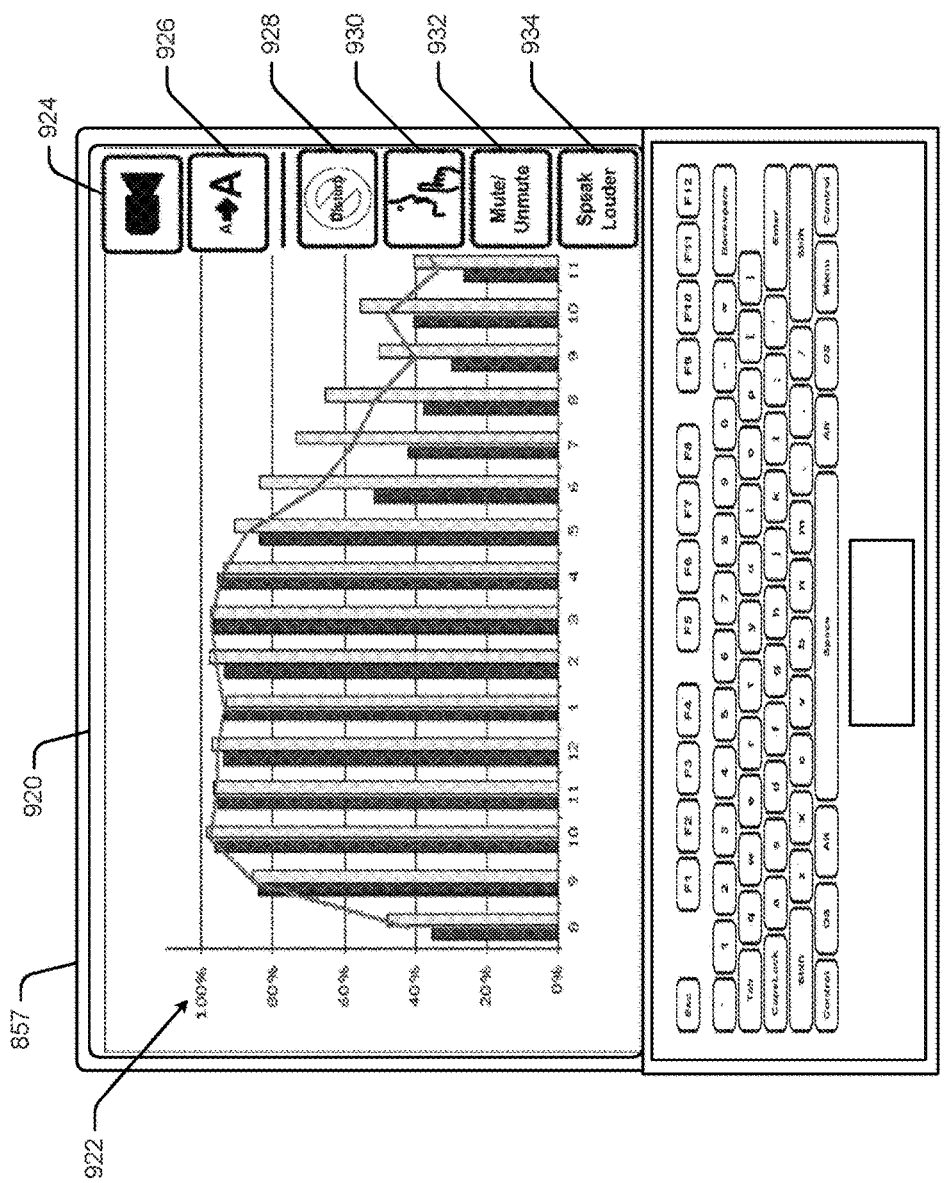
FIG. 62 is a schematic view of lap top computer including a kiosk control user interface that is consistent with at least some aspects of the present disclosure.

Referring still to FIG. 62, here, it is contemplated that an employee will associate her laptop 857 with a kiosk in some fashion and, once the association is complete, system server 20 will cause the control icon tool bar to be presented over the desktop image presented on screen 920 via output of a different application running on the laptop 857. Initially the desktop image may not be duplicated on the kiosk screen 836 but once icon 926 is selected, the desktop image may be duplicated on screen 836. To switch between the desktop image and a telepresence image on screen 836, an employee would simply select icon 924 to cause the telepresence image to be presented in large format on kiosk screen 836.

Kiosk ownership may be indicated via control of lighting or other signalling devices at the kiosk in a fashion similar to that described above with respect to the personal bench and the focus station. In at least some cases it is contemplated that the color signalling convention will be similar throughout enterprise spaces. Thus, for instance, yellow light may signal ownership but that the owner is either currently absent (e.g., travelling to a configuration, is currently using a different configuration (e.g., an employee that owns a bench is currently using a kiosk to amplify content), stepped away to a restroom, etc.), green light may indicate ownership and that the owner is present and using a configuration, other colors may indicate that an employee's scheduled time using a space is coming to an end shortly, etc.

F. Team Studio Configuration

Referring now to FIGS. 63 through 74, an exemplary team studio configuration 62 is illustrated that, in general, includes wall subassemblies that define a team studio space 1010 to support trams of employees as they share content with each other and, in at least some cases, with remotely located employees. While the studio configuration 62 may be used at times by individual employees or small groups like two employees or by one local and one remote employee to facilitate a teleconference session, the configuration 62 affordances have been designed with a mid-size group (e.g., 6 to 12 employees) in mind and therefore includes affordances optimized to facilitate work activities for that size group.

Figure 72:
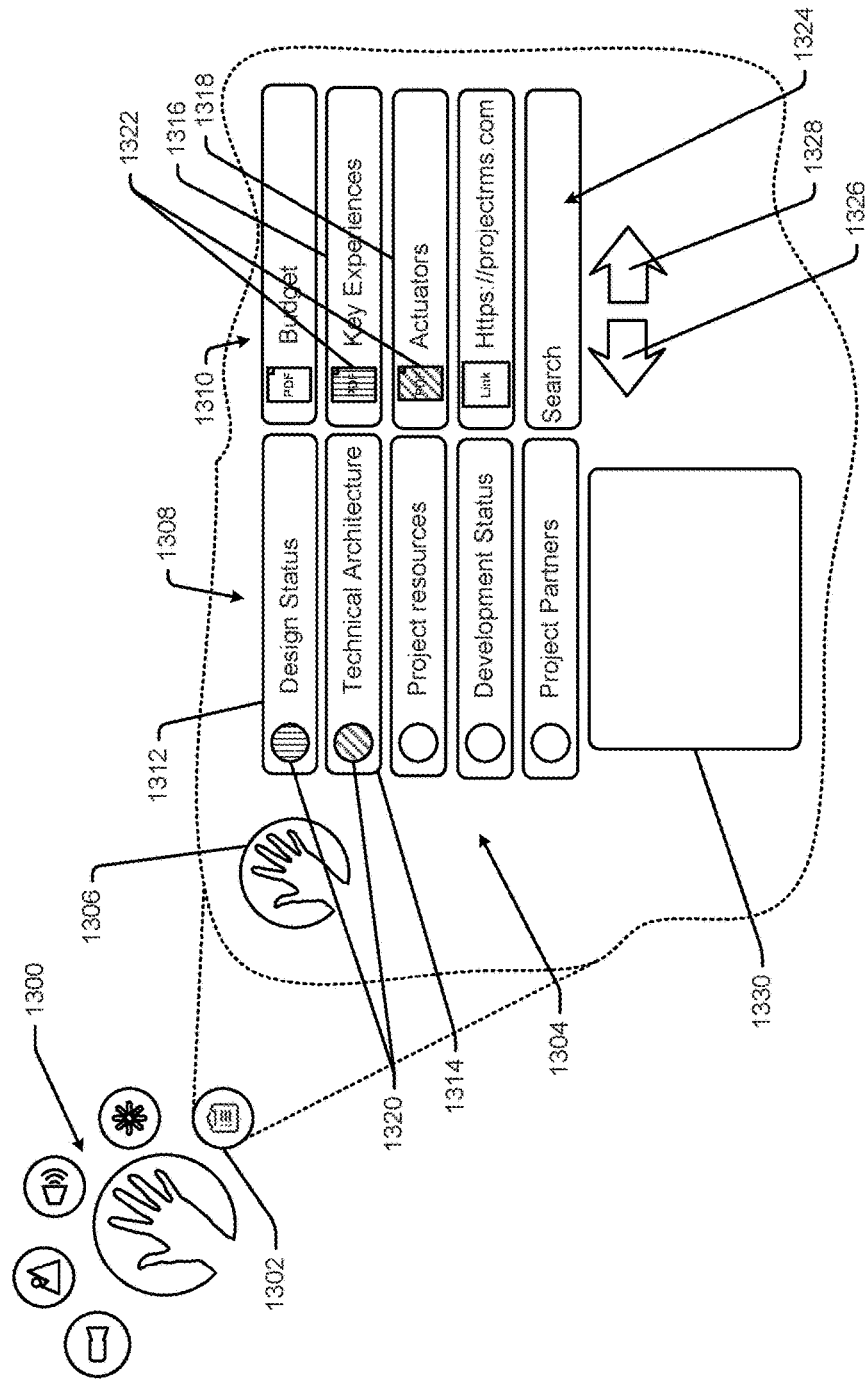
FIG. 72 is a schematic illustrating an exemplary universal interface that maybe provided within the team studio configuration shown in FIG. 63.

Exemplary studio 62 includes first, second, third and fourth wall subassemblies 1000, 1002, 1004 and 1006, respectively, as well as a ceiling structure 1020, first and second table assemblies 1012 and 1014, speakers 999 and a plurality of task chairs, two of which are labeled 1018. In addition, in at least some embodiments, curved wall sections or subassemblies may be provided at the intersections of adjacent wall subassemblies 1000, 1002, 1004 and 1006, so that the typically "wasted" corners of space 1010 are rendered relatively more useful. For instance, in FIG. 63, corner subassemblies 1003 and 1005 are shown generally between adjacent wall subassemblies 1002 and 1004 and adjacent wall subassemblies 1004 and 1006, respectively. A third curved wall subassembly 1007 is shown in FIG. 72 between wall subassemblies 1006 and 1000.

Referring specifically to FIGS. 63 and 65 through 67, first wall subassembly 1000 includes a frame structure 1001 to which various types of functional panel subassemblies are mounted. As in the case of the enhanced privacy configuration 54 described above, some or at least a subset of the wall panels that form the wall subassemblies of studio 64 may be constructed using the teachings in the '842 and '271 patents as well as the '254 application, each of which has been incorporated in its entirety by reference above. In other cases, other technology may be employed to provide light in or on panel surfaces, change opacity of some of the panel subassemblies, mount screens or emissive surfaces, etc.

Figure 65:
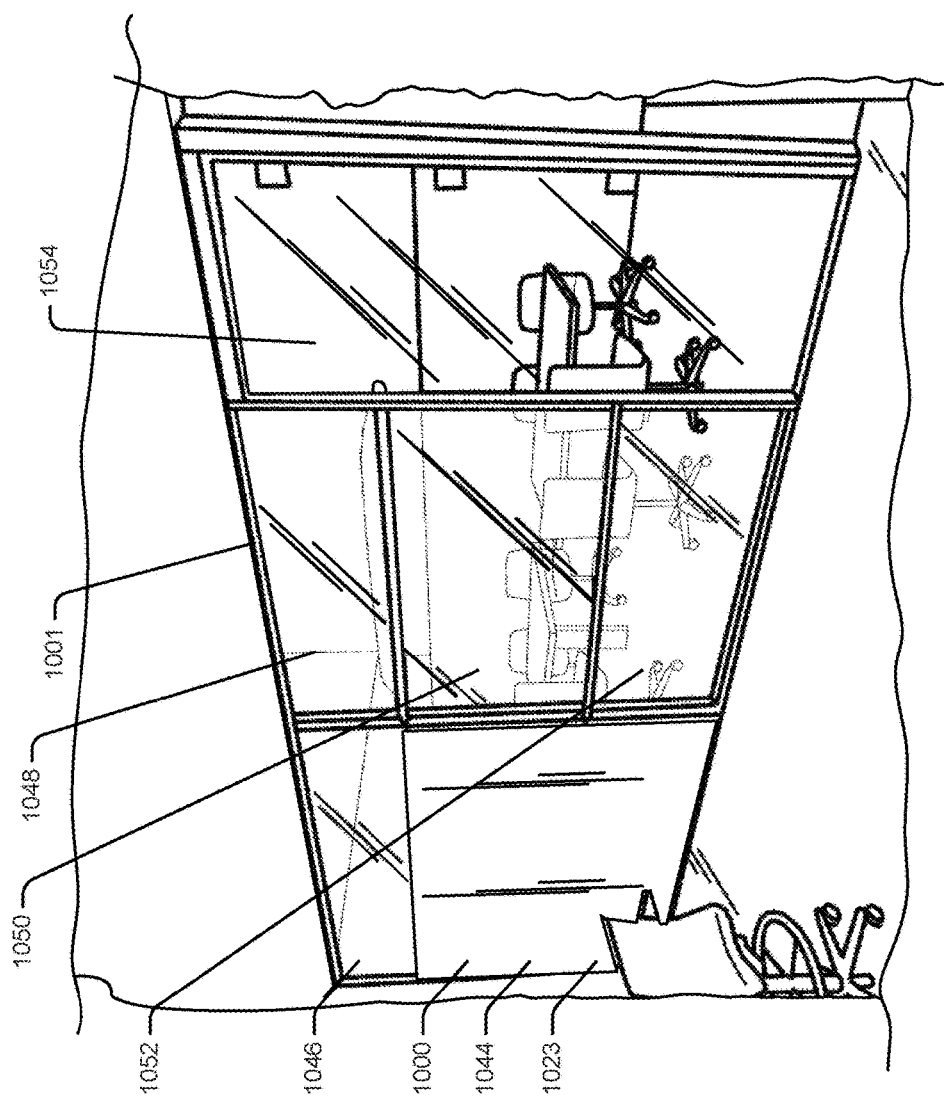
FIG. 65 is a perspective view of the studio configuration shown in FIG. 63, albeit from outside the studio looking through a wall structure.
Figure 66:
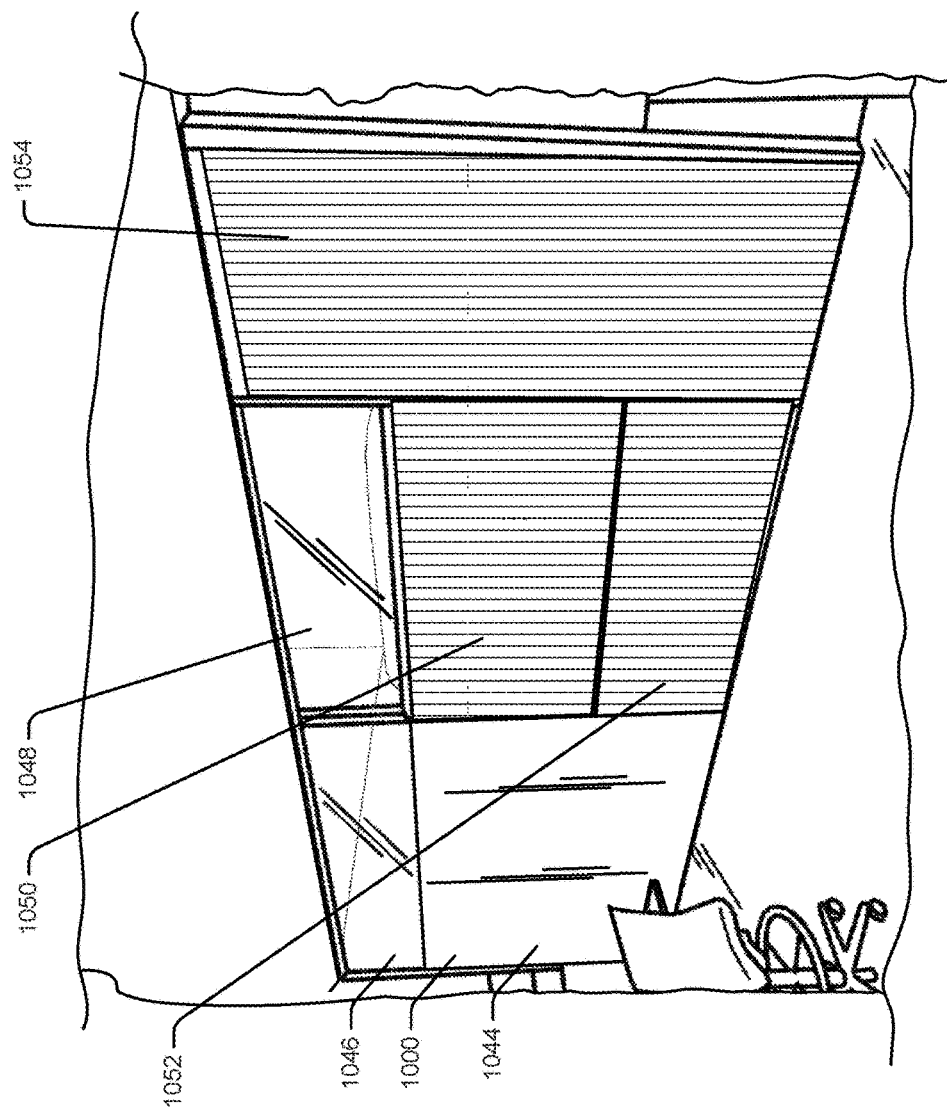
FIG. 66 is similar to FIG. 65, albeit where glass panels and a glass door that form a wall to the studio configuration are shown opaque.
Figure 67:
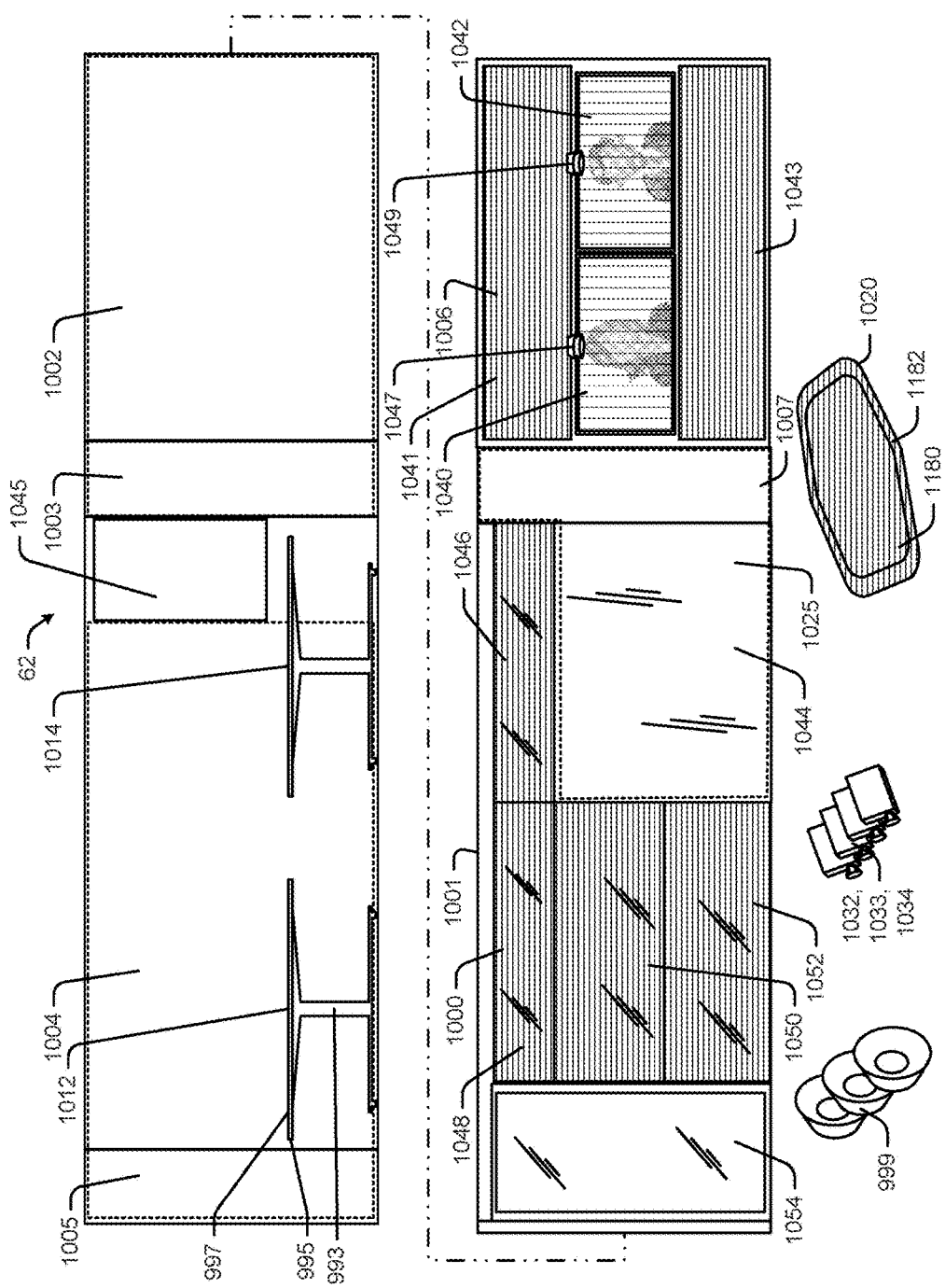
FIG. 67 is a perspective view of the four walls that form the studio configuration shown in FIG. 63 laid out at a particular point in time in a use sequence.

Referring still to FIGS. 63 and 65 through 67, the exemplary first wall subassembly 1000 includes first through fifth panel inserts or subassemblies 1044, 1046, 1048, 1050 and 1052, respectively, and a glass door subassembly 1054, that mount to frame assembly 1001. First panel subassembly 1044 includes two opaque panel members that form an internal panel surface 1025 (seen in FIG. 67) and an oppositely facing external panel surface 1023 (see in FIG. 65). The internal surface 1025, in at least some embodiments, provides a field on which digital content may be presented (e.g., projected). In at least some embodiments, the internal surface 1025 may be constructed via an emissive electronic member akin to a display screen so that relatively high definition content can be presented thereon. In other cases, surface 1025 may be a projection surface on which content can be projected via a ceiling or otherwise mounted projector (see 1034 in FIG. 63) located in space 1010. Unless indicated otherwise hereafter, it will be assumed that content is projected via projector 1034 onto surface 1025 where the projector is controlled by system server 20. Referring specifically to FIG. 67, similarly, it will be assumed that content is provided on each of the surfaces of wall subassemblies 1002, 1003, 1004, 1005 and 1007 via projection (see additional projectors at 1030 and 1032 in FIG. 63). However, as in the case of surface 1025, any of the surfaces of wall subassemblies 1002, 1003, 1004, 1005 and 1007 may be constructed to include an electronic emissive surface for presenting digital content.

Referring yet again to FIGS. 63 and 65 through 67, first panel subassembly 1044 has a height dimension (not labeled) that is selected to be high enough that an average height employee cannot see over the top edge thereof and into space 1010 on the other side of the wall subassembly 1000. Thus, in at least some embodiments, panel subassembly 1044 will have a height dimension within a range between six feet and eight feet and, in particularly advantageous embodiments, will have a height dimension within a range between six and one half foot and seven and one half foot.

Referring again to FIGS. 63 and 65 through 67, second panel subassembly and third panel subassembly 1046 and 1048 are each single or dual sided glass panel assemblies where the glass mounted therein is clear and, in at least some embodiments, always remains transparent. Here, because panels 1046 and 1048 are generally above eye level of typical employees, those panels do not have to block employee view to facilitate privacy in space 1010. By leaving panels 1046 and 1048 clear, an employee outside space 1010 can have a view into the top portion of space 1010 that can be useful when determining if the space is currently being utilized. Thus, for instance if an employee looks up through panels 1046 and 1048 and sees lights on in space 1010 or sees the flicker of reflected video or image light from one of the presentation fields or screens, the employee can quickly get a sense of whether or not space 1010 is currently being utilized.

Referring still to FIGS. 63 and 65 through 67, the lower panels 1050 and 1052 as well as the glass panel that is included in door assembly 1054 include opacity controllable glass akin to the glass described above with respect to the enhanced privacy station 54. Thus, the glass in each of panels 1050 and 1052 as well as the glass in door assembly 1054 are controlled by server 20 to render each of the panels and the door assembly either substantially clear or essentially completely opaque so that the panels and door can be seen through or can block the vision of an employee from outside space 1010 into that space. In FIG. 65, panels 1050 and 1052 and door 1054 are shown clear so that an employee outside space 1010 can easily view space 1010 and obtain a sense of what is going on in space 1010. In FIG. 66, panels 1050 and 1052 and door 1054 are shown opaque so that an employee outside space 1010 cannot see into that space.

In addition, in at least some embodiments, light devices may be mounted in one or each of the glass panel subassemblies 1046, 1048, 1050 and 1052 and/or in door assembly 1054 so that those panels can generate light one or both of inside and outside space 1010. In some cases the light devices in the wall 1000 panels may be controllable to generate any color and therefore may be useable to signal different information (e.g., present guidance signals, to indicate status in space 1010 (e.g., availability, a ready condition, in use, etc.)).

Figure 64:
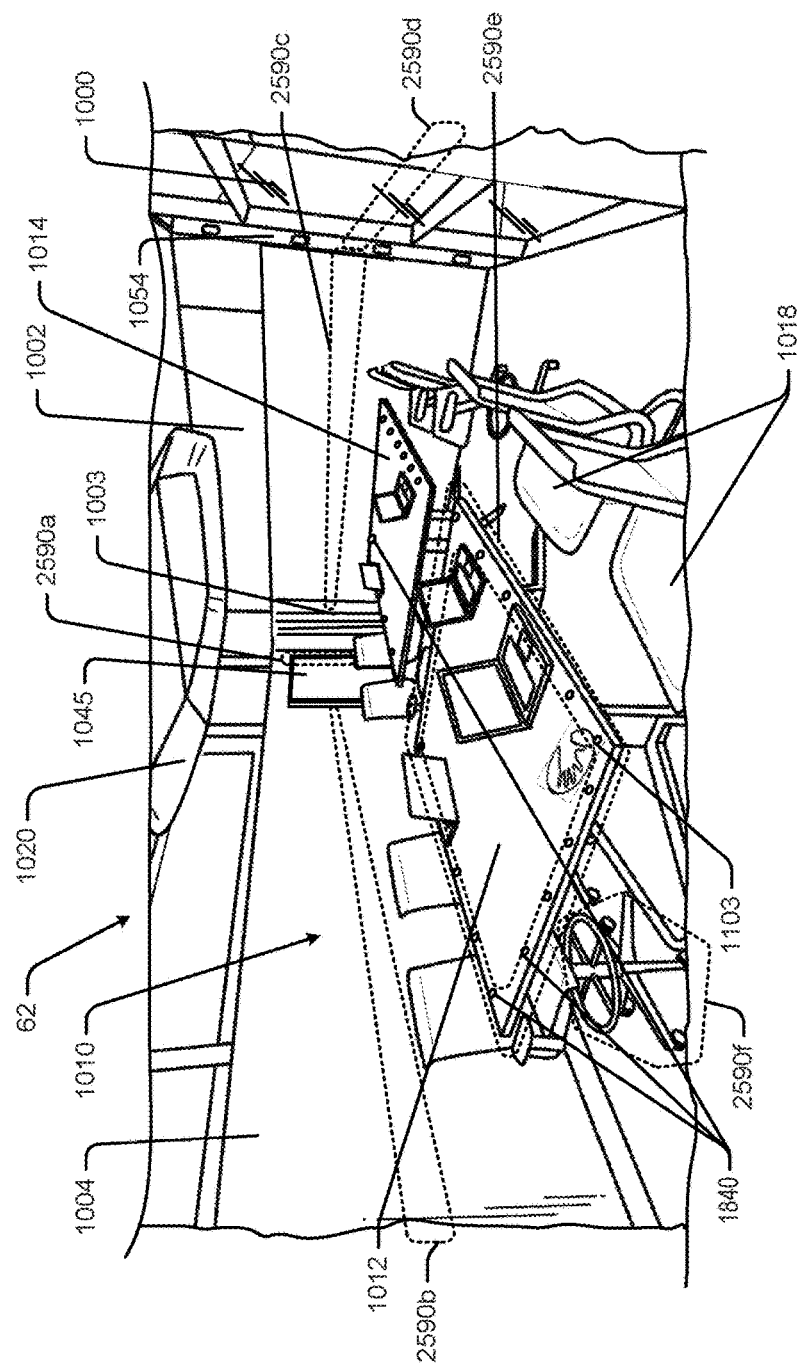
FIG. 64 is a perspective view of the studio configuration shown in FIG. 63.

Referring now to FIGS. 63, 64 and 67, second wall subassembly 1002 includes a flat internal surface on which digital content can be projected (or otherwise presented where assembly 1002 includes an electronic emissive surface). In the illustrated embodiment the projection surface comprises substantially the entire wall surface. In other cases the projection section of wall subassembly 1002 may comprise a smaller section of the overall wall such as, for instance, the section of the wall surface that resides above a typical table top height (e.g., above 26 to 32 inches). Similarly curved wall subassemblies 1003, 1005 and 1007 each presents a projection surface, albeit a curved projection surface, on which digital content may be projected or otherwise presented. Again, the projection surfaces of subassemblies 1003, 1005 and 1007 cover substantially the entire internal surfaces of those subassemblies while in other embodiments smaller section of those subassemblies may present projection surfaces. As shown in FIG. 67, the edges of adjacent sections of wall subassemblies 1002 and 1003 are substantially flush so that the flat surface of wall subassembly 1002 runs into and is substantially contiguous with the curved surface provided by wall subassembly 1003.

Referring still to FIGS. 63, 64 and 67, third wall subassembly 1004 and curved wall subassembly 1005 are substantially similar to second wall subassembly 1002 and curved wall subassembly 1003 with two exceptions. First, wall subassembly 1004 has a greater overall length than wall subassembly 1002 as subassembly 1004 extends along a long dimension of space 1010. Second, a projection surface 1011 portion of subassembly 1004 stops short of the right edge of subassembly 1004 so that a guidance or boot up display screen 1045 can be mounted adjacent the right edge of subassembly 1004 as illustrated. Here, screen 1045 is presented at a location where the screen 1045 is positioned substantially immediately opposite door 1054 (see FIG. 54) so that when an employee enters space 1010, if the employee is looking straight on, the employee will see screen 1045 immediately and screen 1045 therefore operates to sort of greet the employee arriving in space 1010 and present orienting information as described hereafter. The type of information presented via screen 1045 is, in some cases, relatively detailed and therefore, in those cases, screen 1045 should include a high definition screen so that smaller content can easily and clearly be perceived. In other cases, screen 1045 may not be included on wall subassembly 1004 and instead, the functionality of screen 1045 described herein may be provided via a field akin to the field presented by screen 1045 that is projected onto the wall subassembly 1004.

Referring again to FIG. 67, exemplary fourth wall subassembly 1006 include first and second large flat panel displays 1040 and 1042, upper and lower lighted panel subassemblies 1041 and 1043, respectively, and first and second cameras 1047 and 1049, respectively. Each of screens 1040 and 1042 has a width dimension that is similar to half the width dimension of space 1010 and a height dimension that is substantially one third of or greater than the height dimension of wall assembly 1006. Each screen 1040 and 1042, in some embodiments, has a width dimension between 3 and 6 feet and in particularly useful embodiments has a width dimension within a range between 3 and one half feet and five feet while the height of each screen is within a range between two feet and five feet. Cameras 1047 and 1049 are mounted adjacent top edges and centrally with respect to each of screens 1040 and 1042 so that they obtain images of space 1010 that are generally aligned with the locations of screens 1040 and 1042 in space 1010.

The cameras 1047 and 1049 may be used, in at least some embodiments, to facilitate telepresence sessions like those described above in the context of the enhanced privacy station 54 and the amplifying kiosk 58. Here, server 20 may automatically boot up the telepresence system prior to commencement of a meeting where remote employees are scheduled to attend the meeting. In addition, an employee will be able to walk up to an available team studio 62 and start a telepresence session that was not scheduled for the space 1010 by following a simplified protocol. In at least some cases it is also contemplated that server 20 may automatically attempt to establish a telepresence communication link with one or more remote employees automatically when a local employee approaches or walks into space 1010 if the local and remote employees have a scheduled meeting even if space 1010 was not previously reserved for that meeting. This automated on the fly telepresence process would be similar to the process described above in the context of kiosk 58.

Referring still to FIG. 67, light panel 1041 is shown as a single panel but in other cases two or more light panels may be included in panel 1041. Similarly, lower panel 1043 may be formed of two or more light panels. Each of the exemplary panels 1041 and 1043 is constructed as described in the '254 patent application that is incorporated by reference in its entirety above and can be controlled to generate many different colors of light to set mood, provide specific lighting effects for different activities performed in space 1010, etc.

Referring yet again to FIG. 67, corner wall subassembly 1007 is similar to the other corner wall subassemblies 1003 and 1005 described above. Again, the internal projection surface adjacent the edge of curved wall subassembly 1007 that is next to surface 1025 is substantially flush therewith so that content can be presented in an essentially continuous fashion across the edge.

In still other embodiments where high definition content is to be presented and shared among employees in space 1010, one or more additional high definition flat panel electronic display screens may be mounted to or otherwise integrated into one or more of wall subassemblies 1000, 1002 and 1004. In this regard, for instance, see FIG. 72 where four shared content fields 1200a, 1200b, 1200c and 1200d are shown on configuration walls. Here, each of the shared content fields may represent an electronic display screen for presenting high definition content. Where the fields 1200a through 1200d are separate screens, additional content may still be projected about the screens as shown best in FIG. 72. In still other cases, server 20 may control the projectors associated with space 1010 to project content fields 1200a through 1200d onto the space defining walls and to also project additional background content about the fields as shown in FIG. 72.

Figure 68:
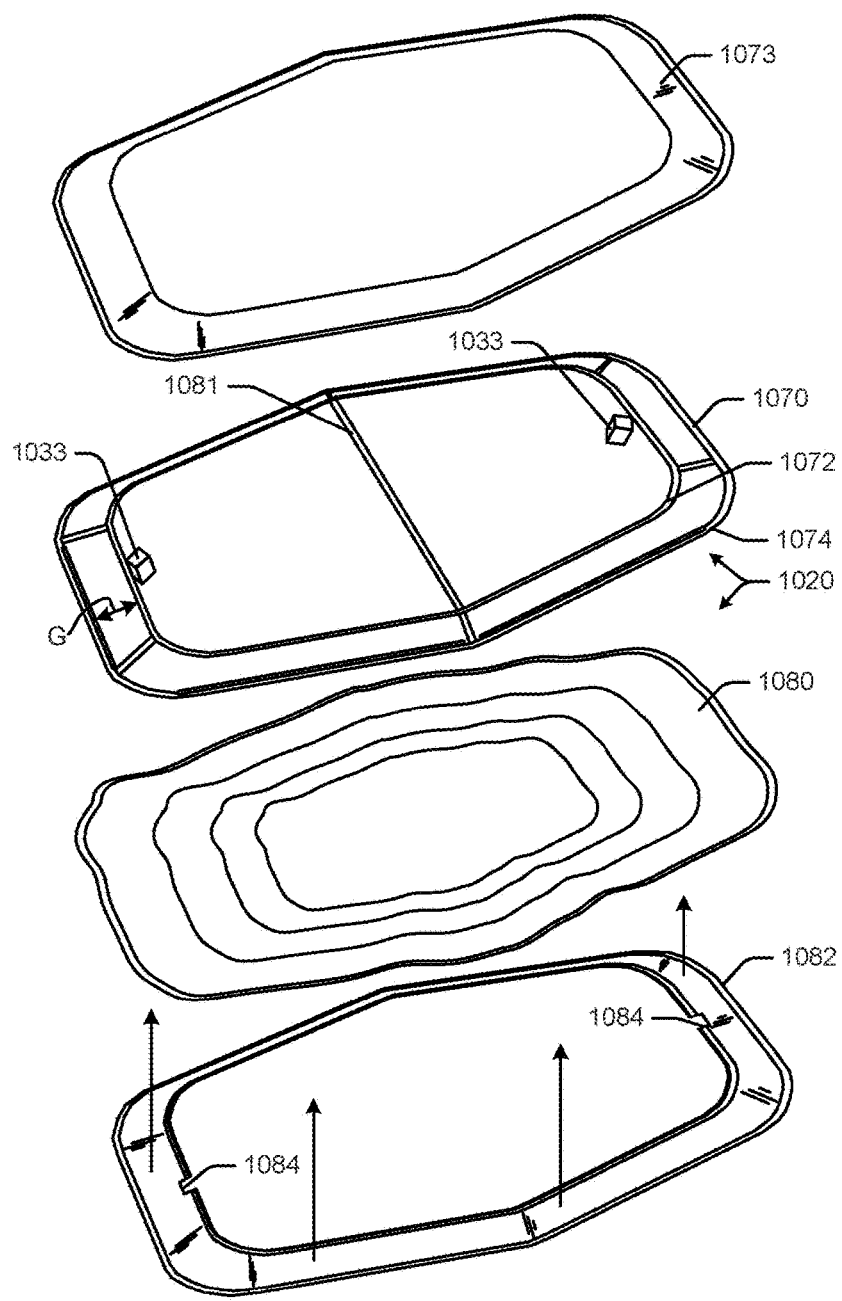
FIG. 68 a partially exploded view of a halo ceiling structure or configuration that may be used in the team studio configuration shown in FIG. 63.
Figure 69:
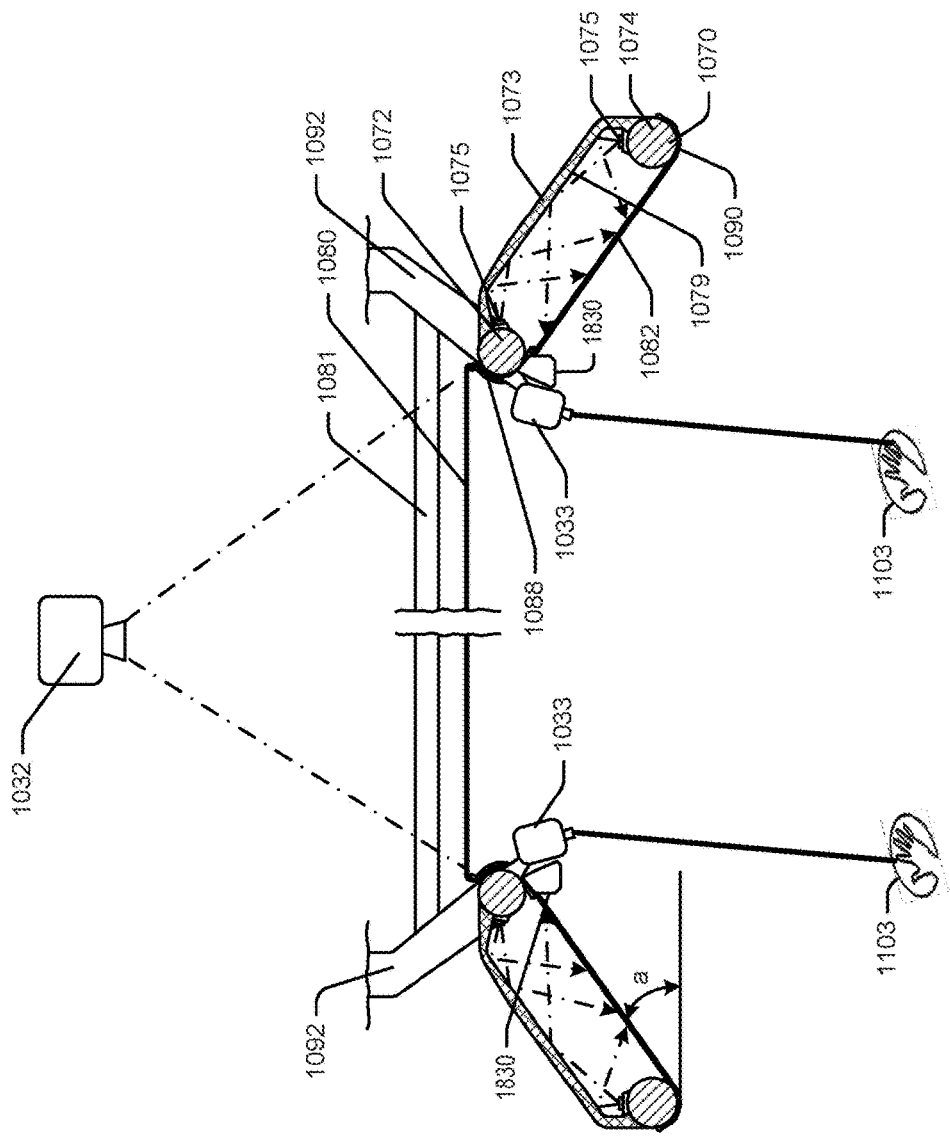
FIG. 69 is a partial cross-sectional view of the halo structure shown in FIG. 68 in an assembled form.

Referring now to FIGS. 63 and 67 through 69, the ceiling subassembly 1020 will now be described. Unless indicated otherwise, the phrase "halo assembly" or "halo structure" will be used hereinafter to refer to ceiling subassembly 1020. The exemplary halo assembly 1020 includes, among other things, a frame structure 1070, laser projector devices 1033, a fabric central member 1080, a diffuser plate 1082, a reflector assembly 1073 and LED light strips or devices 1075. The frame structure 1070 includes rigid inner frame 1072 and rigid outer frame 1074 connected by cross frame members (not labeled) where the inner and outer frames 1072 and 1074 have similar shapes and the inner frame is smaller than the outer frame. In the example shown, the inner frame is spaced generally inward from the outer frame by a gap G that has a dimension within a range between six inches and two feet and in a particularly advantageous embodiment the range with between 8 inches and one foot. The inner frame member 1072 is spaced above the outer frame member 1074 as best shown in FIG. 69 so that a line between the two frames form an angle with a horizontal plane that is within a range between 15 degrees and 75 degrees and in particularly advantageous embodiments is within a range between 30 degrees and 50 degrees. The frame assembly 1070 also includes a cross bar 1081 and mounting brackets 1092 (see FIG. 69) that extend downward to the other frame components from an ambient ceiling structure (not shown).

Referring again to FIGS. 68 and 69, member 1080 is a fabric member that is designed to operate as a projection screen where images are projected onto a top surface and appear on the undersurface when viewed from below (i.e., member 1080 operates as a rear projection screen). Member 1080 has a shape and dimensions that are similar to the shape and dimensions of inner frame member 1072 so that member 1080 can be stretched taught within the opening defined by member 1072.

Diffuser plate 1082 includes a rigid and resilient plastic member that is shaped generally like frame structure 1070 and includes integrated features that can hold or clip member 1082 to the frame structure 1070. To this end, see in FIG. 69 that plate member 1082 includes curled or curved portions 1088 and 1090 along inner and outer edges, respectively, that are designed to engage the inner and outer frame members 1072 and 1074, respectively. Curved portions 1088 and 1090 each forms a channel that has a shape similar to the shape of an associated frame member 1072, 1074 that the portion snaps to upon assembly. Slits (see 1084 in FIG. 69) may be provided periodically along each of the inner and outer edges of member 1082 so that the curved portions each comprise a set of curved portion fingers that can resiliently move independent of adjacent fingers to enable greater flexibility. Plate member 1082 is formed of a transparent or at least semi-transparent plastic material so that light can pass there through. In some cases the inner or outer surface of member 1082 will include a light diffusing pattern to increase the uniformity of appearance of the light passing there through. As shown, in at least some embodiments, a lateral edge of fabric screen member 1080 may be trapped by curved section 1088 against inner frame member 1072 upon assembly so that the lower surface of screen member 1080 has a substantially uniform and flat appearance.

Referring still to FIGS. 68 and 69, reflector member 1073 is mounted to frame structure 1070 between inner and outer frame members 1072 and 1074 and forms a generally downward and inward facing reflection surface 1079 between members 1072 and 1074. The reflecting surface may be curved parabolically from each frame member 1072 and 1074 in some cases so that light generated by LED light strips mounted to the frame members 1072 and 10874 appears substantially uniform below diffuser member 1082. LED light strips 1075 are mounted to each of the frame members 1072 and 1074 to direct light upward and generally toward the reflecting surface 1079. Light directed at surface 1079 reflects off that surface and toward the upper surface of diffuser member 1082 and then through the diffuser member 1082 and down below halo assembly 1020 into space 1010.

Referring yet again to FIGS. 63 and 69, a projector 1032 is mounted to an ambient ceiling structure (not illustrated) and is positioned to direct projected content onto the top surface of screen member 1080. Thus, for instance, a single light pattern (e.g., white light, green light, etc.) may be projected onto the upper surface of member 1080 causing the lower surface thereof to glow with the projected pattern. As another instance, sky imagery may be projected onto member 1080 to show a daytime sky, a nighttime sky, a stormy sky, a sunny sky, etc.

Referring again to FIGS. 63, 64 and 67, table assemblies 1012 and 1014 are similarly constructed and therefore only table assembly 1012 will be described here in any detail. Table assembly 1012 includes a supporting leg structure 993 that supports a substantially horizontal table top member 995 at a seated height (e.g., 26-34 inches depending on chair height). The top member 995 forms a rigid top surface 997 that is designed to, among other things, show up imagery or icons projected there onto by laser projectors 1033 in the halo structure above. In the illustrated embodiment, table 1012 is spaced from wall subassembly 1006 by 4 to 6 feet so that an employee can, if desired, move through that open space and to one of the screens 1040 and 1042 to interact with content presented thereon. Similarly, table assembly 1014 is spaced from wall subassembly 1002 by 4 to 6 feet to allow employees to pass there through. The top members (e.g., 995) of assemblies 1012 and 1014 are spaced apart by 2 to 6 feet and, in particularly useful embodiments, by 3 to 4 feet, so that an employee can move into the space there between if desired.

Referring to FIGS. 63, 68 and 69, in at least some embodiments one or more laser projector units 1033 may be mounted to the halo assembly frame structure 1070 and generally positioned to direct a laser light beam downward toward top surfaces of table assemblies 1012 and 1014. Here, the laser projectors are to be controlled to present images on the top surfaces of the table tops below to present information to employees in space 1010 and, in some cases, to present actionable tools or icons (see 1103 in FIGS. 64 and 69 and 1300 in FIG. 72) that can be selected to control various aspects of space 1010. Where the projected icons or images are actionable, devices 1033 may also include cameras for sensing selection or other action intended to interact with the presented icons or images. For instance, in FIG. 64 where the universal interface image 1103 is presented, a camera in device 1033 may be able to detect when an employee waves his hand above the image 1103 and in response, may present a full UI as shown at 1300 in FIG. 71 for use by the employee.

In addition, in at least some cases the camera that is included in device 1033 may be able to detect locations of employees positioned about the table tops below as well as locations of materials (e.g., laptops, books, etc.) on the table tops and may automatically present image 1103 or some other control interface imagery or icons at a location proximate one of the employees or at locations proximate each of the employees that does not overlap any of the materials on the table top surface. In this way, space affordance control can be, in effect, disposed for immediate selection by one or all of the employees in space 1010 automatically.

In other cases the top surfaces of the table assemblies 1012 and 1014 may be electronic emissive surfaces and may be touch sensitive so that UIs can be presented to employees at any locations on the top surfaces of the assemblies 1012 and 1014. Here, cameras may still be needed to identify locations of employees about the tables as well as to identify locations of materials resting on the tables so that the UIs can be presented in locations where they are visible to the employees.

Where emissive table tops are provided, more accurate sensing of intended employee interaction is possible and thus more complex virtual interfaces may be presented. To this end, see the exemplary second level interface 1304 shown in FIG. 72 and described in some detail hereafter.

In still other cases only portions of the table top surfaces may be emissive and touch sensitive for presenting UIs. For instance, each table top may be dimensioned to support two employees along each edge and emissive panels or display screens may be flush mounted within the table top surfaces adjacent each employee space. For example, 10 inch by 12 inch emissive surfaces may be provided to the right of each employee location for presenting a virtual UI to the employee.

Figure 73:
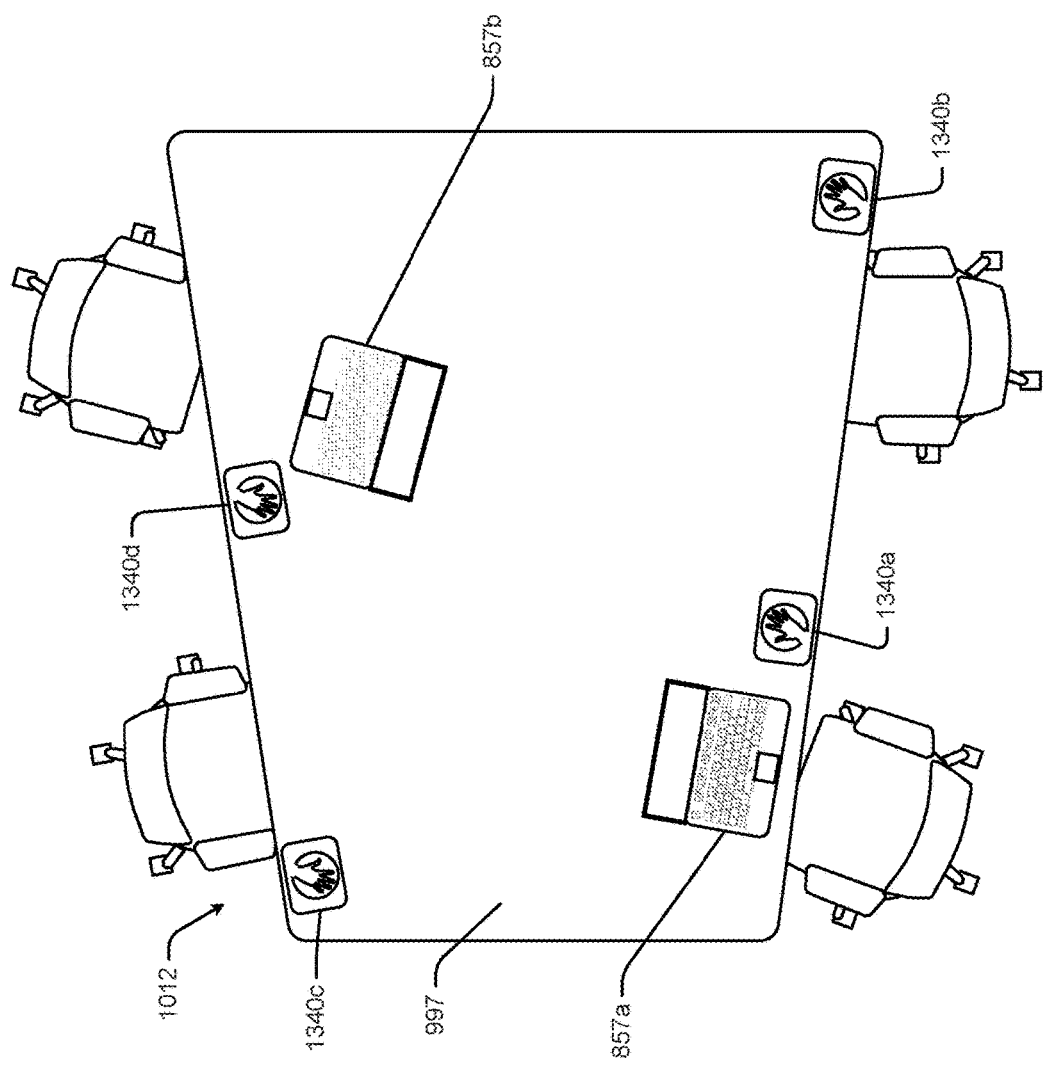
FIG. 73 is a top plan view of one of the table assemblies shown in FIG. 63.

In other cases substantially the entire top surface of each table top may be emissive or provide a projection surface for presenting control tools but only smaller areas of the top surfaces may be reserved for inputting commands or other input. For instance, see FIG. 73 where small touchpad input areas 1340*a*, 1340*b*, 1340*c* and 1340*d* are provided at locations about the edge of table assembly 1012 that can operate as mouse or track pads for moving an icon about on surface 997 to select different virtual icons that comprise the UI output. Here, it is contemplated that, at least initially, no virtual UIs may be provided as shown in FIG. 73 adjacent touchpad areas 1340*b* and 1340*c*.

Figure 74:
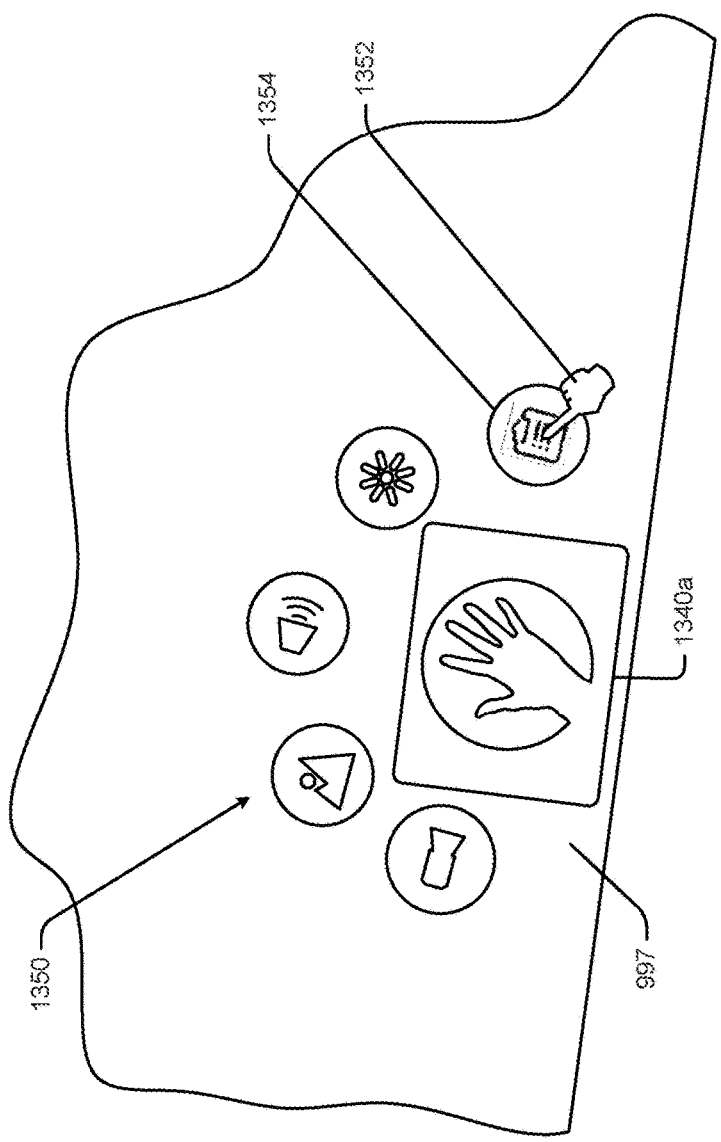
FIG. 74 shows a portion of the table top in FIG. 73 with a simplified universal interface presented on the top surface of the table top.
Figure 75:
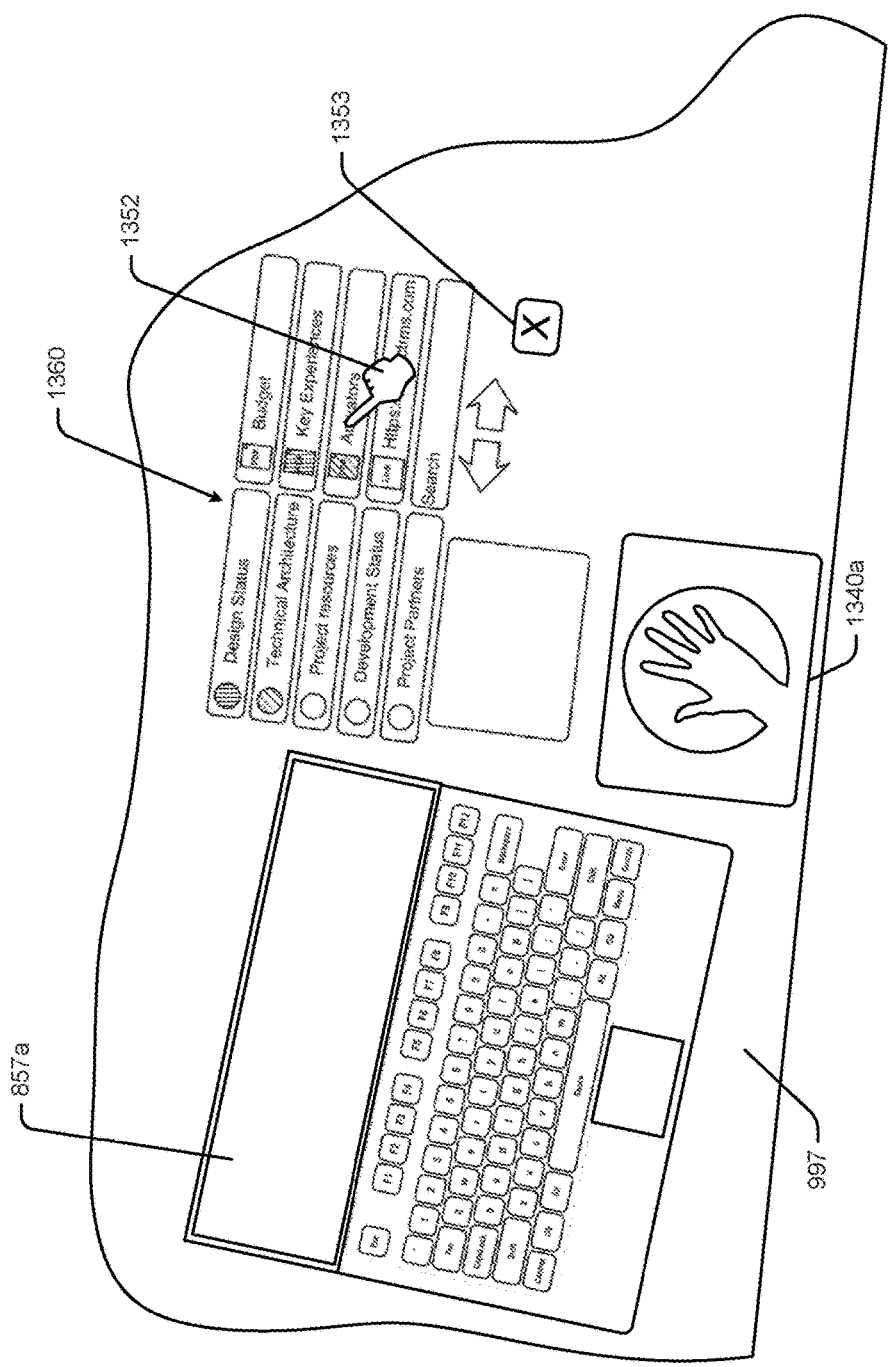
FIG. 75 is similar to FIG. 74, albeit showing a second level of the universal interface on a table top surface.

Referring to FIG. 74, once an employee touches an adjacent touchpad 1340*a*, the virtual control tools may be projected or presented as shown at 1350 to the employee along with a pointing and selection icon 1352 that can be moved about using the touchpad 1340*a* to select the presented UI icons. In FIG. 74, selection icon 1352 is shown pointing at the agenda/file icon 1354. When icon 1354 is selected, an agenda/file interface 1360 may be presented as shown in FIG. 75. Again, touchpad area 1340*a* can be used to move selection icon 1352 around on interface 1360 to select any of the presented icons to indicate status, access files, page through commonly presented files, annotate, interact with application or browser content, etc. In at least some cases interface 1360 includes a close icon 1353 selectable to close interface 1360 (e.g., remove interface 1360 from top surface 997).

As shown in FIG. 75, when a laptop 857*a* or other material is placed on the top surface 997, the locations of the materials may be automatically determined and a UI may be placed elsewhere on surface 997 to enable an employee to clearly view the UI. The agenda/file UIs are described in more detail hereafter.

Referring again to FIG. 63, a set of microphones (two labeled 1044) are provided within halo assembly 1020 and comprise a smart microphone array that is linked to server 20. Server 20 processes signals from the microphone array and can present warnings to help regulate communications in space 1010. For instance, in at least some cases, server 20 may be programmed to use captured employee voices in space 1010 to recognize when two or more employees are speaking at the same time and may present an indication within space 1010 when multiple employees start to speak at the same time. The process of determining when more than one employee is speaking at the same time may include triangulating the locations of sounds in space 1010 via signals received by microphones 1044 and, when sounds at volume levels that exceed a threshold level emanate from more than one location about the tables 1012 and 1014, determining that more than one employee is speaking at the same time.

When more than one employee speaks at the same time various types of indicators are contemplated. For example, one indicator may be provided by controlling one or more of the projectors 1033 to present a warning (e.g., the text phrase "Multiple Speakers") on the top surfaces of table assemblies 1012 and 1014. The warnings may be presented to all of the employees in space 1010 or may be presented only to employees that speak at the same time. Where one employee is speaking and is interrupted by a second employee, the warning may only be provided to the second employee. As another example, the light generated by halo assembly 1020 may flicker to indicate that two or more employees speak at the same time.

In at least some cases it is contemplated that an employee or multiple employees may be able to turn off one or more microphones that reside above their positions at the tables 1012 and 1014 so that the microphones there above do not pick up a conversation at that position. This feature is particularly useful where two or more employees want to have a quiet side bar discussion without interrupting others in the space 1010 and without broadcasting the side bar discussion to remote employees. Here, when a first employee indicates a side bar discussion, instead of turning off microphones above the area associated with the first employee, server 20 may simply not pass the voices of employees picked up in that area to remote employees and may not present warning messages based on the side bar discussion. Here, triangulation of voices in space 1010 using signals from all employees in space 1010 should be useable to identify the employees speaking in the side bar area and those voices should be able to be cancelled from the audio sent to the remote employees. While not shown, controls for turning the array microphones on and off may be presented as part of a UI on the table top surfaces (e.g., 997 in FIG. 67).

In at least some embodiments, consistent with the general idea of enabling affordance benefits with little or no controlling action by an employee, the team studio lighting, cameras, displays and opacity controllable wall panels may be automatically controlled by the system server 20 or by processors linked to actuation devices in the studio configuration where the processors are controlled by system server 20. An exemplary sequence of actuator and indicator controls that may occur prior to, during and after a meeting are contemplated. To this end, see FIGS. 67 and 70 where an initial configuration state is shown prior to commencement of a scheduled meeting in space 1010. As shown, initially, the opacity controllable panels 1050 and 1052 are clear and are illuminated yellow to indicate that a meeting is about to commence. Similarly, halo structure 1020 is illuminated yellow as are panel assemblies 1041 and 1043.

Once remote employees are linked to team studio 62, blurred images of the remote employees are presented on screens 1040 and 1042 to indicate that the remote employees are ready to participate in the session. Again, as in the case of configuration 54 described above, both the remote employees and a local employee may have to opt into the telepresence session to start a meeting.

At least initially no images are projected onto walls 1002, 1003, 1004, 1005 or 1007 or in field 1025. In other cases, nature imagery or other scenes may be projected onto walls 1002, 1003, 1004, 1005 or 1007 or in space 1025 depending on employee or group preference. Within a short time prior to commencement of a scheduled meeting in space 1010, some or all of the yellow light may be visually modified to indicate an imminent start to the meeting. For instance, at least the light viewed from outside space 1010 may be green to indicate that the meeting will start in the next 5 minutes.

Figure 70:
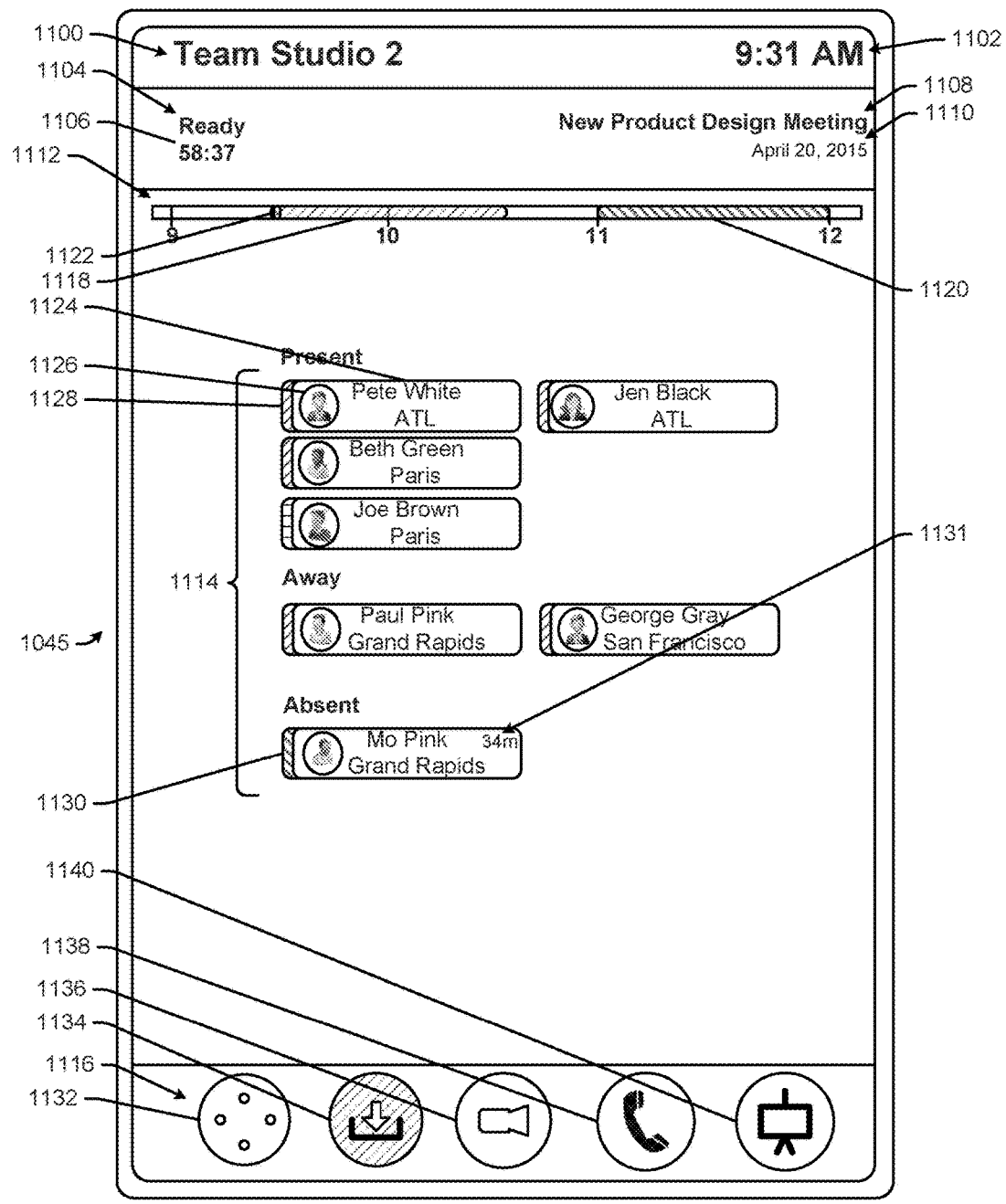
FIG. 70 is a screen shot illustrating an exemplary boot-up screen shown in FIG. 67.

Referring still to FIG. 70, as an employee enters space 1010, the employee encounters screen 1045 which presents various types of information related to the meeting about to start in space 1010. To this end, the exemplary screen shot shown in FIG. 70 includes the name of space 1010 (e.g., "Team Studio 2") and the current time at 1100 and 1102 as well as a title of the scheduled meeting at 1108 and the date at 1110. A meeting status indicator is shown at 1104 and time prior to commencing or time remaining in an ongoing meeting period is presented at 1106. In at least some embodiments the status indicator 1104 will be limited to a small number of statuses so that space users can easily comprehend current status. For instance, in some cases the status indicator 1104 may be limited to indicating "Starts In" (see FIG. 74), "Ready" (see FIG. 70), "In Use" (see FIG. 71) and "In Use—Ending Soon" (see FIG. 73) to indicate the start time of a next scheduled meeting for the space 1010, that a meeting is ready to commence (e.g., that all technology is booted up and ready to use), that a meeting is progressing and that a meeting is ending soon, respectively.

Referring again to FIG. 70, a space schedule or schedule time line is presented at 1112 that includes a graphical time line and indicates a current time at 1122 and meeting time bars aligned with different times as indicated at 1118 and 1120. Bar 1118 corresponds to a next meeting to occur in space 1010 that starts at 9:30 AM and ends at 10:30 AM and bar 1120 corresponds to a flowing meeting that starts at 11 and ends at noon. Thus, employees in space 1010 can readily see times when the space 1010 is available and whether or not the current meeting will be constrained by the next scheduled meeting for space 1010.

Referring still to FIG. 70, the screen shot of display 1045 also includes an employee status legend 1114 that indicates the current status of employees that are to attend the meeting. The employee status legend includes three lists of employees including a present list, an away list and an absent list. The present list includes each employee that is currently located in space 1010 and waiting for the meeting to start. For instance, see field 1124 for Pete White in the present list and field 1130 in the absent list that indicated Mo Pink is absent from the meeting (e.g., is neither present in space 1010 or remotely linked to space 1010). For each employee field in the employee legend 1114, a color or graphical indicator is provided to indicate status as well. For instance, see the green (as indicated by left up to right cross hatching) color highlight at 1128 for Pete White's field which indicates that Pete is present in space 1010. See also the yellow highlight for the field for Joe Brown which indicates that Joe has checked into space 1010 for the meeting but has stepped out of space 1010 for some reason. The highlight for Mo Pink's field is red indicating absence. In addition, an estimated time required for Mo Pink to arrive at space 1010 is presented at 1131 Other employee statuses are contemplated and may be indicated via different color highlighting or via other visually distinguishing features.

Referring still to FIG. 70, affordance status is indicated along the lower portion 1116 of the screen shot and includes icons for each of the major affordances or systems associated with studio 62. The exemplary icons include a content sharing icon 1132, a meeting file management icon 1134, a telepresence icon 1136 and a telephone icon 1138, among others. The icons in space 1116 that are associated with affordances currently in use or activated are visually distinguished from others in some fashion. Thus, in FIG. 70, the file management icon 1134 is shown highlighted green to indicate activation or use of the file management tool. Initially, prior to commencement of the meeting, only the file management icon is highlighted and other affordances are not activated and therefore are not initially highlighted in space 1116.

Thus, referring again to FIGS. 67 and 70, initially, as employees arrive at space 1010, the green color light indicates that a meeting is about to commence and the blurred images on screens 1040 and 1042 indicate that remote participants are ready to join the meeting. Screen 1045 indicates who is present and attending via remote linkage to space 1010 and who has yet to arrive as well as the schedule for space 1010 and the current status of the meeting. As shown in FIG. 70, the status is "Ready" indicating that the meeting can start whenever both remote and local employees opt in to the telepresence session. In FIG. 70, the meeting has been delayed for a few minutes for some reason (e.g., was supposed to begin at 9:30 AM).

Once the meeting commences, the status indicating light viewable outside space 1010 is changed to red. In addition, referring to FIG. 71, the content on screen 1045 is altered to show other information related to the ongoing meeting. To this end, for instance, the meeting status indicator is updated to indicate "In Use". In addition, modified present and away lists of employees are presented. The present list still includes all locally attending employees and the away list still includes all remotely attending employees. However, the local and remote employees are divided up into at least two groups including currently attending employees and employees that are not currently attending to the meeting for some reason. For instance, see the two employees listed under the "Away" heading, Paul Pink and George Gray. In the present example, Paul Pink is linked and currently attending remotely while George Gray is not currently attending (e.g., may have stepped out of a remote team studio or enhanced privacy space for a moment). Current attendee Paul Pink is indicated via a green bar 1150 adjacent his tag or field 1151 while George Gray's current status of not attending is indicated by yellow bar 1152 adjacent his tag 1153. A single green bar 1148 appears next to each of the local attendee tags (e.g., 1146 in FIG. 71) indicating a present and attending status.

Figure 71:
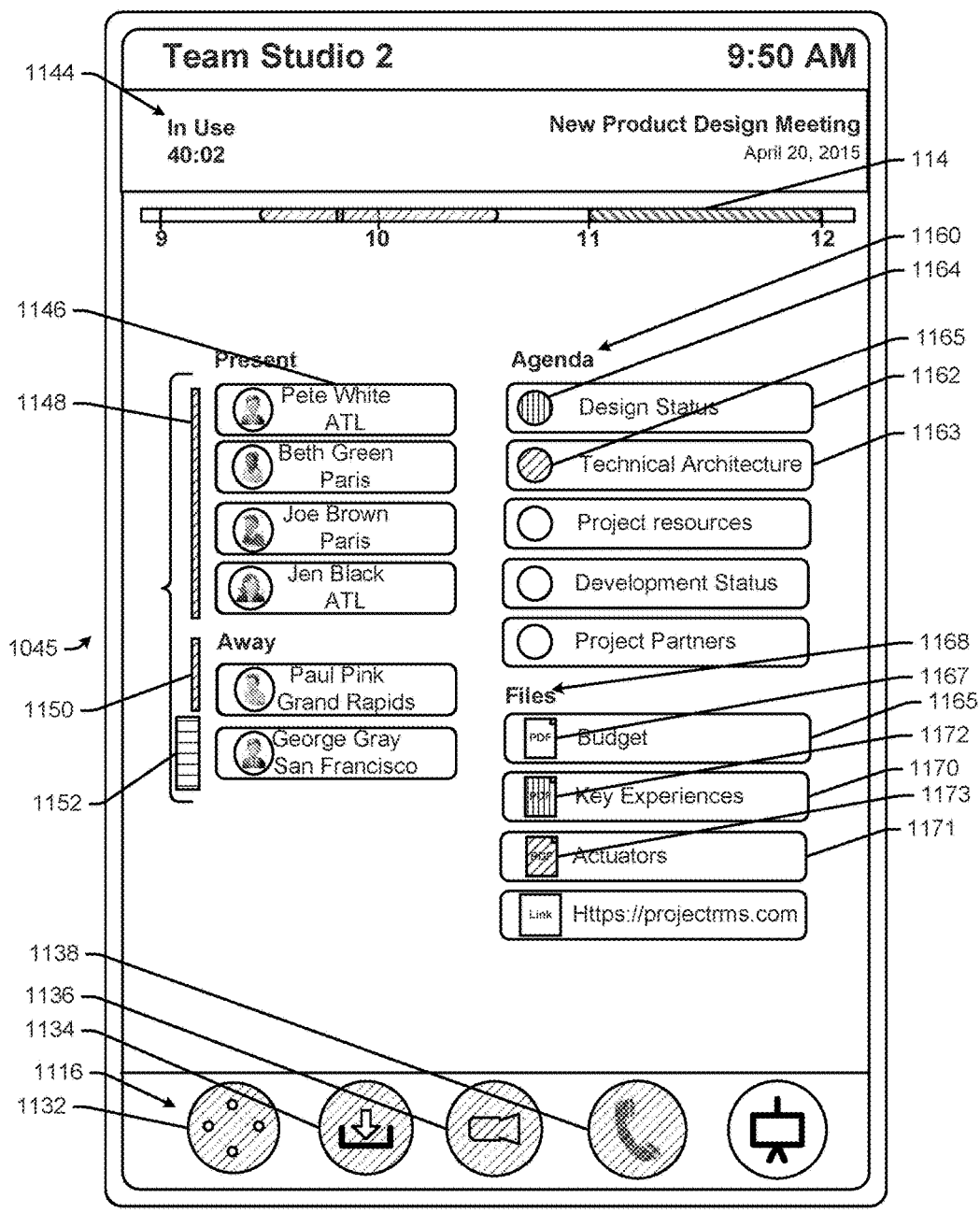
FIG. 71 is similar to FIG. 70, albeit showing the boo-up screen presenting a different set of information.

While only two current statuses (e.g., attending and not attending) of employees participating in a meeting are indicated in the employee status lists in FIG. 71, in other cases additional statuses may be visually distinguished via other color coding. For instance, an employee that is attending a meeting and then departs a facility may be indicated via a gray bar, an employee that has stepped out for longer than a threshold period (e.g., 5 minutes) may be indicated via a blue bar, an employee whose content is currently being shared in space 1010 may be indicated via a pink bar, etc.

Referring again to FIG. 71, the progressing meeting screen shot also includes an agenda 1160 and a list of files 1168 that have been posted for the current meeting. The agenda includes a list of agenda topics, typically arranged in an order in which the topics are to be addressed during the meeting. Exemplary topic tags or fields are shown at 1162 and 1163 that correspond to a "Design Status" topic and a "Technical Architecture" topic, respectively. A status indicator (e.g., 1164, 1165) is presented for each topic in the agenda list that can be used to indicate a current agenda item being addressed in the meeting and that may also indicate topics that have already been addressed. To this end, indicator 1164 is colored gray to indicate that that topic has already been addressed in the meeting while indicator 1165 is colored green to indicate that that topic is currently being addressed.

File list 1168 includes a separate tag for each file or record that is currently queued up for consideration or to possibly be accessed during the meeting, exemplary file tags including 1165, 1170 and 1171. Again, the tags may list the files in an order in which, at least initially, it is intended the files be considered but, during a meeting, the files may be considered out of order. In at least some cases file status indicators may be provided for each of the file tags to indicate whether or not those files have already been considered or are currently being considered. To this end see that indicator 1172 is colored gray to indicate that the associated file or document has been considered while indicator 1173 is colored green to indicate that the associated file is currently being considered. Also, see that a status indicator 1167 for the budget tag 1165 is not colored which indicates that that file has not been considered during the meeting and thus that the files have been taken out of the listed order.

The agenda status and file status information may be determined in any of several different ways. For instance, microphones in space 1010 may pick up employee voices in space 1010 and perform speech recognition on those voices and then content analysis on the words uttered in space 1010 to determine a current agenda topics and other agenda topics that have already been considered. When a new topic on the agenda list is identified, the system server 20 can update the status indicators on the agenda list. In other cases where specific sub-periods of a scheduled meeting are reserved for specific topics, the agenda indicators may be updated purely as a function of time (e.g., each of 5 topics may be associated with a different 12 minute sub-period of an hour long meeting).

In some cases file status may be determined based on which files have been accessed and shared via a common display screen or field on an emissive surface in space 1010 during the meeting. Thus, the first time a file is accessed and shared, the file indicator (e.g., 1173 in FIG. 71) may be altered to indicate a current consideration status (e.g., indicator 1173 may be colored green). Once the commonly shared file is closed, the status may be updated to already considered (e.g., indicator 1173 may be colored gray). If a closed file is again opened and commonly shared, the status indicator may again be changed to green to indicate current consideration.

In still other cases an employee may indicate agenda status directly by indicating a switch from one topic to another in some fashion. For instance, see the exemplary UI 1300 in FIG. 72 that may be projected or presented via an emissive and touch sensitive table top surface. Once a meeting starts, an employee may select an agenda/files icon 1302 that is provided as part of the UI to open up an agenda/file interface 1304 on table top surface 997. The agenda/file interface 1304 includes the agenda list 1308 and the file list 1310 for the meeting where each list includes a selectable icon and status indicators. For instance, exemplary agenda list icons include icons 1312 and 1314, each of which are selectable to indicate a current agenda item being considered in the meeting. Similarly, exemplary file list icons include icons 1316 and 1318 that are selectable, in at least some embodiments, to share those files via common display screens of fields (see 1200a through 1200d in FIG. 72). Agenda status and file status indicators are shown at 1320 and 1322 and are color coded in the same fashion as the indicators on screen 1045 described above.

Where a selected and shared file includes more than one page, arrow icons 1326 and 1328 may be presented as part of interface 1304 for moving forward and rearward in the presented content. In at least some cases where a shared file is not multi-page, the arrows may not be presented. In some cases, where a file corresponds to an application or a web browser page where on screen tools can be selected to interact with the application or browser page, a virtual touch pad 1330 may be presented as part of the interface 1304 that can be used like a mouse or track pad to move an icon about on the shared content fields or screens to interact with the presented content. In still other cases a virtual touch pad may be automatically presented that can be used to annotate commonly presented content via user touch. In some cases a field 1324 may be presented that can be used by an employee to access other content files that have not been added to the meeting queue prior. Here, where an employee touches field 1324, a virtual keyboard may be opened up for receiving file search terms or a file address.

Referring yet again to FIG. 71, the affordance status information 1116 is updated to reflect space resources currently in use or booted up for use. For instance, see that icons 1132, 1134, 1136 and 1138 are each colored green to indicate current use.

Thus, during an on going meeting, screen 1045 presents information that employees can use to understand various aspects of the meeting and how the meeting is progressing. For instance, an employee that arrives for a scheduled meeting 15 minutes late can view screen 1045 and quickly assess who is attending the meeting remotely and locally and who has stepped away for some reason, which agenda items have been considered, which agenda item is currently being considered, which files have been considered and which files are currently being considered and which resources or space affordances are being used or are ready to be used (e.g., are booted up and ready for use). Similarly, an employee in space 1010 can refer to screen 1045 to recollect which employees are linked remotely and if remote employees are currently attending or have stepped away for some reason, which topics have been considered, which are currently being considered and which have yet to be considered as well as which files have been, are currently and still need to be considered.

In addition to changing the content presented on screen 1045, other space 1010 affordances are automatically controlled to change the space 1010 environment when a meeting commences and as the meeting progresses. To this end, see FIG. 76 which shows space 1010 affordances during the course of a meeting. As illustrated, when a meeting commences, glass panels 1050 and 1052 and door 1054 are rendered opaque so that there is a visual barrier from outside space 1010 into the space 1010.

In addition, team imagery is presented as background on many of the wall surfaces surrounding space 1010 that are not used to show telepresence images or share content. For instance, see the nature imagery on wall subassemblies 1003, 1005 and 1007 as well as on walls 1002 and 1004 and wall section 1044 outside the shared content fields 1200*a* through 1200*d*. The presented imagery can set a tone for a team and the meeting in general. In at least some cases the presented imagery may reflect some characteristics associated with remotely linked employees. For instance, where a thunderstorm is occurring in the location occupied by one of the remote employees, the imagery presented may show a thunderstorm or stormy weather. In other cases the presented imagery in space 1010 may be mirrored or reflected on one or more screens associated with the locations of remote employees to increase the sense of shared space and a shared experience.

In addition, remote employee images on screens 1040 and 1042 are unblurred as are images of space 1010 presented to the remotely linked employees and the sound system which enables audio communication between remote employees and employees in space 1010 is activated. Light panels 1041 and 1043 are controlled to generate white light which increases the quality of images generated by cameras 1047 and 1049. Similarly, light in panels 1048 and 1046 may be controlled to generate red light for signaling space 1010 status to employees outside that space. The light generated by halo structure 1182 may be controlled to be white to provide light focused on the top surfaces of the table assemblies 1012 and 1014 and, again, to increase the quality of images generated by cameras 1047 and 1049. Imagery may also be projected onto the top surface of the halo screen 1180 that is consistent with the background or mood setting imagery presented on the wall subassemblies.

Figure 76:
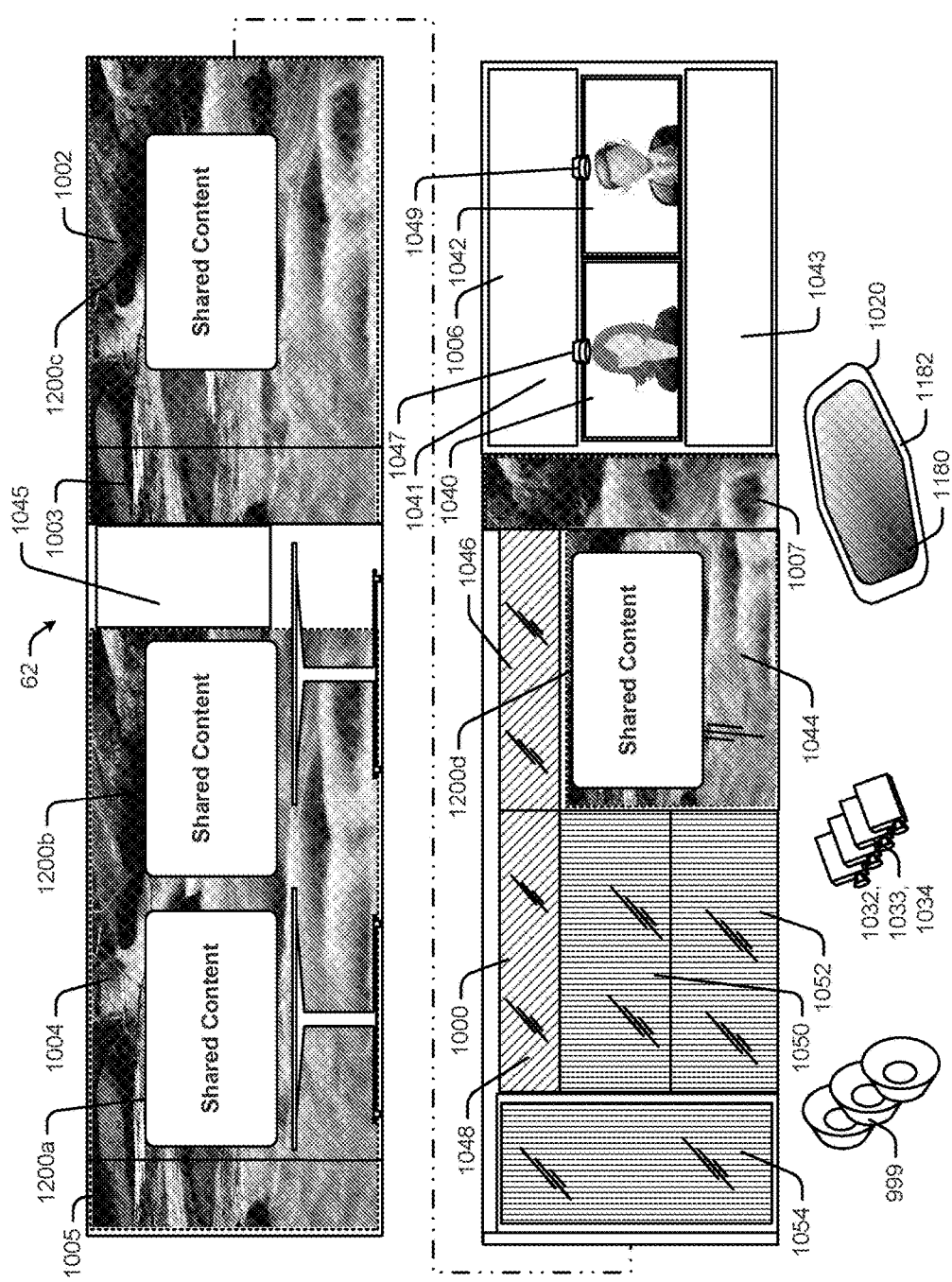
FIG. 76 is similar to FIG. 67, albeit showing studio configuration affordances at a different point in a sequence of use.

Referring still to FIG. 76, when an employee shares content in space 1010 with other employees, the system server opens up one or more shared content fields 1200*a* through 1200*d* and the shared content is presented therein. For instance, referring again to FIG. 72, if an employee selects the "Key Experiences" document at 1316, that document would be opened in one or more of fields 1200*a* through 1200*d* in some embodiments and the employee could use icons 1326 through 1328 to flip through consecutive pages of that document. Where the same document is presented on multiple wall surfaces, employees have the option to view any of those surfaces and see the same content. Here, for instance, a first employee on one side of table assembly 1012 may peer across the table top and to a shared content field 1200*a* behind a second employee across the table assembly while the second employee peers past the first employee at a different shared field 1200*d* to see the same content.

Figure 77:
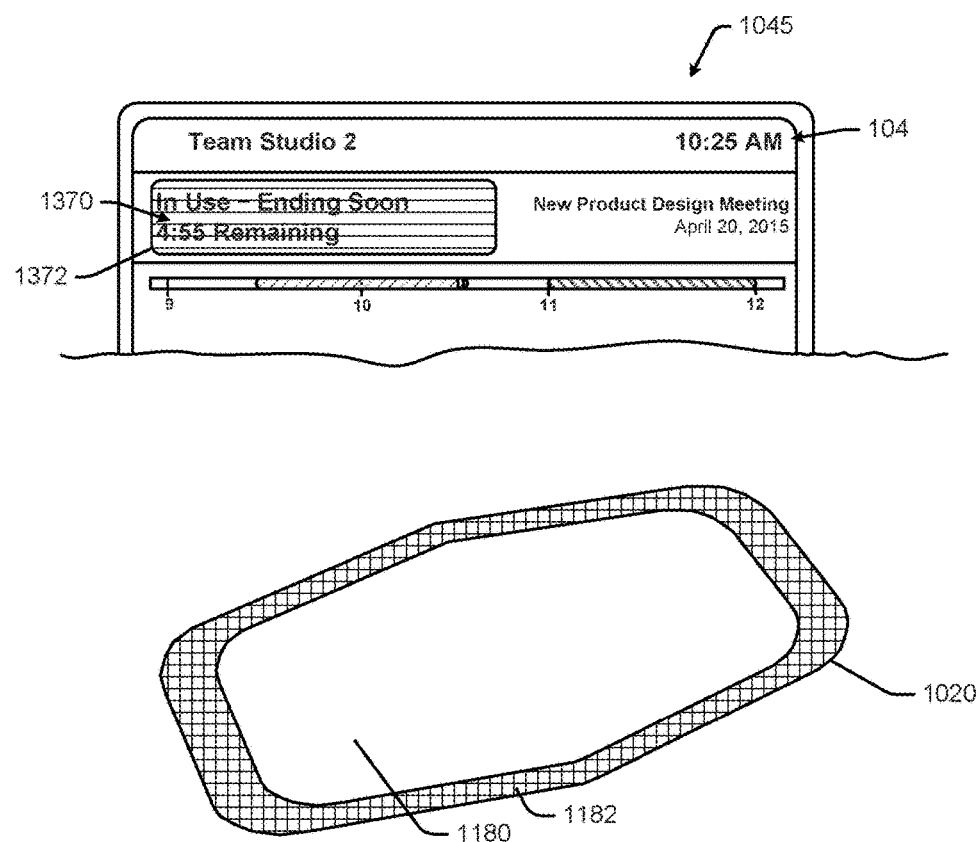
FIG. 77 is a schematic showing the boot-up screen and the halo structure providing signals and messaging near the end of a meeting.

As a meeting nears its scheduled end time, server 20 may be programmed to signal that the end time is approaching. To this end, see, for instance, FIG. 77, where space status is updated to indicate "In Use—Ending Soon" when a meeting is within 5 minutes of the scheduled end time. See also that a yellow colored field 1372 is placed about the indicator 1370 to clearly indicate that the status has changed and to call employee's attention to the short remaining time. Moreover, see that the halo structure 1182 is controlled to generate blue light which indicates an approaching end of meeting time. Similarly, although not shown, panels 1046 and 1048 and perhaps others are controlled to generate blue light and indicate to employees outside space 1010 that the meeting is ending. In some cases, as the end time gets even closer, one or more space affordances may be further controlled to indicate the imminent space status change.

Figure 78:
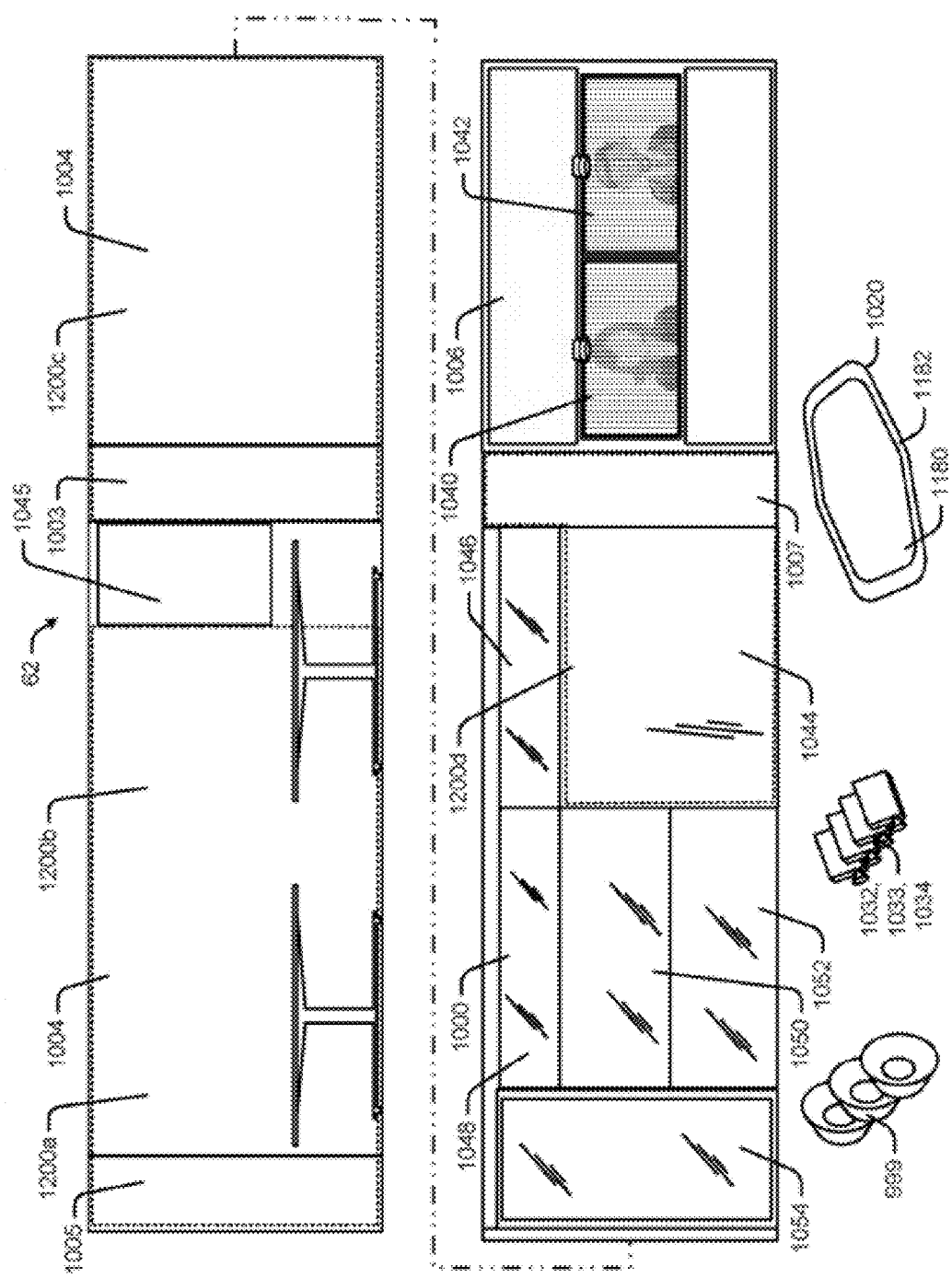
FIG. 78 is similar to FIG. 76, albeit showing the studio configuration affordances at a different point in the sequence of use.

Once a meeting in space 1010 has ended, the space 1010 affordances may be controlled to indicate that a meeting in the space is wrapping up. For instance, see FIG. 78 where the space affordances are shown in yet a different controlled state where panels 1050 and 1052 and door 1054 are generally transparent and where panels 1041, 1043, 1046, 1048, 1050 and door 1054 as well as halo structure 1082 are controlled to generate white light to indicate an end of meeting transition. See also that images presented by screens 1040 and 1042 are blurred to indicate that audio and visual communication with remote employees has been disabled. Speakers 999 may be controlled by server 20 to generate a transition sound track. Team imagery is removed from the wall surfaces.

Figure 79:
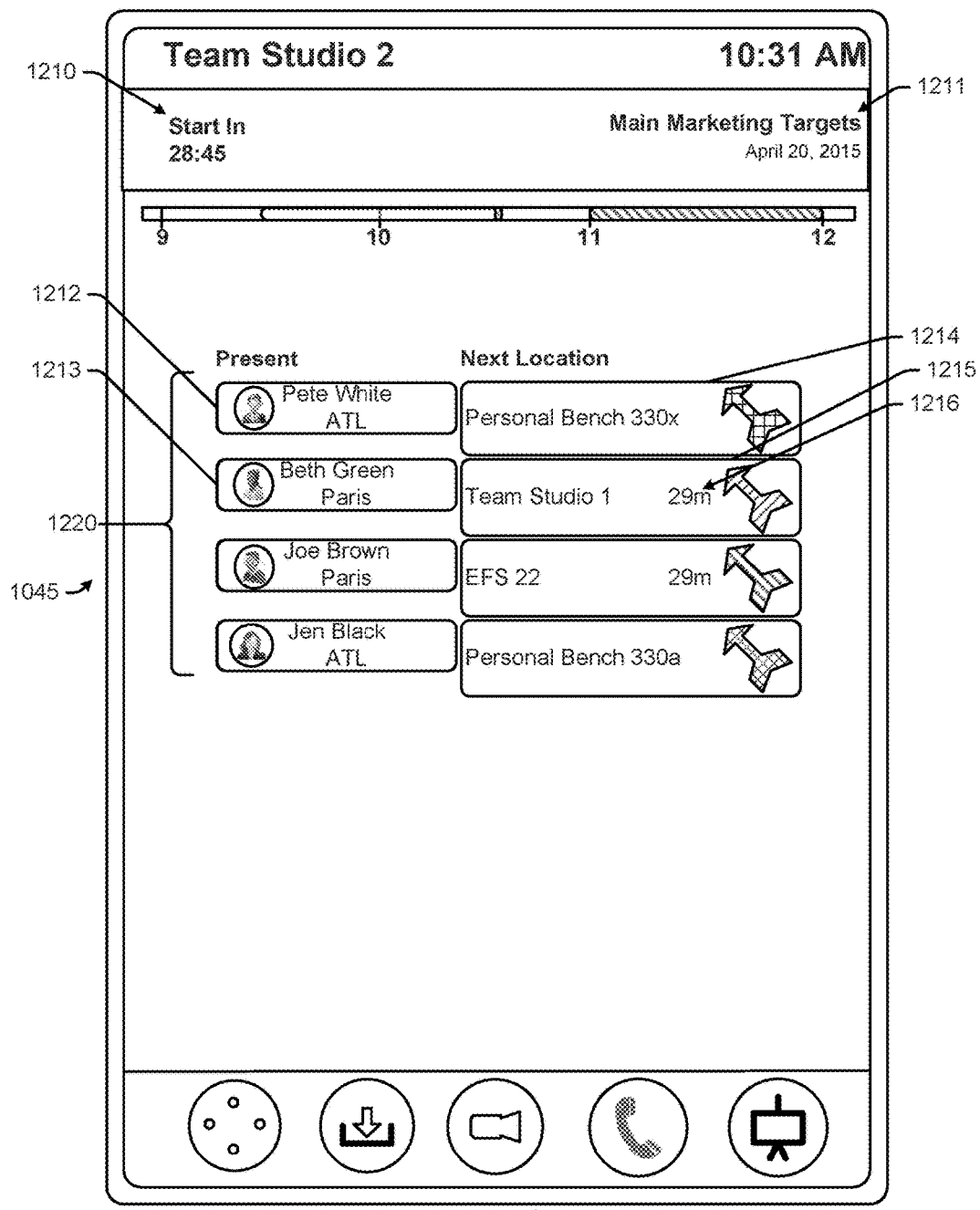
FIG. 79 shows a screen shot of the boot-up screen presenting guidance information to employees after a meeting in a team studio configuration has ended.

Referring also to FIG. 79, boot up screen 1045 is now controlled to present the "Start In" status indicator (e.g., indicating that a next meeting will start in a short while) and a count down clock indicating time remaining prior to commencement of the next meeting scheduled for space 1010. Screen 1045 also presents guidance information 1220 for each of the local employees in space 1010 to help them transition to other spaces. To this end, the guidance information includes a tag for each employee in space 1010 as well as a next location tag. For instance, see the employee tags at 1212 and 1213 and the associated next location tags at 1214 and 1215, respectively. See also that each next location tag is color coded to assign a different color to each of the employees in space 1010 for guidance purposes. For instance, tag 1214 is shown colored pink as indicated by the vertical and horizontal cross hatching, tag 1215 is shown green as indicated by the left up to right cross hatching, etc. For at least some of the next locations, a count down clock (see 1216) is presented to let the employee associated therewith know how much time she has to get to her next scheduled activity. Here, in at least some cases the server 20 will only indicate next scheduled activities that are scheduled to occur within some threshold period (e.g., the next 30 minutes) and personal benches may be suggested to other employees.

Figure 80:
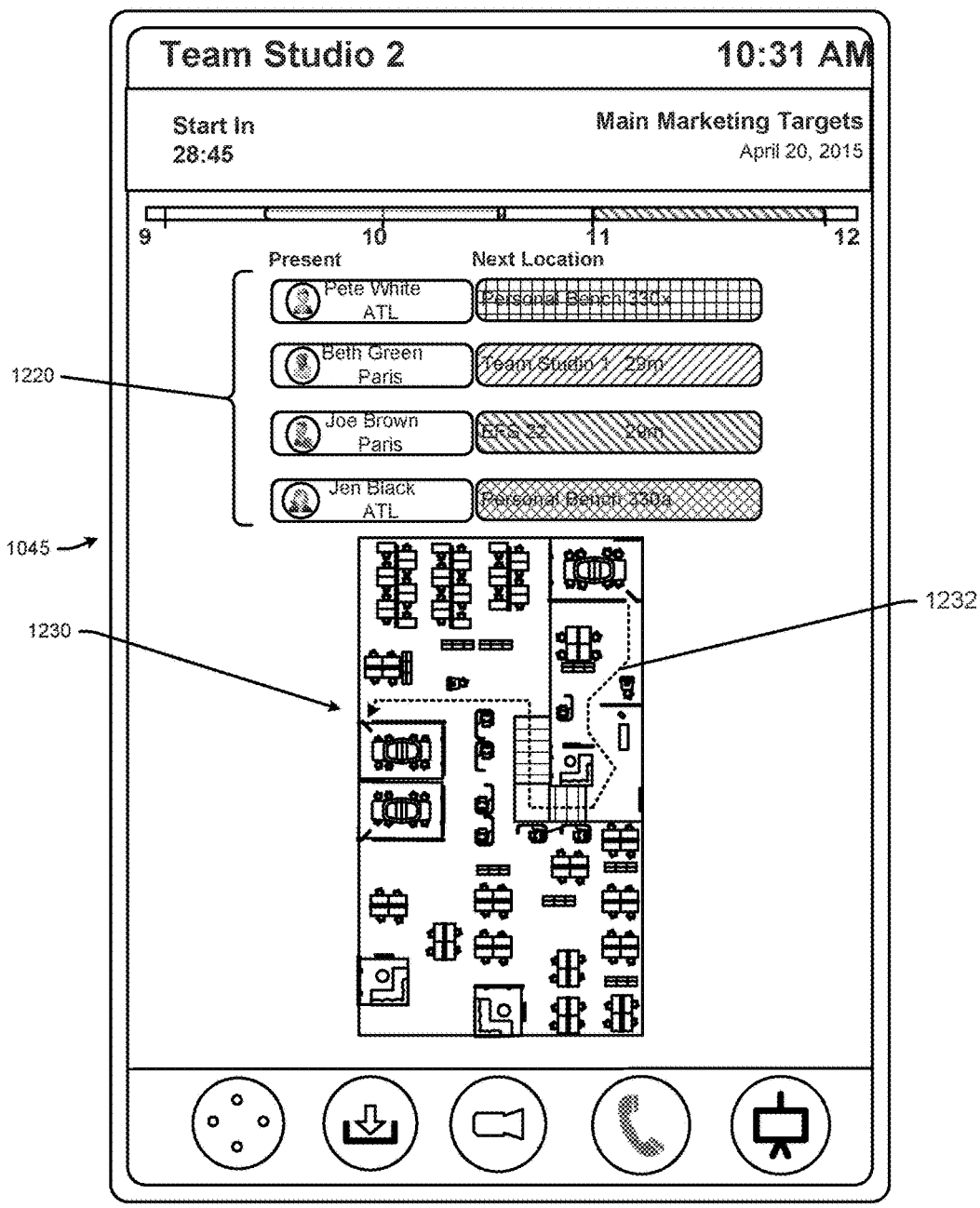
FIG. 80 is similar to FIG. 79, albeit presenting additional guidance information to employees leaving a team studio.

Referring to FIG. 80, in some cases the boot up screen 1045 may include a map representation 1230 of at least the local space 12*a* and may show color coded suggested paths (only one shown at 1232 in FIG. 80) for each employee in space 1010 to next configuration locations.

G. Other Embodiments

Many other embodiments of the disclosed systems and configurations are contemplated. For instance, while relatively simple capacitive touch interface devices are described above in each of the bench, focus station and kiosk configurations, in other embodiments more complex interface configurations are contemplated. For instance, each table top described above as including a capacitive touch interface may, instead, include a completely emissive surface or display screen that is touch sensitive so that more complex interfaces can be provided. As another instance, each table top described above as including a capacitive touch interface that includes actual mechanical buttons or button specific sensors may be replaces by a touch pad for moving an icon about on a display screen provided as part of an associated station or configuration where interface options are provided on the screen and selectable via the touch pad. For instance, see FIG. 81 where an exemplary bench privacy screen 342 includes a display screen 382 where a UI icon set 1410 akin to the icons described above with respect to FIG. 74 and other figures are presented on the display 382 along with a pointer/selection icon 1404 useable to select any of the interface icons. Pointer icon 1404 is controllable via a touch pad 1400 mounted in the upper surface of the bench worksurface 340. Here, in at least some cases, the icon set 1410 may not be presented until an employee contacts or waves her hand over pad 1400. The icon set at 1410 would only include a subset of the UI icons that is relevant to the configuration that the set is presented for. Thus, see in FIG. 81 that there is no telepresence or camera control icon as a typical bench in this disclosure would not include such a camera. If a particular bench or if all benches in a space include a camera, then a camera control or telepresence icon may be provided. While not shown, where a touchpad like pad 1400 is provided, much more complex virtual interface tools may be provided via screen 382 and therefore much more functionality can be built into a bench or other configuration type (e.g., a kiosk, a focus station, etc.). While not shown, a touch pad like the one shown in FIG. 81 may be included in either of the focus station or kiosk configurations to increase functionality.

Figure 81:
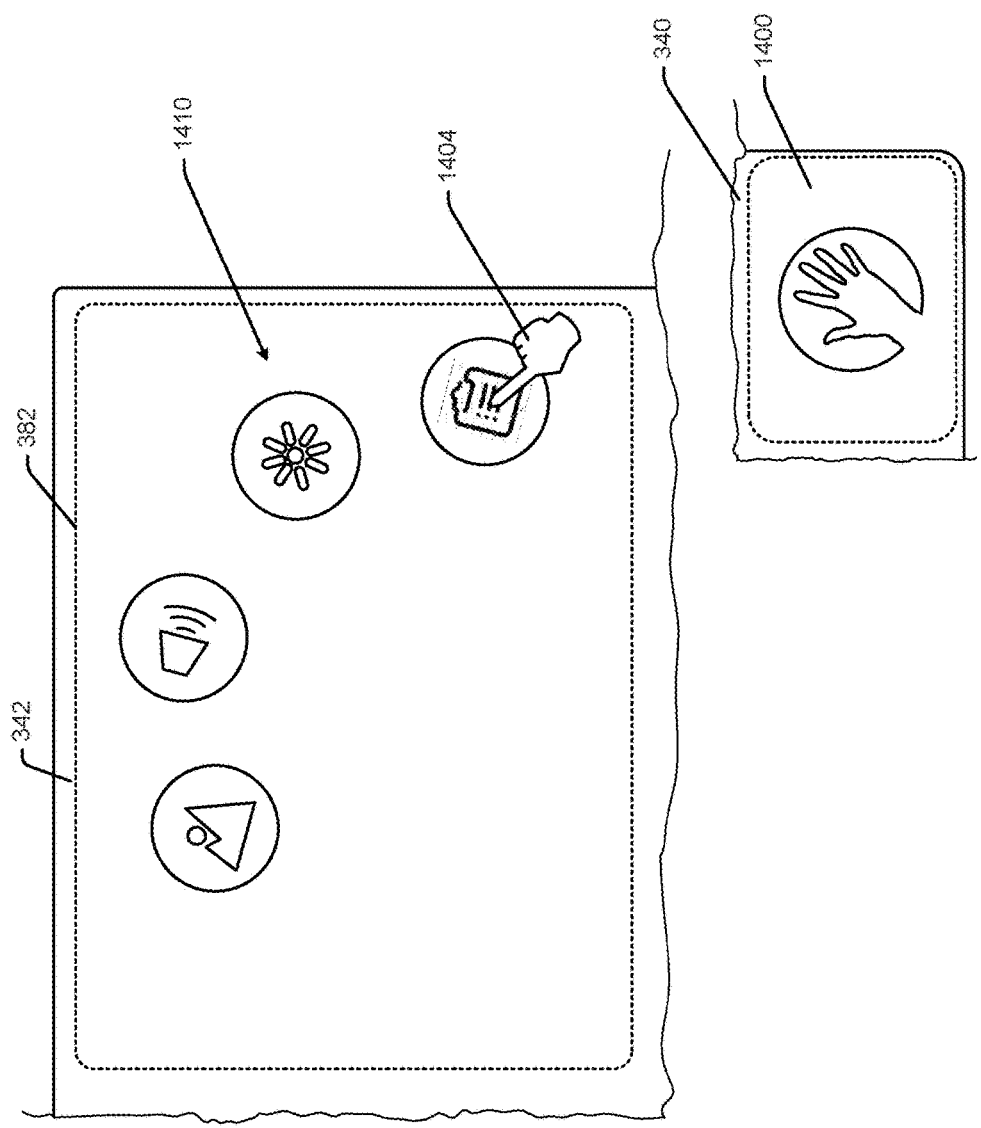
FIG. 81 is a schematic diagram illustrating a different type of user interface that may be provided via one of the personal bench configurations that is consistent with additional aspects of the present disclosure.
Figure 82:
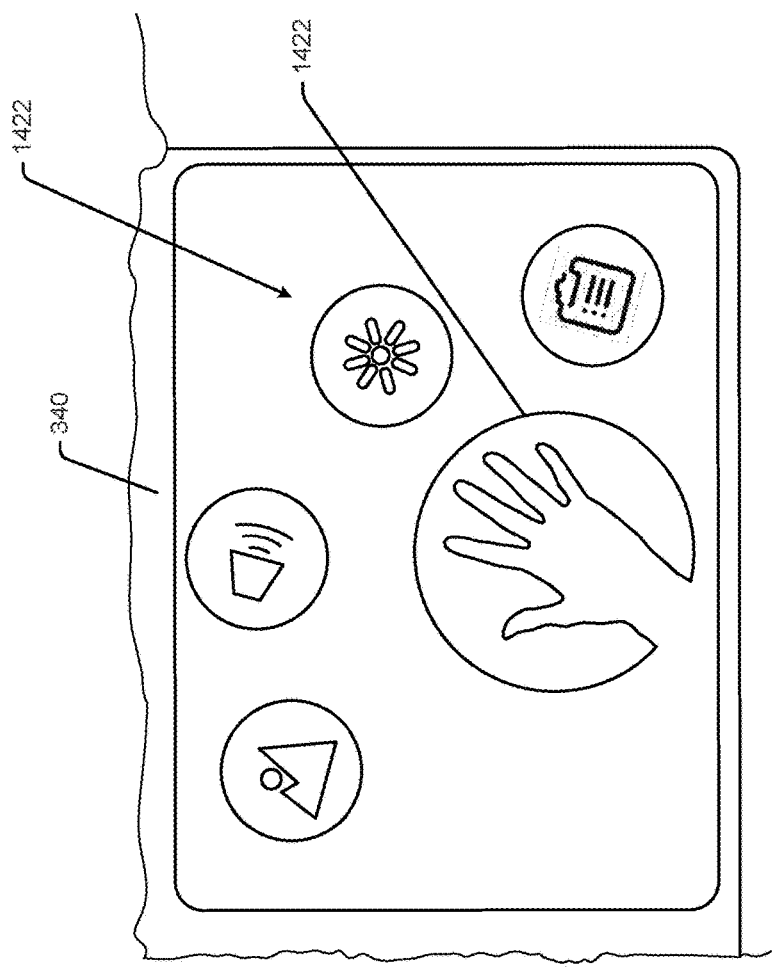
FIG. 82 shows yet another type bench configuration interface device.

In still other cases, the touch pad in FIG. 81 may be replaced by a small touch sensitive display screen or emissive surface on which a configuration UI may be presented. To this end see FIG. 82 that shows a virtual UI representation presented on a display screen 1420 at 1422. Again, the full UI including selectable icons may not be presented initially and, instead, may only be presented after an employee has touched screen 1420 or otherwise indicates a desire for the UI to be presented. In this case, the hand icon or representation 1424 may be presented as an invitation to employees to access the full UI and control configuration affordances.

Figure 83:
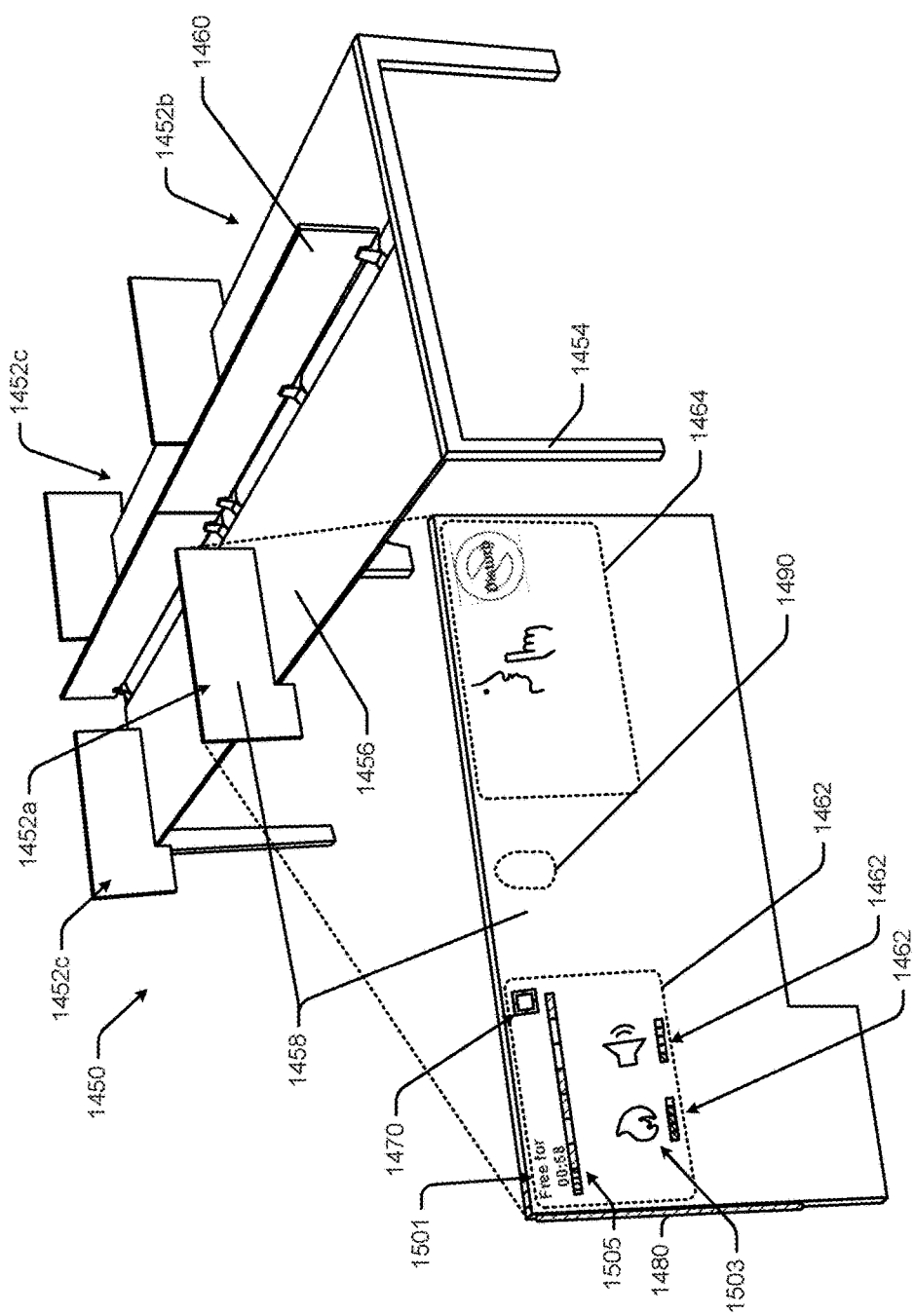
FIG. 83 is a perspective view of another bench configuration that is consistent with at least some aspects of the present disclosure where a lateral screen is shown in a large view.

Referring to FIG. 83, another exemplary bench assembly 1450 is illustrated that includes components that provide four separate but attached bench configurations 1452a, 1452b, 1452c and 1452d. Each of the bench configurations is similarly constructed and operates in a similar fashion and therefore, in the interest of simplifying this explanation, only configuration 1452a is described in any detail. Configuration 1452a includes a leg structure 1454 that supports a horizontal work surface 1456 at a seated height. A lateral dividing screen assembly 1458 is provided to the left hand side of the bench work surface 1456 to serve as a visual divide between bench 1452a and adjacent bench 1452c. Similarly, a screen assembly 1460 is provided between bench 1452a and bench 1452b which is directly across from bench 1452a. Lateral dividing screens are provided at each of the benches 1352b, 1452c and 1452d.

Figure 84:
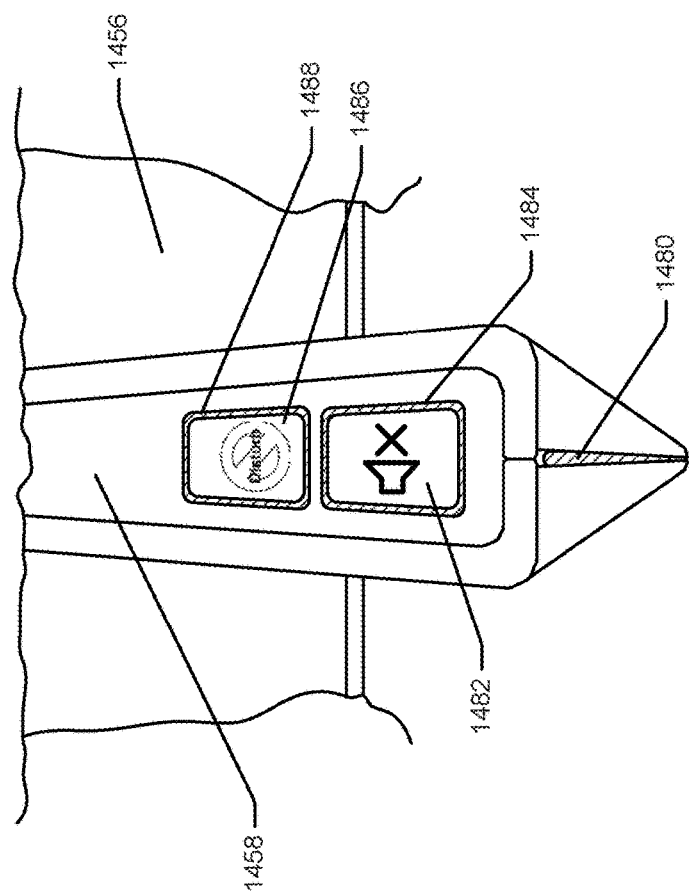
FIG. 84 is a top perspective view of an edge of the lateral screen shown in FIG. 83.

Referring still to FIG. 83 and now also to FIG. 84, lateral screen assembly 1458 has several construction features that are similar to the construction features described above with respect to the other bench screens. To this end, for instance, screen 1458 includes two small flat panel displays 1462 and 1464 mounted to an internal frame structure (not shown) with a fabric sock or cover member over the display surface of each flat display so that features of the displays (e.g., bezels, etc.) are hidden thereby. Again, the fabric is selected so that light and images generated by the displays are visible there through.

As seen in FIG. 84, first and second buttons 1482 and 1486 are provided in a top edge portion of screen assembly 1458 that can be selected by an employee to indicate that the employee currently prefers a silent environment and does not want to be disturbed, respectively. Each button has a light guide and LED (see 1484 and 1488) associated with it that indicates the status of the selected button. For example, in some embodiments when a button is not selected, the LED may be off and, upon selecting the button, the LED may be controlled to generate red light. In other cases, each button may toggle between red and green indicating selection and de-selection of each of each button and associated feature, respectively.

Referring still to FIGS. 83 and 84, an edge light device 1480 is provided along at least the end edge of screen 1458. In some cases, a similar edge light device may be provided in at least a portion of the top edge of screen 1458 as shown at 1481. In at least some cases, the edge light devices 1480, 1481 are used to indicate current ownership status of an associated bench (e.g., 1452a). For instance, when an employee temporarily owns a bench, associated light devices 1480 and 1481 may be controlled to generate red light and when no employee currently owns a bench, the edge light devices may be illuminated green.

Referring still to FIGS. 83 and 84, screens 1462 and 1464 are provided to present useful space management messaging to employees. For instance, in at least some cases screens 1462 and 1464 may be used to provide indicators or warnings associated with buttons 1482 and 1486 as well as other information like a salutation upon arrival of an employee at bench 1452a, preferred widget output, etc. In some cases a microphone 1490 may be mounted within screen assembly 1458 for sensing sound and driving a silence reminder indicator when the sound volume exceeds some threshold level.

Referring still to FIG. 83, an exemplary screen 1462 is illustrated which shows that, in at least some cases, screen 1462 may be divided into different messaging areas. Here, in at least some cases, server 20 may only present specific information types in each of the different messaging areas so that employees can develop familiarity with the layout of the messaging screen 1462 and the meaning of the information presented. The exemplary different types of messaging areas include a text messaging area 1501, a graphical silence preference messaging area 1470, a schedule timeline area 1505 and a graphical glanceable messaging area 1503. Text area 1501 is used to present short and informative text messages to employees that cannot be presented efficiently or effectively in some glanceable graphical way. For instance, the message in FIG. 83 indicates "Free for 00:58" which indicates that an associated bench is not scheduled for use for another 58 minutes and therefore is free for use by any employee for the next 58 minutes.

Figure 91:
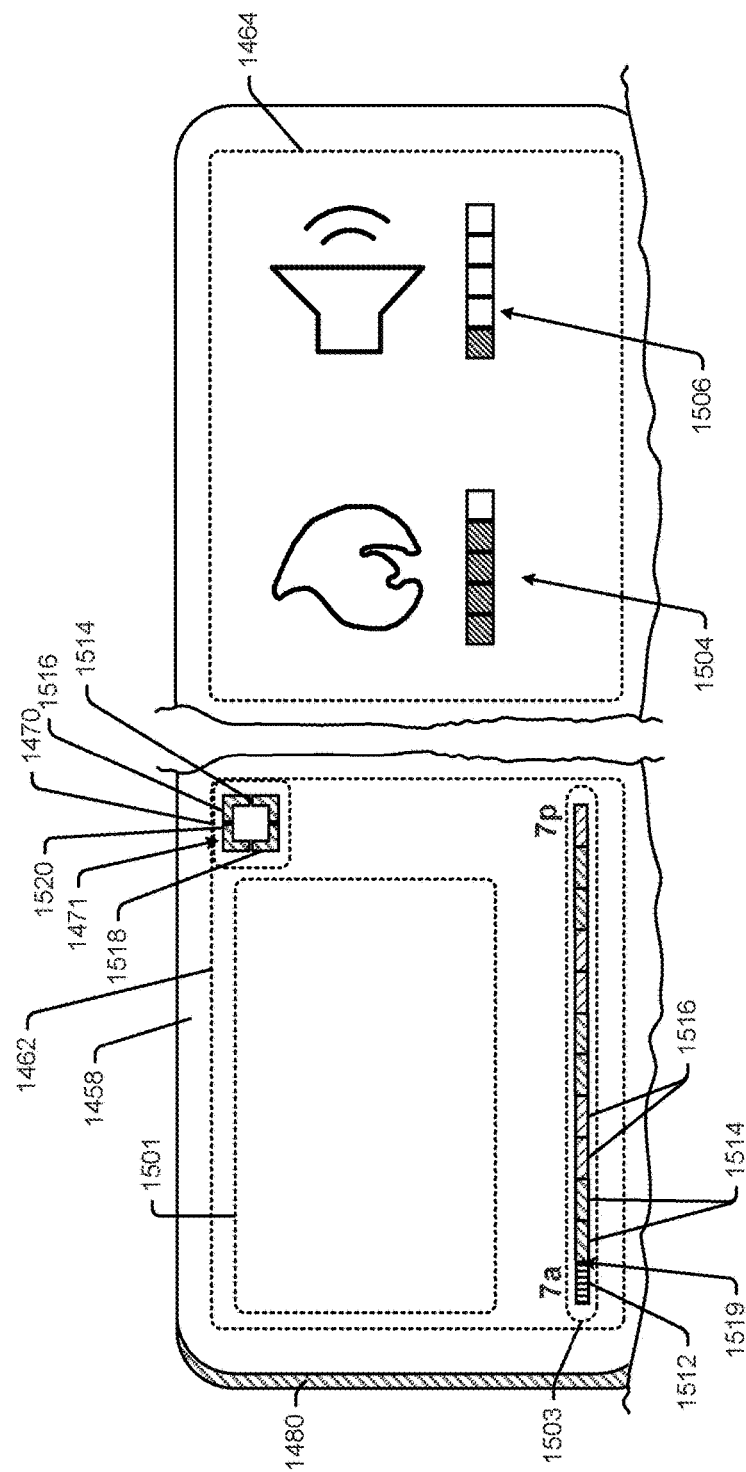
FIG. 91 shows the content of FIG. 90 in more detail.

Referring still to FIG. 83 and also to FIG. 91, messaging area 1470 includes a graphical representation 1471 of the benches that comprise configuration 1450 including four bench icons 1514, 1516, 1518 and 1520 that correspond to bench configurations 1452a, 1452b, 1452c and 1452d, respectively. As in the case of the silence preference indicators (see 450 in FIG. 23) described above, the four icons that make up representation 1471 are oriented to mirror the layout of associated benches so that employees can determine which bench occupants have requested silence and which have not. In FIG. 91, each bench icon 1514, 1516, 1518 and 1520 is colored green to indicate that no employee at the respective benches has indicated a preference for silence. When an employee has indicated a preference for silence, an associated bench icon is colored red.

Referring yet again to FIG. 83 and also to FIG. 91, timeline area 1505 includes a schedule timeline 1502 for an associated bench. The exemplary timeline includes simple graphical representations of time slots where available or free slots are indicated in green (see 1514) and scheduled or owned slots are indicated in red (see 1516). As time passes, past time is indicated in gray as shown at 1512. A current time is therefore located at 1519 (e.g., at the right end of the last gray slot).

Figure 101:
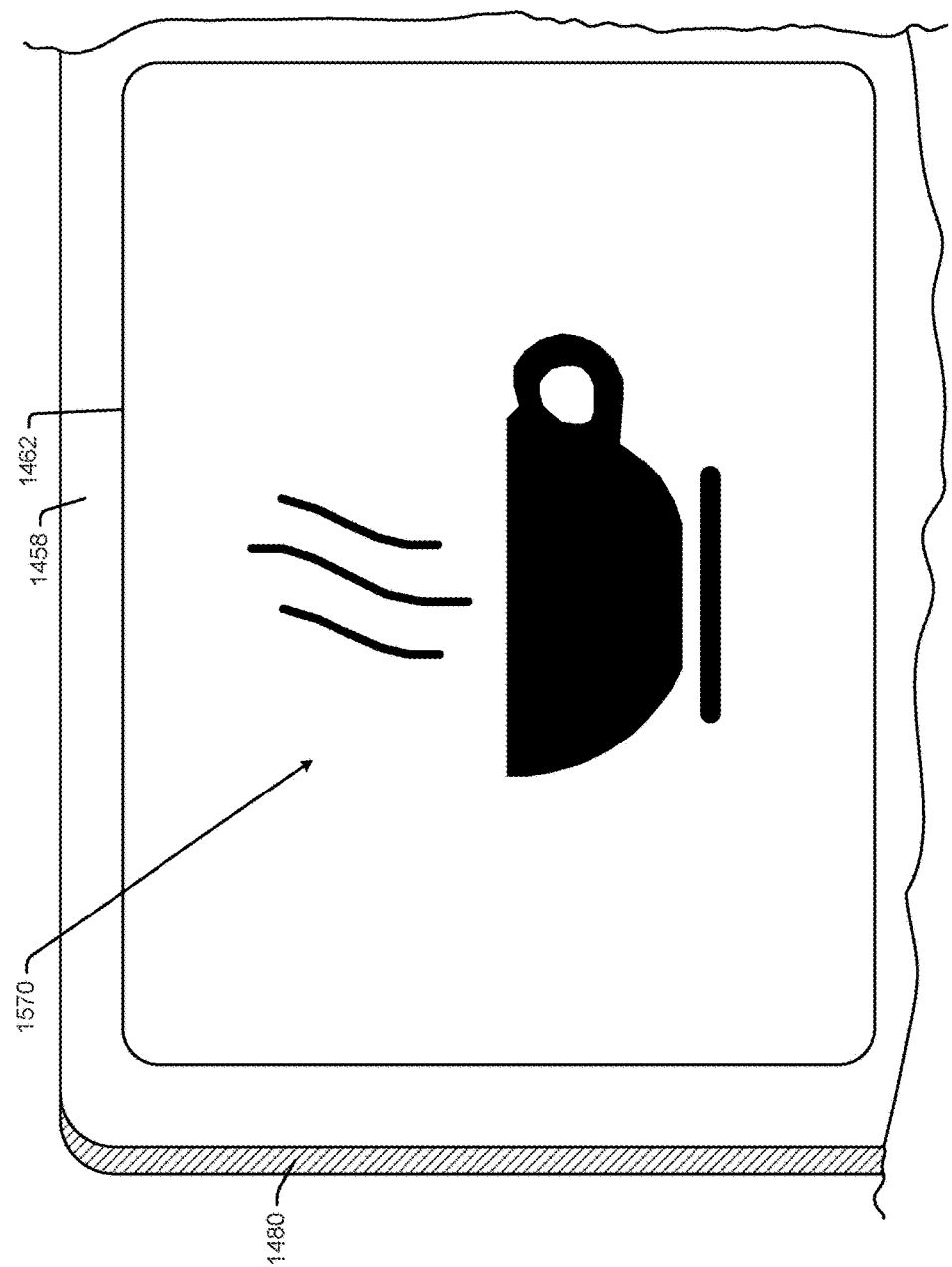
FIG. 101 is similar to FIG. 92, albeit showing a different set of messaging and signaling.

Graphical glanceable messaging area 1503 is used to present messages that can easily and intuitively be expressed by glanceable graphical representations. For instance, see in FIG. 83 that temperature and sound indicators are presented at 1504 and 1506, respectively, and bar type scales for each are presented at 1508 and 1510, respectively. Here, an employee can quickly view area 1503 and determine the relative ambient temperature and relative noise level at the associated bench. As in the systems descried above, temperature and noise level may be based on real time sensed values, historical values for a bench and/or employee feedback. As other instances, see the silence representation at 1540 in FIG. 96 which should be easily recognizable as a notice to reduce noise level, the stand up representation 1560 in FIG. 101 designed to encourage an employee to stand and stretch after a period of minimal movement. Other graphical glanceable representations are contemplated.

Figure 85:
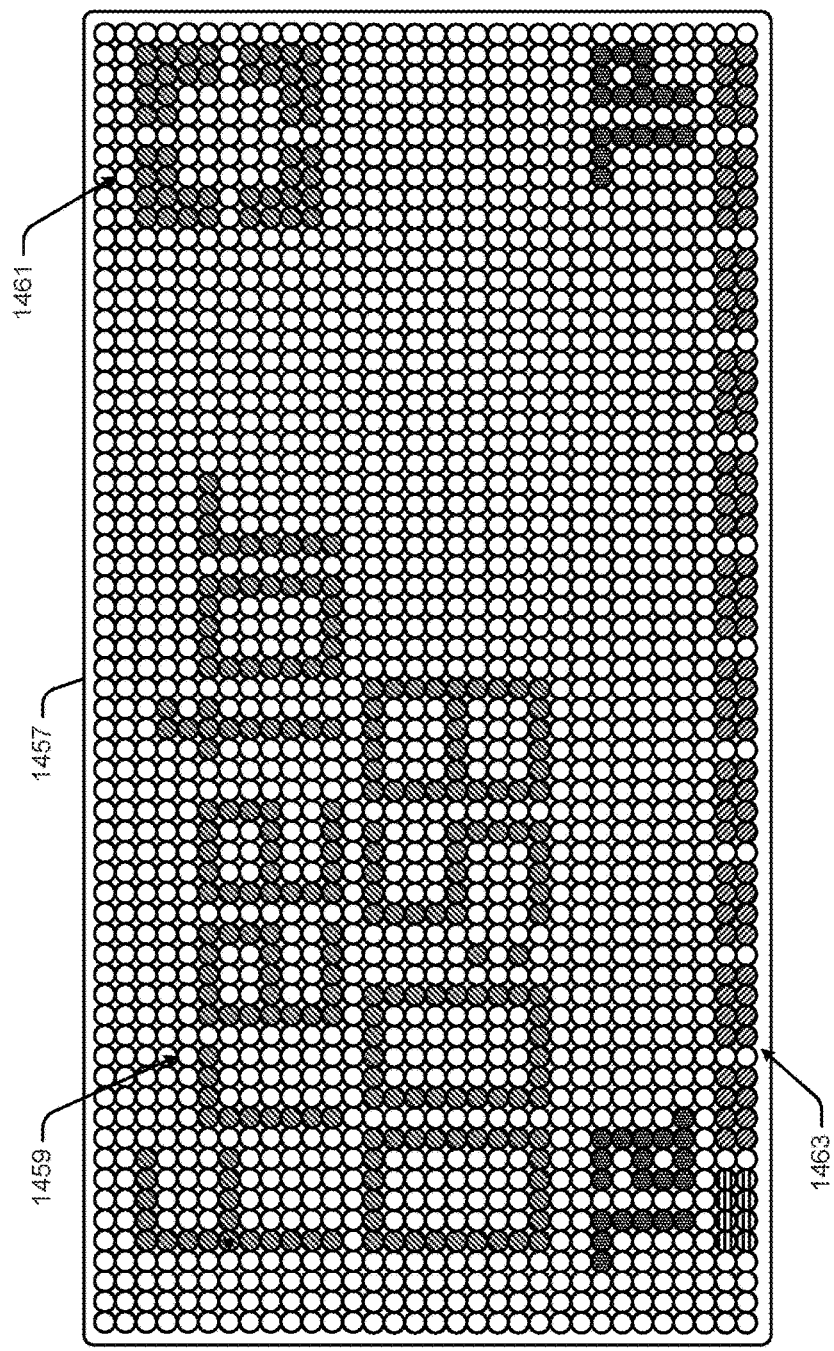
FIG. 85 is a front plan view of an LED matrix type display screen that may be used to provide messaging in the privacy screen shown in FIG. 83.
Figure 86:
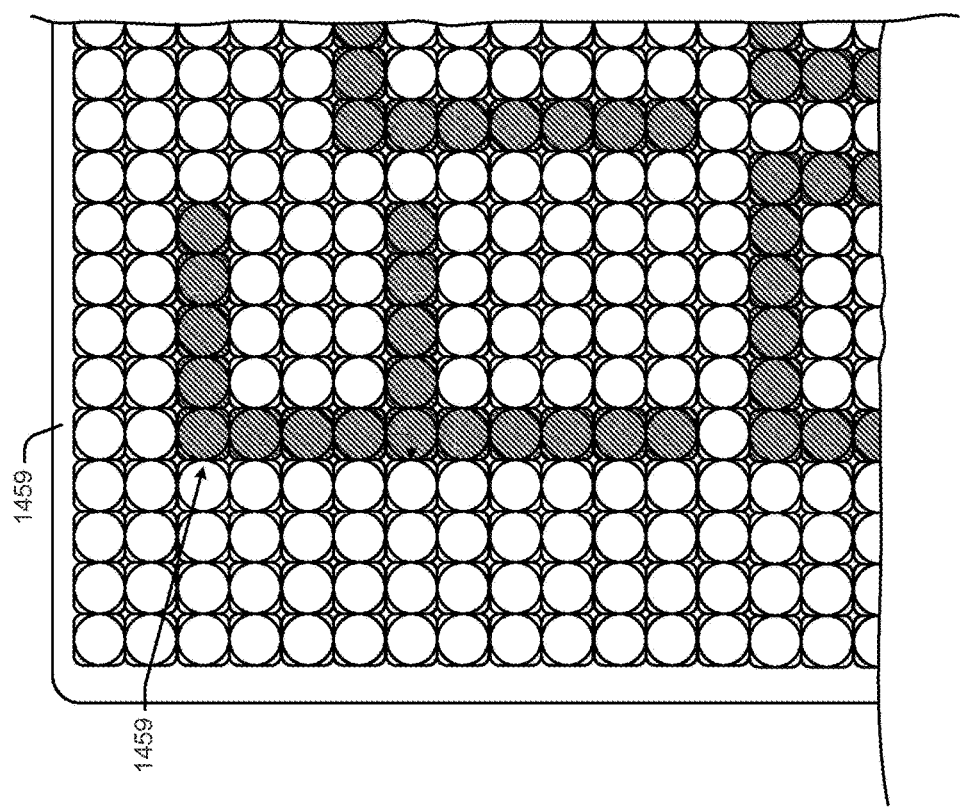
FIG. 86 is a view of an enlarged portion of the screen shown in FIG. 85.
Figure 87:
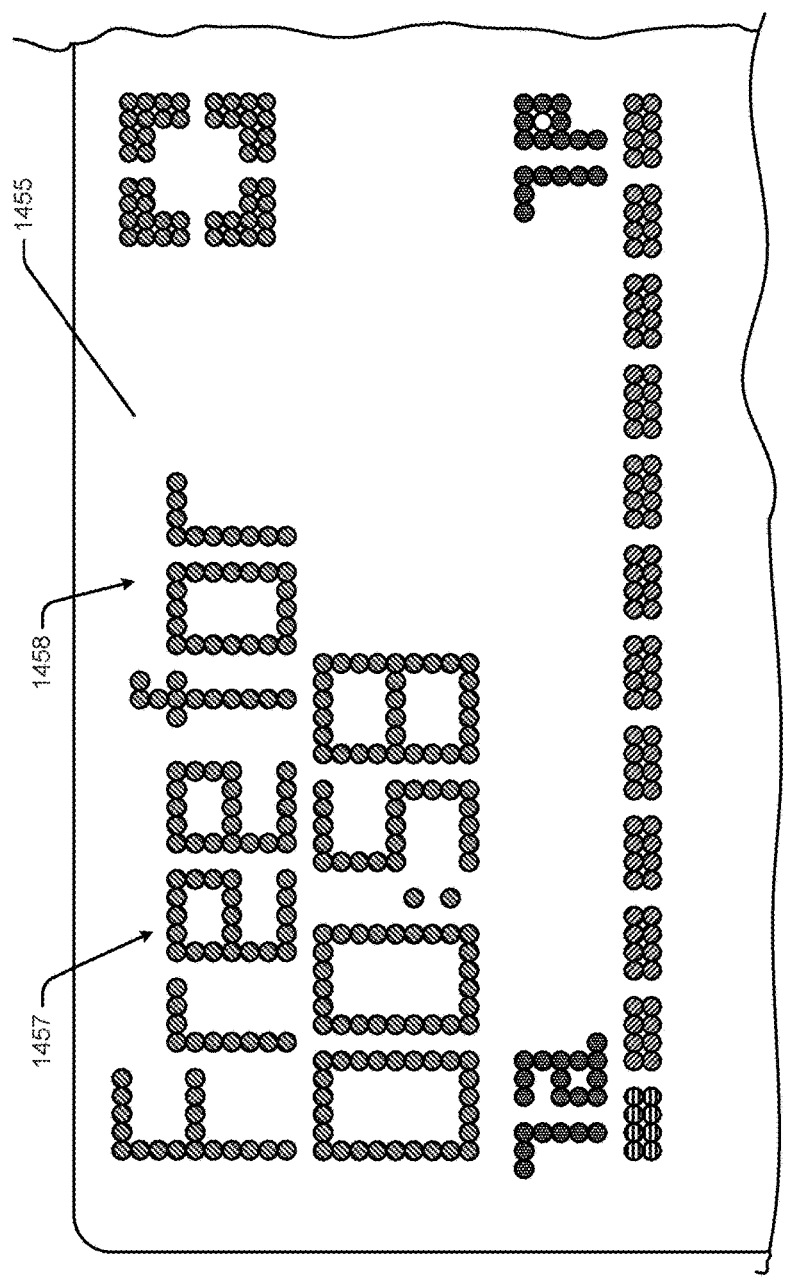
FIG. 87 shows the screen in FIG. 85 with a fabric cover member stretched there across.

Referring now to FIG. 85, another type of display that may be used to present messaging to employees is an LED display screen 1457 that may relatively less expensive is some cases and therefore more suitable for at least some applications. The screen 1457 is a 32 by 64 LED matrix screen where, in at least some embodiments, each LED is independently controllable to generate different light colors (e.g., red, green, yellow, blue, white, etc.) and different brightness levels. The exemplary screen in FIG. 85 shows an exemplary employee message at 1459, a silence preference indicator at 1461 and a bench schedule time line at 1463. FIG. 86 shows an upper left corner of the LED screen 1459 where a portion of a text message is relatively easier to discern. FIG. 87 shows the screen 1457 of FIG. 85 covered by a material layer 1455 to form a dividing screen 1458 where the fabric used to construct the material layer passes light. As shown and consistent with the screen descriptions above, the light passes through the material while the dimensions and other aspects of the underlying screen are completely hidden. In at least some cases the light appears to be, in effect, painted on the outer surface of the material in operation.

Figure 88:
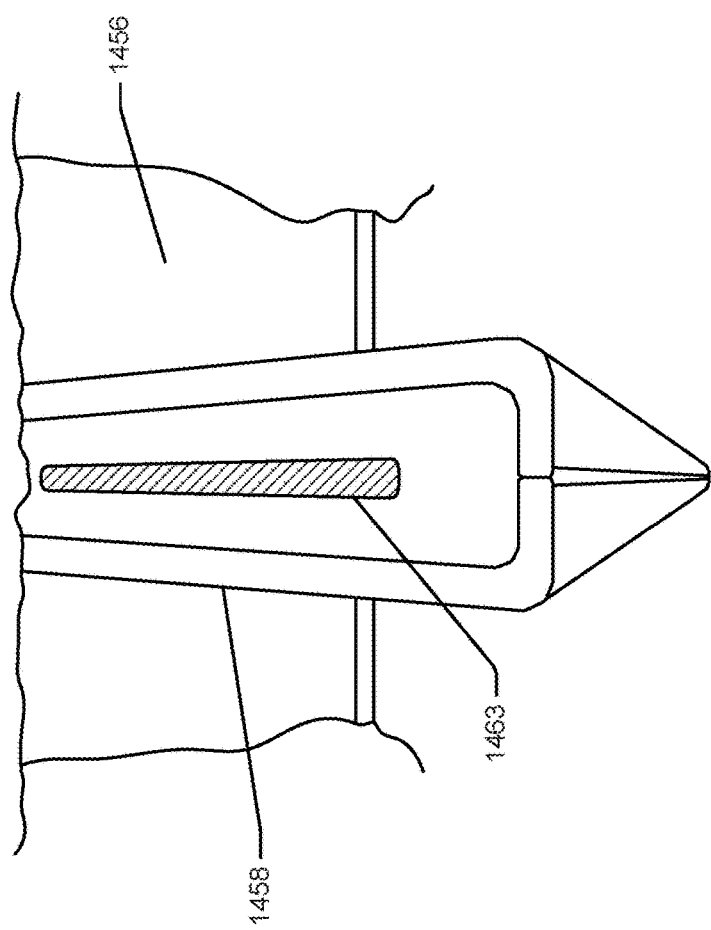
FIG. 88 is similar to FIG. 84, albeit showing an upper edge light device that is consistent with at least some aspects of the present disclosure.

Referring to FIG. 88, in some cases a screen may include an upper edge light device 1463 at a distal end of the upper edge that is viewable by persons passing by the screen and associated bench. In some cases the upper edge light may include LEDs behind a lens or light pipe cover where an upper surface of the cover is flush with the upper edge of the screen assembly 1458. In other cases, the lens or light pipe may have an upper surface that stands proud of the upper edge of the screen assembly 1458 so that the light can better be seen from the sides of the screen assembly 1458.

Figure 89:
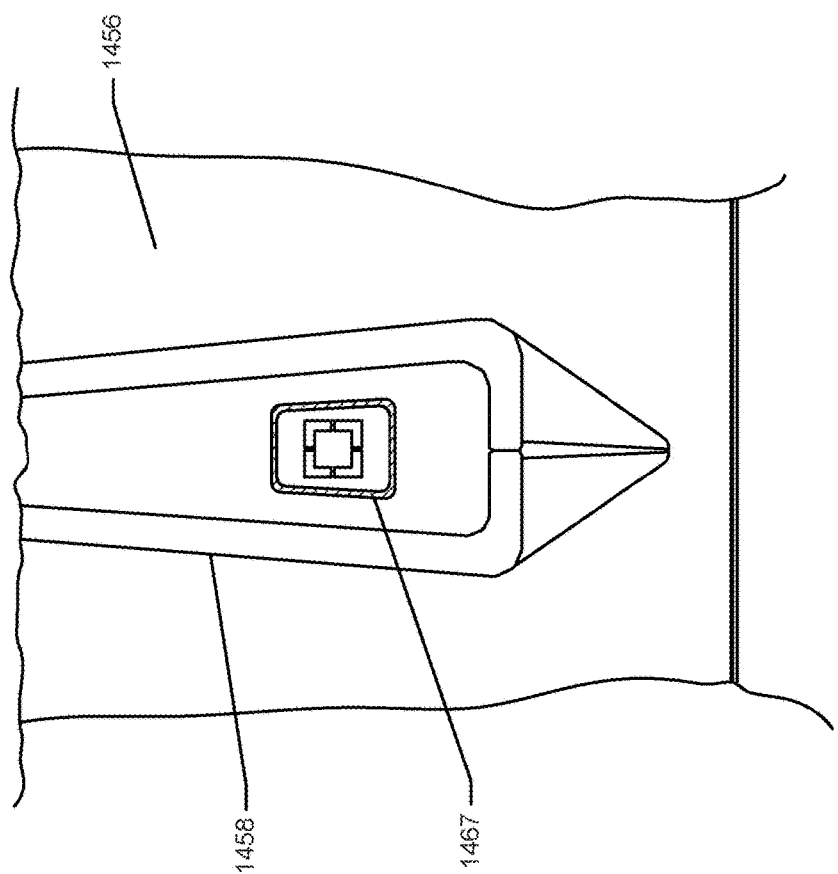
FIG. 89 shows a send end of the top edge of the screen in FIG. 88 with a single preference selection button.

FIG. 89 shows that screen 1458 may include a single selectable button 1467 at a proximal end (e.g., the end over a work surface as opposed to the end extending from the work surface) of the upper edge. Here, button 1467 may be selectable for indicating a silence preference (e.g., as indicated by the silence preference indicator 1461 shown in FIG. 85). For instance, when button 1467 is selected, the quarter section of indicator 1461 associated with the bench that is associated with screen 1458 may be colored red to indicate a silence preference for the bench user. Button 1467 may be surrounded by a light pine and an LED color may toggle between red and green to indicate selection status of the button in some cases.

Figure 90:
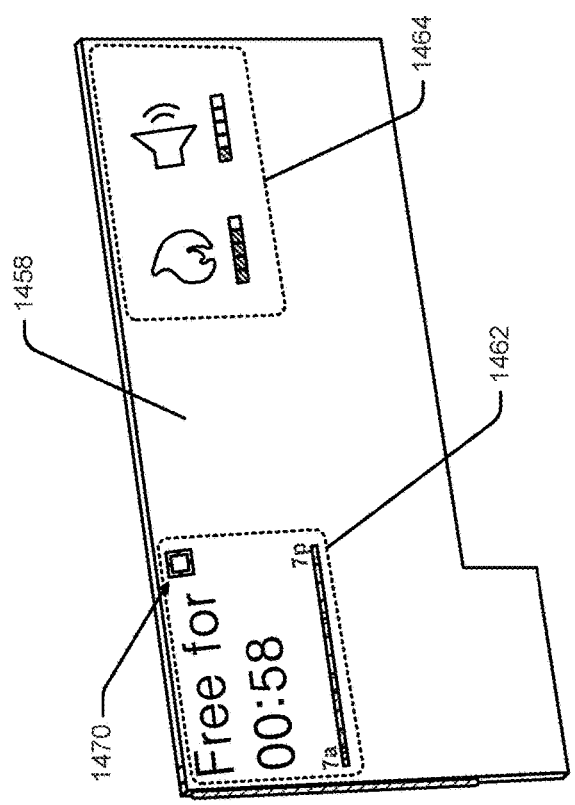
FIG. 90 shows a screen assembly with messaging displays that presents content in a different format.

Referring to FIG. 90, in at least some embodiments graphical representations of temperature, sound level, etc., may be presented via screen 1464 while other messaging is presented via screen 1462. Here, by only presenting a limited and relatively small set of information on screen 1462 and other information on screen 1464, it is believed that employee confusion may be avoided as employees will come to rely on the locations of specific information relatively quickly and the messaging presented will become completely glanceable over time. In FIG. 91, text messaging is large and presented at 1501, the silence preference indicator is presented at 1471 and a bench schedule time line is presented at 1505 while the temperature and sound level indicators are presented at 1504 and 1506 by screen 1464.

Next, several examples of how screens 1462 and 1464 can be used to indicate different statuses of bench configuration 1452*a* are described. A first status is when bench 1452*a* is unreserved and unoccupied (e.g., no employee is detected at the bench). Referring to FIG. 91, when bench 1452*a* is unreserved and unoccupied, text field 1501 may indicate that the bench is available and present the current time as shown at 1501. In FIG. 91, no employee at any of the benches 1452*a* through 1452*d* has indicated a silence preference and therefore each of the bench icons in representation 1470 is colored green. The timeline at 1505 is gray up to the current time 1519 and then green to indicate availability during a next time period.

Edge light device 1480 (or the upper edge light device 1463 as shown in FIG. 88) is shown green indicating that bench 1452*a* is available for use by a walk up employee without a reservation. As described above, glanceable messages on screen 1464 include graphical temperature and sound level representations. Thus, an employee that is passing by bench 1452*a* can view screens 1462 and 1464 and quickly get a sense of availability, whether or not other employees using proximate benches 1452*b* through 1452*d* have expressed a silence preference and information about the bench environment like temperature and noise level. Based on the information presented, the employee can decide whether or not to use the bench in a relatively informed manner. In the present example it will be assumed that Jen Black walks up to and decides to use bench 1452*a* without a prior reservation to use that bench.

Figure 92:
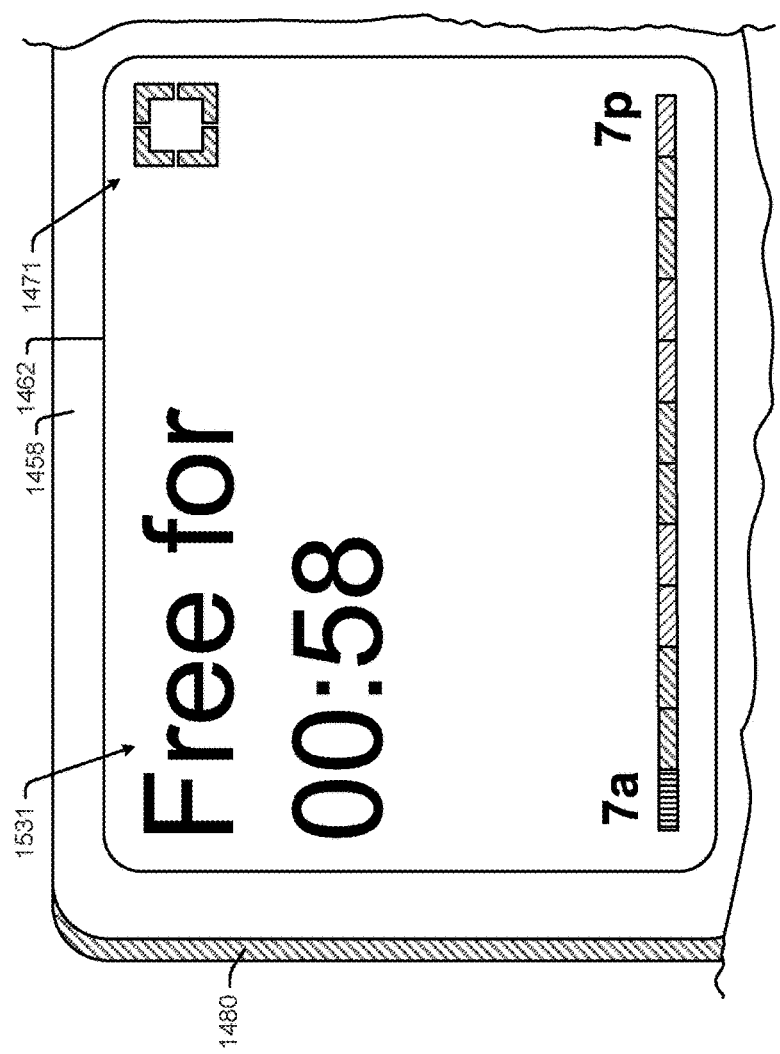
FIG. 92 is an enlarged view of the upper left corner of the screen shown in FIG. 91 showing messaging and signaling that maybe presented via the screen to employees in an enterprise space.

Referring to FIG. 92, when Jen Black sits down at bench 1452*a* without a prior reservation several things happen. First, the presented text message is changed to provide a count down clock (see 1531 in FIG. 92) to indicate the amount of time until bench 1452*a* is reserved for use by another employee. Second, the representations in the graphical glanceable message area of screen 1464 are removed as Jen Black no longer needs that information to make a decision regarding use of the bench 1452*a*. Third, the color of edge light device 1480 is changed to red to indicate that bench 1452*a* is no longer available for use by another employee (e.g., Jen Black temporarily owns the bench 1452*a*).

In the current example if, after walking up and taking unreserved ownership of bench 1452*a*, Jen Black gets up and leaves bench 1452*a*, in at least some cases screen 1458 messaging and edge light 1480 signaling will revert immediately back to the state illustrated in FIG. 91 to, again, indicate bench availability, ambient characteristics and expressed silence preferences for bench 1452*a*.

Figure 93:
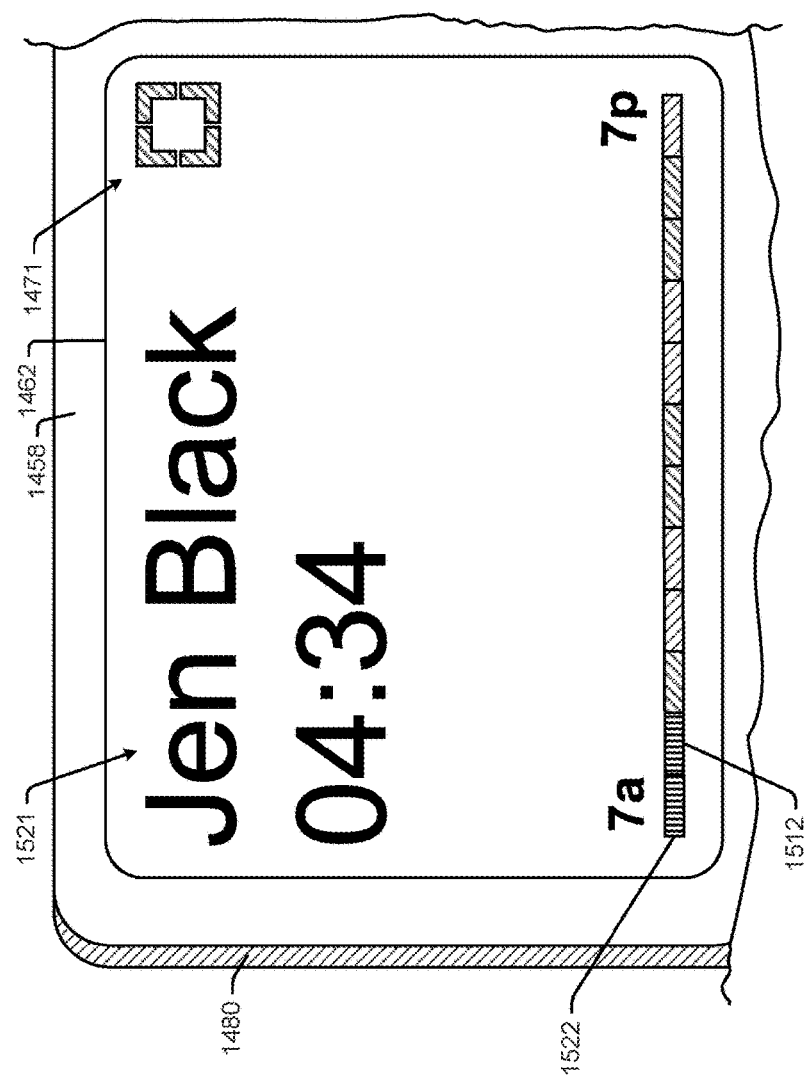
FIG. 93 is similar to FIG. 92, albeit showing a different set of messaging and signaling.

Next, assume that Jen scheduled a reservation to use bench 1452*a* and that the scheduled period of use is approaching. In this case, see FIG. 93 where screen 1462 and edge light device 1480 are shown. In this case, text message 1521 is presented which indicates the scheduled owner of bench 1452*a* as well as provides a count down timer to indicate when Jen Black is to assume ownership of bench 1452*a*. Edge light device 1480 is shown red to warn that bench 1452*a* should not be used by any other employee as the bench is reserved for use in the near future.

Figure 94:
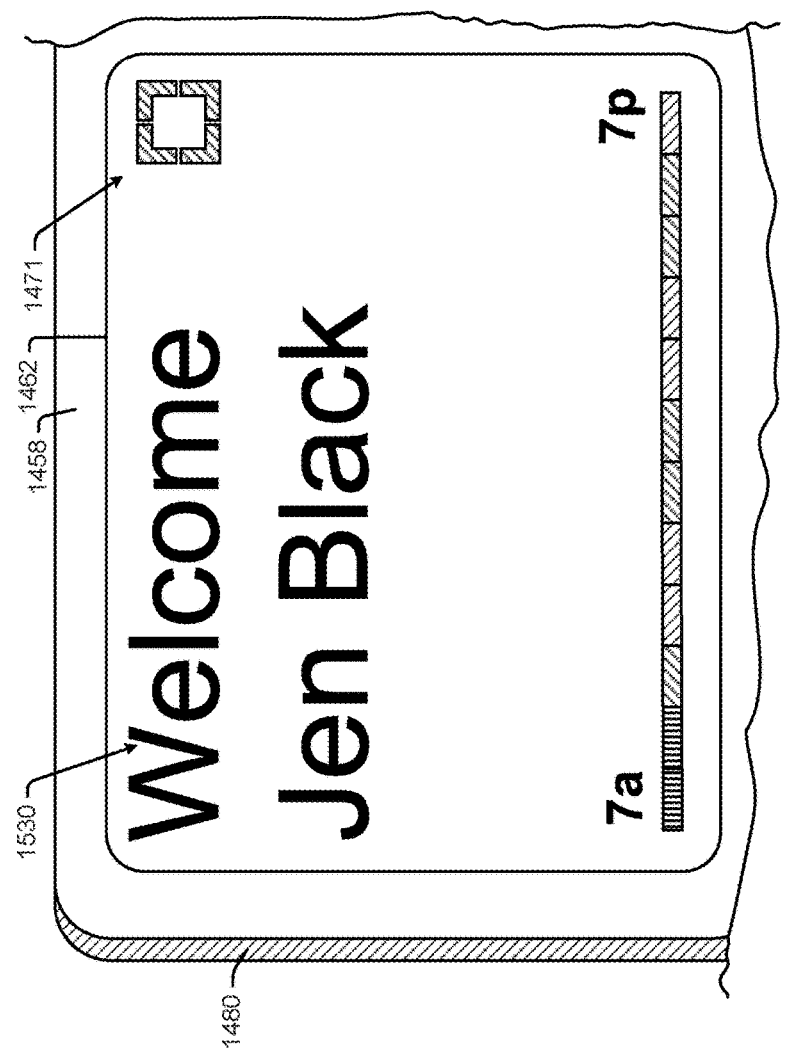
FIG. 94 is similar to FIG. 92, albeit showing a different set of messaging and signaling.
Figure 95:
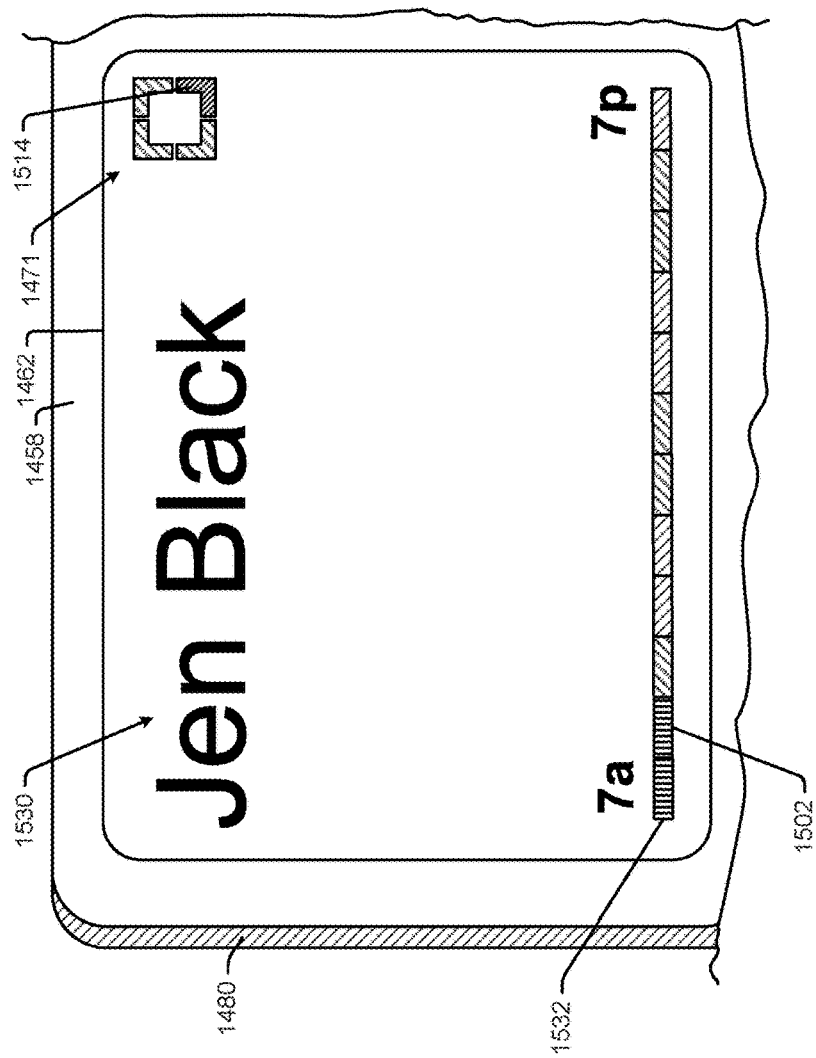
FIG. 95 is similar to FIG. 92, albeit showing a different set of messaging and signaling.
Figure 96:
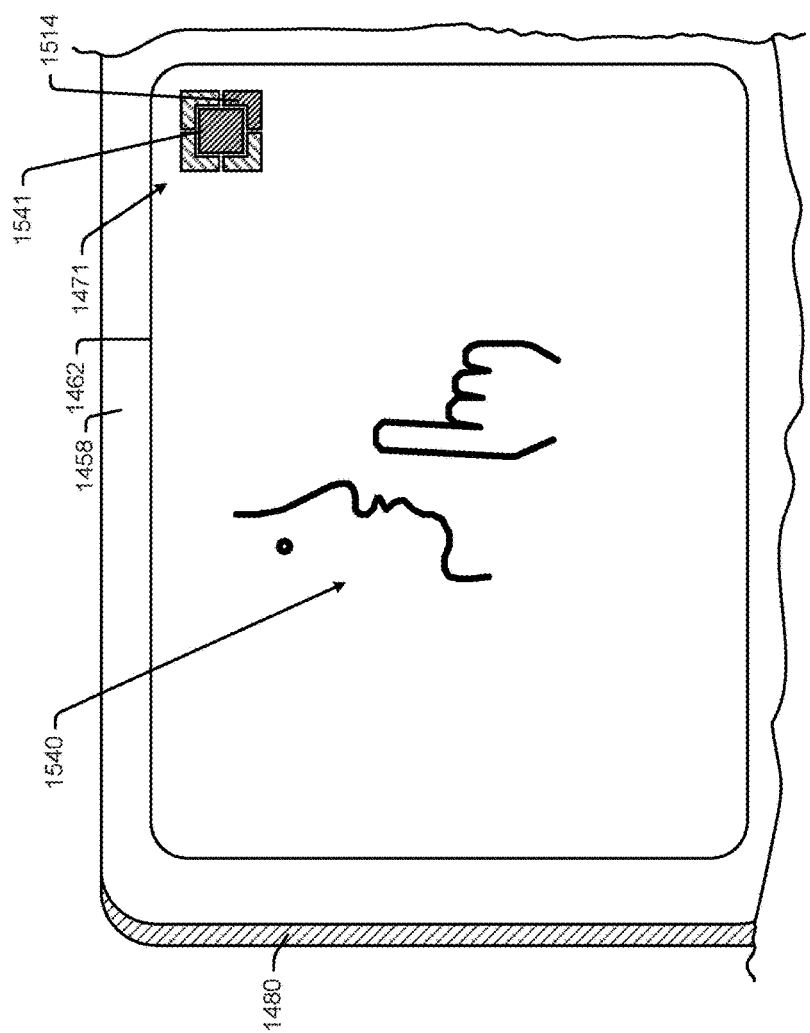
FIG. 96 is similar to FIG. 92, albeit showing a different set of messaging and signaling.

Referring to FIG. 94, when Jen Black arrives at her reserved bench 1452*a*, salutation 1530 is presented in the text area and edge light device 1480 remains red to indicate that bench 1452*a* is currently owned. Referring to FIG. 95, if, while at bench 1452*a*, Jen Black indicates a silence preference (e.g., selects button 1487 in FIG. 89), bench icon 1514 that corresponds to bench 1452*a* is colored red. Similar silence preference indicators are provided at the other benches 1452*b* through 1452*d*, albeit where the bench indicator that is shown red corresponds to the relative juxtaposition of bench 1452*a* to the bench associated with the preference indicator. Referring to FIG. 96, if an employee at any one of the benches 1452*a* through 1452*d* generates sound that exceeds a threshold level after at least one of the employees at those benches has indicated a silence preference, graphical glanceable silence representation 1540 may be automatically provided at least until the sound level drops back down below the threshold level. In addition to presenting indicator 1540, the central portion of indicator 1471 at 1541 is colored red to indicate a quiet reminder.

Figure 97:
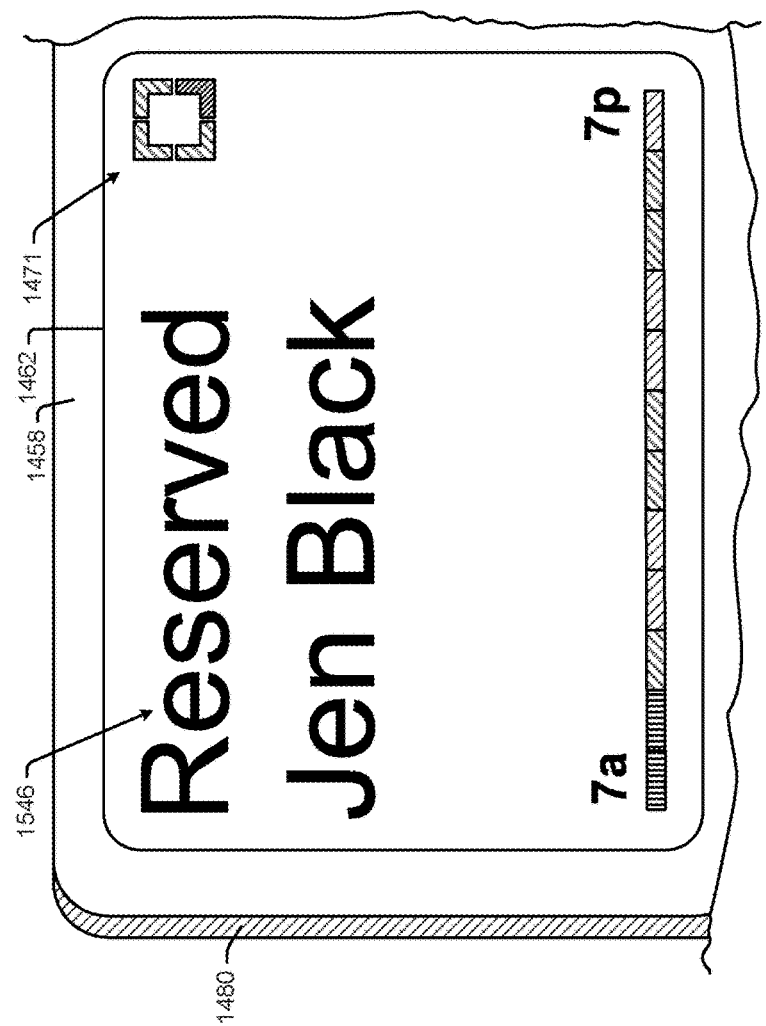
FIG. 97 is similar to FIG. 92, albeit showing a different set of messaging and signaling.
Figure 98:
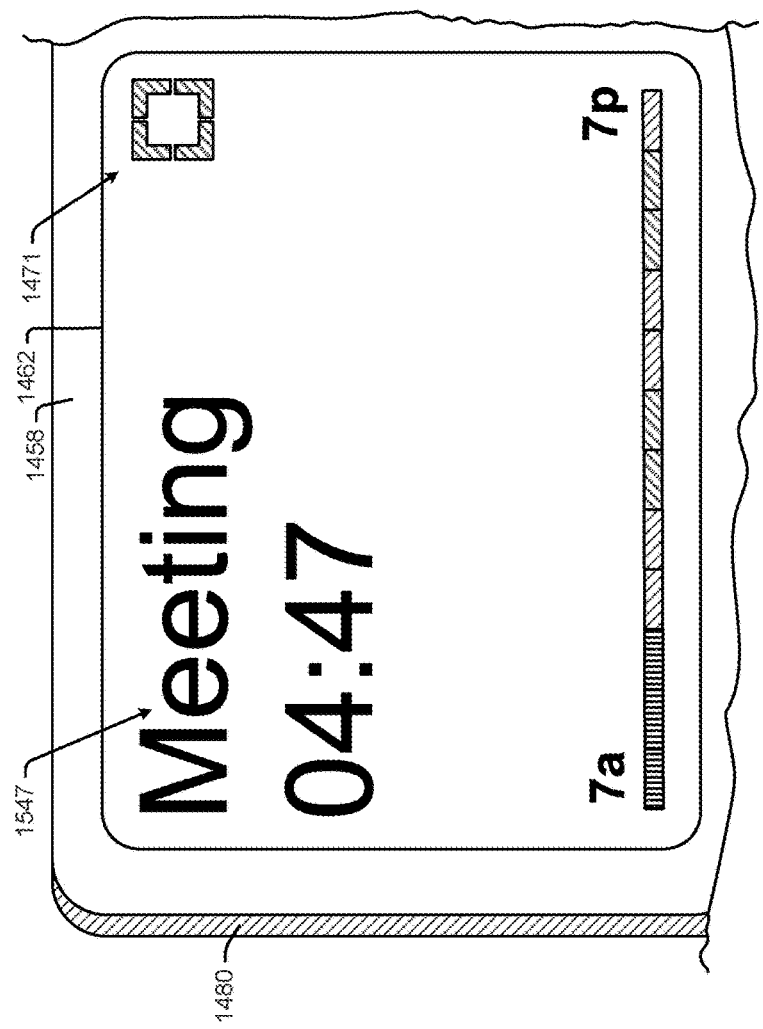
FIG. 98 is similar to FIG. 92, albeit showing a different set of messaging and signaling.

Referring to FIG. 97, if Jen Black leaves a bench that she previously reserved, a "Reserved" message 1546 may be presented in the text area of screen 1462 and edge light device 1480 remains red to indicate that bench 1452*a* is currently owned. Jen's name is also presented to indicate the employee that currently owns bench 1452*a*. Referring to FIG. 98, if Jen Black is using bench 1452*a* and has a meeting coming up on her schedule, a meeting warning 1547 may be presented along with a count down to the scheduled meeting time as shown. While not shown, meeting location may also be indicated or otherwise shown on a map representation of an enterprise space that includes the meeting location.

Figure 99:
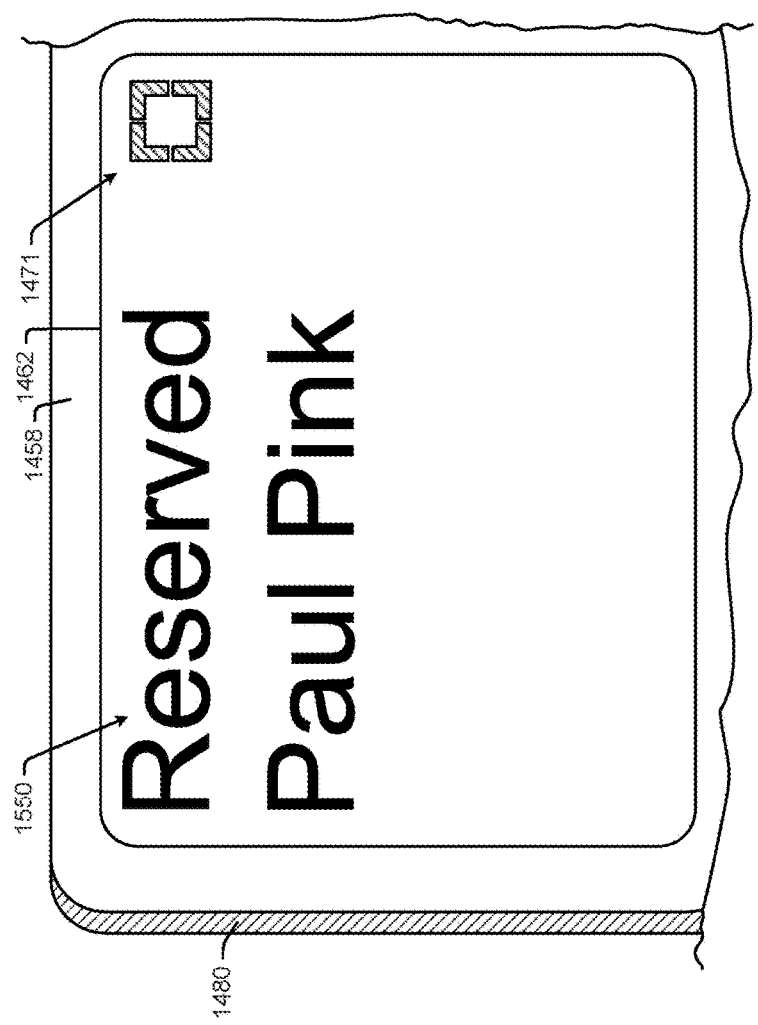
FIG. 99 is similar to FIG. 92, albeit showing a different set of messaging and signaling.

In at least some cases it is contemplated that some bench configurations in a space 12*a* may be assigned more permanently to specific employees. In this case, instead of changing the ownership status of the bench based on presence and reservations, light device 1480 may always be red to indicate ownership and the owning employee's name and other information may routinely be presented via screen 1462 as shown in FIG. 99 at 1550. In this case other signaling or messaging would still be presented such as the silence preference indicator, meeting warnings, etc. The bench schedule timeline would not be presented in at least some embodiments for permanent or semi-permanent employees as that information would not be required. While not shown in detail, other messaging described above and hereafter may be presented to the permanent or semi-permanent employee at the bench sans the schedule timeline.

Figure 100:
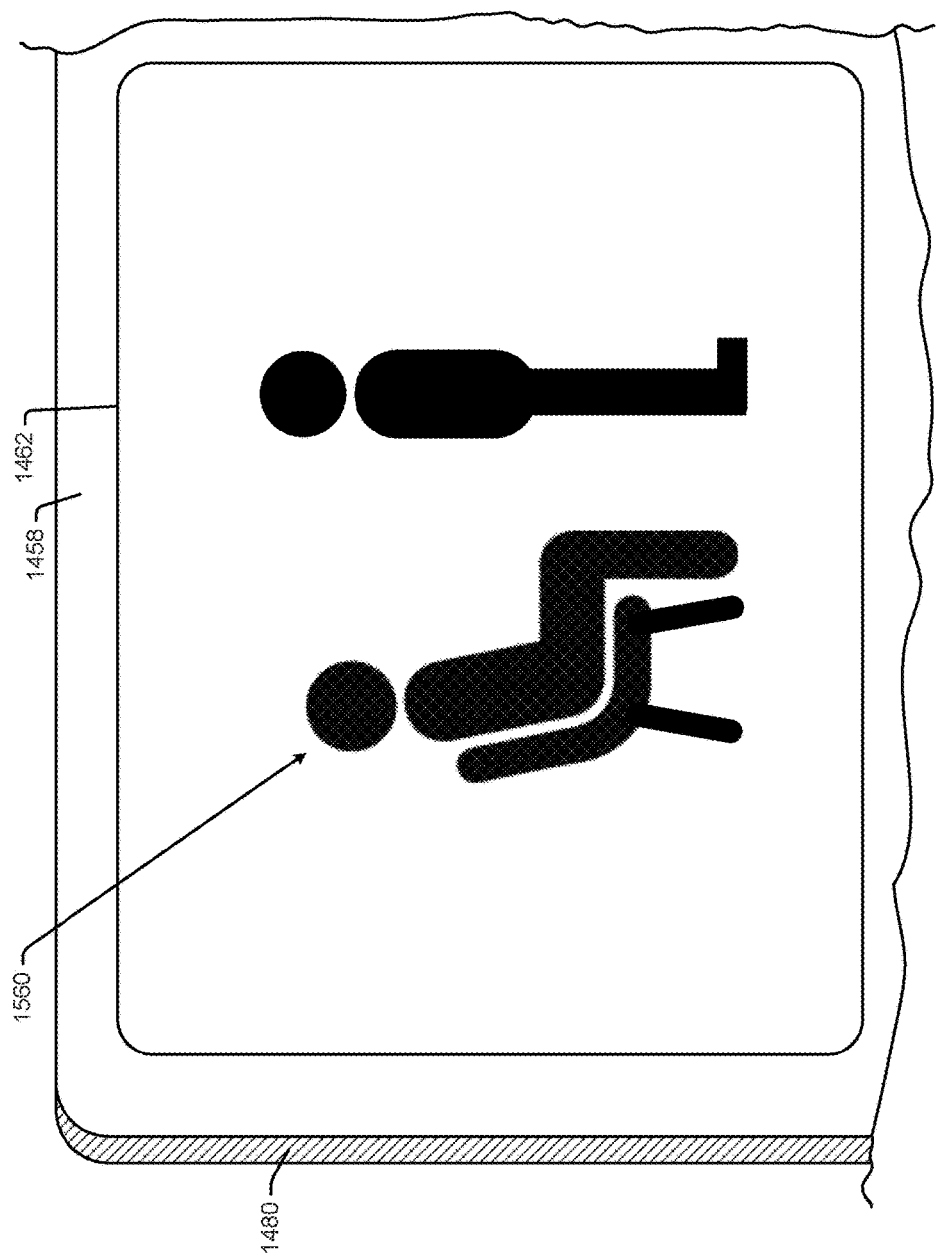
FIG. 100 is similar to FIG. 92, albeit showing a different set of messaging and signaling.

Other warnings are contemplated that are related to an employee's health. To this end, see for instance FIG. 100 where a graphical stand up message is shown at 1560. Here, where server 20 recognizes that an employee has been sitting for greater than a threshold period (e.g., 30 minutes), server 20 may present graphic 1560 to encourage the employee to stand up or stretch. The double graphic representation 1560 may be animated where the sitting and standing representations are presented sequentially and repeatedly. As another instance, see coffee graphic 1570 presented in FIG. 101. In some cases a coffee or other graphical message indicating that an employee should consider taking a break may be presented after the employee has been located at a bench without leaving for some threshold period (e.g., 2 hours).

Figure 102:
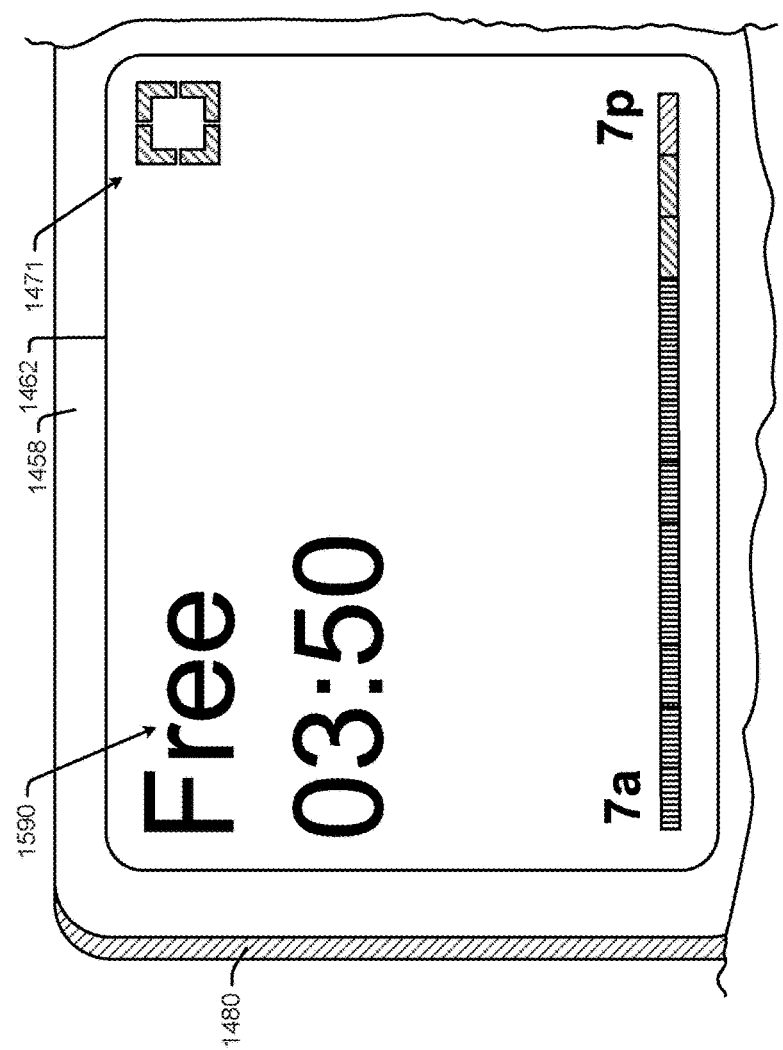
FIG. 102 is similar to FIG. 92, albeit showing a different set of messaging and signaling.

In at least some cases when an employee's reservation at a bench is about to end (e.g., within 5 minutes), an indication of availability and a count down clock may be presented as shown at 1590 in FIG. 102. Other signaling and messaging sequences are contemplated.

While different message sequences are described above in the context of exemplary bench configurations, in at least some embodiments it is contemplated that substantially similar or even identical and simplified messaging may be presented in the same formats for other affordance configurations including the exemplary focus stations, enhanced privacy stations, amplification kiosks and team studios described above. Again, by presenting similar messaging and formatting, users of enterprise spaces can quickly develop a good glanceable understanding of the meanings of the simplified messaging.

Figure 103:
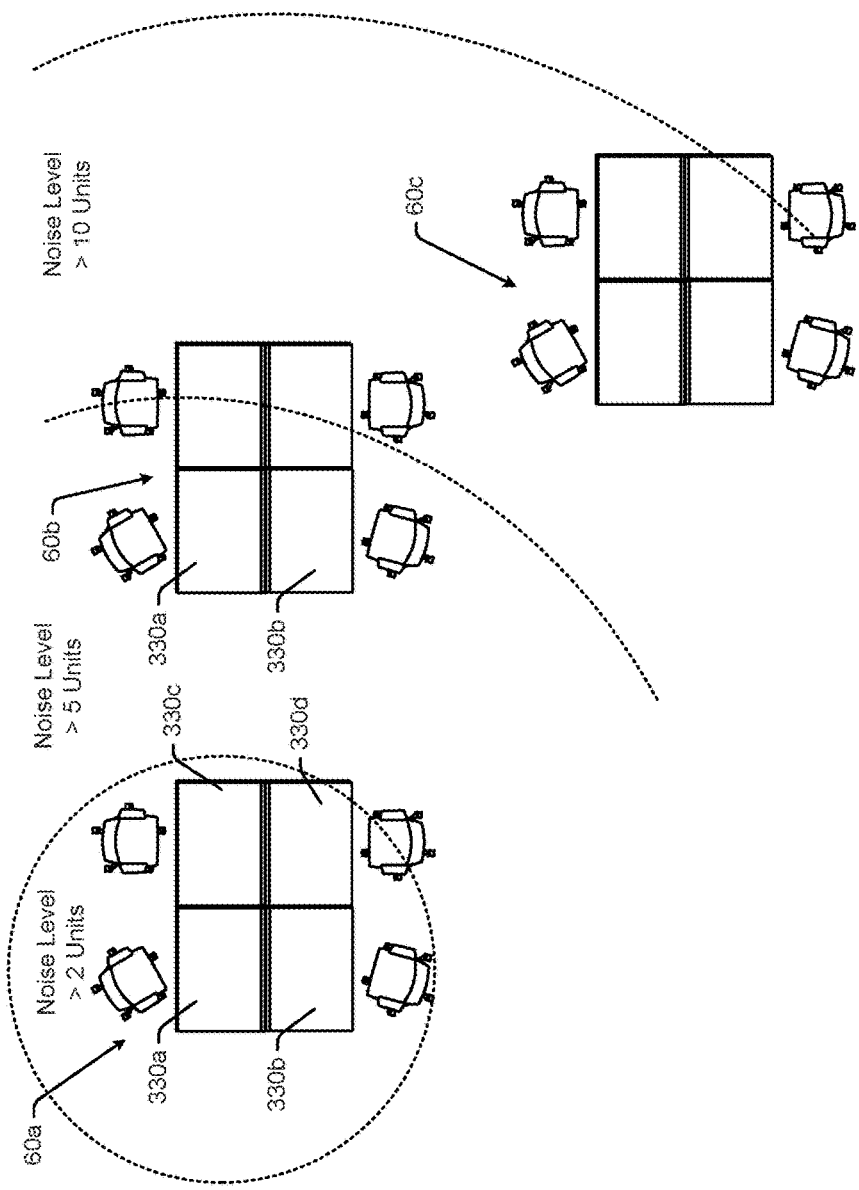
FIG. 103 shows a top plan view of several work bench configurations and zones of noise level thresholds for controlling silence reminders that is consistent with at least some aspects of the present disclosure.

In at least some of the bench embodiments described above silence preference reminders are presented to bench users when noise or sound level exceeds some threshold level (see FIGS. 26 and 452 in FIG. 27). The embodiments described above generally contemplate a single sound threshold level. In some cases it is contemplated that other threshold levels may be enabled. For instance, if an employee at a specific bench has indicated a silence preference, it may be that a first noise level threshold is applied within a radius of 8 feet from the specific bench, a second louder noise level threshold is applied within a band between the 8 foot radius and a 20 foot radius and a third noise level threshold is applied within a band between 20 feet and 40 feet. See, for example, FIG. 103 where it is assumed an employee at bench 330*a* requested silence and where first, second and third noise level thresholds are set to greater than 2 units, 5 units and 10 units, respectively (out of a maximum of 10 units), for first, second and third distance ranges (e.g., bands) from bench 330*a*. Here, if an employee at a bench within the greater than 5 unit band is talking and generates sound at a 7 unit level, a quiet reminder signal (see again 452 in FIG. 27) may be presented to that employee while the same sound level (e.g., 7 units) in the greater than 10 unit band would not result in a silence reminder.

While the invention may be susceptible to various modifications and alternative forms, specific embodiments have been shown by way of example in the drawings and have been described in detail herein. However, it should be understood that the invention is not intended to be limited to the particular forms disclosed. For example, while systems are described above as providing a separate color coded visual indicator for each employee being guided through a space, in cases where multiple employees are being guided to the same space, the same color guidance indicators may be assigned to each of the multiple employees. For instance, if 8 employees are being guided to team studio 2 for a meeting in 10 minutes, each of the 8 employees may be assigned the color blue to guide the employees to the target space.

In addition, server 20 may be programmed to automatically reset affordance configuration resources to default states whenever the configuration is not owned by an employee. For instance, when a first employee using a first bench configuration leaves for the day, in addition to indicating that the first bench is available for use by other employees, server 20 may automatically adjust bench work surface height to a default 28 inches so that all benches that are not owned have the same appearance. Similarly, where task chairs include motors or other actuators so that chair features can be adjusted (e.g., seat height, arm rest height, etc.) or so that the chair positions can be changed (e.g., via one or more motorized casters), server 20 may be programmed to position all chairs at the same relative position to associated benches or other configurations and to adjust all chair settings to the same settings so that the overall space has a neat and clean appearance. For instance, in the exemplary team studio described above that includes eight chairs arranged about two table assemblies 1012 and 1014, when a meeting ends and employees leave the space 1010, server 20 may control the chairs to park four chairs at each table, two along each lateral edge of each table so that the space 1010 has an orderly appearance between meetings.

As another example, while the reception screen is described above as presenting queries to obtain feedback on space affordances from employees after use, in at least some cases it is contemplated that a system server will seek feedback from employee's via portable computing devices like a smart phone, tablet type device, etc. For instance, see FIG. 104 where a request for affordance feedback akin to the request described above in FIG. 12 is illustrated, albeit where the request is presented via a smart phone device.

Figure 104:
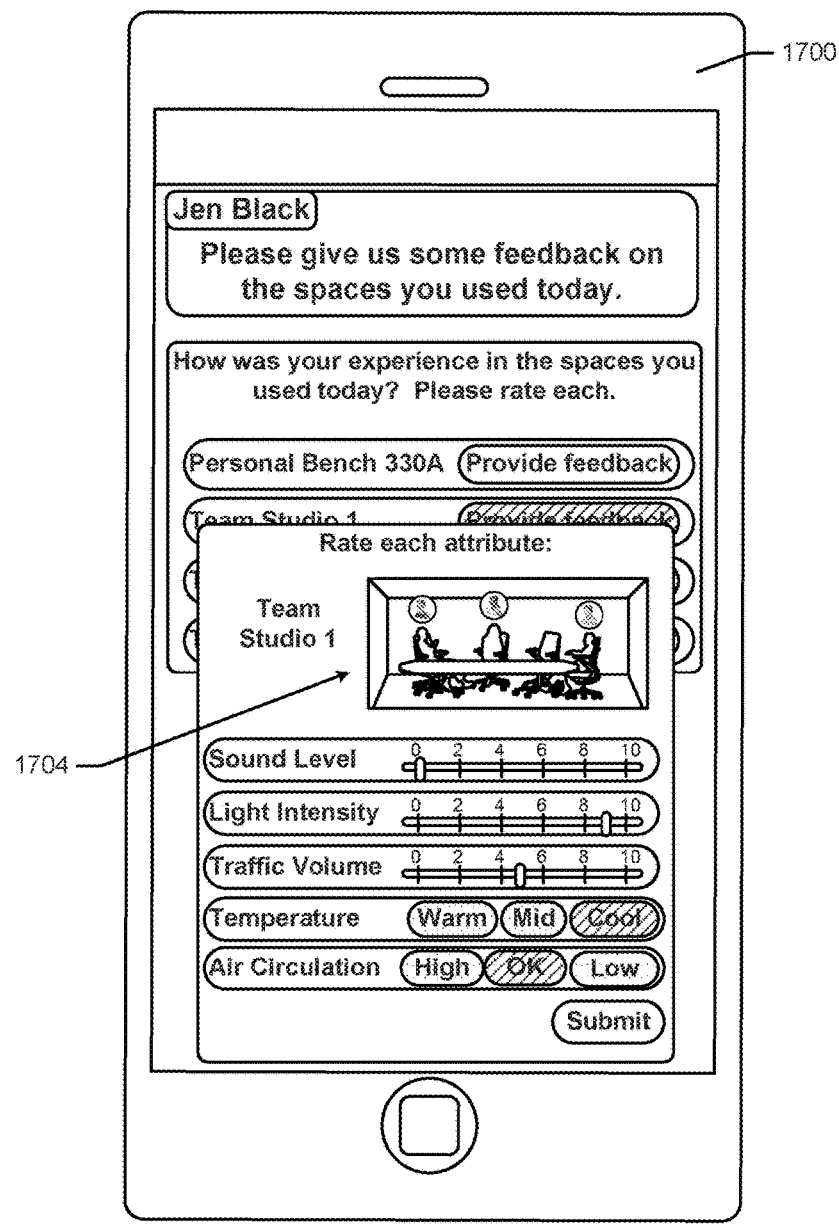
FIG. 104 shows an exemplary portable personal computing device including virtual tools for providing space use feedback to a space user.

In FIG. 104, in addition to including most of the information and feedback tools described above with respect to FIG. 12, the request includes an image of the team studio at 1704 to help the queried employee correctly remember the space for which the employee is providing feedback. The image 1704 may include a real image obtained in the associated space during the actual meeting so that the employee's memory is easily refreshed or the image may include a cartoon type image of the space where employee images are shown on the image at the locations that the employees assumed during the actual meeting. Thus, when an employee selects one of the spaces or affordance configurations to assess, an image of that specific configuration may be presented. In other cases a map of the space including an affordance to be reviewed may be presented instead of the image 1714 where the configuration location is clearly shown on the map.

Figure 105:
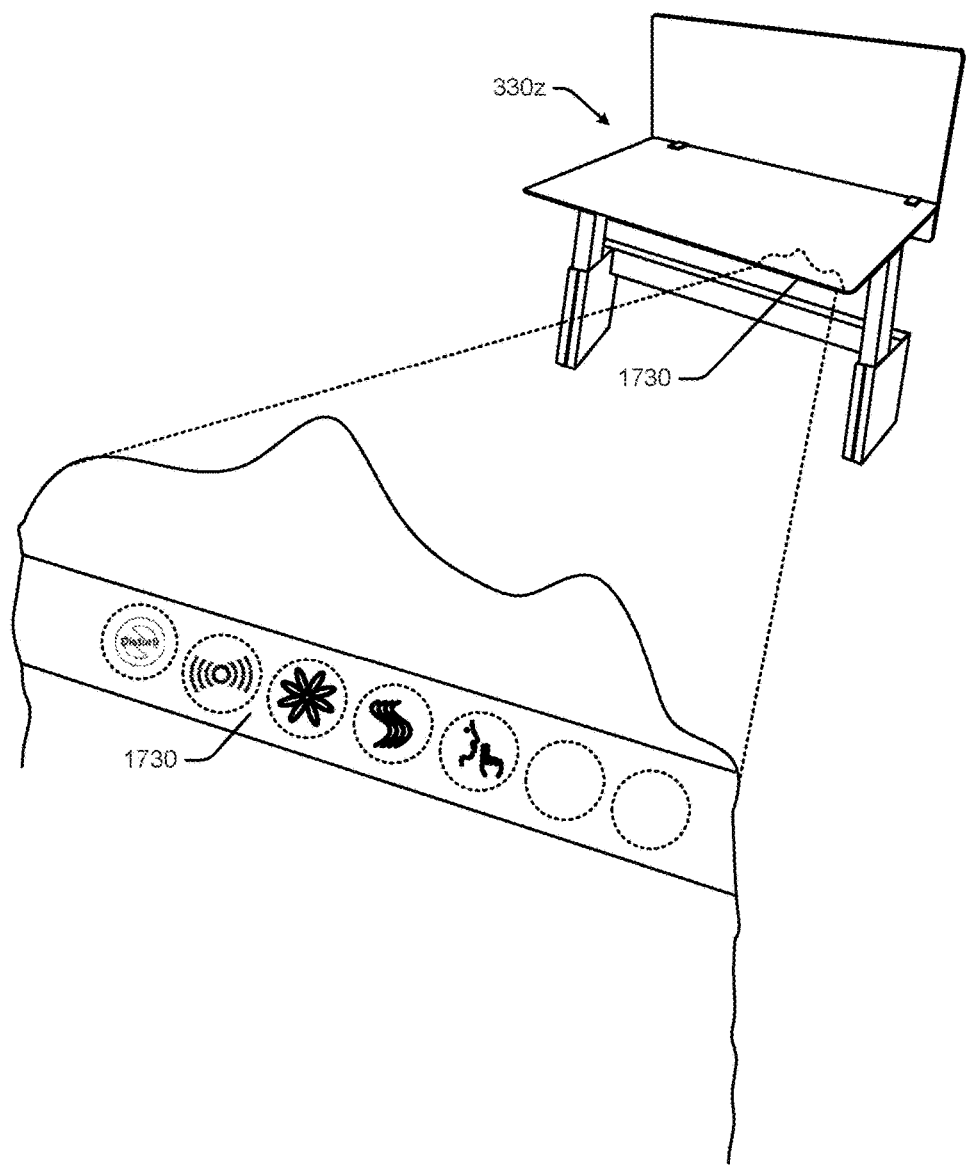
FIG. 105 is a perspective view of a bench assembly with control buttons or messaging indicators built into an edge of a work surface member.

As yet one other example in at least some cases it is contemplated that controls for a bench, an amplification table, or any other affordance configuration that includes a work surface may be provided in the edge of the work surface as opposed to in the top surface thereof. To this end, see FIG. 105 where control buttons are shown built into an edge 1730 of a bench assembly 330z where the buttons are akin to the buttons described above with reference to FIG. 21. In other cases, light signaling devices for signaling different states of configuration ownership, to signal preferences like silence, etc., may also be built right in to the edges of the table top members. In some cases both control buttons and signaling light devices may be built into table top edges.

As one other example, at least some systems described above contemplate presenting imagery on a café configuration wall or display field that is indicative of the energy or some other characteristic in a larger space related thereto to give employees in the café configuration area a sense of the energy level or other characteristic in the larger space. In other embodiments it is contemplated that a similar type of imagery may be automatically generated on other display surfaces in other affordance configurations for other employees to see. For instance, see the exemplary focus station shown in FIG. 34 that includes several different display fields on a screen assembly as well as other indicator capabilities (e.g., projection on a ceiling, light shining off an ambient floor surface, etc. Here, where an employee is using the station 56, sensors within the station 56 may sense various aspects of how the user is working and those aspects may be presented visually via one or more of the display fields illustrated, via projection on a ceiling or floor surface, etc., for employees in the area that can see station 56. For example, in at least some embodiments sensors in the lounge seat assembly 508 may sense biological parameters of a user (e.g., heart rate, temperature, etc.) and a system server may use those values to determine if the employee is in a "flow" state or not. Here, the term "flow" means a state of good focus as opposed to a state where the employee may be having difficulty focusing on content development. Where a user is in a state of flow, imagery on outside surfaces of the screen assembly may be selected to indicate a serene condition or some other characteristics that can be associated with a flow condition. In other cases a do not disturb indicator as at 579 in FIG. 35 may be presented automatically once flow is achieved so that the employee can have the advantage of letting others know that she is in a flow state and should not be disturbed. Flow or other automatically sensed circumstances may be presented on surfaces associated with the other configurations.

In at least some embodiments indicating follow or other circumstances automatically is particularly important in open space configurations like the focus station, the amplification station and the bench configurations as the automatic indication can advantageously affect how other employees in a general area act and hence the instantaneous environment associated with any one of those configurations.

In some embodiments described above, when differently located first and second employees that have a scheduled meeting approach or are proximate two affordance configurations that are capable of supporting a telepresence session, a system server may automatically initiate a telepresence communication link between the two configurations and offer the telepresence functionality to the two employees. In other cases, it is contemplated that, prior to automatically initiating the link for a telepresence session, a system server may access a schedule database and determine if one or both of the first and second employees is already scheduled to own a different telepresence capable affordance configuration at or substantially at the scheduled meeting time. Here, if one of the employees is scheduled to own a telepresence capable configuration, in at least some cases, the server would initiate the telepresence link between the owned configuration (or both owned configurations) and some other configuration as opposed to between a most proximate configuration. This is especially true in cases where other employees are scheduled to attend the session at the same location as one of the first and second employees.

In other cases, where a first employee is scheduled to temporarily own a telepresence capable configuration for a specific meeting, if the first employee is proximate some other available telepresence capable configuration, the system may automatically initiate a session link and offer an opt in option to the first employee. Here, where the first employee accepts the opt in option, the server would automatically release the previously scheduled configuration for use by others. Thus, the first user could simply use the proximate configuration and would not have to do anything to release the previously scheduled configuration.

In still other cases where a first employee has a meeting scheduled with a remote second employee, it is contemplated that the first employee may be able to simply walk up to an unscheduled and unowned telepresence capable configuration (e.g., an amplification kiosk, an enhanced privacy station, a team studio) and select a telepresence initiation icon (e.g., see 862 in FIG. 58) to initiate a session with selection of a single button. Here, in some cases when button 862 is selected, a system server may determine the identity of the employee that selected the button (e.g., via the location tracking system described above or in some other way), access the employee's schedule to determine if the employee is scheduled to communicate with any remote employees and if so, may automatically attempt to locate a telepresence capable configuration proximate the remote employee and initiate a telepresence communication link with the remote employee. In still other cases once a scheduled communication with a remote employee is identified in the first employee's schedule, the first employee may be queried if she wants to attempt to set up a telepresence link with the remote employee and the link may only be initiated after the first employee indicates that the link should be attempted.

In at least some embodiments a video phone or tablet communication may be transferred from a portable personal communication device to a proximate relatively large (e.g., larger than a typical portable device) display screen and linked to a camera, speakers and a microphone associated with that large screen so that a portable device based video call can be enhanced. Here, when a video call is received on a portable smart phone device by a first user using a personal bench assembly as described above, for example, a system server may recognize the call as a video call, may search for an unowned telepresence capable configuration and may suggest the configuration to the first user via a bench messaging screen or the like. Here, the first user may accept the suggestion and then travel to the suggested configuration. Upon arriving at the configuration, the smart phone may automatically link to the telepresence capable configuration and start broadcasting the video call voice and video to the configuration to be shared in an amplified manner. Here, voice picked up via the configuration microphones would be provided to the portable phone device and routed to the remotely linked employee. This automatic linking of a portable device video call to a local telepresence system may be performed on both ends of a call.

In a similar fashion where a portable phone device is used to communicate via only voice to a remote employee, if the remote employee has access to a telepresence system or telepresence capability, the voice call may be turned into a telepresence session at a proximate telepresence capable configuration. For instance, assume that a first local employee and a second remote employee are participating in a voice call via portable smart phones. Here, a system server may be able to detect the voice call, identify a first local telepresence capable configuration and a second remote telepresence capable confirmation that are proximate the first and second employees and may automatically suggest to the employees that the employees move to the proximate stations to participate in a full telepresence session. Here, if one of the employees indicates a desire to participate in a full telepresence session, the server may notify the other employee causing the other employee to confirm a desire to participate. Where both employees agree to participate, guidance systems at each location may automatically guide the employees to their assigned or owned configurations. While travelling to their assigned configurations, the server may automatically initiate the telepresence communication link. Once one of the employees arrives at an assigned station and the server recognizes the specific employee that arrived as one to participate in a session associated with the established link, the system may present an opt in option for that employee. At the other end of the link, once the second employee arrives, if the first employee opted into the session already, the server may present the fuzzy image of the other employee along with an opt in tool.

In still other cases where a call is transferred from a portable phone or other device to a telepresence system, the telepresence system itself may carry voice and video instead of using the phone link so that the phone is completely removed from the communication circuit.

In at least some cases it is contemplated that when an employee leaves a telepresence session prior to the session being completed, the employee may be given the option to patch in her portable phone or other device that is capable of video conferencing so that the employee can continue her session. Here, for instance, if a scheduled telepresence session is coming to an end, the system may query if the employee would like to transfer the session to her phone.

In some embodiments other configuration customization may also be automated. For instance, it has been recognized that when a first employee accesses a file, an image, a document or other content to share with a second employee, a large percentage of time the first employee will be accesses one of the documents that the first employee most recently accessed (e.g., the 50 documents the first employee most recently accessed). Another large percentage of the time where first and second employees share content in a collaborative fashion, the content shared includes a prior document that was shared between the two or a document that is related to a common project (e.g., a project that the first and second employees are working on or worked on together).

In at least some cases, to render documents easily accessible to an employee at an amplification kiosk or at other affordance configurations where content can be amplified and shared, a system server may automatically identify N (e.g., 50, 100, etc.) most recently accessed or edited documents by a first employee, automatically cache those documents at a local database associated with an amplification kiosk owned by the first employee and may provide an on screen recent document queue for the employee to access those documents quickly. In at least some cases the caching will occur prior to an owning employee arriving at a kiosk while in other cases the caching will be performed immediately after the employee arrives at the kiosk. In still other cases the documents will not be cached and instead will simply be accessible via selection of associated icons in the content queue.

In other cases, when a meeting is scheduled between first and second employees and at least one of the employees is using an amplification station for the meeting, a content queue may be presented that includes the N most recently accessed or edited documents by the first employee as well as documents associated with common projects. In some cases the documents associated with common projects may include both first employee and second employee documents as well as documents associated with the project that were generated by a third or other employees. In some cases the queue will include most recent versions of documents regardless of who most recently edited those documents. In some cases the queue may include the N most recent documents accessed or edited by any of the first or second employees. In some cases where the second employee is remote, different queues of the most recent N document may be presented, the first employee receiving a queue including his most recent N document and the second employee receiving a different queue including her most recent N documents. In some cases where a queue includes most recent documents as well as common project documents, the recent and common documents may be separated into different queue sections so that they are easy to distinguish.

U.S. provisional patent application No. 62/008,283 which was filed on Jun. 5, 2014 and which is titled "Environment Optimization For Space Based On Presence And Activities" describes some space affordance configurations that are similar to some of the configurations described above and which may be swapped in for some of the above described configurations and is incorporated herein in its entirety by reference.

US patent application No. 2014/040805 which was filed on Jun. 4, 2014 and which is titled "Sound Detection And Alert System For Workspace" describes at least some sound detection and warning systems and is incorporated herein by reference in its entirety.

U.S. patent application Ser. No. 14/159,589 which was filed on Jan. 21, 2014 and which is titled "Emissive Shapes And Control Systems" describes at least some automated interface devices that are presented as a function of user preferences and is incorporated herein in its entirety by reference.

U.S. patent application Ser. No. 62/171,340 which was field on Jun. 5, 2015 and which is titled "Threshold Configuration And System For Space" describes some emissive surfaces that automatically present space management content to a proximate user and is incorporated herein in its entirety by reference.

U.S. patent application Ser. No. 14/871,097 which was filed on Sep. 30, 2015 and which is titled "Method And System For Locating Resources And Communicating Within An Enterprise" describes affordance sensor systems and ways for identifying locations or resources and employees or persons within an enterprise or multiple enterprise spaces and is incorporated herein in its entirety by reference.

Supplemental Concepts

Sensors 22 (see again FIG. 1) are described above for sensing and tracking employee locations within enterprise space. In particularly advantageous cases the employee location tracking system may include transmitting beacon devices (hereinafter "beacons") spaced throughout an enterprise space that transmit signals to devices carried by employees where the received signals can then be used to determine employee locations within enterprise space. For instance, referring to FIG. 106, in at least some cases, beacons 1800 may be positioned within an enterprise space 1802 at various known locations and each beacon may periodically transmit (e.g., every few seconds or fractions of a second) a wireless signal (e.g., Bluetooth, IR, RF, etc.) having a specific and known signal strength and that identifies the specific beacon (e.g., includes beacon identifying information such as a unique beacon identification number or code). To this end, each beacon includes a processor, a memory for storing beacon identifying information and some type of wireless transmitter (e.g., RF, UV, or some other type of transmitting device). In addition, each beacon includes some type of power device such as a replaceable battery or an energy receiving RF or other type of coil so that the beacon can receive energy from a proximate portable user device or an RF energy source device located within the general area of the beacon within an enterprise space.

An employee's portable device 1804 may include a transceiver (e.g., a transmitter and receiver device or combination of devices), a processor and a power source (e.g., a battery). In at least some cases device 1804 may include a smart phone type device, a laptop computer, a tablet type computing device, a watch, ring or badge device or some other type of user wearable device.

Device 1804 may run a software application causing the device 1804 to receive identifying signals from the beacons 1800 located proximate the device 1804. Here, the signal strength and beacon identifying information from at least a subset of the beacons 1800 may be collected and transmitted via one or more access points 1806 proximate the user's device 1804 to a system server (not illustrated in FIG. 106). In at least some cases the server will be programmed to use the beacon identifying information and signal strength information along with known location information of each beacon to triangulate or otherwise determine the location of the user device 1804 in any of several known ways.

While a user's device 1804 may receive signals from a large number of enterprise beacons, in at least some cases the application run by the user's device may limit the number of beacon signals collected and transmitted to the system server. For instance, in some cases the application may be able to identify the strongest 20 beacon signals received and may only process those twenty beacon signals for transmission to the server. Here, as device 1804 is moved within the enterprise space, the subset of 20 strongest beacon signals would dynamically change.

In other cases, device 1804 may identify the strongest beacon signal received and base the sub-set of other signals to process on proximity of the other beacons to the beacon that transmitted the strongest beacon signal. Here, the beacon sub-set selection process may be based on the assumption that a user's device and hence the user of that device is closest to the location of the beacon that transmitted the strongest beacon signal and that the other most useful beacon signals for determining user device location are the signals from the beacon subset closest to the beacon that generated the strongest sensed signal. For instance, where a first beacon transmitted the strongest sensed signal, device 1804 may select the 9 signals received from nine other beacons known to be closest to the first beacon to be used along with the strongest signal to calculate user device and hence user location.

In the above example, the system server may determine the strongest beacon signal and then provide a list of the other 9 beacon signals (e.g., from beacons closest to the beacon that generated the strongest signal) that should be identified by the user device 1804 and forwarded on to the server for determining device location. In other cases, the application run on the user device may store the beacon map or some surrogate therefore (e.g., for each system beacon, a list of the 9 closest other beacons) so that the user device itself can identify the sub-set of 10 beacon signals based on the strongest received signal to be obtained and forwarded on to the server for processing.

In still other cases, the user device may be programmed to receive and transmit beacon signal strength and identifying information to the server for any received signal having a signal strength greater than some threshold level and the server may be programmed to use only a subset of the received signals to determine user device location. For instance, a user's device 1804 may receive 30 beacon signals having a signal strength greater than a threshold value and may transmit strength and identifying information for each of those signals to the server. Here, the server may be programmed to identify the beacon location associated with the strongest received signal and the locations of 9 other beacons closest to the identified beacon location and may then use those 10 signal strengths to calculate user device location. In this case, as a user's device is moved about within an enterprise space, the server would routinely update the sub-set of signals used, based on signal strength, to calculate user device location.

In at least some cases beacons 1800 may be distributed differently throughout a space so that there are different densities of the beacons in different sections of the enterprise space. To this end, in many cases the specificity of user location within an overall enterprise space required to drive system processes and functions may only need to be precise at some locations and less precise at others. For example, on one hand, where a specific sub-space within an enterprise is designed as a travel corridor for user travel so that users typically move through the sub-space rather quickly, system functions may not be tied to where a user is located within the corridor sub-space and therefore, it may be that presence in a general area, as opposed to specific location, within the sub-space is all that must be identified to support system functions. On the other hand, in a multiuse conference room, relatively precise user locations may be important for driving any of several different system functions and methods. In this case, precise user locations may have to be ascertained substantially in real time. In this example, beacons may be provided in greater density in or proximate the multiuse conference room than in the sub-space that is used as a travel corridor. Multiple (e.g., 3, 4, 5, etc.) gradations in beacon density are contemplated.

Referring again to FIG. 106, each of the circular, rectangular and five sided devices in space 1802 represents a beacon where the circular subset of beacons are arranged in a denser pattern than the five sided beacons and where the five sided beacons are arranged in a denser pattern than the rectangular beacons. More specifically, the circular beacons are arranged in three high density arrays labelled 1810, 1812 and 1814 that are spaced apart within the enterprise space 1802 while the five sided beacons are arranged in an intermediately dense array that covers most of the space 1802. The rectangular beacons are sparsely arranged as shown.

In at least some cases beacons from different density groups may overlap each other while in other cases the different groups may not overlap. To this end, see in FIG. 106 that the intermediate density group represented by the five sided icons overlaps each of the high density groups 1810 and 1812 but does not overlap the high density beacon group labelled 1814. Similarly, the low density rectangular beacons are shown to overlap groups 1810 and 1812 but to be separate from group 1814.

Figure 106:
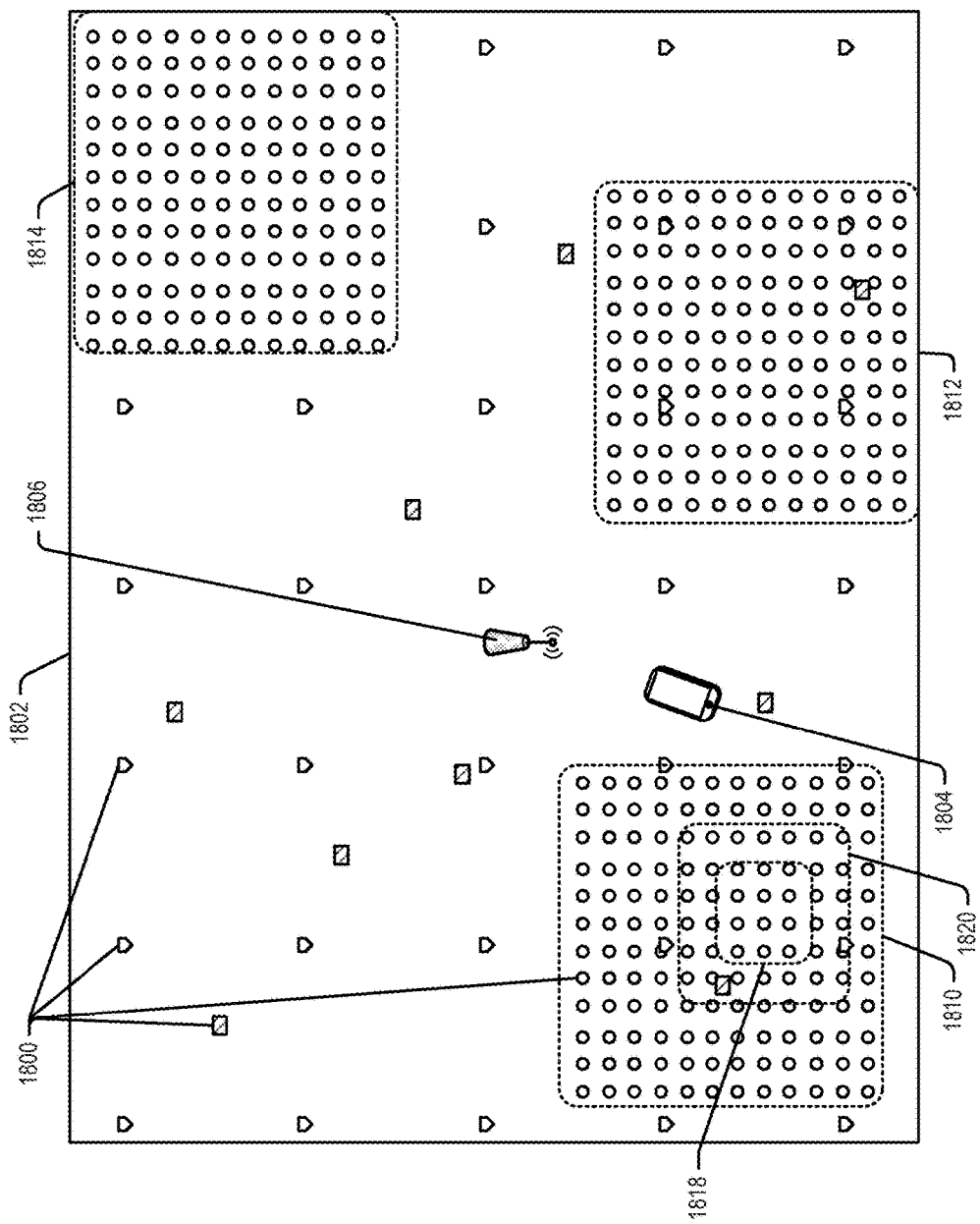
FIG. 106 is a schematic diagram showing an exemplary multi-density beacon arrangement that is consistent with at least some aspects of the present disclosure.

Referring still to FIG. 106, beacon signal strength may, in at least some embodiments, be different for beacons in the different density groups. For instance, each of the beacons in high density group 1810 may generate a signal having a strength that can generally or typically be sensed anywhere within 15 feet of the beacon while each of the low density beacons (e.g., the rectangular beacons) may generate a signal having a strength such that the signal can be sensed within 100 feet of the beacon.

Referring again to FIG. 106, while the beacons in the high and intermediate density groups are shown arranged in substantially uniform arrays, in at least some cases, as represented by the low density rectangular beacons, the beacon pattern within a space may not be uniform and instead may be arranged in some other fashion to meet some type of optimization objective. For instance, in at least some cases space fixtures (e.g., walls, windows, doors, desks, tables, bookshelves, etc.) may prohibit placement of beacons at specific locations and may also attenuate or block beacon signals so that addition of more beacons or rearrangement of beacons is required in those areas to increase the effectiveness of the location determination process.

In at least some cases location determination may include using signals from beacons in different density groups. For instance, a low density beacon signal may be used to generally identify the location of a user's device 1804 and then signals from beacons in a higher density group in the identified general area may be used to calculate a more precise user device location.

In cases where low density beacon signals can be used to clearly establish that a user device is in a location where precise location is not required (e.g., in a travel corridor), the system may automatically forego attempting to calculate the precise location of the user's device. This type of location determining triage process is particularly advantageous in cases where the beacons can be controlled to reduce signal the number of transmissions when precise device locations are not needed. To this end, in particularly advantageous cases each of the beacons may be battery powered and therefore, each beacon signal transmission may cause an associated battery to discharge somewhat, Here, by reducing the number of signals transmitted, battery life may be appreciably extended.

In at least some cases, each beacon may include a receiver or at least an excitation coil for receiving a signal from a user's device 1804 when the user's device is in proximity of the beacon. Here, when a user's device signal is received, the beacon may transmit the beacon signal to the user's device which can then be used as described above to calculate user device location. Again, where a user's location is already sufficiently known from low density beacon signals, signals from higher density beacons may be foregone.

In some cases, where beacons include receivers and where the location of a user's device 1804 can be generally established using low density beacon signals, a user's device 1804 may be programmed to transmit excitation signals to specific subsets of high density beacons in the general area of the user's device so that only a sub-set of beacons in a user's area transmit signals useable for more precise user device location calculation. Thus, for instance, referring again to FIG. 106, where signals from the intermediate density beacons (e.g., the five sided beacons in FIG. 106) can be used to identify that a user's device is in the sub-space labeled 1818, the user's portable device 1804 may be provided with a list of high density beacons including the beacons in sub-space 1820 so that the device 1804 can transmit to the beacons in space 1820 causing each of those beacons to transmit an identity signal to be received by device 1804. In the alternative, a wireless access point 1806 may transmit signals to each of the beacons in the sub-set in space 1820 causing those devices to transmit signals that can be obtained by device 1804 to be used in the location determining process.

U.S. patent application Ser. No. 14/871,097 which was filed on Sep. 30, 2015 which is titled "Method And System For Locating Resources And Communicating Within An Enterprise" is incorporated herein by reference in its entirety and teaches employee or person tracking enterprise systems that track and report employee locations as employees move about enterprise space. In the '097 application, the tracking system generally reports employee locations on personal portable computing devices like tablet type computing devices, phone devices, etc., where a user may access various person or employee tracking views that may be of interest. For instance, a first user may be able to see the closest X employees to the first user's location, locations of specific other users like users on a "favorites" list, users on a specific team, etc. Any of the user tracking information described in the '097 application may be reported to or rendered accessible to an employee in any of the settings or affordance configurations described above, either via a personal portable computing device or via one of the stationary display devices provided in the configurations described.

In addition, the '097 application describes, with reference to FIG. 44 of that application, a system whereby a first employee can set location tracking preferences for the employee that can enable or restrict location tracking capabilities of other employees attempting to track or identify the location of the first employee. For instance, in some cases a first employee may decide to allow all other enterprise employees to track her precise location within enterprise space, a second employee may prefer to only allow other employee's on a specific project team or employees on a "friends" list to track her precise location while other employees can only track her general location (e.g., which building on a campus the second employee is currently located in), and a third employee may want to restrict all other employees to only seeing the third employee's general location. The '097 application describes user interfaces that allow a user to restrict location reporting to different employees in any of the above ways and is incorporated herein for those teachings which may be combined with any of the other systems or processes described in this specification.

In addition, in the present case, a user may specify other location defining restrictions. For instance, a user may place a time period restriction on location tracking such as, only indicating precise user location between 9 AM and noon and between 1 PM and 3:30 PM on Monday through Thursday and no location tracking at other times. As another instance, a user may specify that when the user is in a personal harbor like the one described above with respect to FIGS. 34 through 41 of this application, only general user location is reported to other employees. Here, the idea may be that when in a personal harbor, a user is likely focusing on individual work activities and may not want other employees to be able to find her precise location in space. In other cases the system may automatically change the reported location precision for all employees based on the type of affordance configuration the user is currently spatially associated with. In some cases it is contemplated that employees may be able to seek authorization from other employees to track or change the precision with which they track the other employees' locations.

In still other cases, a first employee may be able to specify whether or not other employees or different sets of other employees can access other information about the first employee's location. For instance, in addition to setting a location precision reporting factor, the first employee may be able to specify a preference for others to identify other employees that are collocated or proximate the first employee. Thus, where the first employee is meeting with a human resources attorney for some reason the first employee may not want other employees to know about the meeting and therefore may restrict access to co-located employee information. Here, while another employee may be able to identify precise location of the first employee, the other employee may only be able to ascertain that the human resources attorney is generally within a specific building on an enterprise campus without placing the attorney near the first employee.

In at least some cases it is contemplated that an enterprise employee may be able to view a list of other employees that are scheduled to meet some specific location based criteria in the future that is specified by a first employee. For instance, a first employee may only be collocated a few times a year with other employees that are on a "favorites" list maintained by the first employee and, whenever scheduled to be collocated, the first employee may want notice of that possibility prior to the scheduled collocated time so that the employees can determine if the employee wants to schedule a face to face meeting. Here, for instance, the first employee may select a system setting whereby a system server routinely examines scheduled employee activities weeks in advance and, where the first employee and any employee on the first employee's favorites list are scheduled to be collocated (e.g., in the same general location (e.g., the same building, the same campus, the same city, etc.)), may provide a notice via text, an e-mail or some other electronic function indicating the scheduled collocation event. Here, the first employee may then, if desired, attempt to schedule a face to face meeting.

In other cases, in addition to identifying a collocation event, the system may be programmed to only provide notice of the collocation event when both the first employee and another collocated employee have at least some overlapping "free" time on their schedules, when there is a convenient available meeting space that can be reserved for a meeting, etc.

In at least some cases a system server may be programmed to track collocation events and suggest face to face meetings whenever two or more employees have scheduled a meeting or conference at a different temporally proximate time. Thus, for instance, where first and second employees have already scheduled a teleconference for 11 AM on a specific day and the system subsequently recognizes that the first and second employees are going to be collocated within 24 hours of the scheduled teleconference, the system may automatically transmit a notice to one or each of the first and second employees suggesting a face to face meeting at some time that is temporally proximate the scheduled conference. Again, here, the system may automatically identify an available conference space and suggest that space for the meeting to expedite a change in employee and other resource schedules.

A halo ceiling structure is described above with respect to FIGS. 63, 64 and 67 through 69. U.S. patent application Ser. No. 62/205,392 which was filed on Aug. 14, 2015 and which is titled "Affordance Template System And Method" and which is incorporated in its entirety herein by reference describes another ceiling mounted affordance assembly or Halo structure in FIGS. 70 through 72. Any of the features described in the '392 application or above with respect to the halo assembly may be combined in this case. In addition, other useful features may also be provided by an enhanced halo assembly.

For instance, in at least some cases one or more light sensors may be provided within a space associated with a halo assembly and light generated by the halo assembly may be automatically adjusted based on the sensed light intensity, temperature, or other light characteristics, to optimize light within the space. For instance, where a space includes several windows so that the amount and characteristics of natural light change during a typical day period based on time, outside weather patterns, etc., halo light may be adjusted in real time to maintain some optimal light characteristics within the space.

In at least some cases the light sensors may be located within the halo assembly itself. To this end, see again FIG. 69 in this application that shows exemplary light intensity sensors at 1830. In some cases the sensors 1830 may sense light at the locations of those sensors. In other cases the sensors 1830 may be programmed to detect image attributes of some affordance component there below and, based on those image characteristics, to assess instantaneous light characteristics of the space below the sensor. For instance, here, the top surface of a conference table may have a specific image characteristic or signature (e.g., color, brightness, pattern, etc.) when light in a space is optimized and therefore, by imaging the top surface below sensor 1830 and comparing the top surface characteristics to the optimized characteristics, a system server can be programmed to determine how light in the space deviates from optimal and may then adjust light generated by the light sources 1075 accordingly to minimize or eliminate any deviations. Here, the server may be programmed to recognize the table top surface and distinguish that surface from other surfaces (e.g., a book or laptop computer placed on the table top within the FOV of the sensor device 1830) so that other materials on the table top surface do not affect the light characteristic determination. For instance, there may be some threshold range of a specific table top characteristic given the known light intensity generated by light devices 1075 and any characteristic outside that range may be used to detect that the surface detected is other than the table top surface.

In other cases light sensors may be built into a table top structure or into some other space affordances below the halo structure to sense light characteristics at those locations. To this end, see the exemplary sensors built into the table tops shown at 1840 in FIG. 64. As shown, the sensors may include multiple sensors equi-spaced about the circumference of each table top so that there is at least some sensor redundancy so that if an employee places a laptop, book, or other opaque item on top of one of the sensors or adjacent thereto so as to cast a shadow over the sensor device, signals from other proximate and unobstructed or unshadowed light sensors may be used to ensure unobstructed sensing of light characteristics at different locations about the table top surface and generally within the space.

In at least some cases a system server may be programmed to recognize rapid or relatively fast changes in light characteristics and to use that information to recognize that specific sensors have been obstructed or shadowed by items so that the signals from those sensors can be ignored. For instance, if light intensity decreases by 50% instantaneously, the server may be programmed to recognize that the sensor device has likely been shadowed by some item on the table top and the signal from that device may be ignored. In some cases one or more halo cameras or other cameras in a space that includes the halo structure that are directed at the top surfaces of the table tops may detect the table top sensors and may be able to determine when items cover the sensors or shadow different table top light sensors and a system server can, again, ignore signals from sensors that are somehow obstructed by items on a table top surface.

In some cases halo light may be controlled uniformly for all light devices located within the halo assembly (e.g., intensity may be uniformly controlled). In other cases where light sensors are capable of sensing light characteristics at specific locations within a conference or other space associated with a halo assembly, the halo light devices may be controlled differently at different sections of the halo to cause different lighting effects. For instance, in cases where an exterior window is proximate the distal edge of table top 1014 in FIG. 64 and natural light enters the space 1010 through the window, artificial halo light above table top 1014 may be controlled to have an intensity that is substantially less than the intensity of the halo light produced above table top 1012. In at least some embodiments halo light may be controlled differently in many different sections of the halo assembly based on sensed light in the space.

In still other cases halo light may also be controlled as a function of activities being performed within an associated space to optimize for particular activities. For instance, where a first employee within a space below a halo assembly is currently being videotaped by a camera for teleconferencing, it may be optimal for the first employee to be illuminated differently than other employees in the space to optimize for video capture. In at least some cases, a system server may track which employee is or employees are being imaged at any time and may adjust halo lighting to affect optical image capture, while providing other optimized lighting effects for other purposes for other employees in the space. Similarly, where first, second and third employees out of eight employees arranged about the table tops in FIG. 64 are each imaged for remote telepresence viewing at the same time, different halo sections may be illuminated differently to optimize for imaging all three of the first, second and third employees.

In some cases it may be that two separate sections of a halo assembly are specially illuminated to optimize for image capture of a single imaged employee. To this end, for instance, referring again to FIG. 64, the section of a halo assembly immediately above an employee's location at a table edge as well as the halo section immediately across from the employee's location may be specially illuminated for image capture. Other special halo effects are contemplated.

In cases where two or more employees that are collocated in a conference space are viewed simultaneously by one or more remote conferees, in at least some cases it is contemplated that the halo assembly or other light generating devices in the local conference space may be controlled to generate the same light effect behind each of the locally imaged conferees so that the remote conferees have a visual queue and sense that the local conferees are collocated. For instance, the halo and other light device may cause an orange colored light behind each locally imaged conferee so that when remotely viewed, the remote conferees have a sense that the local conferees are at the same location.

Where a second set of conferees are collocated at a second location during a teleconference, the system may distinguish the conferees at the second location by controlling a halo or other light devices at the second location to present a different color (e.g., green) lighting effect behind each of the conferees at the second location. Here, for instance, where three conferees at a first location and three at a second location are being imaged and simultaneously presented to a seventh conferee at a third location, the seventh conferee would see orange and green lighted backgrounds for the first through third and fourth through sixth conferee images, respectively, on her telepresence screen to get a sense that the first through third conferees are at a first location and the fourth through sixth conferees are at a second location.

In at least some cases a system processor may use a feedback loop to adjust background light colors so that employees imaged at the same location (e.g., in the same conference room) appear to be in the same environment. For instance, where it is desired to generate video of first and second employees that are in the same space during a telepresence session where the light color behind the employees is intended to present a visual queue that the two employees are co-located, it may be that for their location, the background light color is to be a specific intensity of orange. Here, where different amounts of natural light appear behind the first and second employees in the local space, a server may recognize the effects of natural light that tend to wash out the orange color from one video and not the other and may compensate by increasing the orange intensity in one video or decreasing the intensity in the other so that the visual queue is more clearly presented.

In other cases, instead of controlling halo and other light in conference spaces so that different light hues distinguish conferees at different locations, a system server may visually distinguish employees from specific locations in other ways. For instance, all conferee images from a San Francisco office may have a red border, all conferee images from a Chicago office may have an orange border, and so on. In still other cases, all images from a San Francisco office may be grouped in one sub-window, all images from a Chicago office may be grouped in a second sub-window, etc.

As another example, it is contemplated that Halo light may be controlled to signal other aspects of a meeting in an associated conference space. For instance, a system server may use lighting effects in the Halo to indicate meeting progression. For instance, when there are only 5 minutes left until the scheduled end of a meeting, a server may change the color of the Halo light or at least the color of light generated by sections of the Halo to indicate that the end of the meeting is near. As another instance, in at least some cases it is contemplated that a system server may control the Halo to animate light generated thereby to simulate a change is meeting status. For instance, starting with five minutes left until the scheduled end of a meeting, Halo light may be controlled so that a visually distinguished light "spot" rotates about the Halo to indicate the nearing end of a meeting. For instance, the light spot may rotate about the Halo once every 8 seconds to indicate the ensuing end of the meeting. In other cases a light spot may be rotated about the Halo every 5 minutes to give a sense of progressing time to employees using a space associated therewith.

In cases where a Halo is controlled to change shape, a server may be programmed to change Halo shape instead of or in addition to changing lighting characteristics to indicate meeting progression. Once conferees settle in for a meeting that is to last 60 minutes, a Halo may be moved downward to increase the sense of conferees huddling to share information. With five minutes left in a meeting, the Halo may be raised to a storage height to signal that the end of the meeting is near.

In still other cases a Halo may be used to signal other meeting attributes such as, for instance, one of several different activities being performed in an associated space. For instance, where a scheduled meeting has first through fourth sub-sessions or sub-periods and activities associated with those sub-sessions can be detected (e.g., either via camera's and software that can recognize tell tail signs of the different sub-periods or via employee input to indicate transition to a next sub-session), Halo light intensity, color, or dynamic effect may be controlled differently for each different sub-session in ways that employees can become accustomed to recognizing as visual queues to meeting status or progression. For instance, during an introduction sub-session, Halo light may be controlled to generally be white and bright. During a substantive sub-session, light in the space surrounding a conference table may be dimmed and the light intensity over the table may be increased to indicate a focused activity. Near the end of the meeting, the space surrounding the conference table may be illuminated with a red hue to indicate that the meeting is about to end. Many other Halo lighting effects to indicate different meeting statuses are contemplated.

In cases where space affordance configurations are equipped to and are controlled to change automatically, Halo light (and sound in some cases) may be controlled to indicate that movement is about to commence as a warning for employees in the general area. For instance, U.S. patent application Ser. No. 62/205,392 which has been incorporated herein by reference in its entirety describes systems that include display screens that can be moved about in a conference space to be used in different juxtapositions with reference to, among other figures, FIGS. 58, 64, 65 and 68. In the '392 application, where a Halo is included in a system that includes moveable display screen totems, a system server may change Halo color from white light to flashing red to indicate that the affordances will be automatically moved within the conference space causing employees in that space to be aware of the moving affordances. In other cases a table or desk assembly may be automated and Halo signally may be used to warn employees of an impending rearrangement of table or desktop configurations.

In embodiments where a system server tracks employee locations in enterprise space generally, Halo light may be controlled to indicate the locations of at least some other employees with the enterprise space. For instance, in general, when an employee outside a conference space that includes a Halo is in the general vicinity (e.g., near an entry door) of the conference space, Halo light may be controlled to indicate generally that some employee is near the space. As another instance and more specifically, when an employee scheduled to attend a conference in a space is near but still outside the space (e.g., within 50 feet) or is 5 minutes away from the space and traveling toward the space, Halo light may be controlled to indicate the location or proximity of the employee outside the space. In this case, when the specific scheduled employee is about to enter the conference space (e.g., is located within 10 feet), the server may again change the Halo lighting effect to indicate that the employee is about to enter the space.

In a fashion similar to the way in which the Halo light is controlled to indicate proximity of an employee outside a conference space associated with the Halo, Halo light may also be controlled to indicate some other imminent event or activity such as, for instance, to indicate that a remote employee is about to patch in to the conference space via a telepresence system so that local employees are not surprised by a telepresence link. For instance, where a remote employee performs some activity to link to the conference space via telepresence, five seconds before the actual telepresence link is formed, Halo light may be used to signal that the telepresence link is about to commence.

Thus, Halo light can be used for many different purposes including providing general area or task lighting of different types and intensities at different locations below and around the Halo structure as well as providing various types of signaling to indicate current or imminent status within an associated conference space or outside the conference space. In at least some cases where Halo light is controlled both for task/area lighting as well as for signally purposes, the task/area lighting and signally features or control aspects may be completely independent such that illumination for signaling purposes has little or no effect on the task/area lighting functions or effects. For instance, Halo lighting may be controlled to compensate for natural light differences within a conference space independent of signally to indicate meeting progression, proximity of employees scheduled to attend a conference, or to indicate when a new remote conferee is about to link for telepresence with a local space. In other cases task and signal lighting in the Halo may be at least somewhat associated. For instance, Halo light that optimally illuminates one of eight local employees in a local conference space for telepresence may be generated five second prior to initiation of a telepresence link to both serve a task lighting purpose as well as signal a changing conference status (e.g., that telepresence is about to commence).

In at least some cases it is contemplated that special employee sensing systems may be implemented at certain locations within an enterprise space. For instance, see again FIG. 18 where a height adjustable workstation includes a table top member 340 that includes a front edge 2040. In particularly interesting embodiments, height adjustment of the table top 340 in FIG. 18 may only be allowed when an employee (e.g., a person) is within an area immediately adjacent front edge 2040 (e.g., within a "present zone"). For instance, an employee may need to be sensed within two and one half feet of the front edge 2040 of top member 340 in order for height control buttons presented at 360 to be activated.

In some cases employee location adjacent edge 2040 may be determined using one of the triangulation methods and hardware (e.g., access points) described above. In particularly advantageous embodiments, a proximity sensor of some type may be provided within edge 2040 or in the undersurface of top member 340 proximate front edge 2040. For instance, where a camera is integrated into a workstation or is provided as part of a display screen at a workstation or as part of a computer used at the workstation, images obtained using the camera may be used to identify when a person is located within the present zone. Here, camera images may be received by a system server that then detects employee presence and table top height control may be enabled when a person is present at the edge. In other cases a weight mat or the like may be provided adjacent edge 2040 to sense a person at that location.

Figure 107:
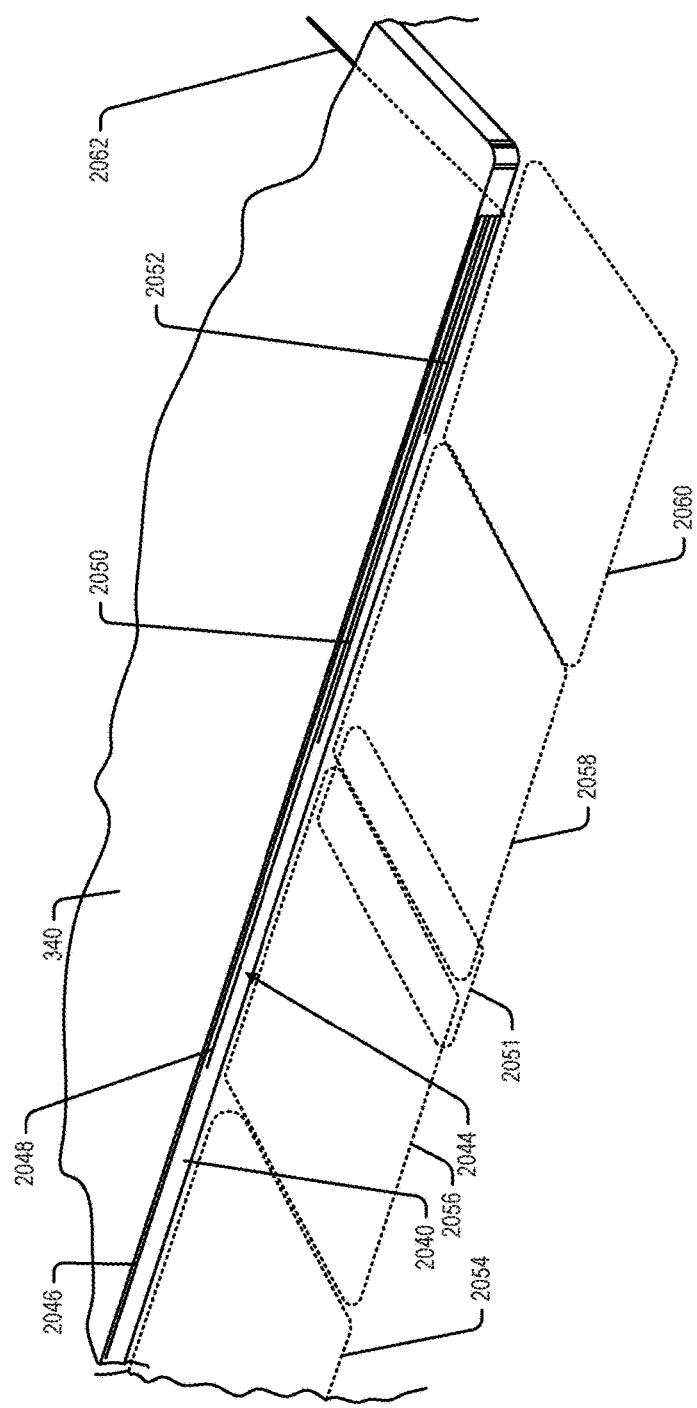
FIG. 107 is a partial perspective view of a workstation edge structure and associated presence sensing zones that are consistent with at least some aspects of the present disclosure.
Figure 108:
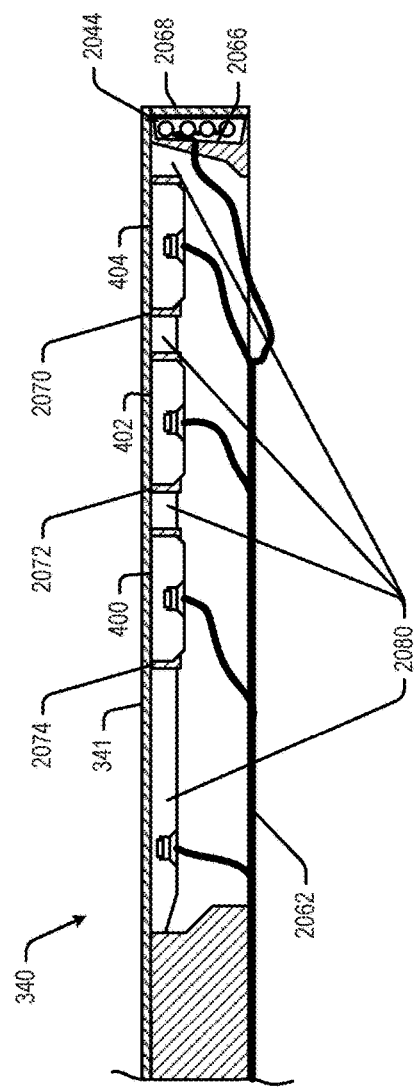
FIG. 108 is a cross sectional view of a capacitive trough table top interface configuration that is consistent with at least some aspects of the present disclosure.

As another instance, referring again to FIG. 18, in some cases a capacitive sensor may be integrated into edge 2040 at 2042 for sensing an employee adjacent or within the present zone near edge 2040. Referring to FIGS. 107 and 108, one type of capacitive sensor assembly 2044 may include a set of parallel wires or flat metal ribbons of different lengths that extend along front edge 2040 of an exemplary top member 340. While shown along the top member edge 2040, in other cases some or all of the sensor assembly 2044 wires may be mounted to the lower surface of member 340 or an upper surface of member 340, or different wires may be integrated into the top, edge and undersurface of member 340 adjacent the edge 2040 (e.g., within a channel formed in the surface). A longest wire 2046 extends substantially along the entire length of the front edge 2040, a second longest wire extends along substantially ¾ths of edge 2040 from a right lateral edge, a third longest wire extends along substantially half edge 2040 from the right lateral edge and the shortest wire extends only along a right quarter portion of edge 2040. As shown, right ends of each of the sensing wires may be linked to a data bus 2062 that extends along the lower surface of member 340 or that is integrated into member 340 and that is in turn linked to a system server (not shown in FIG. 107). Each of the different length wires may be used as an independent capacitive sensor. Thus, in addition to sensing general proximity adjacent edge 2040, the sensor assembly 2044 may be used to sense where along edge 2040 an employee resides within four separate zones shown in phantom at 2054, 2056, 2058 and 2060.

The longest of the four wires would generate a signal much larger than the signals generated by the other three wires when an employee is within zone 2054, each of the two longest wires would generate signals stronger than the two shorter wires when an employee is in zone 2056, each of the three longest wires would generate signals stronger than shortest wire when an employee is in zone 2058, and each of the four wires would generate a strong signal when an employee is within zone 2060. In at least some cases an electrical and magnetic insulating sheath (e.g., flexible plastic) may cover portions of each wire so that signal is only received along distal sections of the wires so that the signal from the wire with the strongest value is more clearly distinguishable from the signals from the other three wires. In some cases first and second of the four wires may extend from the left side of the top member and the third and fourth wires may extend from the right side of the table top member or the four wires may extend outward in both directions from a central section of the front edge 2040.

In some cases the wire sensor assembly 2044 may be integrated into an edge banding member that can be applied via adhesive or mechanical fasteners to the edge of top member 340. In other cases assembly 2044 may be integrated into a tape structure and applied similarly via adhesive on the back of the tape to the member edge. In still other cases, referring to FIG. 108, a channel 2066 may be formed in the edge of member 340, assembly 2044 may be received in the channel and a cover member 2068 banding material may be applied over the assembly 2044 to retain assembly 2044 in the channel as well as to protect the assembly 2044 from impact.

In order to avoid false employee proximity detection which can result from a mobile cart, chair or other space affordance placed adjacent front station edge 2040, a processor linked to the capacitive sensor assembly 2044 may be tuned to detect a human as opposed to other types of items or objects at edge 2040. For instance, a processor may be tuned using empirical data generated for an exemplary "average human being". To this end, data for detecting a human within a present zone (e.g., the area within 2.5 feet of the front edge of a table top member) may be derived by having each of a set of persons of different body types (e.g., small, large, thin, heavy, etc.) assume a plurality of different locations within the present zone and detecting the capacitive signal for each person/location combination. Then for each location, the signals for each person may be combined to generate an average capacitive signal that can be used for that location as a standard "capacitive human signature". Thus, in this case, where signals are generated for each of 15 different locations within the present zone, fifteen different location specific capacitive human signatures would be generated. Where there are 15 different capacitive signatures, in operation, a processor may be able to detect location of a person within the present zone at any one of the 15 different locations.

In other cases where location within a zone is not required or needed for any reason, the fifteen capacitive human signatures may be used to generate a capacitive signal range for simply detecting if a person is present in the present zone as opposed to identifying a more precise location. Thus, the signature would include a maximum capacitive value and a minimum capacitive value and all capacitive values there between for detecting a human in the present zone. The human capacitive range or set of capacitive human signatures are used to program the processor for detecting human presence in subsequent operation of the sensing system where a signal within the range or consistent with a signature reflects water density within a typical human being.

In the alternative, in most cases even when an employee is located adjacent edge 2040, the employee moves around at least somewhat along edge 2040 while using the workstation and that movement should show up in the signals sensed by the assembly 2044 wires where the highest signal strength from the wires changes over time in a pattern consistent with typical human movement (e.g., the strongest signal strength may alternate between wires 2048 and 2050 at a frequency consistent with typical human movement, fidgeting, etc.). In particularly advantageous cases the sensor assembly 2044 may be tuned as a function of water density and the resulting signal may be considered over time to identify a movement pattern that is consistent with typical human movement to increase presence sensing accuracy.

While the capacitive sensor assembly shown in FIG. 107 is described in the context of a single person workstation, it should be appreciated that the concepts associated therewith may be employed in any type of affordance that includes a work surface where human presence at different locations about a circumference of the work surface is to be detected. For instance, referring again to FIG. 64 where an affordance arrangement includes first and second conference table assemblies and 1014 that are split. Sensor wires akin to those in assembly 2044 described above may be provided in each of the edges of each of the tables 1012 and 1014 to sense employee locations adjacent the table edges. For instance, for table 1012, the sensor assembly may be provided within the field labelled 2590e to sense presence and location of employees about the edge of assembly 1012.

Similarly, linear capacitive sensors may also be provided within other elongated structures where human presence sensing is desirable. Referring again to FIG. 64, one or more linear capacitive sensors may be placed within a door assembly jamb as indicated at 2590a or within a wall or other vertical structure like the lower edge of an electronic white board or an emissive surface as indicated by phantom fields 2590b, 2590c and 2590d.

In still other cases the capacitive sensor need not be linear and instead may use any metal structure as a capacitive area sensor tuned to sensing human presence. For instance, in at least some cases the large metal base of a task chair (see 2590f in FIG. 64) may be used as a capacitive electrode where a processor on the chair receives a signal from the base and filters that signal to detect human presence within a present zone proximate the base. Here, human presence from the chair based sensor may be transmitted via an access point or otherwise wirelessly to some other system server or processor for consumption and use to drive other system features and functions.

In at least some cases signals from a set of linear capacitive sensors within a conference space may be used together to identify user locations within the space from which further detail about human activities and interactions can be ascertained. To this end, see yet again FIG. 64 and consider a case where capacitive presence and location sensors are provided in the circumferential edges of each of table assemblies 1012 and 1014 as well as in the door at 2590a and in each of the wall members or emissive surfaces that form the space enclosure as indicated at 2590b through 2590d (assume that a fourth wall includes a linear capacitive sensor as well). Here, the sensor at 2590a may be used to track the number of persons that enter the space 1010 and each of the table edge and wall mounted capacitive sensors may be able to generate data useable by a processor to detect presence and location of persons within 2.5 feet of the sensor device. Here, in most cases users most people in space 1010 will be within one of the defined sensor zones most of the time and, when in an intermediate area between the sensed zones, will simply be transitioning between the sensed zones for a short time. Thus, at least relatively precise locations of all persons within space 1010 will be determinable most of the time which should be sufficient for most system functions. Here, for instance, where the door sensor is used to determine that 8 people are currently in space 1010 and five are sensed at specific table edge locations while two are sensed adjacent an emissive surface 1004 but the eighth person is not currently sensed, the processor can be programmed to assume that the eighth person is within one of the intermediate non-sensed zones and still present. Here, when the eighth person moves into a sensed zone, the processor would immediately detect the person and better identify her location. Again, presence in an intermediate zone will typically be of short duration so detecting and tracking specific locations of several users in an overall conference room or other space should be possible with relatively inexpensive sensing assemblies or a set of such assemblies arranged in an integrated pattern. In at least some cases, to avoid intermediate areas in which user presence cannot be detected, a single or multiple wire sensor device may be integrated into a floor or ceiling structure so that the sensor resides within the space that is associated with the intermediate area between wall structures and table to edges.

In addition to using employee presence as a trigger or condition for controlling adjustment of moveable affordances (e.g., limit workstation height adjustment to times when a person is located adjacent the front edge of the workstation assembly), employee locations adjacent affordances may also be used to generate reports or information that can be used by facility management personnel to assess how affordances are being used and to identify optimal overall enterprise affordance arrangements. For instance, in FIG. 64, in cases where a specific conferencing arrangement 1010 has been designed to support up to 8 employees at a time but the arrangement 1010 is only used by one or two employees 95% of the time, a facility manager may recognize that two smaller conference spaces would be more optimal. Many other insights may be developed based on space and affordance utilization information detected via sensor assemblies akin to assembly 2044 in all work surface edges.

In still other cases where a workstation includes other controllable devices, user presence at a workstation may be used to automatically control the other devices for various purposes. For instance, where a workstation includes a desk lamp or the like, a processor may be programmed to control the lamp to turn off and on automatically based on user presence. As another instance, where a computer and display screen are associated with and located at a workstation, computer state may be automatically adjusted based on user presence so that the computer and/or screen enters a sleep or other low power mode when no user is sensed within the present zone.

While described above as including a plurality of wire sensor devices of different lengths, in other cases it is contemplated that a single wire capacitor sensor device may be used to sense presence within a present zone without detecting location within the zone in a more granular fashion. Thus, for instance, where only location adjacent a front edge 2040 of a workstation table top is needed, a single wire sensor 2046 as in FIG. 107 may be provided.

In order for the linear and other capacitive sensors to work properly, in at least some cases it is important that the metallic sensor electrode is not grounded. In many cases a table top member is constructed of wood or some other natural electrical insulator so that the sensor electrode can be mounted directly thereto without grounding the electrode. Similarly, in the case of a metal chair based being used as a capacitive electrode, the base is insulated from the ground by plastic wheels or casters or other plastic components between the base and supporting metal casters and therefore a chair base can, in most cases, operate as a capacitive electrode.

Referring yet again to FIG. 107, while four sub-zones are illustrated in phantom at 2054, 2056, 2058 and 2060, in some cases combined signals from two or more sensor wires in the assembly may be used to identify even smaller zones for user location. For instance, where each of sensor wires or ribbons 2048 and 2050 generates a strong signal, a processor may be programmed to recognize that a person is present in an intermediate zone as indicated at 2051. Other software based location determining algorithms are contemplated.

In at least some cases it is contemplated that a processor may be used to drive the sensing wires in a capacitive sensing assembly through sensing cycles to generate capacitive signals that can be used to assess distance from the edge of a table top or from a supporting wall structure, supporting whiteboard structure, etc. For instance, referring yet again to FIG. 107, sensitivity of each sensing wire may be adjusted to sense presence within 4 feet, then within 3 feet, then within 2.5 feet, then within 1.5 feet, then within 1 foot, then within six inches, to more precisely detect how close a person is to the table top edge 2040. Here, while a sensor may sense user presence 4 or more feet away from an edge, a system processor may tie workstation usage or control to presence within a smaller present area (e.g., within the 2.5 foot space as described above). In this case, sensing within 4 or more feet, however, maybe useful for sensing presence within a larger conference space and to eliminate non-sensed intermediate spaces as described above.

Referring to FIG. 45, in at least some embodiments elongated or linear capacitive sensors may also be mounted within the backrests or the seat structures of sofa or elongated lounge assemblies for sensing user presence and location with respect thereto as shown in phantom at 739 and 741, respectively. Here, the elongated sensor is particularly useful as a relatively inexpensive user presence and location sensor can be provided which would avoid much of the cost associated with prior presence and location sensing solutions for sensing presence an location along elongated furniture affordances.

Other types of presence and location sensors are contemplated that may be mounted in or proximate work station edges and used to detect user presence and location.

In cases where a touch screen or capacitive buttons are integrated into a space affordance for controlling the affordance, unintended control activities can occur when a user inadvertently selects a control button or icon by touch. This is particularly true in cases where the touch screen or capacitive buttons are built into and flush with the top surface of a horizontal planar member that forms a work surface. For instance, see again FIG. 21 where capacitive buttons 400, 402, 404, etc., are integrated into and are flush with a top surface of member 340. In this case, an employee using work surface 340 may rest her palm or other extremity on interface 360 so as to contact more than one of the capacitive buttons at the same time. In the alternative, the employee's inadvertent palm placement may contact one of the buttons 407 simply by placement on the upper surface of member 340 without any intention of contacting the button 407 so that the function associated with button 407 is inadvertently selected. Here, in at least some cases there may be no haptic or other feedback that can be sensed by touch.

To substantially eliminate any inadvertent selection of capacitive controls in a table top member 340, in at least some cases, sections of the top surface about the capacitive buttons 400, 402, etc., may also include capacitive touch sensor hardware and a processor that detects button selection may be programmed to discern intended from unintended button selections based on all capacitive signals received from the interface assembly 360. To this end, see FIGS. 21 and 108 where, in addition to including capacitive buttons 400, 402, 404, etc., interface 360 also includes a capacitive surround section 2080 and non-active insulating sections (e.g., non-sensing circular or ring shaped surface sections) around each button that are shown in phantom in FIG. 21 (three of the insulating sections labeled 2070, 2072 and 2074 in FIGS. 21 and 108). Here, a processor may be programmed to only accept input from interface 360 when a single one of the capacitive control buttons is selected at a time and when the sensor associated with surround section 2080 does not sense touch. Thus, if an employee rests her hand on interface 360 such that button 407 is touched as well as a portion of surround section 2080, both the button 407 and the sensor associated with section 2080 sense contact and the processor would recognize the dual sensing action as an inadvertent button selection. Similarly, if a user inadvertently touches buttons 400 and 406 at the same time, the touches may be sensed as inadvertent selection.

Herein, unless indicated otherwise, an inadvertent palm sensing within the space between two buttons or simultaneous selection of two buttons will be referred to as a "palm selection error". Similarly, the sensor assembly that senses between two buttons will be referred to generally as a "palm sensor" or "palm button" unless indicated otherwise.

In some cases two or more selection buttons may be selectable at the same time to cause various simultaneous controls where the control activities associated with the selected buttons are not contrary to each other. For instance, button 408 to turn on a fan may be selected at the same time as the table top raising button 400 but the up and down buttons 400 and 402 may not be selectable at the same time as they cause opposite control activities. Which buttons can and cannot be selected at the same time can be programmed into the controlling processor.

Recent advances in imaging hardware and software have made it possible to provide 360 degree real time views of enterprise spaces. For instance, Nokia has developed a camera called the Ozo which includes 8 2K by 2K image sensors, each associated with a different 195 degree lens which generates imaging data that is stitched together in software to provide images along virtually any trajectory about the imaging device include 360 degrees laterally, up, down, and along any trajectory there between. As another instance, Samsung recently debuted a 360 imaging device called the Gear 360 which similarly includes a plurality of sensors and lenses to generate image content and software that stitches that content together to form seamless images of scenes about the camera device. In at least some embodiments of the present disclosure it is contemplated that at least one 360 degree camera may be provided within a conference space for various imaging purposes. For instance, see FIG. 109 where a conferencing arrangement 1858 includes, among other components, a 360 degree camera assembly at 1880.

Arrangement 1858 includes a halo assembly 1860, a table assembly 1862 and a plurality of chairs (not labeled) arranged about the table assembly. The table assembly 1862 includes a leg support structure (not labeled) and a table top member 1863 that forms a generally triangular shape with cut off corners so that the top has relatively long straight edge or somewhat curved sections separated by relatively shorter straight edge sections. The table assembly 1862 further includes first and second electronic display screens 1864 and 1866 arranged along two of the shorter straight edge sections so that display surfaces face space above the upper surface of table top member 1863. The third short edge and the first through third long edges of table top 1863 are generally unobstructed except for when an employee moves up to the edge to participate in a conference. In the illustrated example, an electronic whiteboard is mounted to a space defining wall (now shown) at 1868 which is spaced from the third short edge to allow a conferee to move into the space between the third short edge and the board 1868 to use the board as should be understood to one of ordinary skill in the art.

Figure 109:
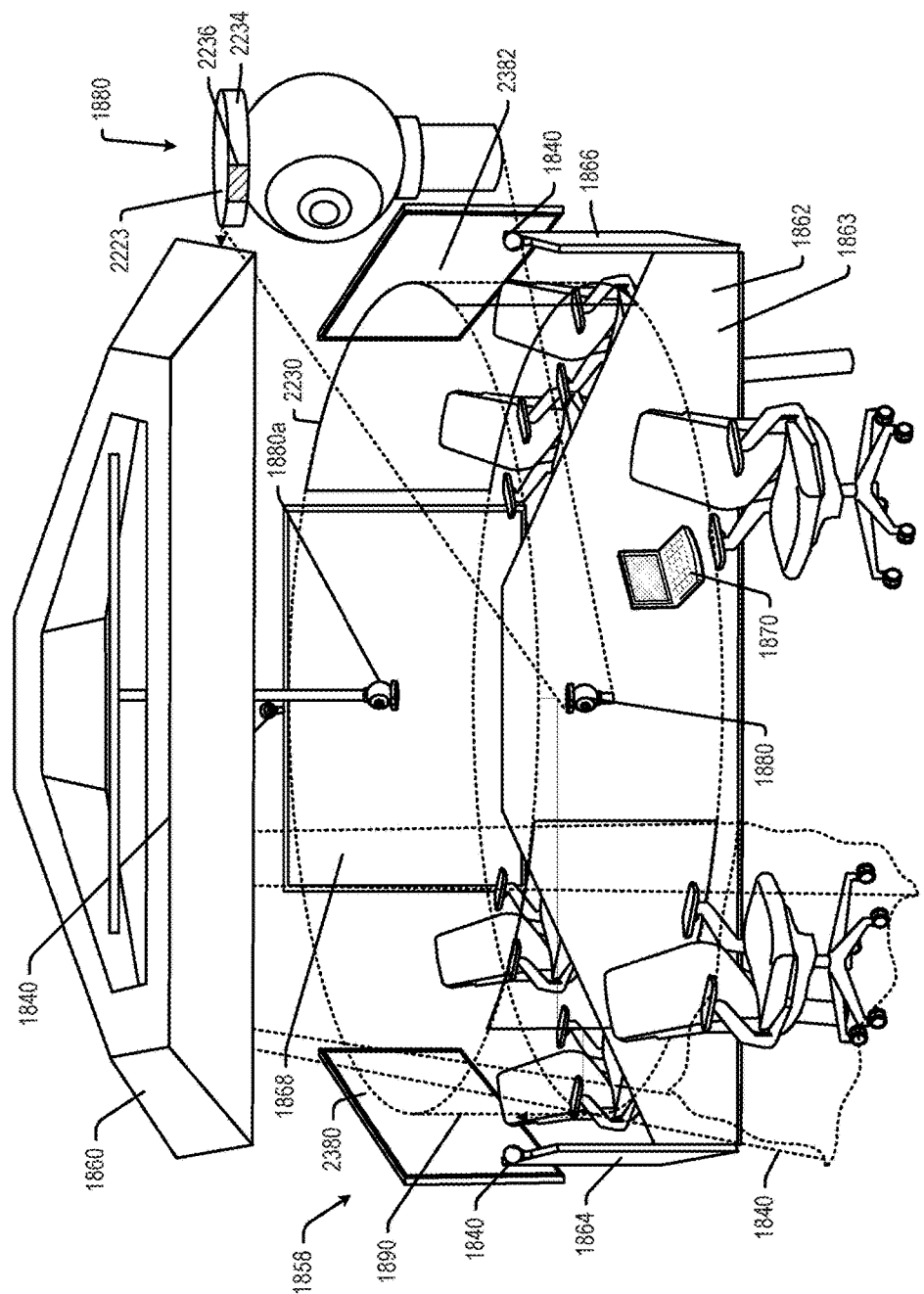
FIG. 109 is a perspective view of a conferencing assembly that is consistent with at least some aspects of the present disclosure.

Referring still to FIG. 109, the 360 camera assembly 1880 is mounted centrally with respect to the table top member 1862. In the illustrated example, camera 1880 is mounted to the top end of a post where the post suspends the camera at a height above the table top assembly of a few inches (e.g., 2 to 15 inches above the table top surface). By suspending the camera above the table top surface, the perspective of the camera can be better aligned for head on views of employees gathered about the table top edge as opposed to viewing those employees from a lower perspective. While not shown, in at least some cases it is contemplated that camera assembly 1880 may be raised and lowered to change the perspective thereof to optimize for specific types of imaging when necessary. For instance, the post in FIG. 83 may be telescoping so that the camera can be raised from a height just above the table top surface to a height 15 or so inches there above.

In still other cases, a 360 degree camera may be centrally mounted to and suspended by the halo assembly 1860 as shown at 1880*a*. Here, again, the camera may be suspended by a post or a telescoping arm assembly so that the height thereof can be changed to optimize for different imaging tasks.

Referring still to FIG. 109, the field of view of exemplary camera 1880 is represented by the conical band shown in phantom at 1890. In other cases where the camera 1880 includes additional sensors and lenses the camera may be able to obtain images of the entire spherical space about the camera assembly 1880 (e.g., upward, downward, to any side, upward and leftward, etc.). In the interest of simplifying this explanation, camera imaging will be described assuming that images are within the conical band 1890.

During a meeting, camera 1880 may operate to obtain 360 degree video of meeting activities including real time video of all local conferees in the meeting as well as all content that is presented on the display screens, whiteboards, etc., that are located within the 360 degree FOV of camera 1880. The 360 degree video may be used for various purposes. For instance, in at least some cases the 360 degree video may be used to memorialize a meeting so that meeting attendees or employees that missed the meeting can view meeting activities subsequently. As another instance, the video may be used to provide remote views of a meeting as the meeting is taking place.

Figure 110:
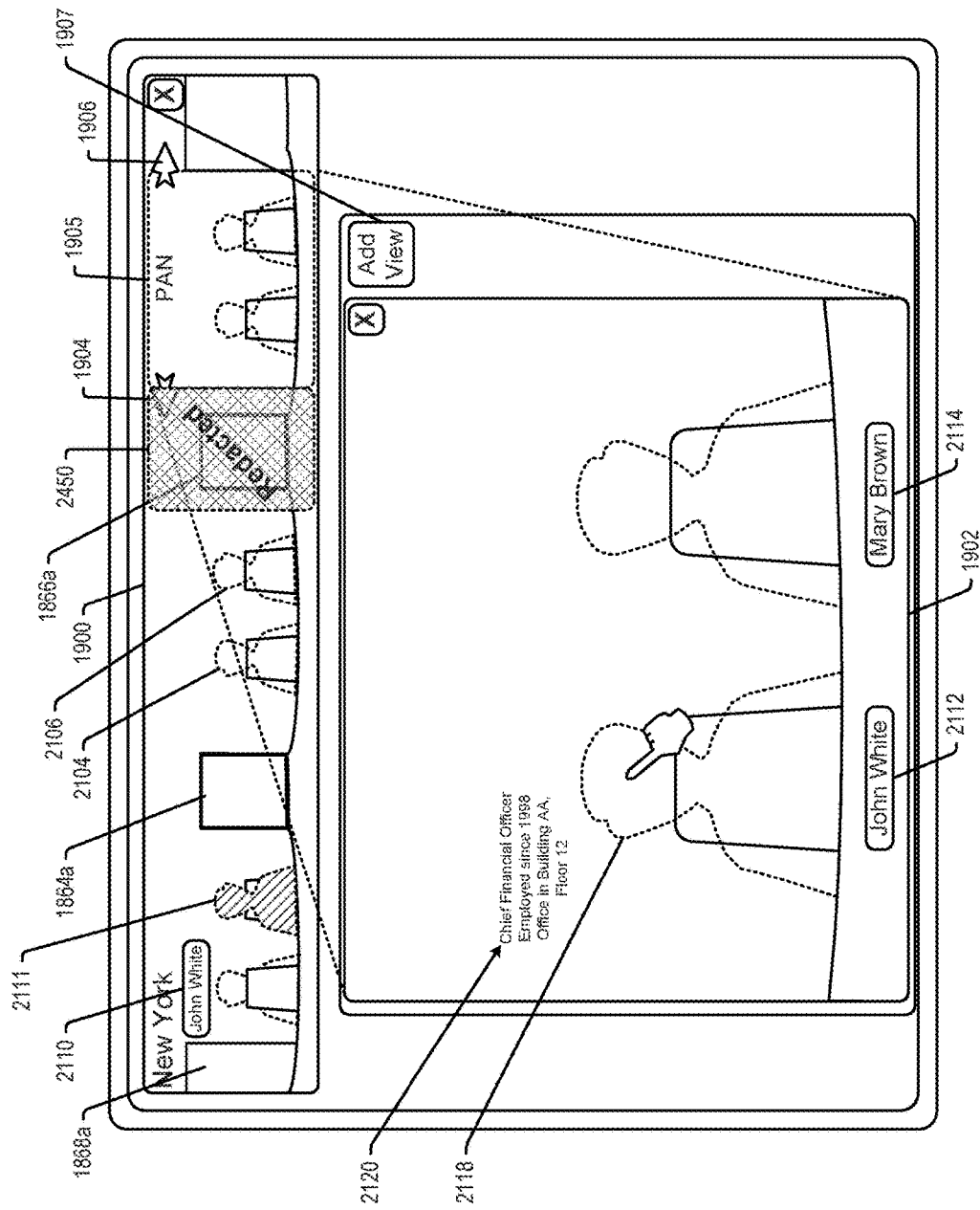
FIG. 110 is a schematic view of an exemplary screen shot that may be provided to a remote conferee showing the conference space of FIG. 109 and other information.

The view accessed by a remote conferee may include the entire 360 degree real time video in any of several different formats. For instance, where a remote conferee has only a flat panel display screen at her disposal, the full 360 view may include a ribbon view stretched across the user's display screen as shown in FIG. 110 at 1900 where the entire 360 degree view is simultaneously observable. In other cases, the remote user's view may only include a portion of the 360 degree view as shown at 1902 in FIG. 110. In still other cases, the remote view may include both a ribbon view as at 1900 and an enlarged partial view as shown at 1902 in FIG. 110. In this case, a sub-field which is shown in phantom at 1905 may be presented in the ribbon to indicate the section of the full 360 view in the ribbon presentation that is presented in the enlarged field 1902.

In FIG. 110, panning arrows for moving along the ribbon view to change the FOV presented in field 1902 are shown at 1904 and 1906. By selecting arrow icon 1904, a user can pan the field 1905 left to change the FOV and by selecting icon 1906 a user can pan right. In cases where a user reduces the vertical dimension of selection box 1905 to a dimension smaller than the vertical dimension of the ribbon view, up and down panning arrows (not illustrated) may be provided for moving the box up and down within the ribbon view.

In at least some cases, in addition to changing the direction of the presented FOV, the remote user may be able to zoom in and out of the view presented in field 1902. For example, in at least some cases where the user's interface device includes a touch sensitive screen, the user may be able to use the well known two finger touch and expanding motion to increase the zoom of the image in field 1902. Other conventional image zooming interface tools are contemplated. Here, as the FOV in field 1902 is changed, the phantom selection box 1905 in ribbon view 1900 may also be modified to indicate the section of the 360 degree view that is presented in field 1902.

Figure 111:
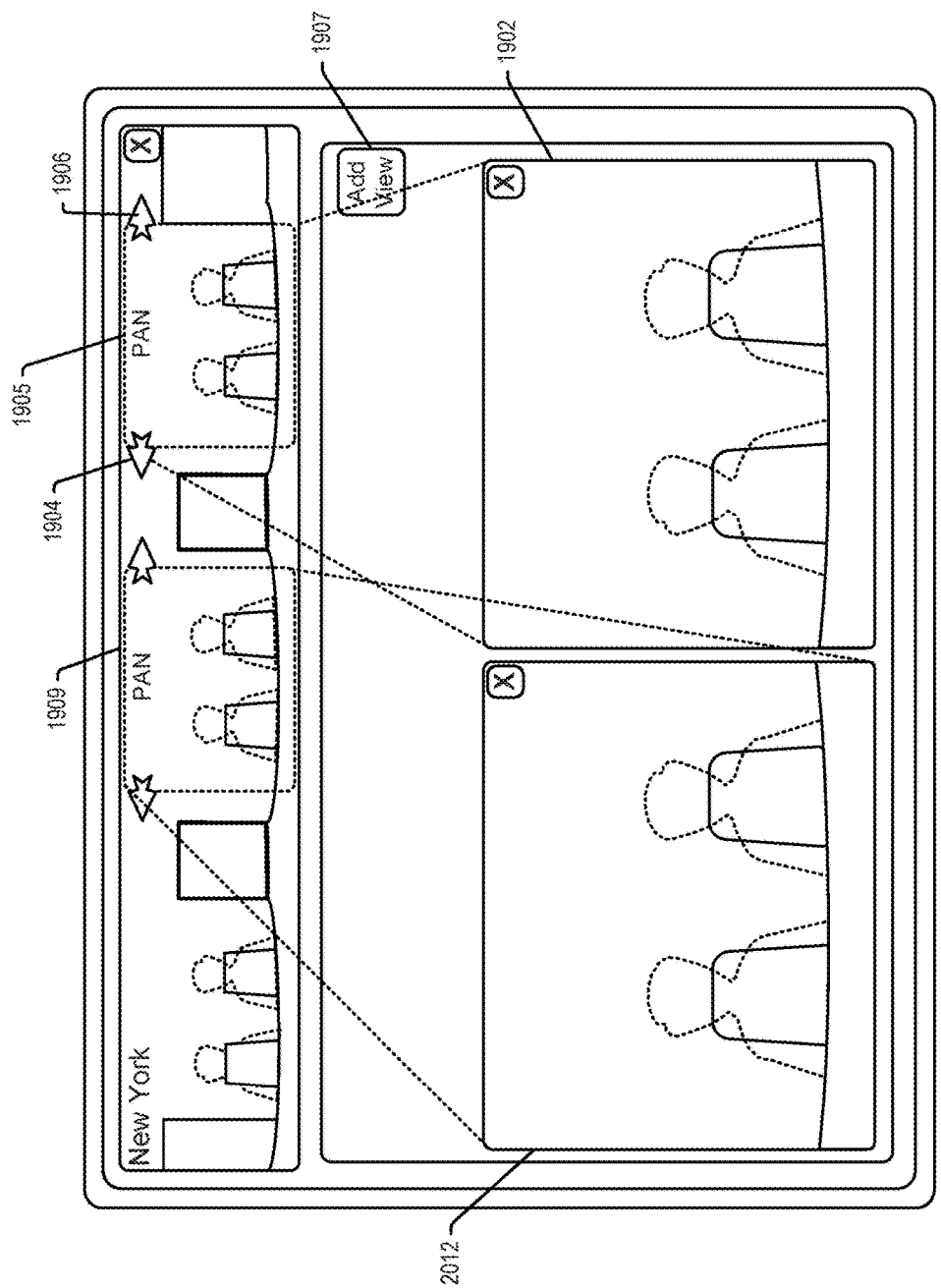
FIG. 111 is similar to FIG. 110, albeit where the remote user view includes a second enlarged FOV into the space of FIG. 109.

The contemplated system may enable a remote conferee to view images or videos corresponding to two or more FOVs simultaneously. In this regard, see again FIG. 110 that includes a selectable "Add View" icon 1907 that, when selected, causes a system server to present a second field 1909 in the ribbon 1900 as shown in FIG. 111. In addition, selecting the add view icon causes the server to automatically shrink down the FOV field 1902 to accommodate a second FOV field 2012 to show the video corresponding to the second field 1909 from the ribbon view in a larger format. Again, panning arrow icons are presented for the second field 1909 enabling an employee to move field 1909 left or right along the ribbon view 1900. While only two views are shown in enlarged fields 1902 and 2012 in FIG. 111, a user may cause many more enlarged fields to be generated by continually selecting the add view icon 1907. FOVs can be closed by selecting associated "X" icons.

In some cases, a user may be able to select a vertical side edge of field 1905 and drag left or right in the ribbon view to increase the width of field 1905 and similarly to increase the width of the associated enlarged field 1902 and the video presented therein. Thus, a remote user may have the ability to view only small sections of the 360 view or intermediate sized sections selected by the user by changing the width of field 1905.

Figure 112:
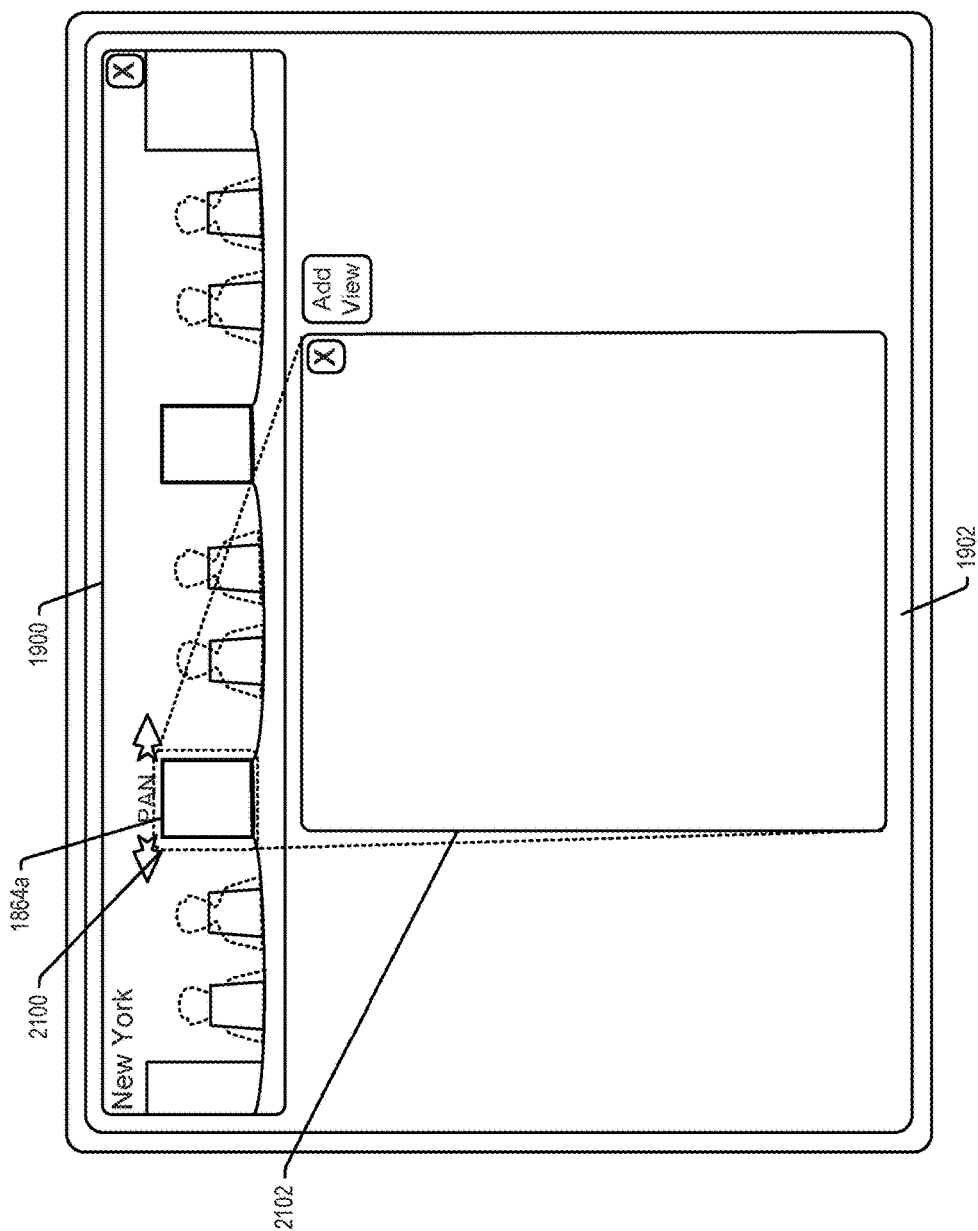
FIG. 112 is similar to FIG. 110, albeit where a remote user has selected to enlarge content on one of the display screens in the FIG. 109 conference space.

In at least some embodiments it is contemplated that at least certain "objects" within the ribbon view 1900 may be identified by a system server or processor and may be selectable by a remote conferee to access optimized views or high fidelity representations of the selected objects for remote viewing. For instance, referring again to FIGS. 109 and 110, each of the first and second flat panel display screens 1864 and 1866 as well as the electronic whiteboard 1868 are shown in the ribbon view 1900 as labeled at 1864a, 1866a and 1868a, respectively. In a particularly simple embodiment, each of the screen and board representations 1864a, 1866a and 1868a may be selectable via touch, a mouse controlled cursor, etc., to select an optimized view of the selected screen or board. Referring also to FIG. 112, once screen 1864a is selected, the field selection box in ribbon view 1900 may move and shrink to a location indicating selection of representation 1864a as shown at 2100 and an enlarged view of representation 1864a may be presented as shown at 2102 for view by the remote conferee.

Referring still to FIG. 112, when an object is selected from ribbon view 1900 for enlarged viewing as shown at 2102 and the selected object is associated with a digital representation, the enlarged view at 2102 may either include an actual video representation generated by the camera 1880 (see again FIG. 109) or may include the associated digital representation used to drive display 1864 in the real world. Here, the phrase "digital representation" is intended to mean that the real world affordance associated with the object selected in the ribbon view 1900 currently presents visual digital output which can be presented in field 2102 in the same digital form that it appears on the display screen or electronic whiteboard in the real world (e.g., in the local conference space shown in FIG. 109). Thus, for instance, where a local conferee present in the space illustrated in FIG. 109 presents output of an application program (e.g., a word processor program) on display screen 1864 in FIG. 109, when representation 1864a is selected as in FIG. 112, the application program output (e.g., the word processor program output) may be duplicated in high digital fidelity in window 2102 for easy viewing by the remote conferee.

Referring again to FIG. 110, in addition to objects that include display screens, other objects that may be recognizable by a system server in the ribbon view 1900 may include conferees that are represented in FIG. 110 in phantom, two of which are labeled 2104 and 2106. In at least some cases the server may simply be programmed to generally recognize human beings in the view and, when one of the humans is selected via the interface of FIG. 110, an enlarged view of the selected person may be presented in a fashion similar to that shown at 1902 in FIG. 110. In other cases where a server monitors locations of specific persons within the local space shown in FIG. 109, the server may also track personal identities of specific employees presented in the ribbon view. Where personal identities of conferees in the ribbon view are tracked, some type of identifying information may be presented within the ribbon view for each tracked conferee either persistently, for a short duration (e.g., 3 seconds) when the ribbon view is first accessed, for a short duration when the ribbon view is selected or for a short duration when a specific conferee within the ribbon view is selected. For instance, see the exemplary identifying field 2110 shown in FIG. 110. Identifying fields may also be presented in the enlarged view field 1902 as shown at 2112 and 2114. Fields 2110, 2112 and 2114 are exemplary augmented reality fields for presenting additional information about objects (e.g., conferees) within the video content.

Other information associated with different selected objects in the ribbon view may be presented in an augmenting fashion. For instance, user identifying fields 2112 and 2114 may be persistently presented as shown in FIG. 110 and, when a remote conferee further selects or hovers over (e.g., touches or moves a selection icon over) one of the conferee representations in field 1902, additional information about the selected conferee may be presented for a short duration about the conferee's representation in field 1902. For example see the exemplary additional conferee information at 2120 in FIG. 110 presented when conferee representation 2118 is selected.

In at least some cases it is contemplated that a system server may examine the entire ribbon view and identify interesting objects including display screens, whiteboards, present conferees, etc. for which additional information is available and may visually distinguish each of those interesting objects within the ribbon view or other views in some fashion to indicate that each of the objects is selectable to access augmented information. Thus, for instance, while one identity field 2110 is shown in FIG. 110, in some cases a field akin to field 2110 may be provided in close proximity to each of the conferees represented in the ribbon view, to each of the display screen representations 1864a and 1866a and to the selectable whiteboard representation at 1868a. In other cases, each of the selectable objects may be highlighted, color coded (e.g., rendered blue like a hyperlink (see the cross hatched conferee at 2111 in FIG. 110 indicating a blue color)) to indicate accessible additional digital content.

Figure 113:
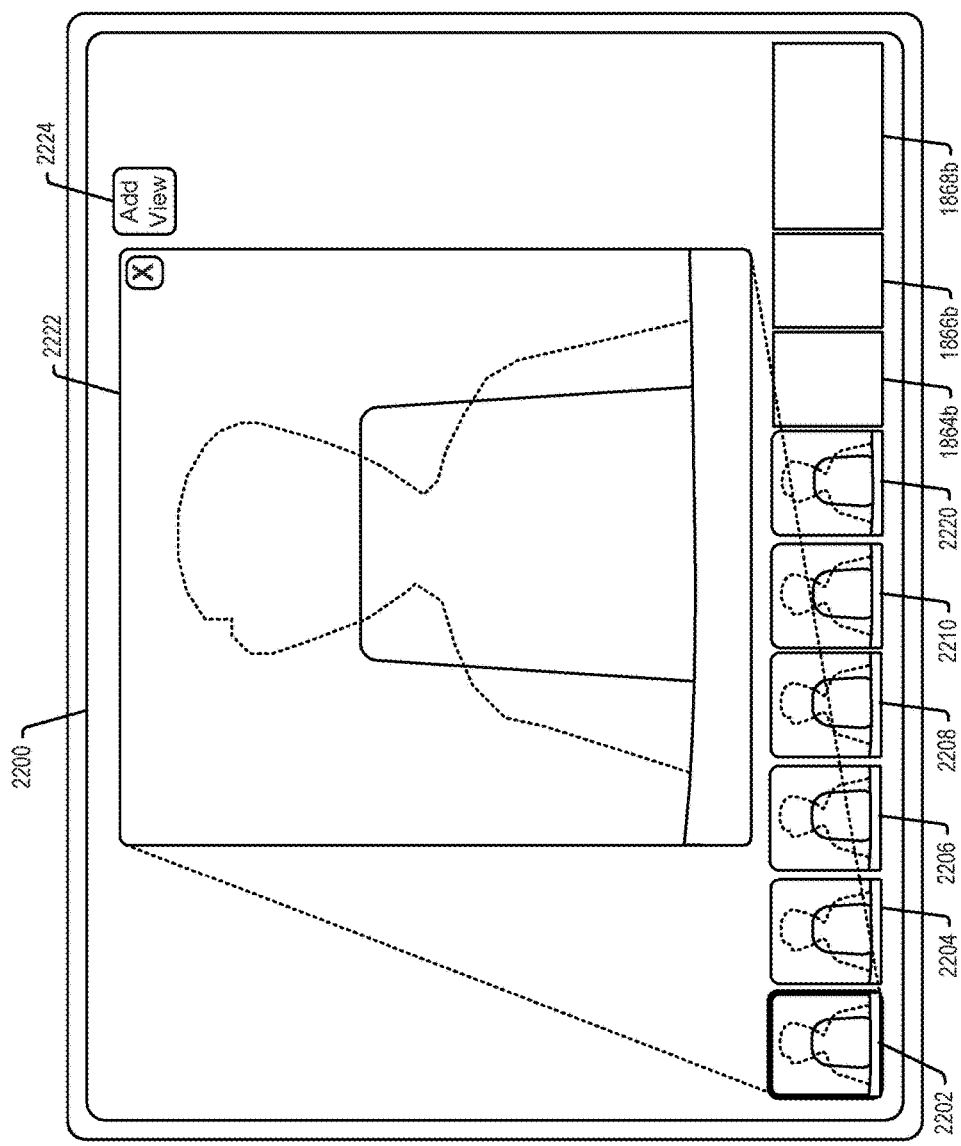
FIG. 113 is yet another remote conferee's interface to the space represented in FIG. 109, albeit where a processor provides FOV options of interest for selection by the remote user to enlarge views into the FIG. 109 space.

Instead of presenting the full 360 ribbon view on a remote conferee's interface, the system server may automatically identify all recognizable objects in a ribbon view and may present each recognized object in its own field or window for selection by the remote conferee as viewing options. For instance, see FIG. 113 where a set of separate and independently selectable object fields corresponding to each of 6 conferees and the two display screen and one electronic whiteboard are shown in a row along the bottom edge of the interface 2200 at 2202, 2204, 2206, 2208, 2212, 2220, 1864b, 1866b and 1868b, respectively. The screen and whiteboard object fields 1864b, 1866b and 1868b correspond to the screens 1864, 1866 and whiteboard 1868 in FIG. 109, respectively. Here, a conferee may select any one or more of the options along the bottom of the interface to present an associated enlarged version of the field content in the selected field at 2222. Again, additional enlarged fields may be added via icon 2224.

It has been recognized that at least some employees attending a conference may be uncomfortable with the notion of remote conferees being able to select any sub-field in a 360 degree FOV within a conference space without some indication of what the remote conferees are viewing. In prior cases where the direction of a camera lens could be visually determined (e.g., is the lens pointing at me?), local conferees could relatively easily determine if they were in the camera's FOV by observing the trajectory along which the lens was aimed. With most 360 degree cameras, however, the camera assemblies obtain 360 degree views without having to change the directional aim of the camera so that there is no visual way to determine the directional trajectory of a remote user's FOV or even if the camera is actively obtaining images.

In at least some embodiments it is contemplated that some additional type of FOV indicator may be provided within a conference space to indicate remote user FOVs within the space to the local conferees. For instance, referring again to FIGS. 109 and 110, where a remote user's FOV presented in field 1902 corresponds to the FOV 2230 in the local space shown, the system in the local conference space may dynamically indicate the FOV in the local conference space in some fashion. For example, a laser writer device 2232 may be provided on top of the camera 1880 that can be controlled to generate a laser outline as shown at 2230 to indicate the current remote user's FOV. Here, as the remote user changes her FOV, the laser writer would move the outline 2230 to a different location within the 360 FOV 1890 that mirrors the remote user's FOV.

In other cases, device 2232 in FIG. 109 may include a simple conical curved display screen 2234 where a section 2236 is visually distinguished to indicate an area of the conference space that is aligned with a remote user's FOV. Thus, as the remote user changes her FOV, the distinguished section 2236 may be changed accordingly.

In still other cases, the halo assembly 1860 in FIG. 109 may be controlled to indicate a remote user's view in some fashion. For instance, where the halo changes light effects based on who is being imaged for telepresence purposes, the different lighting effects may clearly indicate remote user FOVs as shown at 1840 where a field is illuminated optimally for telepresence imaging. Here, in at least some cases it is contemplated that special lighting effects will not be needed in cases where a remote viewer is viewing one of the electronic display screens or the electronic whiteboard and therefore, remote view indication may only be presented when a remote user's view includes a view of a local conferee. In other cases the remote view indicator may always indicate the remote conferee's FOV regardless of the object within the FOV.

Figure 114:
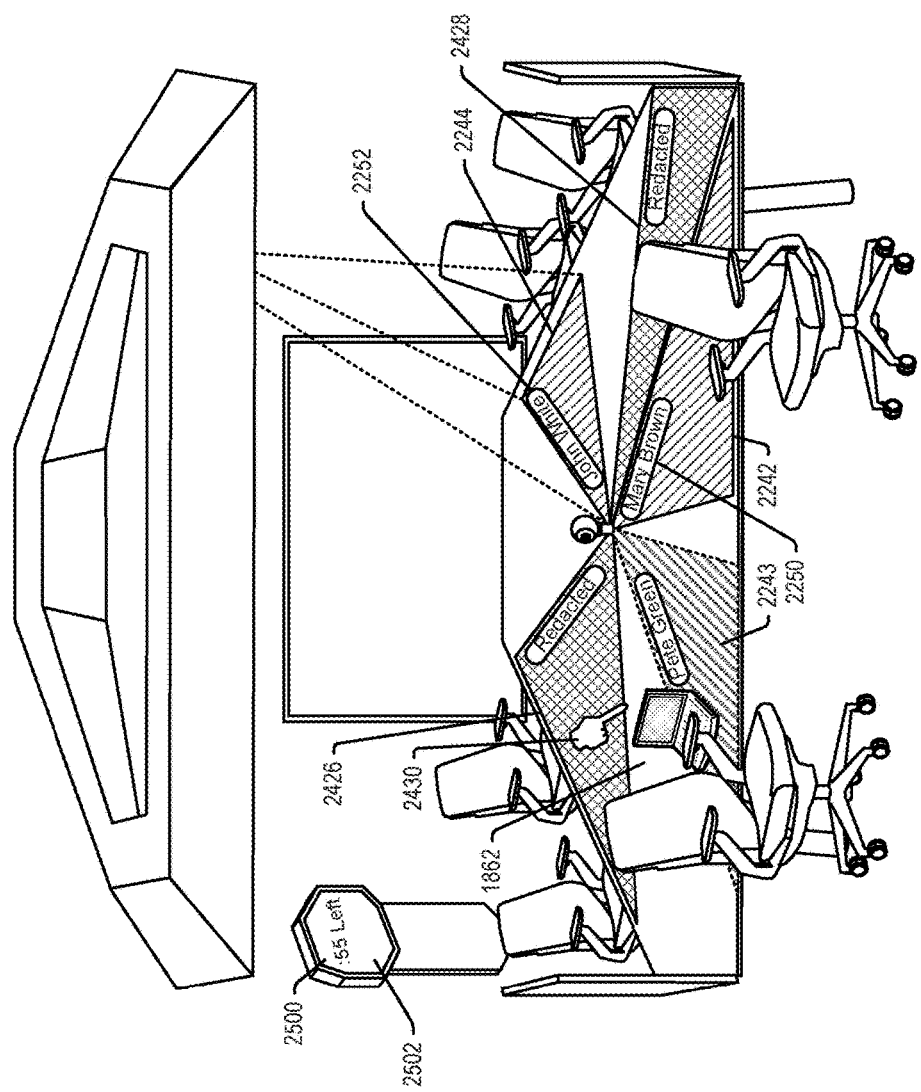
FIG. 114 is similar to FIG. 109, albeit showing various FOVs and redacted areas within a local conference space.

In yet other cases, a laser writer device or other light projector type device mounted within the halo 1860 or adjacent the camera assembly 1880 may be programmed to indicate remote user views associated with 360 degree camera 1880. For instance, see FIG. 114 where first and second different remote user views are indicated by laser or other projected light on surface 1862 as 2242 and 2244, respectively.

In at least some embodiments more than one remote conferee may patch into a meeting and each of the remote conferees may prefer or desire a different FOV of the local conference space. In this regard, for instance, a first remote conferee may want the view indicated by projected field 2242 while a second remote conferee wants the view indicated by projected field 2244 in FIG. 114. In this case, because camera 1880 can support any number of different views at the same time, each of the first and second remote conferees can be presented his or her desired FOV and each of those two FOVs may be visually indicated in any of the ways described above. For instance, both projected fields 2242 and 2244 may be presented on table top 1862 at the same time. Where two or more remote users have different simultaneous FOVs, the projected fields 2242 and 2244 may be visually distinguished, one from the other, as an indication that different remote conferees are viewing different FOVs. In this case, in at least some embodiments it is contemplated that each of the fields 2242 and 2244 may be earmarked in some fashion that associates the field with a specific one of the remote conferees. For instance, in the case of a high definition laser writer device, the laser device may project each remote conferee's name as shown at 2250 and 2252 into the associated one of the fields 2242 and 2244.

The remote FOV indicators may be persistently presented, only presented for a short duration when a remote FOV is changed, presented upon some affirmative step by a local user or any combination thereof that makes sense. For instance, in one combination the FOV's may be presented for a short duration upon request by a conferee or may be presented for a short duration automatically whenever a remote conferee changes her instantaneous FOV is any way.

Figure 115:
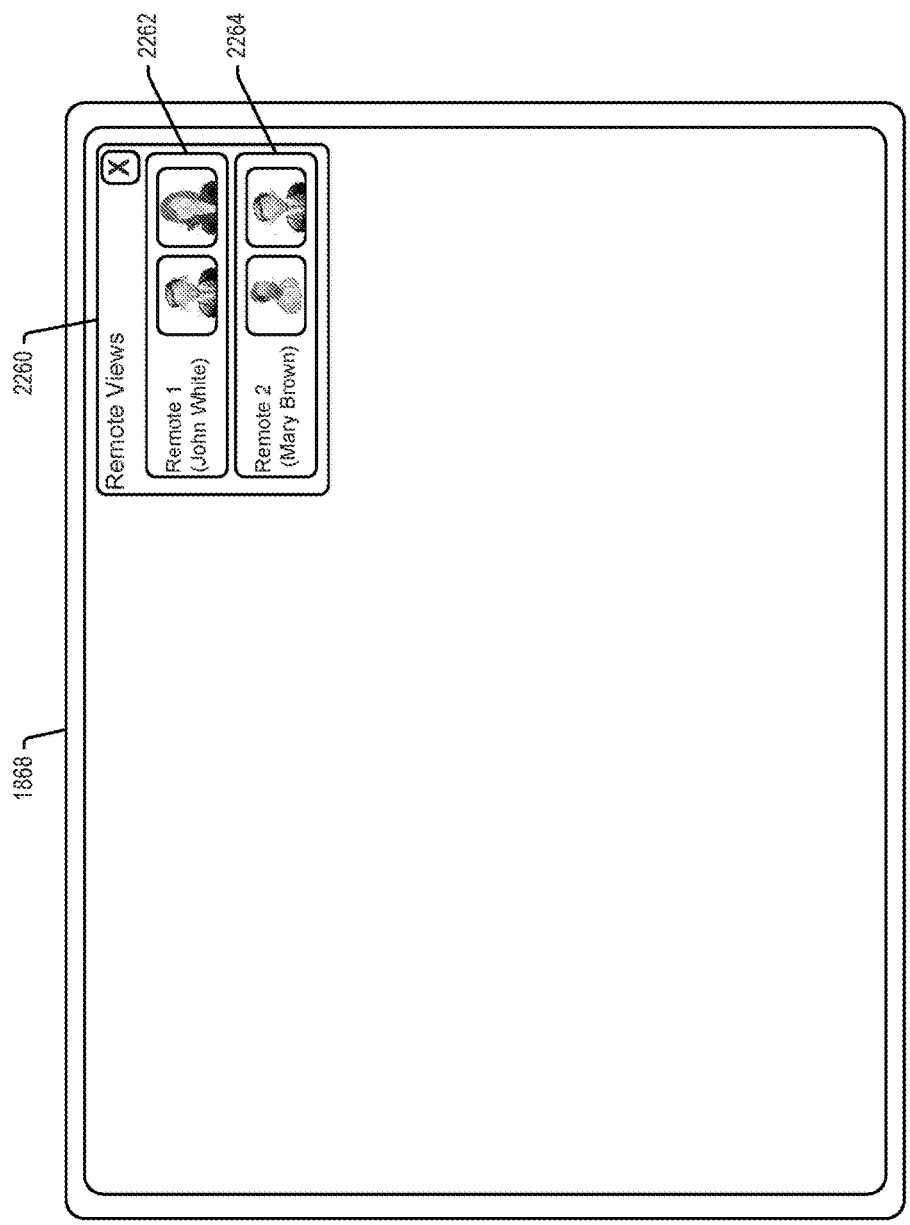
FIG. 115 is an emissive surface view that may be provided on the whiteboard shown in FIG. 109 that shows remote views being seen by remote conferees.

In at least some cases instantaneous remote user views may be presented on a portion of one of the display screens 1864 or 1866 or on a portion of the electronic whiteboard 1868 in a conference space. For instance, see the remote view representation at 2260 that is presented on the exemplary whiteboard in FIG. 115. In FIG. 115, representation 2260 indicates that first and second remote conferees are each view two different subsets of FOVs represented at 2262 and 2264. Here, any local conferee can view representation 2260 and quickly ascertain if she if being remotely viewed and if so, by whom. Again, representation 2260 may be persistent or may be presented for short durations at different trigger times when remote user views are modified.

In cases where a local conferee in the space associated with the FIG. 109 arrangement uses a laptop or other portable personal computing device, personal notice of remote view may be presented to the local conferee via their portable device display screen. For instance, see FIG. 116 which shows a display screen from an exemplary laptop computer 1870 in FIG. 109 where a user of laptop 1870 is presented with a remote view notice window 2300 that includes a list or tally of remote conferees at 2302 that are currently displaying a FOV that includes the local conferee. Again, window 2300 may persist or be of short duration upon some triggering event. Where no remote conferee is viewing a specific conferee in a local space, the system may automatically provide a confirmation message or notice as shown at 2390 in FIG. 117 that "You are NOT currently being remotely viewed" as a confirmation that the system is operating properly and that the local conferee is not being viewed by a remote conferee.

Figure 116:
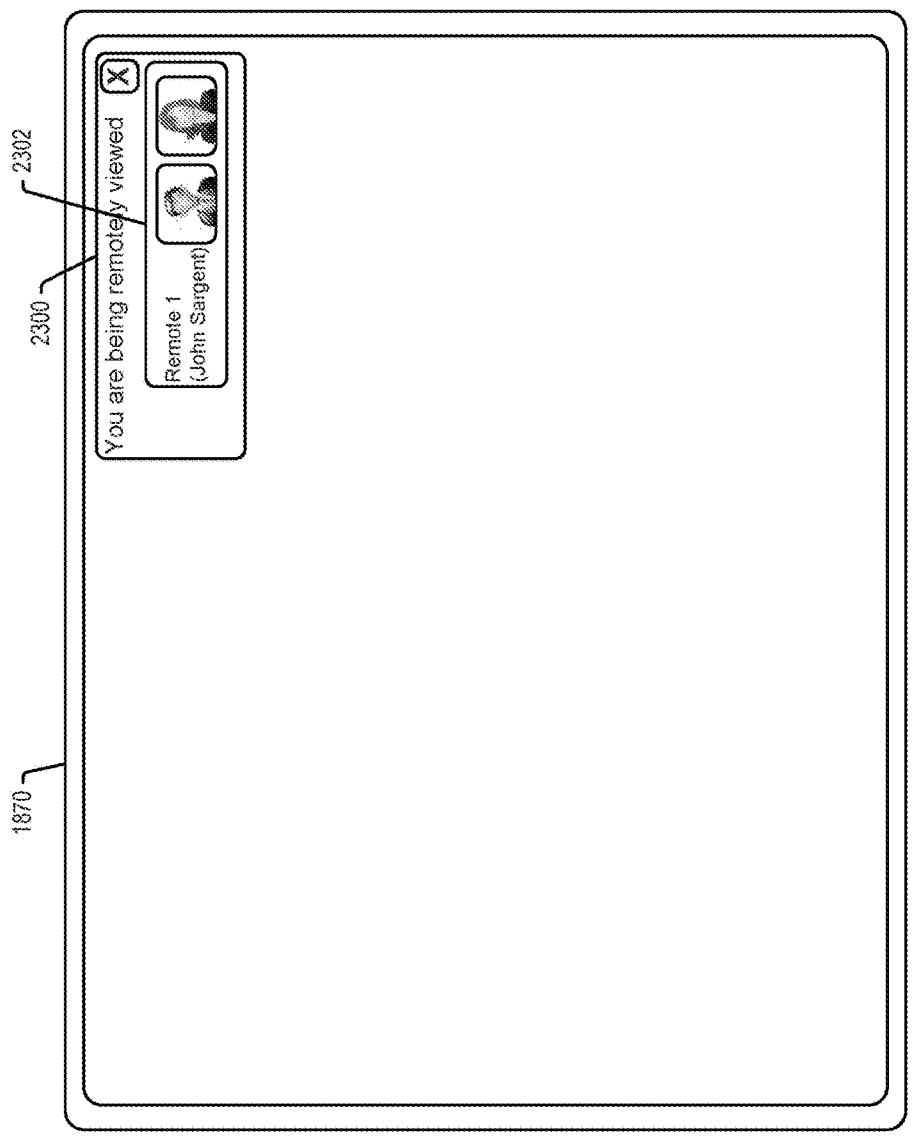
FIG. 116 is similar to FIG. 115, albeit showing a laptop or other personal portable computer screen that indicates to a specific conferee other remote conferees that are currently viewing the specific conferee.
Figure 117:
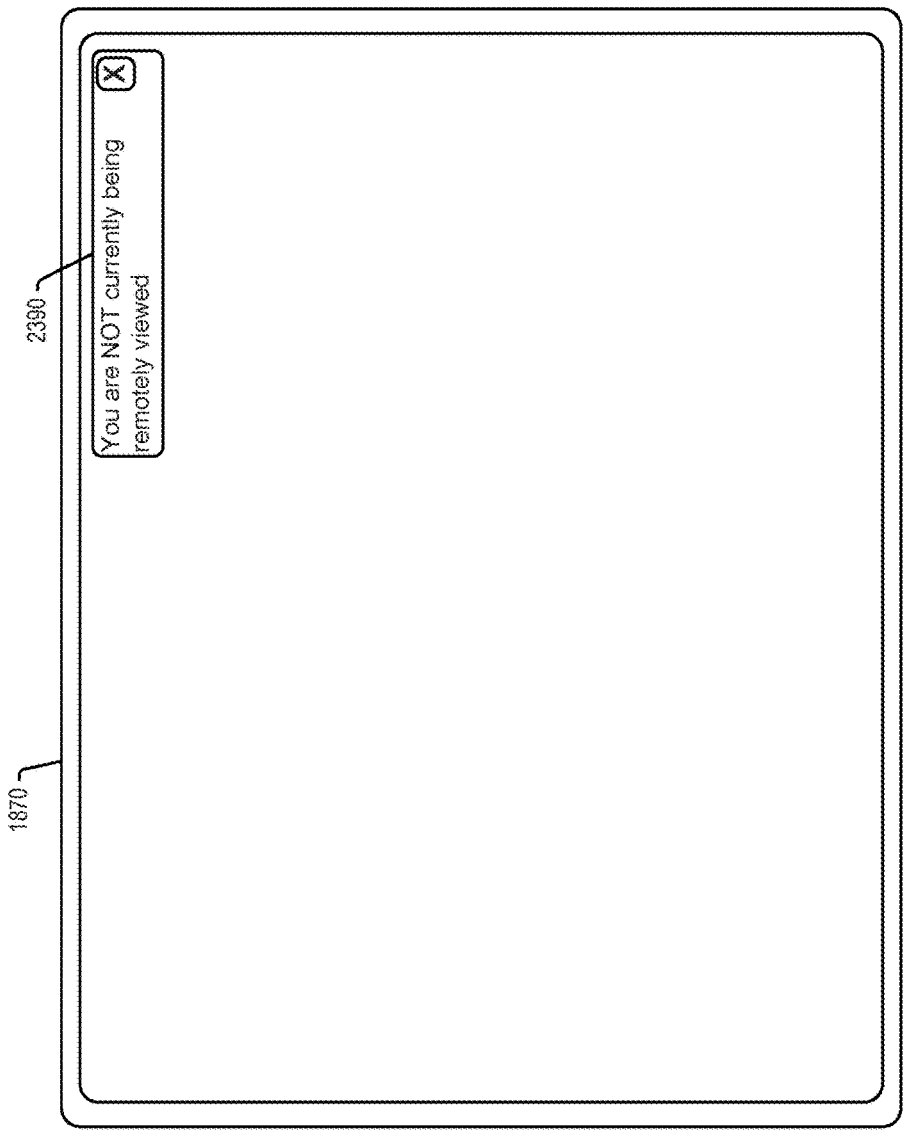
FIG. 117 is similar to FIG. 116, albeit indicating that no remote conferee is viewing the conferee associated with the device that includes the illustrated screen.

In cases where a remote conferee's device also includes a camera so that video of the remote conferee can be presented in a local space (e.g., see again the local affordance arrangement of FIG. 109), a window similar to window 2300 in FIG. 116 may be presented to the remote conferee on the remote conferee's laptop or other device display screen so that the remote conferee knows when local conferees are viewing the local conferee. A confirmation that no one on a conference is viewing the remote viewer may be presented that is akin to the message shown at 2390 in FIG. 117.

Referring again to FIG. 109, in still other cases one or more dedicated display screens or other emissive surfaces 2380 and 2382 may be provided within a conference space to persistently present instantaneous remote views of the local space and, in at least some cases, to identify remote conferees associated with the remote views. Here, the remote views may appear similar to the views shown in FIG. 111 so that local conferees have a clear understanding of what remote conferees are viewing at all times and how those views are changing over time. By consistently providing dedicated emissive surfaces or specific sections of emissive surfaces to remote view replication, a system can be designed that conferees can become quickly accustomed to and can breed confidence in a conferencing system despite the ability of remote users to independently select their views into the local scene.

Figure 120:
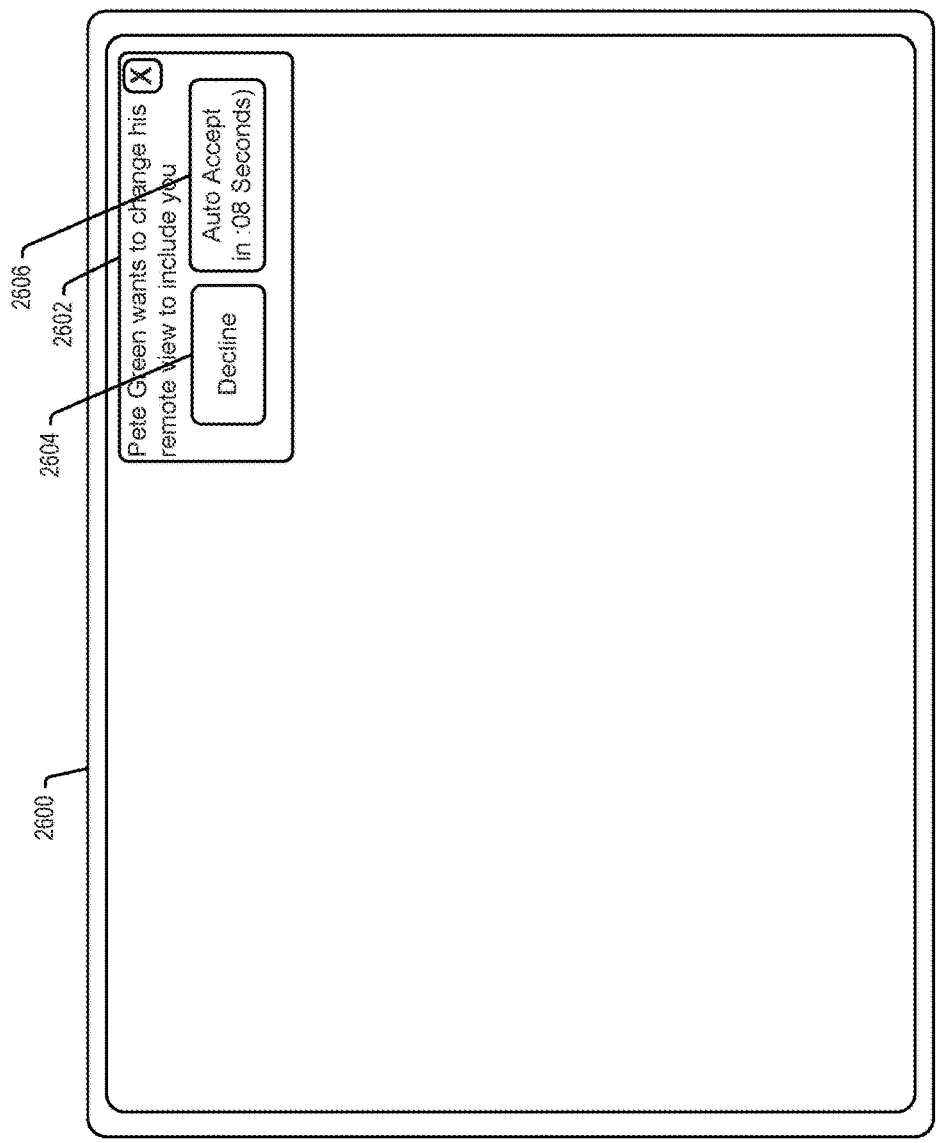

In at least some cases when a remote conferee acts to change her view in a local conference space, the view change may be noticed to local conferees prior to being initiated. For instance, in FIG. 114, when a remote conferee Pete Green intends to add a remote view as indicated at 2243, a system server may cause the view to be indicated on as shown at 2243 a few seconds prior to the view being initiated so that conferees in the space associated with the arrangement illustrated are forewarned of the view. In some cases a tool may be provided so that at least one local conferee can reject a view change requested by a remote conferee. To this end, see FIG. 120 which includes a screen shot 2600 that may be presented on a laptop or the like to a local conferee at table 1862 in FIG. 114 allowing the conferee to reject the view change. Here, the option to reject may be provided to a conferee that is located in the requested modified view or to each conferee in the requested modified view that is currently using a laptop or other personal interface device. In FIG. 120, the notice indicates the view change at 2602 and presents on screen "Decline" and "Accept" icons at 2604 and 2606 where the accept icon 2606 indicates that if the noticed conferee does not decline the view request within the time specified by a countdown clock, the view will be changed automatically to the view requested by the remote conferee.

In at least some cases it is contemplated that one or more local conferees within a local conference space may want to block remote conferees from viewing at least portions of a local conference scene. For instance, a local conferee may not want remote conferees to see contents presented on one of the large display screens 1864 (see again FIG. 109). As another instance, a local conferee that is not planning on talking much during a session may not want to think or worry about whether or not she is being viewed by remote conferees during a session.

Figure 118:
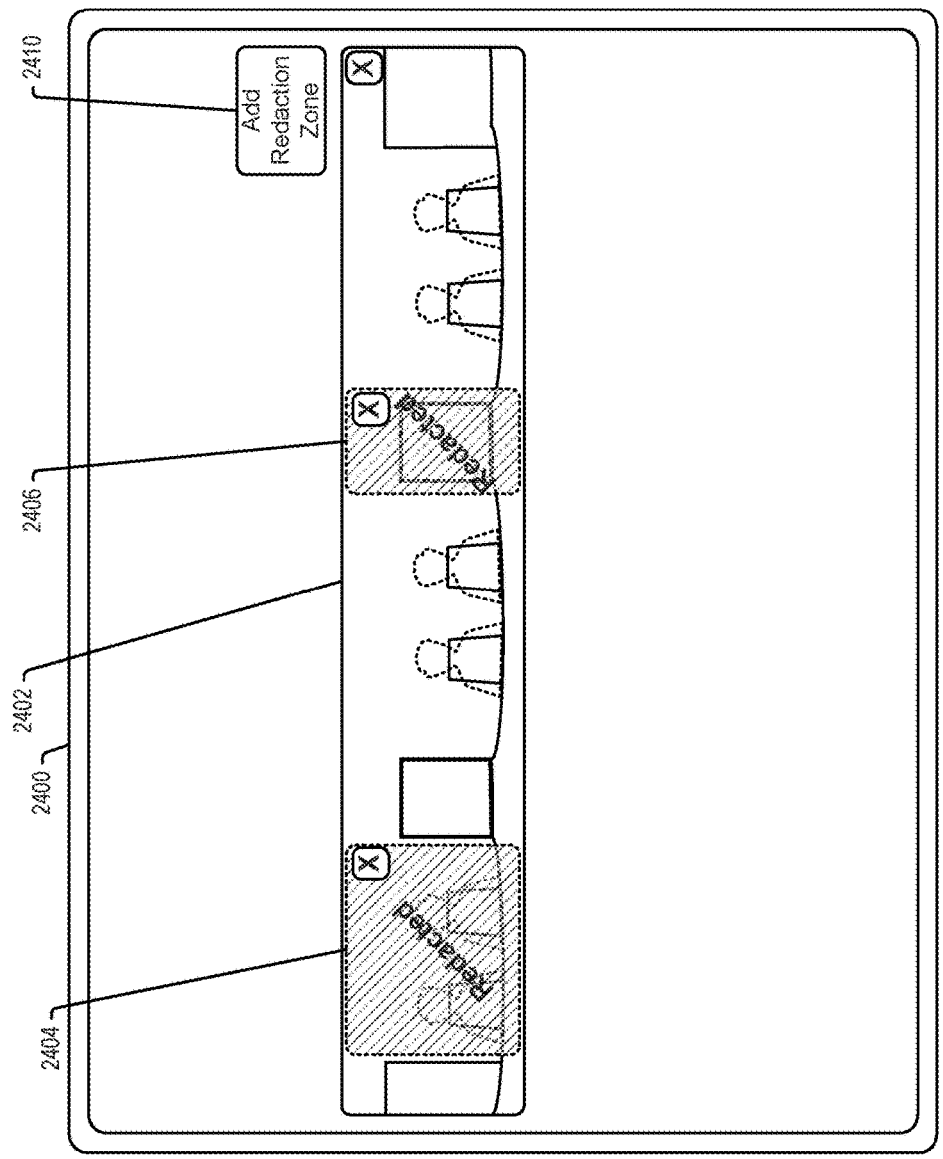
FIG. 118 is a screen shot from an interface used to select and set redacted portions of a conference space that cannot be remotely viewed by remote conferees.

In at least some embodiments it is contemplated that a conferee may be able to effectively turn off or disallow sub-FOVs of the 360 view capable by camera 1880 in FIG. 109 to restrict remote conferee viewing in the sub-FOVs. Hereinafter, unless indicated otherwise, when a sub-FOV of camera 1880 is disabled, the act of disabling the sub-field will be referred to as "redaction" and the sub-FOV will thereafter be referred to as a "redacted field". In this regard, see FIG. 118 where a touch screen type user interface device is shown at 2400 for setting redacted sections of the 360 FOV for camera 1880 in FIG. 109. As shown, in at least some embodiments, the redaction tool may include a ribbon view 2402 akin to the remote conferee view shown in prior figures where a local user can see the entire 360 degree view captured by camera 1880 in real time. Initially, when a user accesses the redaction screen shown, a default redaction window or box may be presented as indicated at 2404 where the space inside the window is shaded and labeled to indicate redaction of the sub-FOV associated therewith. Window 2404 can be moved about within the ribbon view to change the sub-FOV that is redacted and the left and right edges can be pulled out or moved in to change the redacted area dimensions. Likewise, top and bottom edges of the window 2404 may be selected and dragged up or down to change the vertical dimensions of the redacted area. The redacted area can be removed by selecting an "X" icon in the upper left corner of window 2404. Additional redacted areas can be added to the ribbon by selecting icon 2410 to add another redacted window 2406 and after being added, the additional redacted window can be modified by moving the window within the ribbon or by pulling the window boundaries in and out.

Referring again to FIG. 114, as a local conferee adds, deletes and modifies redacted areas within the space associated with the illustrated arrangement, the laser writer in the Halo may be programmed to automatically indicate the redacted sections of the space by projecting redacted boundaries and labels onto the top surface of the table top 1862 there below as shown at 2426 and 2428. Thus, the local user can see in real time how her redacted selections limit viewing angles available to remote conferees. In at least some cases the redacted indicia may be persistently projected onto surface 1862 so that any conferees entering the conference space have a clear understanding of which space areas can be remotely viewed and which cannot. In other cases the projected boundaries of redacted areas may persist in a less intense representation after redaction area selection is complete as a soft reminder of redacted areas in the space. Redacted areas may be indicated in other ways as well using, for instance, the indicator 2223 shown in FIG. 109 where redacted sections of the space aligned with different sections of the screen 2234 may be visually distinguished from other non-redacted areas, via a laptop or other portable personal interface device, via indicia presented by the Halo, etc. Where a local user redacts an area to prohibit remote viewing thereof, a redacted and darkly shaded or otherwise visually distinguished window may be presented within the ribbon view as shown at 2450 in FIG. 110 whenever a remote user accesses images from camera 1880.

In still other cases, with redacted areas projected onto the top surface 1862, camera 1880 or some other system camera may track user hand movements on surface 1962 intended to change redaction area boundaries and may adjust the redacted areas accordingly. For instance, referring still to FIG. 114, item 2430 represents a user's hand contacting one of the boundaries of redacted area 2426 while the system is in the redaction defining mode. Here, camera 1880 may obtain images useable to track hand 2430 and may adjust the touched boundary as the user moves her hand left or right. In this case, any redacted window as shown in FIG. 110 and in FIG. 118 would automatically change to reflect the gesture based redaction modification that occurs on table top surface 1862.

While redaction tools and a redaction interface are described above, in at least some cases a view authorization tool and interface may be provided to a system user that operates in a fashion similar to the redaction tools and interface, except that, instead of redacting sub-FOVs associated with interface windows (see again 2404 in FIG. 118), the interface would allow a local user to move and change the shapes and dimensions of selection windows to indicate sub-FOVs that can be viewed remotely. Thus, for instance, a user may only want remote conferees to be able to view the first and second display screens 1864 and 1866 and nothing else within the space associated with the FIG. 109 arrangement. Here, viewing windows or boundaries would define FOVs including the displays 1864 and 1866 and nothing more and an interface akin to the interface in FIG. 118 could be used to define the authorized viewing windows.

In at least some embodiments where a system server tracks locations and identities of specific system users, at least some users may be able to set rules for if and when then can be imaged by cameras located throughout an enterprise area or at least within certain spaces in the larger enterprise area. For instance, a first employee may simply prefer to never be viewed by remote conferees and may be able to set a control command causing a system server to always redact at least the sub-FOV of camera 1880 and other enterprise cameras that corresponds to the user's instantaneous location. Here, the server would track the first employee's location and automatically redact a view of the employee from remote access. As another instance, a second user may not mind being imaged via "public" cameras that are positioned throughout an enterprise for safety purposes but may prefer not to be imaged within private conference spaces during meetings or in specific conference spaces at any time. These types of limitation may be programmed and used to control redacted sub-FOVs of camera 1880 and other cameras in the enterprise space.

Figure 119:
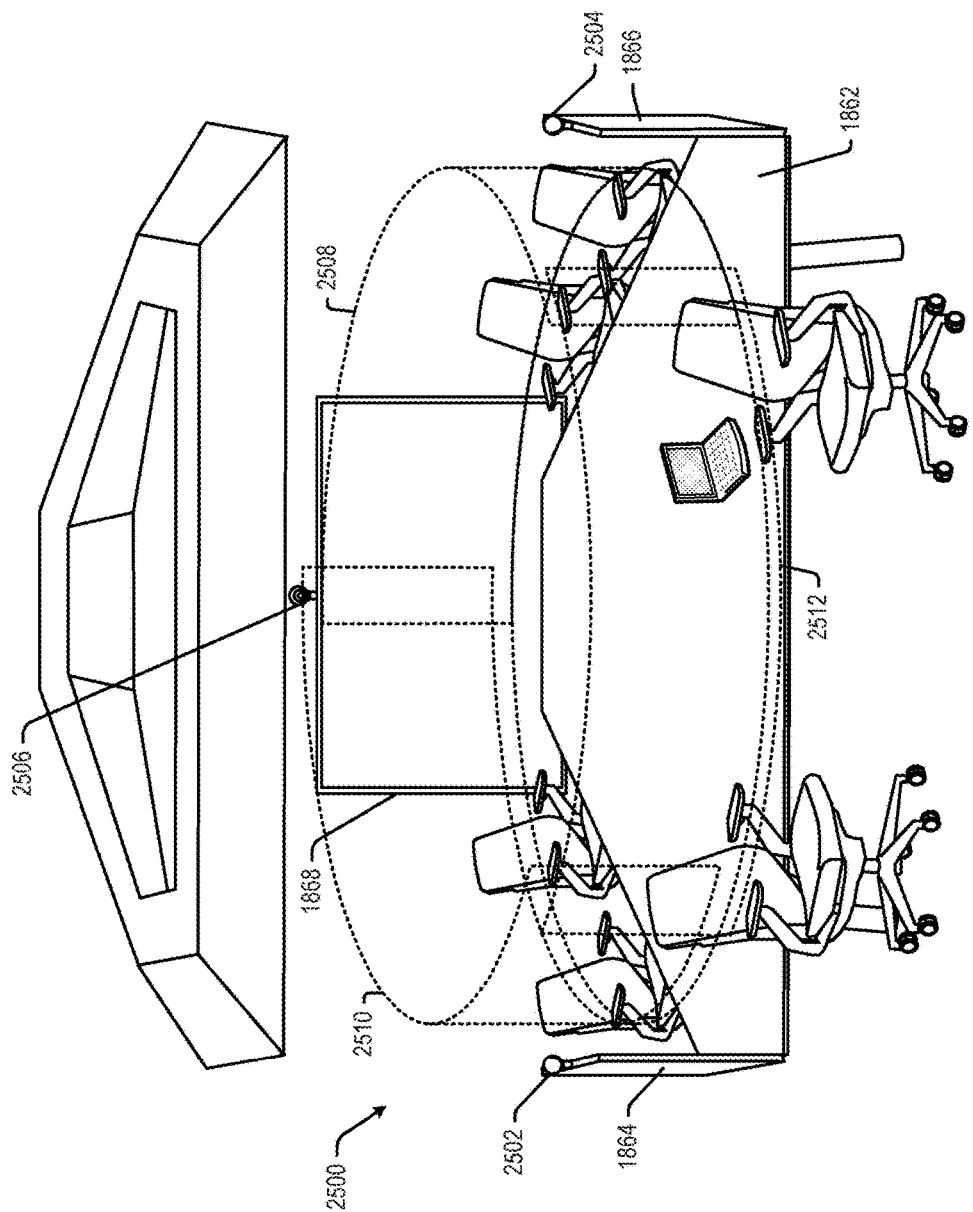
FIG. 119 is similar to FIG. 109, albeit where a camera system includes three wide angle cameras as opposed to a 360 degree camera where a system processor stitches together images from all three cameras to provide a 360 camera effect within a conference space.

Instead of providing a single camera assembly 1880 as shown in FIG. 109, other arrangements are contemplated where several cameras that are independently mounted may be used to, in effect, obtain a 360 degree view of a conference space by electronically stitching together images from a plurality of different cameras. To this end, see, for instance, the arrangement 2500 in FIG. 119 that includes a conference table 1862, a Halo assembly, first and second display screens 1864 and 1866 and an electronic whiteboard 1868 that are similar to the affordances labeled with the same numbers in FIG. 109. In the FIG. 119 arrangement, however, three separate wide angle or fisheye type camera assemblies 2502, 2504 and 2506 are centrally mounted along the upper edges of the first and second display screens 1864 and 1866 and centrally along the upper edge of electronic whiteboard assembly 1868, respectively. As shown, each of the cameras is configured to obtain a wide angle image of the space from its perspective and the cameras are arranged to be offset from each other by substantially 120 degrees about the associated space. In at least some cases, each camera 2502, 2504 and 2506 obtains images through substantially more than 120 degrees of arc so that the camera views of adjacent cameras overlap at least somewhat. In FIG. 119, the FOVs associated with cameras 2502, 2504 and 2506 are shown as concave rectangular FOVs 2508, 2510 and 2512, respectively which are shown to overlap at least somewhat. A system processor receives all of the images from each of the three cameras and stitches the views together to form a seamless 360 view of the conference space.

One advantage associated with the camera system shown in FIG. 119 is that 360 images can be obtained without requiring a centrally mounted camera system as shown in FIG. 109 so that the cameras do not obstruct conferee views across the conference table. Another advantage to the FIG. 119 camera system is that the images obtained from cameras arranged along the upper edges of the displays facilitate generally better eye-to-eye contact between local and remote conferees.

While the FIG. 119 system includes a different camera system than the system described with respect to FIG. 109, all of the features described above with respect to FIG. 109 and other embodiments may be implemented with minor changes in the system of FIG. 119. Thus, remote user FOVs may be visually indicated in some fashion, redaction fields may be specified by local conferees and then indicated within the local space, etc.

In at least some of the embodiments described above, various types of scheduling or schedule information have been described that can be provided to a space or affordance configuration user to help the user or users determine scheduling status. For instance, countdown clocks for meeting commencement, the scheduled end of a meeting, where people that are scheduled to be at a meeting are currently located, meeting agenda, etc., have been described in the context of FIGS. 51, 71, 77, among others. Typically the additional conference information has been described as being presented in a field on an electronic display screen or via some type of electronic output device that can be used dynamically at different times to provide many different types of information or notices to a user. While the multi-functionality of flat panel and other types of display or emissive surfaces is advantageous in many cases, it has been recognized that driving a display screen to facilitate many different functions at different times can be a weakness as space users become confused as to the purpose of the present information as well as to where to look for specific types of information. This is particularly true in cases where enterprise space has evolved and grown over time so that conference, meeting and other spaces are not uniform or, in many cases, even particularly similar so that any information type may be represented and located differently in different spaces which tends to cause confusion. This is also particularly true as more and more information and functionality are packed into conference and other spaces so that users simply do not know where to look for specific information types and simply become overwhelmed.

One solution to overcoming the problems associated with too much information and functionality packed into dynamically changing emissive surfaces is to provide dedicated interface devices for specific tasks that have a uniquely recognizable form which is consistent throughout enterprise space so that once users are socialized to what the form means and the functions associated with the form, the users can more easily access the functions of the recognized form. Specially designed interface devices that are consistently coupled to a small set of functions will, in generally, be referred to hereinafter as "enchanted objects" because the form of each of these objects takes on a sort of life of its own where users can quickly recognize the functions of the objects simply from their appearance. For instance, see the time object 2500 shown in FIG. 114 that has a shape akin to a conventional clock assembly and that includes an interface surface 2502 for presenting time related information about an on-going meeting to conferees in an associated space. As shown, time object 2500 is currently presenting a countdown timer that indicates that there are 55 minutes left prior to the scheduled end time of the current meeting. Here, while other time related information may be presented at different times, the idea is to limit the types of information presented so that conferees in the space can quickly become familiar with the functions associated with object 2500 and therefore may be more inclined to use the functions thereof and benefit from the information presented thereby. In at least some cases only one time or clock may be presented at any time to further simplify user interaction with object 2500. For instance, in addition to indicating time left in a meeting, time object 2500 may at other times in a daily cycle indicate time remaining prior to a next scheduled meeting in the associated space, at the beginning of a meeting, indicate the scheduled duration of the meeting or the scheduled time at which the meeting is to end, may specially indicate when there are only 5 minutes left in the current meeting, etc. In at least some cases, the type of time information presented may be textually distinguished to make clear to conferees the nature of the presented information. In other cases, information type may be indicated by visually distinguishing with colors, shading, etc., where each of the different appearances comes to be associated with a different information type. In still other cases both text and visual indicators may be presented at the same time so that users less familiar with the meanings of the visual indicators can understand information type by using the text representations, at least initially. Other types of enchanted objects are also contemplated.

Other height adjustable desk assemblies and configurations are contemplated. To this end, see for instance FIG. 121 where sub-assembly that may be included in another type of height adjustable configuration is illustrated. The subassembly includes a table top member 2630 and a control interface 2636 that may be included in one of the height adjustable workstations described above for controlling workstation worksurface height. Top member 2630 includes a top surface 2632 and an undersurface 2634 (see also FIG. 122). The top surface, as described above in other embodiments, includes a plastic or other thin upper layer of material that is at least somewhat light transparent or translucent so that light generated below that upper surface can pass through the surface to be viewed from above.

Figure 121:
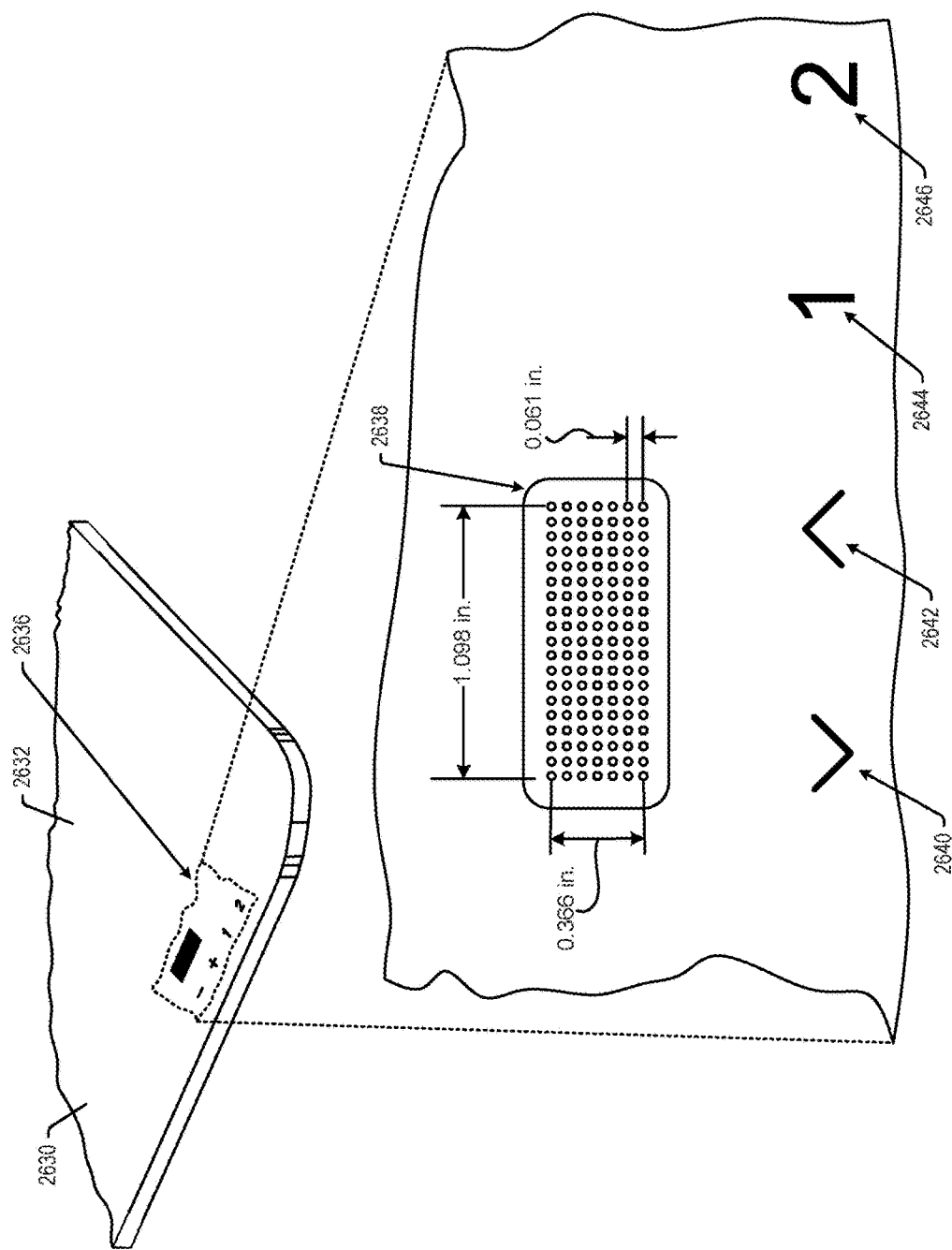

As shown in FIG. 121, interface 2636 includes four selectable buttons including a "down" button 2640, an "up" button 2642, a "1" button 2644 and a "2" button 2646. Interface 2636 also includes an LED matrix 2638 that is seven LEDs high and nineteen LEDs wide where the width and length dimensions in the illustrated embodiment are 1.098 inches and 0.366 inches, respectively. Other dimensions are contemplated. Here, capacitive button hardware like that described above is mounted below each of the indicia 2640, 2642, 2644 and 2646 so that when a user selects one of the indicia, the button sensor hardware there below senses the selection and provide a control signal to a workstation control processor. Matrix 2638 is for providing information to a workstation user and typically provides feedback to confirm or warn about workstation conditions or operations. For instance, in cases where the workstation provides periodic reminders to a user to change the table top height, the reminders may be provided via matrix 2638. As another instance, in a case where a user is raising the table top to a standing height and an unexpected condition occurs, a warning may be provided to the user via matrix 2638.

In at least some cases the control interface 2636 may be provided along with other workstation features and subsystems described above. For instance, the user presence sensor assembly described above with respect to FIGS. 107 and 108 may be included in the subassembly of FIGS. 121 and 122 so that user presence can be used as a condition for table height adjustment. As another instance, the buttons of FIG. 121 may be constructed in a fashion similar to that described above with respect to FIG. 21 so that unintended button selection when a user rests her hand on interface 2636 can be eliminated or at least substantially reduced.

Figure 122:
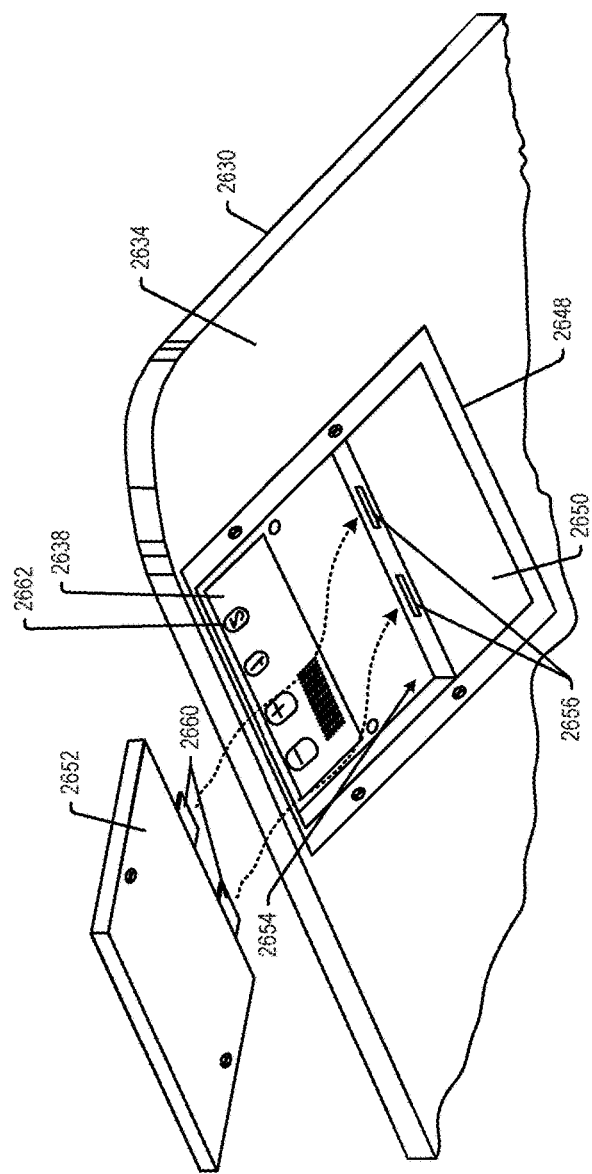
Figure 124:
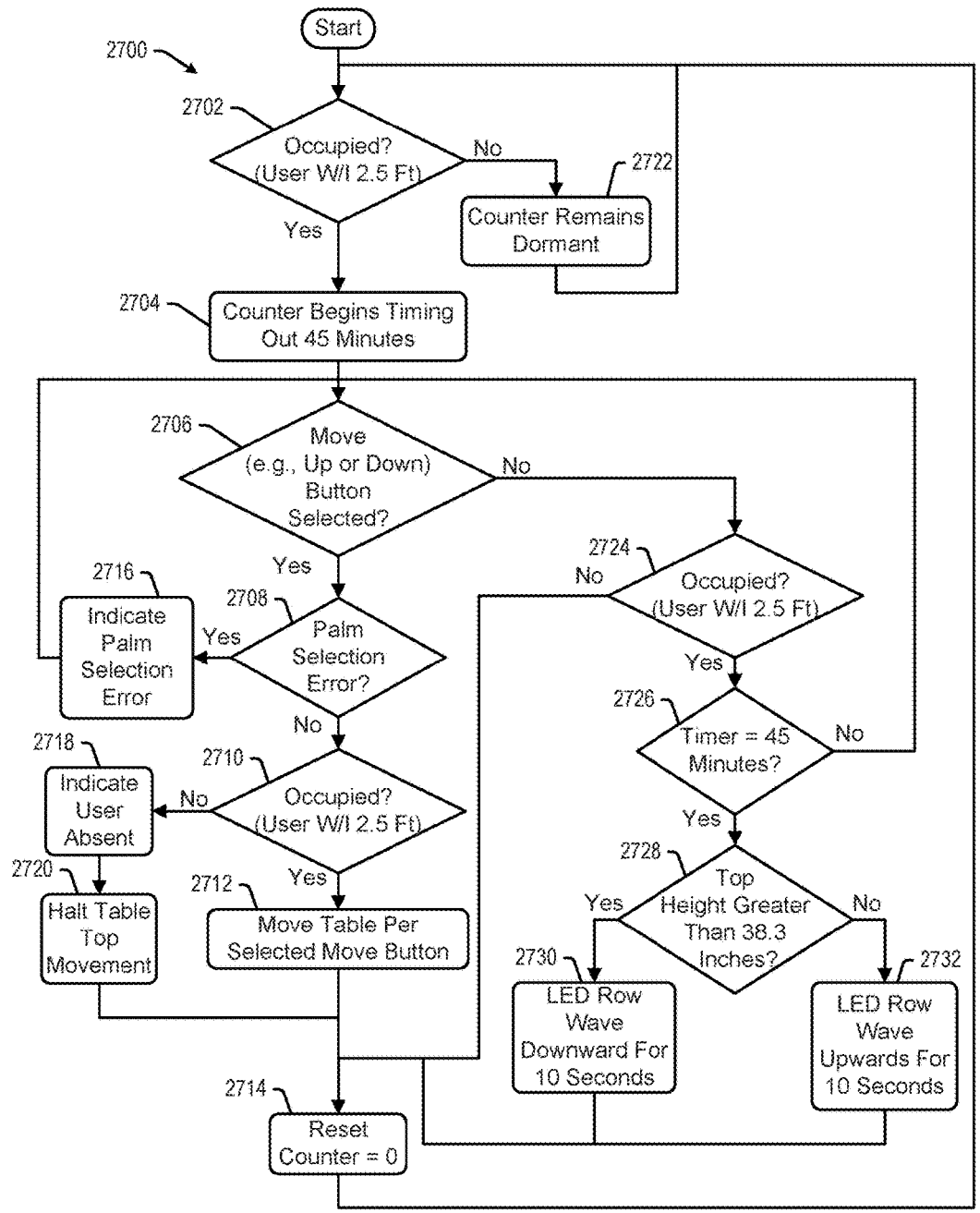

One process 2700 that may be implemented using a height adjustable table assembly that includes the capacitive sensor system of FIGS. 107 and 108, the button construction of FIG. 21 and the interface of FIGS. 121 and 122 is shown in FIG. 124. Starting at block 2702, a workstation control processor determines whether or not a user is sensed within the present zone (e.g., within 2.5 feet of the front edge of the workstation assembly). If a user is not within the present zone, control passes to block 2722 where the processor maintains a dormant counter or timing device. If a user is sensed within the present zone, control passes to block 2704 where the processor starts to time out a 45 minute period. Here, the idea is that if a workstation table top is at one height for 45 minutes, it can be assumed that a user present at the station either sits or stands during the entire 45 minute period after which the processor should encourage a change in table top height and hence a change in user position from sit to stand or vice versa.

Referring still to FIG. 124, after the counter is started at block 2704, control passes to block 2706 where the processor monitors for selection of either the up or down buttons (see 2640 and 2642 in FIG. 121 again). If no height adjustment button has been selected, control passes to block 2745 where the processor again determines that a user is still located within the present zone. If a user remains in the present zone, control passes to block 2726 where the processor determines if the 45 minute period has been timed out. If the 45 minute period has not timed out, control passes back up to block 2706 where the processor continues to monitor for an up or down button selection. At block 2726, once a 45 minute period times out where a user was located in the present zone for the entire 45 minute period, control passes to block 2728 where the processor determine the current height of the table top and compares that height to a standard standing height which, in the illustrated example, is 38.3 inches. Where the current table top height is below 38.3 inches, control passes to block 2732 where the processor controls the LED matrix 2638 (see again FIG. 121) to generate an upward rowing wave signal to encourage the user to raise the table top to a standing height. Similarly, if the table top height is above 38.3 inches, control passes to block 2730 where the processor controls matrix 2638 to generate a downward rowing wave signal to encourage the user to lower the table top to a sitting height. Here, it is assumed that the if the table top is below 38.3 inches it is at a sitting height and if the table top is above 38.3 inches, the top has been at a standing height. Each of the up and down wave signals is presented for a few seconds (e.g., 10 seconds in the present example) and then is automatically turned off so that the signal does not persist and become bothersome to the workstation user. After each of blocks 2730 and 2732, control passes to block 2714 where the counter is reset to zero and control then passes back up to block 2702 where the process described above continues to cycle.

Referring still to FIG. 124 and specifically again to block 2706, if the processor detects an up or down button selection, control passes to block 2708. At block 2708, the processor determines if it also senses a palm selection error (e.g., senses touch between two buttons on the control interface or simultaneous selection of two interface buttons) as described above with respect to FIG. 21. If a palm selection error occurs, control passes to block 2716 where the processor controls matrix 2638 to indicate a palm selection error and then back up to block 2706 where the processor continues to monitor for a movement selection button.

Once a single movement selection button is selected at block 2708, control passes to block 2710 where the processor again determines if a user is located in the present zone. If there is no user in the present zone, at block 2718 the processor controls matrix 2638 to indicate that there is no user in the present zone and table top movement is halted at block 2720 after which the counter is reset to zero again at block 2714. At block 2710, if a user remains in the present zone, control moves to block 2712 where the requested table top movement commences. After a table top move is completed, control passes to block 2714 where the counter is again reset to zero prior to returning to block 2706 where the entire process continues to cycle.

It has been recognized that where a "smart" workstation is provided that includes a processor, there are a large number of different functions and features (e.g., height adjustment algorithms, coaching and scheduling algorithms, encouragement algorithms, environmental control processes, etc.) that may be implemented and that different users may have different preferences. It has also been recognized that, in at least some cases, a user may want to upgrade or modify how a workstation operates to decrease functions, increase functionality or to change how functions or systems operate. For instance, as a simple example, referring again to FIG. 121, interface 2638 includes "1" and "2" buttons at 2644 and 2646, respectively. In some cases the buttons 2644 and 2646 may be programmed to automatically control a control processor to move an associated table top to a preset first upper position and a present second lower position, respectively. In other cases, it should be possible to program the buttons 2644 and 2646 to correspond to first and second separate users that have different optimal standing and sitting heights such that, after button 2644 is selected and while a user remains within a present zone uninterrupted, whenever button 2640 is selected the top moves to a preset lower position for the first user and when button 2642 is selected, the top moves to a preset upper position for the first user and, after button 2646 is selected and while a user remains within a present zone uninterrupted, whenever button 2640 is selected the top moves to a preset lower position for the second user and when button 2642 is selected, the top moves to a preset upper position for the second user. Thus, button functions may be programmed to operate differently in at least some embodiments.

In some cases it is contemplated that a workstation processor will be programmable in many different ways by accessing an application program on a laptop or other device and selecting programming options via that device that are then associated with either a specific workstation or with the user that makes the operational selections. In cases where the selections are associated with a specific user that made the selections, it is contemplated that when a user moves about within an enterprise and uses different workstations, the user's selected options may automatically be provided to a workstation processor and used to drive the workstation with the user selected preferences.

In at least some cases it is contemplated different user preferences may require different sets of hardware. For instance, one hardware set may be required when a processor only controls table height adjustment but a second set of hardware may be required to perform other reminding functions, scheduling functions and notification, employee guidance functions, etc. Here, at least some processing and hardware will likely be standard and required for all workstation functions while other hardware may be function mix specific. For this reason, in at least some embodiments it is contemplated that processing functions may be divided into two where one processor is provided that is required generally for all table functions and a second specialized processor and related hardware is provided in a modular form which can be easily replaced and swapped out with one of several other module based processors and hardware when different function sets are required.

Figure 123:
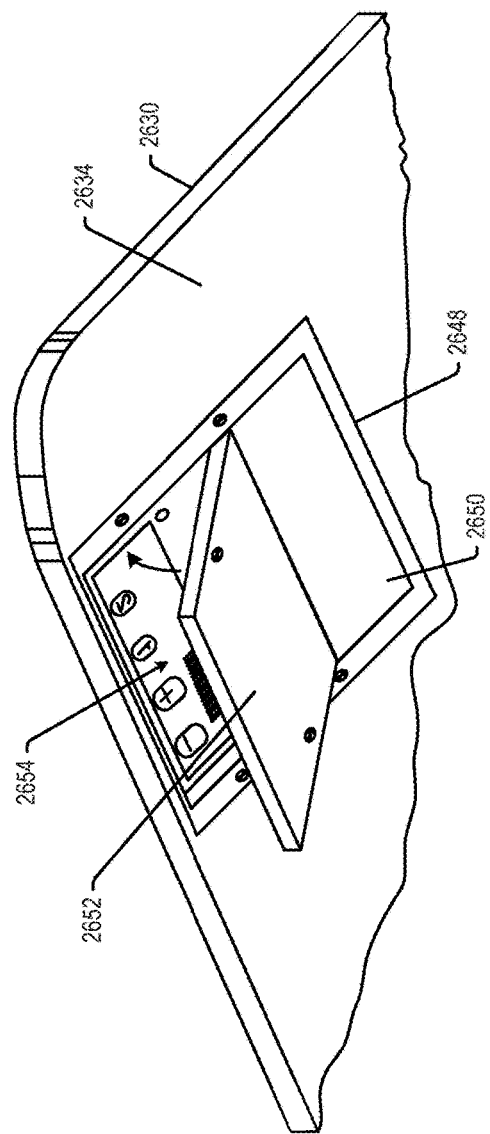

To this end, see FIGS. 122 and 123 where two views of a processor/functional module, a main processor module and the underside of a workstation top member are shown. As illustrated, in at least some embodiments a cavity 2648 is formed in the undersurface of a workstation table top member 2634 just below the transparent or translucent top member that covers the control buttons and LED matrix 2638 described above with respect to FIG. 121. While not shown in detail, a main processor is located within main processor housing 2650. Here, the main processor would be linked to other workstation hardware for control purposes, driving warning and notice devices, linking to sensors, receiving power, networking, etc. The housing 2650 is generally received in the cavity 2648 so that an undersurface thereof is substantially flush with the undersurface 2634 of member 2630. Housing 2650 forms another cavity 2654 in which the processor/functional module 2652 can be received. As shown, in at least some case the functional module 2652 may include tabs 2660 that align with slots 2656 in the housing 2650 to help guide module 2652 into the cavity 2654. In at least some cases, slots 2656 are arranged to limit the types of modules that can be installed in the cavity to ensure that only compatible modules are used with the assembly.

Referring still to FIGS. 122 and 123, capacitive button hardware and the LED matrix are provided in an upper surface (not illustrated) of module 2652 and align with the translucent top member that forms the upper surface of top member 2630. Once module 2652 is installed in cavity 2654, screws or other mechanical fasteners can be used to lock the module in place such that the undersurface of the module is substantially flush with the undersurface of housing 2650 and hence the undersurface of top member 2634. Here, if desired, a user can swap one functional module in for another to change at least some capabilities or functions of the module and hence operation of the workstation.

Where a user modifies functionality associated with the buttons presented via interface 2638 (see again FIG. 121), in at least some cases it may be that the user would like to change the indicia that appears on the interface 2638 to match the new functionality. For this reason, in at least some cases the indicia shown in FIG. 121 may be provided via a sticker overlay or underlay. For instance, the up and down arrow and "1" and "2" indicia on interface 2638 may be removable and replaceable via other stickers that could be purchased or provided with modules are they are purchased from a manufacturer. Referring again to FIG. 122, underlay stickers (e.g., see 2662) may be adhered to the undersurface of interface 2638 top member so as to be visible through the top member and the underlay stickers may be replaceable by a user. By providing the india as an underlay, the stickers are protected from wear and tear. In at least some cases the module 2652 may include light devices below the indicia to shine through underlay stickers to increase visibility of the indica on the stickers.

Figure 125:
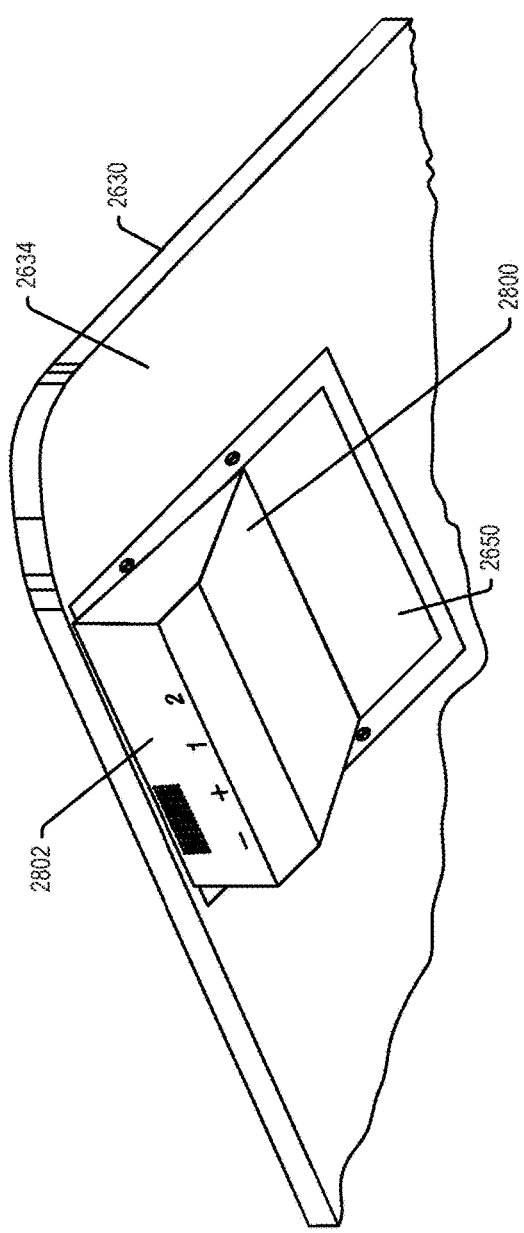

Another module type 2800 is shown installed in the main processor housing cavity below a table top member 2630 where, instead of providing an interface through the top surface of the table top, the interface is provided below the table top and adjacent a front edge of the table top as shown at 2802. Here the interface provided by module 2800 is easily accessible from below the top member and there is no issue with a user inadvertently placing her hand on the interface. In at least some cases a user may have the option for a through surface interface as shown in FIG. 121 and an undersurface interface as in FIG. 125 where different modules provide different configurations even with the same base workstation structure.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. For example, while a capacitive sensor assembly along the front edge of a workstation top member is described above with respect to FIGS. 107 and 108, in other embodiments it is contemplated that other types of present zone sensor assemblies may be employed. For instance, a workstation camera or a general space camera near a workstation may be used to detect user presence within a present zone. Other types of sensors like a sonar sensor device, a Doppler sensor device, etc. may be built right into the workstation assembly. In addition, a capacitive sensor assembly may be supported by other parts of the workstation including but not limited to within a privacy screen that surrounds side and rear edges of a worktop member, within a workstation support pedestal or leg structure, etc.

Thus, the invention is to cover all modifications, equivalents, and alternatives falling within the spirit and scope of the invention as defined by the following appended claims.

What is claimed is:

1. A guidance system for helping users locate specific affordance configurations for use within an open enterprise space, the system comprising:
   a stationary display field located within the open enterprise space, the display field controlled to present glanceable guidance information to a system user;
   a database storing affordance configuration schedules and user schedules;
   a processor programmed to automatically perform the steps of:
   (i) determining that a first user is proximate the display field;
   (ii) in response to determining that the first user is proximate the display field, examining the first user's schedule information to identify activities scheduled for the first user within a threshold period of time;
   (iii) determining, based on the first user's schedule information, that the user is scheduled to participate in a collaborative activity within the threshold period of time;
   (iv) in response to determining that the user is scheduled to participate in the collaborative activity within the threshold period of time, examining the affordance configuration schedules to identify at least one affordance configuration within the enterprise space that is available and that is suitable for the collaborative activity; and
   (v) automatically presenting the identified at least one affordance configuration via the display field in a glanceable fashion as a suggestion to the first user as a location for the collaborative activity while the first user is proximate the display field.

2. The guidance system of claim 1 wherein the processor is further programmed to perform the step of determining that no affordance configuration in the open enterprise space has been associated with the collaborative activity.

3. The guidance system of claim 1 wherein the collaborative enterprise activity includes a teleconference session with a second user that is located remotely from the open enterprise, the step of examining the affordance configuration schedules to identify at least one affordance configuration within the open enterprise that is available and that is suitable for the collaborative activity includes:
   identifying one or more affordance configurations that include a telepresence system.

4. The guidance system of claim 1 wherein the collaborative enterprise activity includes a meeting with a plurality of other users that are each located in the open enterprise, the step of examining the affordance configuration schedules to identify at least one affordance configuration within the open enterprise that is available and that is suitable for the collaborative activity includes:
   identifying one or more affordance configurations that are suitable for the first user and the plurality of other users.

5. The guidance system of claim 1 wherein the collaborative enterprise activity includes a collaborative conference with at least one other user that is located in the open enterprise, the step of examining the affordance configuration schedules to identify at least one affordance configuration within the open enterprise that is available and that is suitable for the collaborative activity includes:
   identifying one or more affordance configurations that include a collaborative display system.

6. The guidance system of claim 1 wherein the step of automatically presenting the identified at least one affordance configuration includes:
   presenting a map view of at least a sub-portion of the open enterprise that includes a representation of the at least one affordance configuration and surrounding affordance configurations.

7. The guidance system of claim 6 wherein the step of automatically presenting the identified at least one affordance configuration includes:
   presenting a selectable user interface icon associated with a first affordance configuration of the at least one affordance configurations, wherein selection of the user interface icon allows the first user to reserve the first affordance configuration;
   receiving input selecting the selectable user interface; and
   in response to receiving input selecting the selectable user interface, reserving the first affordance configuration for the first user for at least the scheduled time of the collaborative enterprise activity.

8. A guidance system for helping users locate specific affordance configurations for use within an open enterprise, the system comprising:
   a display field located within the open enterprise;
   a database storing affordance configuration schedules and user schedules;
   a processor programmed to automatically perform the steps of:
   (i) determining that a first user is proximate the display field;
   (ii) in response to determining that the first user is proximate the display field, examining the first user's schedule information to identify activities scheduled for the first user within a threshold period of time;
   (iii) determining, based on the first user's schedule information, that the user is scheduled to participate in a first collaborative activity within the threshold period of time with a second user in the open enterprise;
   (iv) examining the affordance configuration schedules to identify at least one affordance configuration within the open enterprise that is available and that is suitable for the collaborative activity; and
   (v) automatically presenting the identified at least one affordance configuration via the display field in a glanceable fashion as a suggestion to the first user as a location for the collaborative activity while the first user is proximate the display field.

9. The guidance system of claim 8 wherein the processor is further programmed to perform the step of determining that no affordance configuration in the open enterprise has been associated with the collaborative activity.

10. The guidance system of claim 8 wherein the processor is further programmed to perform the steps of:
    determining that the second user is proximate the display field; and
    automatically presenting the identified at least one affordance configuration via the display field in a glanceable fashion to the second user as the location for the collaborative activity while the second user is proximate the display field.

11. The guidance system of claim 8 wherein the collaborative enterprise activity includes a teleconference session with a third user that is located remotely from the open enterprise, the step of examining the affordance configuration schedules to identify at least one affordance configuration within the open enterprise that is available and that is suitable for the collaborative activity includes:

identifying one or more affordance configurations that include a telepresence system.

12. The guidance system of claim 8 wherein the collaborative enterprise activity includes a collaborative conference with the second user, the step of examining the affordance configuration schedules to identify at least one affordance configuration within the open enterprise that is available and that is suitable for the collaborative activity includes:

identifying one or more affordance configurations that include a collaborative display system.

13. The guidance system of claim 8 wherein the step of automatically presenting the identified at least one affordance configuration includes:

presenting a map view of at least a sub-portion of the open enterprise that includes a representation of the at least one affordance configuration and surrounding affordance configurations.

14. The guidance system of claim 13 wherein the step of automatically presenting the identified at least one affordance configuration includes:

presenting a selectable user interface icon associated with a first affordance configuration of the at least one affordance configurations, wherein selection of the user interface icon allows the first user to reserve the first affordance configuration;

receiving input selecting the selectable user interface; and in response to receiving input selecting the selectable user interface, reserving the first affordance configuration for the first user and the second user for at least the scheduled time of the collaborative enterprise activity.

15. A guidance system for helping users locate specific affordance configurations for use within an open enterprise, the system comprising:

a display field located within the open enterprise;

a database storing affordance configuration schedules and user schedules;

a processor programmed to automatically perform the steps of:

(i) determining that a first user is proximate the display field;

(ii) in response to determining that the first user is proximate the display field, examining the first user's schedule information to identify activities scheduled for the first user within a threshold period of time;

(iii) determining, based on the first user's schedule information, that the user is scheduled to participate in a first collaborative activity within the threshold period of time;

(iv) examining the affordance configuration schedules to identify at least one affordance configuration within the open enterprise space that is available proximate to a first affordance configuration suggested to the first user as a base station, and that is suitable for the collaborative activity; and (v) automatically presenting the identified at least one affordance configuration via the display field as a suggestion to the first user as a location for the collaborative activity while the first user is proximate the display field.

16. The guidance system of claim 15 wherein the processor is further programmed to perform the step of determining that no affordance configuration in the open enterprise has been associated with the collaborative activity.

17. The guidance system of claim 15 wherein the processor is further programmed to perform the steps of:

determining that the second user is proximate the display field; and automatically presenting the identified at least one affordance configuration via the display field in a glanceable fashion to the second user as the location for the collaborative activity while the second user is proximate the display field.

18. The guidance system of claim 15 wherein the collaborative enterprise activity includes a teleconference session with a second user that is located remotely from the open enterprise, the step of examining the affordance configuration schedules to identify at least one affordance configuration within the open enterprise that is available proximate to a first affordance configuration suggested to the first user as a base station, and that is suitable for the collaborative activity includes:

identifying one or more affordance configurations that include a telepresence system.

19. The guidance system of claim 15 wherein the collaborative enterprise activity includes a meeting with a plurality of other users that are each located in the open enterprise, the step of examining the affordance configuration schedules to identify at least one affordance configuration within the open enterprise that is available proximate to a first affordance configuration suggested to the first user as a base station, and that is suitable for the collaborative activity includes:

identifying one or more affordance configurations that are suitable for the first user and the plurality of other users.

20. The guidance system of claim 15 wherein the collaborative enterprise activity includes a collaborative conference with at least one other user that is located in the open enterprise, the step of examining the affordance configuration schedules to identify at least one affordance configuration within the open enterprise that is available proximate to a first affordance configuration suggested to the first user as a base station, and that is suitable for the collaborative activity includes:

identifying one or more affordance configurations that include a collaborative display system that is proximate to both the first affordance configuration and a second affordance configuration associated with the at least one other user.

\* \* \* \* \*